US012652524B2

(12) United States Patent
Kim et al.

(10) Patent No.: US 12,652,524 B2
(45) Date of Patent: Jun. 9, 2026

(54) METHOD AND APPARATUS FOR ACCELERATING DATA PROCESSING IN NEXT-GENERATION WIRELESS COMMUNICATION SYSTEM

(71) Applicant: Samsung Electronics Co., Ltd., Suwon-si (KR)

(72) Inventors: Donggun Kim, Suwon-si (KR); Jinkyu Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 722 days.

(21) Appl. No.: 17/523,445

(22) Filed: Nov. 10, 2021

(65) Prior Publication Data

US 2022/0150693 A1    May 12, 2022

(30) Foreign Application Priority Data

Nov. 10, 2020    (KR) ......................... 10-2020-0149473
Feb. 5, 2021    (KR) ......................... 10-2021-0016633
(Continued)

(51) Int. Cl.
*H04W 12/033*    (2021.01)
*H04L 47/2483*    (2022.01)
(Continued)

(52) U.S. Cl.
CPC ....... *H04W 12/033* (2021.01); *H04L 47/2483* (2013.01); *H04W 12/106* (2021.01); *H04W 28/065* (2013.01); *H04W 80/08* (2013.01)

(58) Field of Classification Search
CPC .............. H04W 80/80; H04W 12/033; H04W 28/065; H04W 12/106; H04L 47/2483
(Continued)

(56) References Cited

U.S. PATENT DOCUMENTS 10,432,291 B2 *  10/2019  Agiwal ................. H04W 12/04
11,088,958 B2     8/2021  Kim et al.
(Continued)

FOREIGN PATENT DOCUMENTS

CN         102300259 A     12/2011
CN         110178358 A      8/2019
(Continued)

OTHER PUBLICATIONS

Ericsson et al., 'KT PyeongChang 5G Special Interest Group (KT 5G-SIG); KT 5th Generation Radio Access; Packet Data Convergence Protocol (PDCP); Protocol specification (Release 1)', TS 5G.323 V1.0; Jun. 2016.
(Continued)

*Primary Examiner* — Teshome Hailu
(74) *Attorney, Agent, or Firm* — Jefferson IP Law, LLP

(57) ABSTRACT

The disclosure relates to a 5th generation (5G) or 6$^{th}$ generation (6G) communication system for supporting a higher data rate than that of a beyond-4G communication system such as Long-term evolution (LTE). A method and an apparatus for improving procedures that have high data processing complexity or require a lot of time for data processing in a next-generation mobile communication system are provided.

20 Claims, 46 Drawing Sheets

(30) Foreign Application Priority Data

| | | |
|---|---|---|
| Apr. 28, 2021 | (KR) | 10-2021-0054717 |
| May 18, 2021 | (KR) | 10-2021-0064345 |

(51) Int. Cl.

| | |
|---|---|
| *H04W 12/106* | (2021.01) |
| *H04W 28/06* | (2009.01) |
| *H04W 80/08* | (2009.01) |

(58) Field of Classification Search
USPC ........................................................ 380/270
See application file for complete search history.

(56) References Cited

U.S. PATENT DOCUMENTS

| | | | | |
|---|---|---|---|---|
| 2008/0226074 | A1* | 9/2008 | Sammour | H04W 12/033 |
| | | | | 380/270 |
| 2009/0092138 | A1* | 4/2009 | Joo | H04W 28/065 |
| | | | | 370/392 |
| 2010/0202613 | A1 | 8/2010 | Ray et al. | |
| 2011/0033048 | A1* | 2/2011 | Stanwood | H04W 72/04 |
| | | | | 380/255 |
| 2013/0235803 | A1 | 9/2013 | Yi et al. | |
| 2017/0374551 | A1* | 12/2017 | Shen | H04L 9/40 |
| 2018/0083688 | A1* | 3/2018 | Agiwal | H04M 3/537 |
| 2018/0206213 | A1 | 7/2018 | Kim et al. | |
| 2019/0268819 | A1* | 8/2019 | Kim | H04W 36/0058 |
| 2020/0204986 | A1 | 6/2020 | Liu et al. | |
| 2020/0221329 | A1 | 7/2020 | Kim | |
| 2020/0305225 | A1* | 9/2020 | Zhang | H04W 80/02 |
| 2021/0352606 | A1* | 11/2021 | Hosseinian | H04B 7/1851 |

FOREIGN PATENT DOCUMENTS

| | | |
|---|---|---|
| EP | 3 556 135 | 10/2019 |
| KR | 10-2020-0086625 A | 7/2020 |
| WO | 2018/080565 A1 | 5/2018 |
| WO | 2018/184475 A1 | 10/2018 |
| WO | 2019/235768 A1 | 12/2019 |

OTHER PUBLICATIONS

International Search Report dated Feb. 14, 2022, issued in International Application No. PCT/KR2021/016305.

Extended European Search Report dated Mar. 22, 2024; European Appln. No. 21892306.8-1213 / 4226600 PCT/KR2021016305.

Korean Office Action dated Sep. 26, 2025, issued in Korean Patent Application No. 10-2021-0153715.

European Office Action dated Jan. 28, 2026, issued in European Patent Application No. 21892306.8.

Chinese Office Action dated Apr. 18, 2026, issued in Chinese Patent Application No. 202180075825.8.

* cited by examiner

Figure 15D:
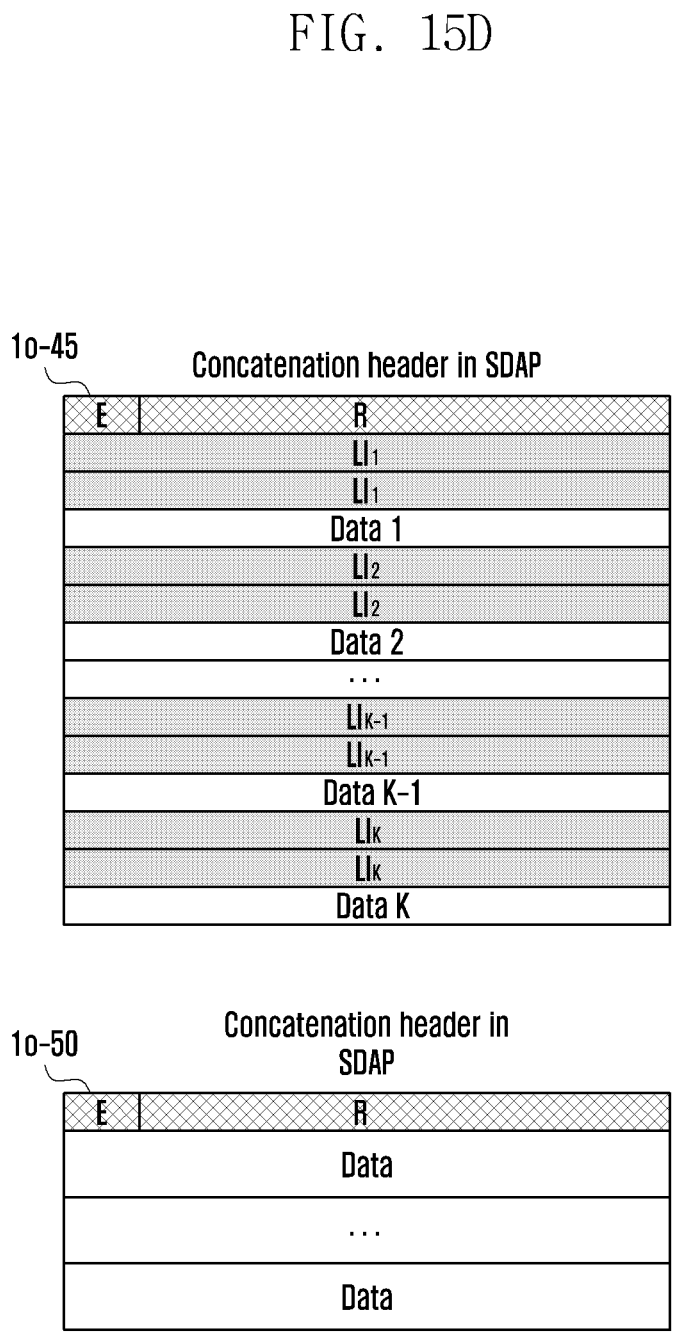

Concatenation header in SDAP

| E | R |
|---|---|
| | $LI_1$ |
| | $LI_1$ |
| Data 1 | |
| | $LI_2$ |
| | $LI_2$ |
| Data 2 | |
| . . . | |
| | $LI_{K-1}$ |
| | $LI_{K-1}$ |
| Data K-1 | |
| | $LI_K$ |
| | $LI_K$ |
| Data K | |

10-50

Concatenation header in
SDAP

| E | R |
|---|---|
| Data | |
| . . . | |
| Data | |

| | Case 1 | Case 2 |
|---|---|---|
| Key generation | 4 | 1 |
| # of bus use | 4 | 1 |
| Efficiency of bus | Low | High |
| # of integrity (HW call) | 4 | 1 |
| # of MAC-I | 4 | 1 |
| # of ciphering (HW call) | 4 | 1 |
| Efficiency of HW | Low | High |
| Delay at RX side | Low | Low |
| # of header set | 4 | 1 |

METHOD AND APPARATUS FOR ACCELERATING DATA PROCESSING IN NEXT-GENERATION WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0149473, filed on Nov. 10, 2020, in the Korean Intellectual Property Office, and of a Korean patent application number 10-2021-0016633, filed on Feb. 5, 2021, in the Korean Intellectual Property Office, and of a Korean patent application number 10-2021-0054717, filed on Apr. 28, 2021, in the Korean Intellectual Property Office, and of a Korean patent application number 10-2021-0064345, filed on May 18, 2021, in the Korean Intellectual Property Office, the disclosure of each of which is incorporated by reference herein in its entirety.

BACKGROUND

1. Field

The disclosure relates to a method and an apparatus for improving procedures having a high level of complexity of data processing or requiring a large amount of time for data processing in a next-generation mobile communication system.

2. Description of Related Art

A review of the development of mobile communication from generation to generation shows that the development has mostly been directed to technologies for services targeting humans, such as voice-based services, multimedia services, and data services. It is expected that connected devices which are exponentially increasing after commercialization of 5th generation (5G) communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices or things in the 6G era, there have been ongoing efforts to develop improved 6th generation (6G) communication systems. For these reasons, 6G communication systems are referred to as Beyond-5G systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the $\frac{1}{10}$ radio latency thereof.

In order to accomplish such a high data transmission rate or an ultra-low latency, it has been considered to implement 6G communication systems in a terahertz band (for example, 95 GHz to 3 THz bands). It is expected that, due to severer path loss or atmospheric absorption in the terahertz bands than those in mmWave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming or massive MIMO, full dimensional MIMO (FD-MIMO), array antennas, and large-scale antennas. In addition, there has been ongoing discussion on new technologies for improving the coverage of terahertz-band signals, such as metamaterial-based lenses or antennas, orbital angular momentum (OAM), and reconfigurable intelligent surface (RIS).

Moreover, in order to improve the frequency efficiencies or system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), or the like in an integrated manner; a network structure innovation technology for supporting mobile nodes B and the like and enabling network operation optimization or automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of user equipment (UE) computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments or secure use of data, or development of technologies for privacy maintenance methods.

It is expected that such research or development of 6G communication systems will enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security or reliability, services such as remote surgery, industrial automation, or emergency response will be provided through 6G communication systems, and thus these services will be applied to various fields including industrial, medical, automobile, and home appliance fields.

The above information is presented as background information only to assist with an understanding of the disclosure. No determination has been made, and no assertion is made, as to whether any of the above might be applicable as prior art with regard to the disclosure.

SUMMARY

Extremely high data transmission rates need to be supported in next-generation mobile communication systems, and there is thus a need for a method for improving a ciphering or deciphering procedure, integrity protection, a verification procedure, or a procedure of an ARQ (Autonomous Repeat Request) operation, which has a large influence on the data processing time, and for enabling parallel processing.

Aspects of the disclosure are to address at least the above-mentioned problems and/or disadvantages and to provide at least the advantages described below. Accordingly, an aspect of the disclosure is to provide various data processing methods for improving the data processing speed when a base station and a terminal perform data processing according to a high data transmission rate in a next-generation mobile communication system.

Additional aspects will be set forth in part in the description which follows and, in part, will be apparent from the description, or may be learned by practice of the presented embodiments.

In accordance with an aspect of the disclosure, a method by a transmission device in a wireless communication system is provided. The method includes receiving service data units (SDUs) from an upper layer; generating concatenated data by concatenating the SDUs; performing at least one procedure among an integrity protection procedure and a ciphering procedure for the concatenated data; and transmitting the data, for which the at least one procedure has been performed, to a reception device through a lower layer, wherein security key information corresponding to each of the at least one procedure is equally applied to SDUs included in one piece of concatenated data.

In accordance with another aspect of the disclosure, a method by a reception device in a wireless communication system is provided. The method includes receiving data from a transmission device through a lower layer; performing at least one procedure among an integrity verification procedure and a deciphering procedure for the data; separating service data units (SDUs) included in the data for which the at least one procedure has been performed; and transmitting the separated SDUs to an upper layer, wherein security key information corresponding to each of the at least one procedure is equally applied to SDUs included in the data.

In accordance with another aspect of the disclosure, a transmission device in a wireless communication system is provided. The transmission device includes a transceiver; and a controller configured to receive service data units (SDUs) from an upper layer; generate concatenated data by concatenating the SDUs; perform at least one procedure among an integrity protection procedure and a ciphering procedure for the concatenated data; and control the transceiver to transmit the data, for which the at least one procedure has been performed, to a reception device through a lower layer, wherein security key information corresponding to each of the at least one procedure is equally applied to SDUs included in one piece of concatenated data.

In accordance with another aspect of the disclosure, a reception device in a wireless communication system is provided. The reception device includes a transceiver; and a controller configured to control the transceiver to receive data from a transmission device through a lower layer; perform at least one procedure among an integrity verification procedure and a deciphering procedure for the data; separate service data units (SDUs) included in data for which the at least one procedure has been performed; and transmit the separated SDUs to an upper layer, wherein security key information corresponding to each of the at least one procedure is equally applied to SDUs included in the data.

The disclosure proposes an efficient ciphering or deciphering procedure, integrity protection, a verification procedure, or a procedure of an autonomous repeat request (ARQ) operation such that an extremely high data transmission rate can be supported at a high data processing speed in a next-generation mobile communication system. This is advantageous in that the efficiency of the data processing procedure is maximized, and a larger amount of parallel processing is possible.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7B illustrates a procedure of processing and transmitting data, which is received from an upper layer device, by each protocol layer device of a bearer, and a procedure of processing data, which is received from a lower layer device, by each protocol layer device of a bearer and transferring the processed data to an upper layer device in a next-generation mobile communication system according to an embodiment of the disclosure;

FIG. 11A illustrates a first embodiment of a data concatenation procedure according to an embodiment of the disclosure;

FIG. 15D illustrates a header structure or a new field structure of an upper layer device suitable for the second embodiment of a data concatenation procedure proposed in according to an embodiment of the disclosure;

FIG. 17A illustrates the benefit of a data concatenation procedure proposed in the disclosure from the viewpoint of an RLC layer device according to an embodiment of the disclosure;

FIG. 21 illustrates an SO-based segmentation operation that can be used in an RLC layer RLC AM mode or RLC UM mode in according to an embodiment of the disclosure;

FIG. 22 illustrates a data processing operation to which an SO-based segmentation method of an RLC AM mode or RLC UM mode proposed in according to an embodiment of the disclosure;

FIG. 24 illustrates a data processing operation to which an SI-based segmentation method of an RLC UM mode or RLC AM mode proposed in according to an embodiment of the disclosure;

The same reference numerals are used to represent the same elements throughout the drawings.

DETAILED DESCRIPTION

Figure 1:
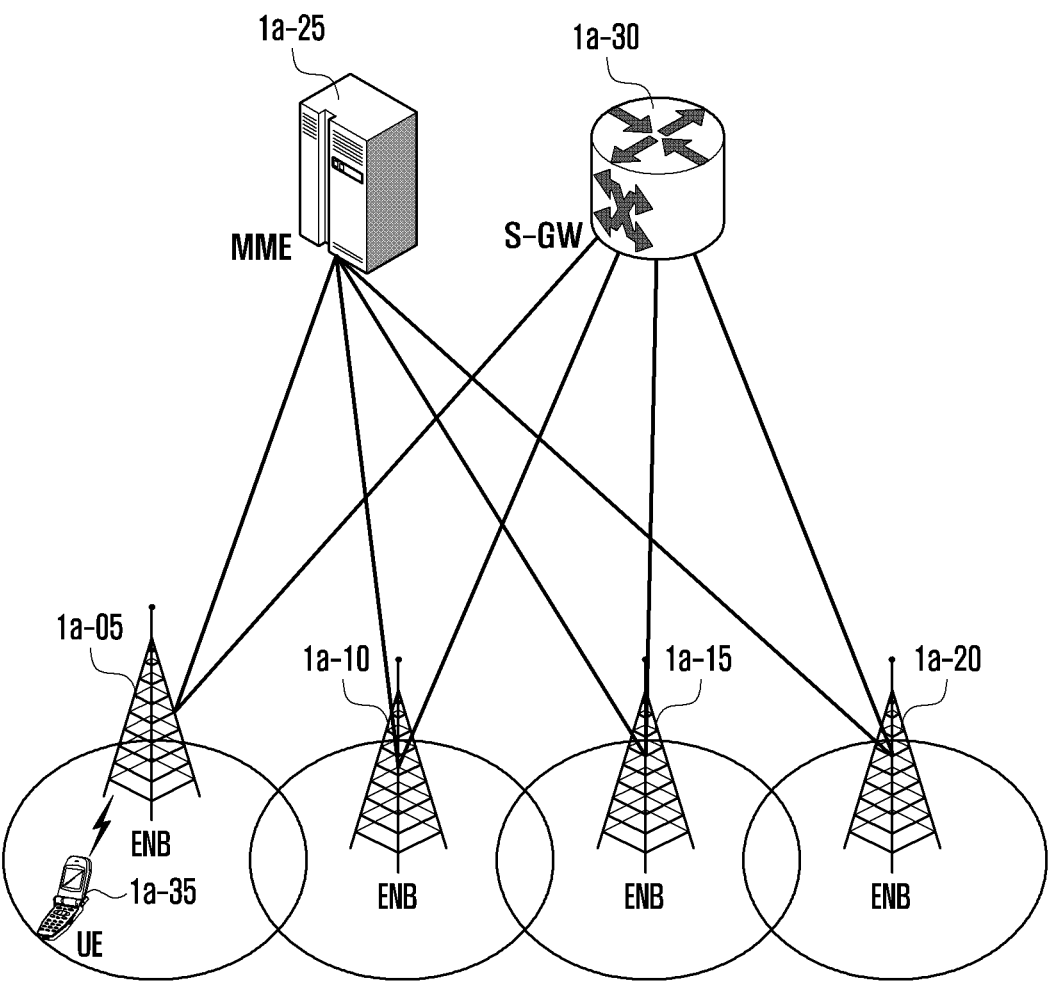
FIG. 1 illustrates the structure of a Long-term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of the disclosure, a detailed description of known functions or configurations incorporated herein will be omitted when it is determined that the description may make the subject matter of the disclosure unnecessarily unclear. Hereinafter, embodiments of the disclosure will be described in detail with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms or names defined in the 3rd generation partnership project long term evolution (3GPP LTE) standards for the convenience of description. However, the disclosure is not limited by these terms or names, and may be applied in the same way to systems that conform other standards. In the disclosure, the term "eNB" may be interchangeably used with the term "gNB". That is, a base station described as "eNB" may indicate "gNB".

In the disclosure, a bearer may include SRB and DRB, the SRB denotes a signaling radio bearer, and the DRB denotes a data radio bearer. The SRB is mainly used to transmit or receive RRC messages of an RRC layer device, and the DRB is mainly used to transmit or receive user layer data. In addition, a UM DRB denotes a DRB which uses an RLC layer device operating in an unacknowledged mode (UM mode), and an AM DRB denotes a DRB which uses an RLC layer device operating in an acknowledged mode (AM mode).

The disclosure proposes various data processing methods for improving data processing speed when a base station and a UE perform data processing at a high data rate in a next-generation mobile communication system.

A procedure that consumes the largest amount of processing load or time, among data processing procedures performed when a UE or base station transmits or receives data, is a ciphering procedure, a deciphering procedure, an integrity protection procedure, and an integrity verification procedure of a PDCP layer device, or an autonomous repeat request (ARQ) procedure of an RLC layer device.

The above procedures are procedures performed in the RLC layer device or the PDCP layer device configured for each bearer, and when the UE establishes a connection with the network, a base station transmits an RRC message (e.g., an RRCReconfiguration message, an RRCSetup message, or an RRCResume message) to a UE, and thus may configure, through an indicator, as to whether or not to use the ciphering procedure (or deciphering procedure), integrity protection procedure (or integrity verification procedure), or ARQ procedure (e.g., configuration in RLC AM mode) for each bearer (e.g., SRB or DRB), respectively.

Therefore, if a ciphering procedure (or deciphering procedure) is established for a bearer and an integrity protection procedure (or integrity verification procedure) is not configured, a UE or base station may perform a ciphering procedure (or deciphering procedure) for the bearer without performing the integrity protection procedure (or integrity verification procedure).

In addition, if a ciphering procedure (or deciphering procedure) is not established for a bearer and an integrity protection procedure (or integrity verification procedure) is configured, a UE or base station may perform the integrity protection procedure (or integrity verification procedure) for the bearer, and may not perform the ciphering procedure (or deciphering procedure).

In addition, when a ciphering procedure (or deciphering procedure) is configured for a bearer and an integrity protection procedure (or integrity verification procedure) is also configured, a UE or base station may perform an integrity protection procedure (or integrity verification procedure) for the bearer, and then, may perform a ciphering procedure (or deciphering procedure).

In the above, since the PDCP layer device performs the ciphering procedure (or deciphering procedure) or the integrity protection procedure (or integrity verification procedure) once for each data received from an upper layer device, the more data the PDCP layer device receives, the more the ciphering procedure (or deciphering procedure) or integrity protection procedure (or integrity verification procedure) needs to be performed, which increases data processing complexity and increases data processing time. In addition, since an RLC layer device allocates an RLC serial number to each data received from an upper layer device (e.g., a PDCP layer device), the more data the RLC layer device receives, the more RLC serial numbers are allocated and used. Therefore, the ARQ procedure that operates based on RLC serial numbers becomes very complicated and requires a lot of data processing time.

Therefore, the disclosure proposes a method in which the number or frequency of ciphering procedures (or deciphering procedures) or integrity protection procedures (or integrity verification procedures) performed in the PDCP layer device is reduced, and the number of RLC serial numbers allocated and used by the RLC layer device is reduced.

Since the ciphering procedure (or deciphering procedure) or the integrity protection procedure (or integrity verification procedure) in the above is a procedure having a large data processing load, it can be processed using a hardware accelerator or hardware engine. In the above, if the number of times of calling and using a hardware accelerator for performing the ciphering procedure (or deciphering procedure) or the integrity protection procedure (or integrity verification procedure) is reduced, more hardware accelerator calls can be used in parallel in order to perform processing of other data (for example, data of another bearer), and thus data processing time can be reduced and data processing speed can be improved.

In addition, if the number of RLC serial numbers allocated for each data is reduced, a list searching time with the RLC serial number, data, ACK or NACK indicator in the ARQ procedure of the RLC layer device can be reduced, so that the data processing time can be reduced.

The disclosure proposes that an upper layer device (e.g., a PDCP layer device, an SDAP layer device, or a new layer device) performs a data concatenation procedure for pieces of data (e.g., SDAP SDU or PDCP SDU), which are received from a further upper layer device.

The upper layer device data concatenation procedure (upper layer concatenation) proposed in the disclosure may have one or multiple functions among the following functions. In the above, if the upper layer device data concatenation procedure is configured at a transmitting terminal, a receiving terminal needs to perform a data de-concatenation or separation procedure.

The data concatenation procedure proposed in the disclosure may be configured or performed in an SDAP layer device, a PDCP layer device, or a new layer device, and whether to apply the data concatenation procedure may be configured for each bearer through an RRC message (e.g., RRCReconfiguration message, RRCSetup message, or RRCResume message), or using an indicator for each downlink or uplink. When the data concatenation procedure is configured in the RRC message, the amount of data to be concatenated or the maximum size of data that can be concatenated may be configured. In another method, a specific type of data (e.g., small size data or data including TCP ACK) to be performed data concatenation in the RRC message, or specific data (or QoS flow) (e.g., QoS flow with a small data size, a QoS flow having a low data rate, or a QoS flow having a high data rate) may be configured. For example, the PDCP layer device processes and transmits specific packets (for example, a TCP ACK message) first, by considering the UE implementation, the configuration information, indication information configured in the RRC message, or priority information, or performs concatenation processing first of the specific packets and transmits, so as to increase data rate. In another method, the amount of data to be concatenated or the size to be concatenated may be freely determined by the UE implementation or the base station implementation.

The UE supporting the data concatenation procedure proposed in the disclosure may report, through a UE capability reporting message, the maximum size that can be concatenated by the data concatenation procedure (e.g., the maximum size of concatenated data or the maximum size to which ciphering procedure (or deciphering procedure) and integrity protection procedure (or integrity verification procedure) can be applied at one time), or whether the data concatenation procedure is supported. In the above, the maximum size that the UE or base station can concatenate by the data concatenation procedure, the maximum size of concatenated data, or the maximum size to which ciphering procedure (or deciphering procedure) and integrity protection procedure (or integrity verification procedure) can be applied at one time may be predetermined or defined and used in the PDCP layer device. For example, the maximum size (e.g., 8192 bytes, 9000 bytes, or 8188 bytes) may be defined in the PDCP layer device-related standard.

It is proposed to introduce new fields to perform the data concatenation procedure or data de-concatenation procedure proposed in the disclosure. Some of the new fields proposed above may be introduced or defined in the SDAP header or PDCP header, some of the new fields may be attached or introduced in front of each concatenated data, or some of the new fields may be attached or introduced at the very front of all concatenated data. In the disclosure, the UE or the base station may apply or perform the data concatenation procedure or data de-concatenation procedure proposed above based on the new fields. The new fields may include one or multiple fields among the following fields. The new fields proposed in the disclosure may be generated or introduced in a PDCP layer device or an SDAP layer device (or new layer device) and may be attached and used in the data concatenation procedure, or the PDCP layer device or SDAP layer device (or new layer device) may read and interpret the new fields and use the same to separate concatenated data, in the data de-concatenation procedure.

C field: may indicate whether a data concatenation function is performed or not, and may indicate that there is data, new fields, or concatenated data immediately thereafter using another method. As another method, it may indicate whether it is the last data.

E field: may indicate whether there is data, new fields, or concatenated data immediately thereafter. As another method, it may indicate whether it is the last data.

LI field: may indicate the size of each concatenated data in byte units, or with regard to concatenated data, the size of each data received from or transferred to an upper layer device may be indicated in byte units. For example, the first LI field may indicate the size of the first (or very first) data among concatenated data in byte units, or the second LI field may indicate the size of the second (or the next) data among concatenated data in bytes. For example, an LI field is introduced for each data, and the layer 1 (L1) field may be used in a data concatenation procedure or a data de-concatenation procedure.

For example, each of the LI fields is located in front of each data, and thus data may be concatenated in the structure of {[field+data] [LI field+data] . . . [LI field+data]}. The above structure facilitates data processing speed because data processing can be performed sequentially and quickly using new fields and the processed data can be directly transferred to an upper layer.

As another method, data may be concatenated in the structure of [E field LI field] [E field LI field] . . . [E field LI field] [data+data+ . . . +data]. The above structure has the advantage of enabling simultaneous processing of new fields.

As another method, the LI field indicating the size of the last data may be omitted. This is because, when n pieces of data are concatenated, if the (n−1)th data is separated by the LI field, the remaining data itself becomes the nth data without even knowing the size of the remaining data.

As another method, in the above, the LI field may indicate the size of concatenated data in byte units, and if the header compression procedure is configured, the L1 field may indicate the compressed size of data, the size of data is reduced by application of the header compression procedure, in byte units.

As another method, in the above, the LI field may indicate the size of concatenated data in byte units, and if an integrity protection procedure is configured, the L1 field may indicate the size of data before application of the integrity protection procedure and add MAC-I field to the very end of the concatenated data. If the integrity protection procedure is configured at the time of application of the data de-concatenation procedure, a receiving terminal may perform the data de-concatenation procedure by considering that there is a MAC-I field having a predetermined length (e.g., 4 bytes) at the very end thereof. For example, the LI field for the last data may indicate the length of the last data except for the MAC-I field.

As another method, in the above, the LI field may indicate the size of concatenated data in byte units, and if a header compression procedure or integrity protection procedure is configured, the L1 field may indicate the size of compressed data to which the header compression procedure is applied before application of the integrity protection procedure, and may add the MAC-I field to the very end of the concatenated data. If the header compression procedure or integrity protection procedure is configured at the time of application of the data de-concatenation procedure, a receiving terminal may perform the data de-concatenation procedure by considering that there is a MAC-I field having a predetermined length (e.g., 4 bytes) at the very end thereof. For example, the LI field for the last data may indicate the length of the last data, to which a header compression procedure is applied, except for the MAC-I field. In the above, if the LI field indicates only the size of data, data processing can be accelerated by applying the same processing procedure to all data. On the other hand, an indicator indicating whether the MAC-I field exists or an indicator indicating the location of the MAC-I field needs to be newly introduced.

As another method, if the LI field in the above may indicate the size of the data, the size of the MAC-I field, or the total size of the fields (for example, with regard to the last data, the very front data, or each data), the overhead can be reduced because there is no need for an indicator as to whether or not there is a MAC-I field or an indicator indicating a location.

F field: is a field indicating the type of length of the LI field introduced or attached for data concatenation or data de-concatenation, and may indicate whether the LI field is a field having a small length (e.g., 6 bytes) or a field having a long length (e.g., 14 bytes). The overhead for the LI field can be reduced by introducing the F field.

SN field: is a field indicating the sequence of pieces of data in concatenated data (e.g., a sequence number).

If integrity protection is configured in the PDCP layer device for convenience of implementation (for example, the same processing can be performed as that for data), the new fields proposed in the disclosure are applied with the integrity protection procedure. Alternatively, when a ciphering procedure is applied to the PDCP layer device, the new fields are applied with the ciphering procedure. In another method, in order for a receiving terminal to read new fields before the deciphering procedure, the new fields proposed in the disclosure are applied with an integrity protection procedure when the integrity protection procedure is configured in the PDCP layer device, or when the ciphering procedure is applied to the PDCP layer device, the ciphering procedure may not be applied. That is, if the ciphering procedure is not applied even when the integrity protection procedure is applied, the receiving terminal can read the new fields in advance before the deciphering procedure.

The data concatenation procedure proposed in the disclosure is applied or performed for pieces of data to which the integrity protection procedure or ciphering procedure is not applied or not performed at a transmitting terminal (UE or base station). In another method, the data concatenation procedure proposed in the disclosure is applied or performed for pieces of data before the transmitting terminal (UE or base station) applies or performs the integrity protection procedure or ciphering procedure. For example, if an integrity protection procedure or ciphering procedure is established, the data concatenation procedure may be performed or applied for pieces of data, and then the integrity protection procedure or ciphering procedure may be performed for the concatenated data. This is because the number or frequency of performing the integrity protection procedure or the ciphering procedure can be minimized and the data processing time can be reduced only when the integrity protection procedure or the ciphering procedure is simultaneously applied to the concatenated data. In addition, when applying the integrity protection procedure or ciphering procedure to one concatenated data, obtained by concatenating multiple pieces of data in the above, the integrity protection procedure or ciphering procedure is simultaneously performed on multiple pieces of concatenated data using a single COUNT value, so as to enable single processing using one set of security key values (such as a COUNT value, bearer identifier, or security key) and to shorten the data processing time. For example, if multiple pieces of data are not concatenated in the above, a large amount of data processing time is needed because the integrity protection or ciphering procedure needs to be performed multiple times based on different sets of security key values using a different COUNT value for each data. In addition, when the integrity protection procedure is applied in the above, one MAC-I field can be added after concatenated data, but when the concatenated procedure is not applied, each MAC-I field needs to be added after each data and therefore processing can be complicated and overhead can be increased. Further, when applying or performing the data concatenation procedure to the pieces of data, the data concatenation procedure may be applied in a sequence in which the pieces of data are received first from an upper layer device, or the pieces of data can be concatenated by the concatenation procedure in a sequence in which the pieces of data are placed in front. This is because, only if data concatenation occurs in order of placement from the front when performing the data concatenation procedure, the receiving terminal may separate the concatenated data and may sequentially transfer the pieces of separated data to the upper layer device. For example, pieces of data concatenated to concatenated data, to which one PDCP serial number is assigned, are arranged in a sequence in which data is received first from an upper layer device. Alternatively, as a method for simply reducing protocol header overhead only (e.g., MAC header, RLC header, or PDCP headers), the data concatenation procedure proposed in the disclosure can be applied or performed for pieces of data for which the integrity protection procedure or ciphering procedure has applied or performed. For example, the transmitting terminal (transmitting PDCP layer device) may apply the data concatenation procedure proposed in the disclosure to pieces of data appended with a MAC-I field having a predetermined size (e.g., 4 bytes) to which a header compression procedure or ciphering procedure is applied, or an integrity protection procedure is applied. In this case, it may be characterized in that a ciphering procedure or an integrity protection procedure is performed for each data based on a different COUNT value, and pieces of concatenated data can be assigned and applied with different COUNT values (based on the COUNT values configured by PDCP serial numbers included in the PDCP header) in order of placement from the front or in ascending order.

The data de-concatenation procedure proposed in the disclosure is applied or performed for concatenated data for which a deciphering procedure or an integrity verification procedure have been applied or performed at a receiving terminal (UE or base station). In another method, the data de-concatenation procedure proposed in the disclosure is applied or performed for the concatenated data after the receiving terminal (UE or base station) applies or performs the deciphering procedure or integrity verification procedure. For example, if a ciphering procedure or an integrity verification procedure is configured, the deciphering procedure or the integrity verification procedure may be performed on the received concatenated data, and then a data de-concatenation procedure may be performed on the concatenated data. This is because, only when the deciphering procedure or the integrity verification procedure is simultaneously applied to the concatenated data, the number or frequency of performing the deciphering procedure or the integrity verification procedure can be minimized and the data processing time can be reduced. In addition, when the deciphering procedure or integrity protection procedure is applied to one concatenated data, obtained by concatenating multiple pieces of data, the deciphering procedure or integrity protection procedure is performed once for multiple pieces of concatenated data using a single COUNT value, so as to enable single processing using one set of security key values (such as COUNT value, bearer identifier, or security key) and to shorten data processing time. For example, if the data is not concatenated above, a large amount of data processing time is needed because the deciphering procedure or the integrity protection procedure needs to be performed multiple times based on different sets of security key values using a different COUNT value for each data. In addition, when applying or performing the data de-concatenation procedure for the data concatenated above, pieces of data may be separated from the beginning of the concatenated data, and data processing is performed in a sequence in which the pieces of data are placed in front and the processed data are transferred to an upper layer device. For example, pieces of data concatenated to concatenated data to which one PDCP serial number is assigned need to be transferred to an upper layer device in order of placement from the front. As another method, as a method for simply reducing protocol header overhead (e.g., MAC header, RLC header, or PDCP headers), if the data concatenation procedure proposed in the disclosure is applied to pieces of data, to which an integrity protection procedure or a ciphering procedure at the transmitting terminal (UE or base station) is applied or performed, the receiving terminal (receiving PDCP layer device) may separate pieces of data according to the data de-concatenation procedure proposed in the disclosure, and may apply a deciphering procedure, integrity verification procedure, or a header decompression procedure to each data. In this case, it may be characterized in that a deciphering procedure or an integrity verification procedure is performed based on a different COUNT value for each data, and pieces of concatenated data can be assigned and applied with different COUNT values (based on COUNT values configured by PDCP serial numbers included in the PDCP header) in order of placement from the front or in ascending order.

If the data concatenation procedure proposed above is configured or performed in the SDAP layer device (or new layer device), the SDAP layer device (or new layer device) does not apply the data concatenation procedure to SDAP control data (SDAP control PDU). This is because the ciphering procedure or deciphering procedure is not applied to the SDAP control data, and when the SDAP control data is concatenated with other data (e.g., SDAP data SDU or SDAP data PDU), the implementation complexity can increase when performing the ciphering or deciphering procedure of the concatenated data. In the above, when the SDAP layer device (or new layer device) performs a data concatenation function, a data concatenation procedure may be performed for pieces of data (for example, SDAP data SDU or SDAP) data PDU) of an upper layer device corresponding to QoS flow IDs (QoS identifiers) mapped to each bearer, and concatenated data may be transferred to the PDCP layer device of the bearer. In another method, when the SDAP layer device (or new layer device) performs the data concatenation function and performs the data concatenation procedure for pieces of data of an upper layer device corresponding to QoS flow IDs (QoS identifiers) mapped to each bearer, the SDAP layer device may apply the data concatenation procedure to only pieces of data corresponding to the same QoS flow ID (QoS identifier), and may transfer the concatenated data to the PDCP layer device of the bearer. In the above, when an integrity protection procedure is configured, the integrity protection procedure may be applied for SDAP control data, or when a ciphering procedure is configured, the ciphering procedure may not be applied therefor. As another method, as in FIG. 13, which will be described later, when the SDAP layer device (or new layer device) has a data concatenation structure such as 1*m*-10 or 1*m*-15 at the time of performing a data concatenation procedure, SDAP control data may also be located at the very front of the header of new fields for data concatenation so as to quickly process the SDAP control data at the receiving terminal. As another method, as in FIG. 13, which will be described later, when the SDAP layer device (or new layer device) has a data concatenation structure such as 1*m*-10 or 1*m*-15 at the time of performing a data concatenation procedure, SDAP control data may also be located at the very end of the header of new fields for data concatenation so as to easily add dynamically generated SDAP control data.

If the data concatenation procedure proposed above is configured or performed in the SDAP layer device (or new layer device), the data concatenation procedure proposed in the disclosure is applied or performed for pieces of data for which a header compression procedure, an integrity protection procedure, or a ciphering procedure are not applied or not performed at a transmitting terminal (UE or base station). In another method, the data concatenation procedure proposed in the disclosure is applied or performed for pieces of data before a transmitting terminal (UE or base station) applies or performs a header compression procedure, an integrity protection procedure, or a ciphering procedure. Accordingly, the length field (e.g., the LI field) among new fields generated in the data concatenation procedure may configure the length of header uncompressed data as a byte unit value. For example, if a header compression procedure, integrity protection procedure, or ciphering procedure are established, the data concatenation procedure may be performed or applied, and then the header compression procedure, integrity protection procedure, or ciphering procedure may be performed on the concatenated data. This is because the number or frequency of performing the integrity protection procedure or the ciphering procedure can be minimized and the data processing time can be reduced only when the integrity protection procedure or the ciphering procedure is simultaneously applied to the concatenated data. In addition, when the integrity protection procedure or ciphering procedure is applied to one concatenated data, obtained by concatenating multiple pieces of data in the above, the integrity protection procedure or ciphering procedure is performed using a single COUNT value to enable single processing using one set of security key values (such as COUNT value, bearer identifier, or security key) and to shorten data processing time. For example, if pieces of data are not concatenated above, a large amount of data processing time is required because integrity protection or ciphering procedures need to be performed multiple times based on a set of different security key values using a different COUNT value for each data. In addition, when applying or performing the data concatenation procedure to the pieces of data, the data concatenation procedure may be applied in a sequence in which pieces of data are received first from an upper layer device, or the pieces of data can be concatenated, by the concatenation procedure, in a sequence in which the pieces of data are placed in front. This is because, only if data concatenation occurs in order of placement from the front when performing the data concatenation procedure, the receiving terminal may separate the concatenated data and may sequentially transfer the pieces of separated data to the upper layer device. For example, pieces of data concatenated to concatenated data, to which one PDCP serial number is assigned, are arranged in a sequence in which data is received first from an upper layer device.

If the data concatenation procedure proposed above is configured or performed in the SDAP layer device (or new layer device), the data de-concatenation procedure proposed in the disclosure is applied or performed for the concatenated data to which a deciphering procedure, integrity verification procedure, or header decompression procedure have been applied or performed at a receiving terminal (UE or base station). As another method, the data de-concatenation procedure proposed in the disclosure is applied or performed for the concatenated data after the receiving terminal (UE or base station) applies or performs the deciphering procedure, the integrity verification procedure, or the header decompression procedure. For example, if the header compression procedure, ciphering procedure, or integrity verification procedure are configured, the received concatenated data is deciphered, or the integrity verification procedure or header decompression procedure for the received concatenated data is performed, and then the data de-concatenation procedure is performed on the concatenated data. This is because the number or frequency of performing the deciphering procedure or the integrity verification procedure can be minimized and the data processing time can be reduced only when the deciphering procedure or the integrity verification procedure is simultaneously applied to the concatenated data. In addition, when a deciphering procedure or integrity protection procedure is applied to one concatenated data, obtained by concatenating multiple pieces of data in the above, a deciphering procedure or integrity protection procedure is performed using a single COUNT value to enable single processing using one set of security key values (such as COUNT value, bearer identifier, or security key) and to shorten data processing time. For example, if pieces of data are not concatenated above, a large amount of data processing time is required because integrity protection or ciphering procedures need to be performed multiple times based on a set of different security key values using a different COUNT value for each data. In addition, when applying or performing the data de-concatenation procedure to the concatenated data, pieces of data may be separated from the beginning of the concatenated data, and data processing may be performed in a sequence in which the pieces of data are placed in front and the processed data may be transferred to an upper layer device. For example, pieces of data concatenated to concatenated data, to which one PDCP serial number is assigned, need to be transferred to an upper layer device in order of placement from the front.

If the data concatenation procedure proposed above is configured or performed in the SDAP layer device (or new layer device), the data processing load and implementation complexity can be increased due to a header compression procedure. Therefore, in the above, if the data concatenation procedure or de-concatenation procedure is configured for a random bearer, or if a header compression procedure (e.g., robust header compression (ROHC) and Ethernet header compression (EHC)) or a data compression procedure (uplink data compression (UDC)) are configured to be used or added, with regard to a bearer or upper layer device for which the data concatenation procedure is configured, it may adversely affect the data processing speed. This is because the transmitting terminal needs to perform a header compression procedure for each data or the receiving terminal needs to perform a header decompression procedure for each data. Therefore, with regard to each bearer or upper layer device (PDCP layer device, SDAP layer device, or new layer device), the data concatenation procedure, header compression procedure (e.g., robust header compression (ROHC) and Ethernet header compression (EHC)), or data compression procedure (uplink data compression (UDC)) may be limited not to be established together. For example, if the data concatenation procedure is configured, there may be limitation such that the header compression procedure (e.g., robust header compression (ROHC) and Ethernet header compression (EHC)), or data compression procedure (uplink data compression (UDC)) may not be established. As another method, if the header compression procedure (e.g., robust header compression (ROHC) and Ethernet header compression (EHC)), or data compression procedure (uplink data compression (UDC)) is established, it is possible to limit the data concatenation procedure not to be established. In another method, the ciphering procedure or the integrity protection procedure may not be established in order to further accelerate the data rate in the above.

If the header compression procedure or data compression procedure is not configured in order to accelerate data processing in the above, or if the data concatenation procedure proposed above is configured or performed in the SDAP layer device (or new layer device), the data concatenation procedure proposed in the disclosure applies or perform a data concatenation procedure to pieces of data to which an integrity protection procedure or a ciphering procedure is not applied or not performed at a transmitting terminal (UE or base station). In another method, the data concatenation procedure proposed in the disclosure applies or performs the data concatenation procedure for pieces of data before the transmitting terminal (UE or base station) applies or performs the integrity protection procedure or ciphering procedure. Therefore, among new fields generated in the data concatenation procedure, the length field (e.g., the LI field) may configure the length of data as a byte unit value. For example, if an integrity protection procedure or ciphering procedure is established, the data concatenation procedure may be performed or applied for pieces of data, and then the integrity protection procedure or ciphering procedure may be performed for the concatenated data. This is because the number or frequency of performing the integrity protection procedure or the ciphering procedure can be minimized and the data processing time can be reduced only when the integrity protection procedure or the ciphering procedure is simultaneously applied to the concatenated data. In addition, when the integrity protection procedure or ciphering procedure is applied to one concatenated data, obtained by concatenating multiple pieces of data in the above, the integrity protection procedure or ciphering procedure is performed using a single COUNT value to enable single processing using one set of security key values (COUNT value, bearer identifier, or security key) and to shorten data processing time. For example, if multiple pieces of data are not concatenated in the above, a large amount of data processing time is needed because the integrity protection or ciphering procedure needs to be performed multiple times based on different sets of security key values using a different COUNT value for each data. In addition, when applying or performing the data concatenation procedure to the pieces of data, the data concatenation procedure may be applied in a sequence in which pieces of data are received first from an upper layer device, or the pieces of data can be concatenated, by the concatenation procedure, in a sequence in which the pieces of data are placed in front. This is because, only if data concatenation occurs in order of placement from the front when performing the data concatenation procedure, the receiving terminal may separate the concatenated data and may sequentially transfer the pieces of separated data to the upper layer device. For example, pieces of data concatenated to concatenated data, to which one PDCP serial number is assigned, are arranged in a sequence in which data is received first from an upper layer device.

If a header compression procedure or data compression procedure is not configured in order to accelerate data processing in the above, or if the data concatenation procedure proposed above is configured or performed in the SDAP layer device (or new layer device), the data de-concatenation procedure proposed in the disclosure is applied or performed for the concatenated data for which a deciphering procedure or an integrity verification procedure have been applied or performed at the receiving terminal (UE or base station). In another method, the data de-concatenation procedure proposed in the disclosure is applied or performed for the concatenated data after the receiving terminal (UE or base station) applies or performs the deciphering procedure or integrity verification procedure. For example, if a ciphering procedure or an integrity verification procedure is configured, a deciphering procedure or integrity verification procedure may be performed on the received concatenated data, and then a data de-concatenation procedure may be performed on the concatenated data. This is because the number or frequency of performing the integrity protection procedure or the deciphering procedure can be minimized and the data processing time can be reduced only when the integrity protection procedure or the deciphering procedure is simultaneously applied to the concatenated data. In addition, when the integrity protection procedure or deciphering procedure is applied to one concatenated data, obtained by concatenating multiple pieces of data in the above, the integrity protection procedure or deciphering procedure is performed using a single COUNT value to enable single processing using one set of security key values (COUNT value, bearer identifier, or security key) and to shorten data processing time. For example, if multiple pieces of data are not concatenated in the above, a large amount of data processing time is needed because the integrity protection or deciphering procedure needs to be performed multiple times based on different sets of security key values using a different COUNT value for each data. In addition, when applying or performing the data de-concatenation procedure to the concatenated data, pieces of data may be sequentially separated from the beginning of the concatenated data, and data processing may be performed in a sequence in which the pieces of data are placed in front and the processed data may be transferred to an upper layer device. For example, pieces of data concatenated to concatenated data, to which one PDCP serial number is assigned, need to be transferred to an upper layer device in order of placement from the front.

If the data concatenation procedure proposed above is configured or performed by the PDCP layer device, the PDCP layer device does not apply the data concatenation procedure to SDAP control data (SDAP control PDU) or PDCP control data (PDCP control PDU). This is because a ciphering procedure or a deciphering procedure is not applied to the SDAP control data, concatenating the SDAP control data with other data can increase the implementation complexity when performing ciphering or deciphering of the concatenated data. In addition, since a ciphering procedure, a deciphering procedure, an integrity protection procedure, or an integrity verification procedure are not applied to the PDCP control data, if the PDCP control data is concatenated with other data, it may increase the implementation complexity when performing a procedure of ciphering or deciphering the concatenated data, the integrity protection procedure, or the integrity verification procedure. In the above, when an integrity protection procedure is configured, the integrity protection procedure may be applied to SDAP control data, or when a ciphering procedure is configured, the ciphering procedure may not be applied thereto. However, when the integrity protection procedure is configured in the above, the integrity protection procedure may not be applied to the PDCP control data, or the ciphering procedure may not be applied thereto when the ciphering procedure is configured. In another method, for ease of implementation by applying the same processing as the procedure performed on data, in the above case, when an integrity protection procedure is configured, the integrity protection procedure is not applied to SDAP control data; when the ciphering procedure is configured, the ciphering procedure also may not be applied to the SDAP control data, the integrity protection (or integrity verification) procedure may not be applied to the SDAP control data or PDCP control data, the ciphering procedure (or deciphering procedure) may not be applied to the SDAP control data or PDCP control data, the integrity protection (or integrity verification) procedure may be applied to the SDAP control data or PDCP control data, and the ciphering procedure (or deciphering procedure) may also be applied thereto. In another method, as a method for simply reducing only protocol header overhead (e.g., MAC header, RLC header, or PDCP headers), the data concatenation procedure proposed in the disclosure may be applied or performed for pieces of data for which an integrity protection procedure or a ciphering procedure is applied or performed at a transmitting terminal (UE or base station). For example, a transmitting terminal (transmitting PDCP layer device) may apply the data concatenation procedure, proposed in the disclosure, to pieces of data appended with a MAC-I field having a predetermined size (e.g., 4 bytes) to which a header compression procedure or ciphering procedure is applied or an integrity protection procedure is applied. In this case, it may be characterized in that a ciphering procedure or an integrity protection procedure is performed based on a different COUNT value for each data, and pieces of concatenated data can be assigned and applied with different COUNT values (based on COUNT values configured by PDCP serial numbers included in the PDCP header) in order of placement from the front or in ascending order.

If the data concatenation procedure proposed above is configured or performed in the PDCP layer device, the data processing load and implementation complexity can be increased due to the header compression procedure. Therefore, in the above, if a data concatenation procedure or de-concatenation procedure is configured for a random bearer, or if a header compression procedure (e.g., robust header compression (ROHC) and Ethernet header compression (EHC)) or a data compression procedure (uplink data compression (UDC)) are configured to be used or added, with regard to a bearer or upper layer device for which the data concatenation procedure is configured, it may adversely affect the data processing speed. This is because the transmitting terminal needs to perform a header compression procedure for each data or the receiving terminal needs to perform a header decompression procedure for each data. Therefore, with regard to each bearer or upper layer device (PDCP layer device, SDAP layer device, or new layer device), the data concatenation procedure, header compression procedure (e.g., robust header compression (ROHC) and Ethernet header compression (EHC)), or data compression procedure (uplink data compression (UDC)) may be limited not to be established together. For example, if the data concatenation procedure is configured, there may be limitation such that the header compression procedure (e.g., robust header compression (ROHC) and Ethernet header compression (EHC)), or data compression procedure (uplink data compression (UDC)) may not be established. As another method, if the header compression procedure (e.g., robust header compression (ROHC) and Ethernet header compression (EHC)), or data compression procedure (uplink data compression (UDC)) is established, it is possible to limit the data concatenation procedure not to be established. In another method, the ciphering procedure or the integrity protection procedure may not be established in order to further accelerate the data rate in the above.

If the data concatenation procedure proposed above is configured or performed in the PDCP layer device, the data concatenation procedure proposed in the disclosure is applied or performed for pieces of data for which the header compression procedure is applied or performed at a transmitting terminal (UE or base station) but the integrity protection procedure or ciphering procedure is not applied or not performed. In another method, the data concatenation procedure proposed in the disclosure is applied or performed for pieces of data, to which the header compression procedure is applied, before the transmitting terminal (UE or base station) applies or performs the integrity protection procedure or ciphering procedure although the header compression procedure is applied or performed. Therefore, the length field (e.g., LI field), among new fields generated in the data concatenation procedure, may configure the length of data to which the header compression procedure is applied as a byte unit value. For example, if a header compression procedure, an integrity protection procedure, or a ciphering procedure are established, the header compression procedure may be applied or performed for each data, the data concatenation procedure may be performed or applied for pieces of data, and then the integrity protection procedure or ciphering procedure may be performed for the concatenated data. This is because the number or frequency of performing the integrity protection procedure or the ciphering procedure can be minimized and the data processing time can be reduced only when the integrity protection procedure or the ciphering procedure is simultaneously applied to the concatenated data. On the other hand, since applying or performing the header compression procedure to each data of concatenated data results in high complexity of implementation, it is convenient to perform data concatenation after performing the header compression procedure in advance, and the length field indicating the length of each concatenated data can be reduced to thereby reduce overhead. In addition, when applying the integrity protection procedure or ciphering procedure to one concatenated data, obtained by concatenating multiple pieces of data in the above, the integrity protection procedure or ciphering procedure is performed on the concatenated data using a single COUNT value, so as to enable single processing using one set of security key values (such as a COUNT value, bearer identifier, or security key) and to shorten the data processing time. For example, if pieces of data are not concatenated in the above, a large amount of data processing time is needed because the integrity protection or ciphering procedure needs to be performed multiple times based on different sets of security key values using a different COUNT value for each data. Further, when applying or performing the data concatenation procedure to the pieces of data, the data concatenation procedure may be applied in a sequence in which pieces of data are received first from an upper layer device, or the pieces of data can be concatenated, by the concatenation procedure, in a sequence in which the pieces of data are placed in front. This is because, only if data concatenation occurs in order of placement from the front when performing the data concatenation procedure, the receiving terminal may separate the concatenated data and may sequentially transfer the pieces of separated data to the upper layer device. For example, pieces of data concatenated to concatenated data, to which one PDCP serial number is assigned, are arranged in a sequence in which data is received first from an upper layer device.

If the data concatenation procedure proposed above is configured or performed in the PDCP layer device, the data de-concatenation procedure proposed in the disclosure is applied or performed with regard to concatenated data to which a deciphering procedure or an integrity verification procedure has been applied or performed at a receiving terminal (UE or base station), and a header decompression procedure may be applied to the each of pieces of de-concatenated data. In another method, the data de-concatenation procedure proposed in the disclosure is applied or performed for the concatenated data after the receiving terminal (UE or base station) applies or performs the deciphering procedure or integrity verification procedure, and a header decompression procedure may be applied to the each of pieces of de-concatenated data. For example, if the header compression procedure, ciphering procedure, or integrity verification procedure are configured, the deciphering procedure or the integrity verification procedure may be performed on the received concatenated data, and then a header decompression procedure may be applied to the each of pieces of de-concatenated data. This is because, only when the deciphering procedure or the integrity verification procedure is simultaneously applied to the concatenated data, the number or frequency of performing the deciphering procedure or the integrity verification procedure can be minimized and the data processing time can be reduced. On the other hand, since applying or performing the header compression procedure to each data of concatenated data results in high complexity of implementation, it is easy for implementation to perform each of the header decompression procedures later after performing data de-concatenation, and the length field indicating the length of each concatenated data can be reduced to thereby reduce overhead. In addition, when applying the deciphering procedure or integrity protection procedure to one concatenated data, obtained by concatenating multiple pieces of data in the above, the deciphering procedure or integrity protection procedure is performed on the concatenated data using a single COUNT value, so as to enable single processing using one set of security key values (such as a COUNT value, bearer identifier, or security key) and to shorten the data processing time. For example, if pieces of data are not concatenated in the above, a large amount of data processing time is needed because the deciphering procedure or integrity protection procedure needs to be performed multiple times based on different sets of security key values using a different COUNT value for each data. Further, when applying or performing the data de-concatenation procedure to the concatenated data, pieces of data may be sequentially separated from the beginning of the concatenated data, and data processing may be performed in a sequence in which the pieces of data are placed in front and the processed data may be transferred to an upper layer device. For example, pieces of data concatenated to concatenated data, to which one PDCP serial number is assigned, need to be transferred to an upper layer device in order of placement from the front. As a method for simply reducing protocol header overhead (e.g., MAC header, RLC header, or PDCP headers), if the data concatenation procedure proposed in the disclosure is applied to pieces of data, to which an integrity protection procedure or a ciphering procedure at the transmitting terminal (UE or base station) is applied or performed, the receiving terminal (receiving PDCP layer device) may separate pieces of data according to the data de-concatenation procedure proposed in the disclosure, and may apply a deciphering procedure, integrity verification procedure, or a header decompression procedure to each data. In this case, it may be characterized in that a deciphering procedure or an integrity verification procedure is performed based on a different COUNT value for each data, and pieces of concatenated data can be assigned and applied with different COUNT values (based on COUNT values configured by PDCP serial numbers included in the PDCP header) in order of placement from the front or in ascending order.

If the header compression procedure or data compression procedure is not configured in order to accelerate data processing in the above, or if the data concatenation procedure proposed above is configured or performed in the PDCP layer device, the data concatenation procedure proposed in the disclosure is applied or performed for pieces of data to which an integrity protection procedure or a ciphering procedure is not applied or not performed at the transmitting terminal (UE or base station). In another method, the data concatenation procedure proposed in the disclosure is applied or performed for pieces of data before the transmitting terminal (UE or base station) applies or performs the integrity protection procedure or ciphering procedure. Therefore, among the new fields generated in the data concatenation procedure, the length field (e.g., LI field) may configure the length of data to which the header compression procedure is applied as a byte unit value. For example, if an integrity protection procedure or ciphering procedure has been established, the data concatenation procedure may be performed or applied to multiple pieces of data, and then the integrity protection procedure or ciphering procedure may be performed on the concatenated data. This is because the number or frequency of performing the integrity protection procedure or the ciphering procedure can be minimized and the data processing time can be reduced only when the integrity protection procedure or the ciphering procedure is simultaneously applied to the concatenated data. In addition, when the integrity protection procedure or ciphering procedure is applied to one concatenated data, obtained by concatenating multiple pieces of data in the above, the integrity protection procedure or ciphering procedure is performed using a single COUNT value to enable single processing using one set of security key values (COUNT value, bearer identifier, or security key) and to shorten data processing time. For example, if multiple pieces of data are not concatenated in the above, a large amount of data processing time is needed because the integrity protection or ciphering procedure needs to be performed multiple times based on different sets of security key values using a different COUNT value for each data. In addition, when applying or performing the data concatenation procedure to the pieces of data, the data concatenation procedure may be applied in a sequence in which pieces of data are received first from an upper layer device, or the pieces of data can be concatenated, by the concatenation procedure, in a sequence in which the pieces of data are placed in front. This is because, only if data concatenation occurs in order of placement from the front when performing the data concatenation procedure, the receiving terminal may separate the concatenated data and may sequentially transfer the pieces of separated data to the upper layer device. For example, pieces of data concatenated to concatenated data, to which one PDCP serial number is assigned, are arranged in a sequence in which data is received first from an upper layer device.

If the header compression procedure or data compression procedure is not configured in order to accelerate data processing in the above, or if the data concatenation procedure proposed above is configured or performed in the PDCP layer device, the data de-concatenation procedure proposed in the disclosure is applied or performed for concatenated data for which a deciphering procedure or integrity protection procedure is applied or performed at a receiving terminal (UE or base station). In another method, the data de-concatenation procedure proposed in the disclosure is applied or performed for concatenated data after the receiving terminal (UE or base station) applies or performs the deciphering procedure or integrity protection procedure. For example, if a ciphering procedure or integrity protection procedure has been established, the deciphering procedure or integrity protection procedure may be performed for the received concatenated data, and then the data de-concatenation procedure may be performed on the concatenated data. This is because the number or frequency of performing the deciphering procedure or integrity protection procedure can be minimized and the data processing time can be reduced only when the deciphering procedure or integrity protection procedure is simultaneously applied to the concatenated data. In addition, when the deciphering procedure or integrity protection procedure is applied to one concatenated data, obtained by concatenating multiple pieces of data in the above, the deciphering procedure or integrity protection procedure is performed using a single COUNT value to enable single processing using one set of security key values (COUNT value, bearer identifier, or security key) and to shorten data processing time. For example, if multiple pieces of data are not concatenated in the above, a large amount of data processing time is needed because the deciphering procedure or integrity protection procedure needs to be performed multiple times based on different sets of security key values using a different COUNT value for each data. In addition, when applying or performing the data de-concatenation procedure to the concatenated data, pieces of data may be sequentially separated from the beginning of the concatenated data, and data processing may be performed in a sequence in which the pieces of data are placed in front and the processed data may be transferred to an upper layer device. For example, pieces of data concatenated to concatenated data, to which one PDCP serial number is assigned, need to be transferred to an upper layer device in order of placement from the front.

In the above, the data concatenation procedure or de-concatenation procedure may be established for a random bearer or upper layer device. If the data concatenation procedure is not configured for a transmitting PDCP layer, the transmitting PDCP layer device may allocate one PDCP serial number (or COUNT value) to one data (e.g., PDCP SDU or PDCP PDU) received from an upper layer device, may increment a variable for serial number assignment by 1 after allocation of one PDCP serial number (for example, a value obtained by modulating a variable value in which a COUNT value is stored by the total size of the PDCP serial number, or a transmission variable (COUNT value) modulo $2^{(length\ of\ the\ PDCP\ serial\ number\ for\ uplink)}$), and then assign a serial number, which is incremented by 1 using the variable, for the next data. However, if the data concatenation procedure is configured in the above, in a case of applying the data concatenation procedure to pieces of data received from the upper layer device, the transmitting PDCP layer device may assign one PDCP serial number (or COUNT value) to multiple pieces of concatenated data, may assign one PDCP serial number and increment the variable for serial number assignment by 1, and may assign a serial number, which is incremented by 1 using the variable, for the next data (concatenated data or non-concatenated data). In the above, in a case in which the data concatenation procedure is not applied to data received from an upper layer device, one PDCP serial number may be assigned to one non-concatenated data, the variable for serial number assignment is incremented by 1 after assigning one PDCP serial number, and a serial number, which is incremented by 1 using the variable, may be assigned for the next data (concatenated data or non-concatenated data). In the above, if the data concatenation procedure is performed in the SDAP layer device (or new layer device), PDCP data processing (e.g., header compression procedure, integrity protection procedure, or ciphering procedure) is performed for one PDCP SDU (or SDAP data PDU), obtained by concatenating multiple SDAP SDUs, a PDCP header is generated, and one PDCP serial number with regard to the PDCP data PDU may be generated and assigned. If the data concatenation procedure is performed in the PDCP layer device in the above, PDCP data processing (e.g., integrity protection procedure or ciphering procedure) is performed for one concatenated PDCP SDU obtained by concatenating multiple PDCP SDUs (e.g., compressed PDCP SDU to which a header compression procedure is applied when the header compression procedure is configured), a PDCP header is generated, and one PDCP serial number with regard to the PDCP data PDU may be generated and assigned.

In the above, if the data concatenation procedure or de-concatenation procedure is configured for a random bearer, or if an SDAP header or a header compression procedure (e.g., robust header compression (ROHC) and Ethernet header compression (EHC)) or a data compression procedure (uplink data compression (UDC)) are configured to be used or added, with regard to a bearer or upper layer device for which the data concatenation procedure is configured, it may adversely affect the data processing speed. This is because the transmitting terminal needs to add the SDAP header to each data or perform a header compression procedure for each data or the receiving terminal needs to remove the SDAP header for each data or perform a header decompression procedure for each data. Therefore, with regard to each bearer or upper layer device (PDCP layer device, SDAP layer device, or new layer device), the data concatenation procedure, SDAP header or header compression procedure, or data compression procedure may be limited not to be established together. For example, if the data concatenation procedure is configured, there may be limitation such that the SDAP header or header compression procedure, or data compression procedure may not be established. As another method, if the SDAP header or header compression procedure, or data compression procedure is established, it is possible to limit the data concatenation procedure not to be established.

The data concatenation procedure proposed in the disclosure may be activated or deactivated, or stopped or resumed according to an indication of an RRC message, MAC control information, or physical download control channel (PDCCH).

If the data concatenation procedure or data de-concatenation procedure is configured for the PDCP layer device in the above, the UE may perform the data concatenation function in the upper layer device, and in the above, if the UE receives an RRC message (RRCReconfiguration) indicating handover from the base station, if the RRC message includes ReconfigurationWithSync (handover indicator), if the RRC message includes an indicator (reestablishPDCP) for performing reestablishment of a PDCP layer device (PDCP re-establishment), or if the RRC message includes security configuration information (security config) for changing a security key, the UE may derive a new security key from the RRC layer device based on the security configuration information, and may apply the security key to each PDCP layer device. In addition, the UE may perform a PDCP re-establishment procedure in the PDCP layer device. When performing the PDCP re-establishment procedure in the above, with regard to data to be retransmitted or data to be transmitted to an AM DRB, the UE may newly apply and transmit the data processing procedure of the PDCP layer device based on the new security key. For example, specifically, in the PDCP re-establishment procedure, the UE may apply the data processing procedure of the PDCP layer device with regard to retransmitted data and newly transmitted data as follows.

When re-applying the data processing procedure (header compression procedure, integrity protection procedure, or ciphering procedure) of the PDCP layer device, based on the new security key, to the data to be retransmitted in the PDCP re-establishment procedure, the UE may perform the header compression procedure again if the data concatenation procedure is configured or the data concatenation procedure has been performed on previously transmitted data and if the header compression procedure has been configured at the time of newly configuring data to be retransmitted, or may perform the data concatenation procedure again in the same way as that of pieces of data concatenated when transmission occurs before; if the integrity protection procedure is configured for the identically concatenated data, the UE may newly perform the integrity protection procedure on the concatenated data based on the new security key; or if the ciphering procedure is configured, the UE may perform the ciphering procedure on the concatenated data based on the new security key. For example, when the transmitting PDCP layer device configures the first data and the second data to be PDCP serial number #1 and transmit, and configures the third data to be PDCP serial number #2 and transmit, if successful transfer of the PDCP serial numbers 1 and 2 is not identified from a lower layer device, a retransmission procedure (transfer to a lower layer device) is performed in the PDCP reestablishment procedure. In the above, it may be assumed that the receiving terminal actually receives data corresponding to PDCP serial number #1 and does not receive data corresponding to PDCP serial number 2. However, if, in the retransmission procedure of the PDCP re-establishment procedure, the first data, the second data, and the third data are concatenated and transmitted as PDCP serial number 1, since the data for the PDCP serial number #1 has already been received, the receiving terminal may detect the data as duplicate received data and discard the data. That is, data loss may occur because the third data is concatenated with PDCP serial number #1 by concatenating the data retransmitted in the PDCP re-establishment procedure using a different concatenation function different from the previous one. Therefore, when the procedure of the PDCP layer device is newly applied with the new security key, with regard to the data retransmitted by the PDCP re-establishment procedure in the above, the data concatenation function is performed in the same manner as that of the previously transmitted data, and based on the new security key, the procedure of PDCP layer device should be newly applied.

When applying the data processing procedure (header compression procedure, integrity protection procedure, or ciphering procedure) of the PDCP layer device to data to be newly transmitted in the PDCP re-establishment procedure based on the new security key, if the data concatenation procedure is configured and if the header compression procedure is configured at the time of configuring data to be transmitted, the UE may perform the header compression procedure, or may perform a data concatenation procedure (data concatenation may occur or not); if the integrity protection procedure is config-
ured for the concatenated data or non-concatenated
data, the UE may newly perform the integrity pro-
tection procedure for the concatenated or non-con-
catenated data based on the new security key; or if
the ciphering procedure is configured, the UE may
perform a ciphering procedure for the concatenated
data or the non-concatenated data based on the new
security key, and may perform a transmission pro-
cedure (transmission to a lower layer device).

FIG. 1 illustrates the structure of an LTE system according
to an embodiment of the disclosure.

Referring to FIG. 1, a radio access network of an LTE
system includes next-generation base stations (also referred
to as evolved node Bs, hereinafter eNBs, node Bs, or base
stations) 1a-05, 1a-10, 1a-15, and 1a-20, a mobility man-
agement entity (MME) 1a-25, and a serving gateway
(S-GW) 1a-30. A user equipment (hereinafter UE or termi-
nal) 1a-35 accesses an external network through the eNBs
1a-05 to 1a-20 and S-GW 1a-30.

Referring to FIG. 1, the eNBs 1a-05 to 1a-20 correspond
to an existing node B of an UMTS system. The eNBs are
connected to the UE 1a-35 through a radio channel, and
perform a more complicated role than the existing node B.
In the LTE system, since all user traffic pertaining to
real-time service, such as voice over IP (VoIP), via the
Internet protocol, is serviced through a shared channel, a
device that performs scheduling by collecting state infor-
mation, such as buffer states, available transmit power states,
and channel states of UEs, is required, and eNBs 1a-05 to
1a-20 are in charge of this function of the device. In general,
one eNB controls multiple cells. For example, in order to
implement a transmission rate of 100 Mbps, the LTE system
uses orthogonal frequency division multiplexing (OFDM) as
a radio access technology in the bandwidth of 20 MHz. In
addition, the LTE system adopts an adaptive modulation &
coding (hereinafter referred to as AMC) scheme for deter-
mining a modulation scheme and a channel coding rate
based on the channel state of the UE. The S-GW 1a-30 is a
device for providing a data bearer and generating or remov-
ing a data bearer under the control of the MME 1a-25. The
MME is in charge of various control functions in addition to
a mobility management function for the UE, and is connected to multiple base stations.

Figure 2:
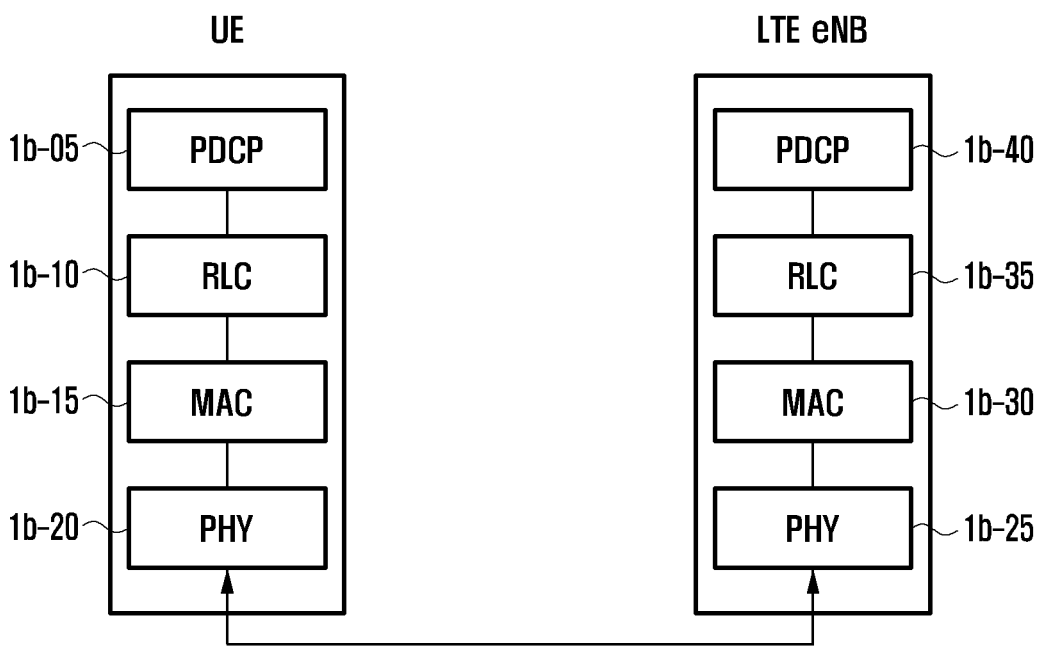
FIG. 2 illustrates a radio protocol structure in an LTE system according to an embodiment of the disclosure.

FIG. 2 illustrates a radio protocol structure in an LTE
system according to an embodiment of the disclosure.

Referring to FIG. 2, the radio protocol of the LTE system
includes packet data convergence protocols (PDCPs) 1b-05 and 1b-40, radio link controls (RLCs) 1b-10 and 1b-35, and
medium access controls (MACs) 1b-15 and 1b-30, in a UE
and an eNB, respectively. The packet data convergence
protocols (PDCPs) 1b-05 and 1b-40 are used to perform
operations, such as IP header compression/restoration. The
main functions of PDCPs are summarized as follows.

Header compression and decompression: ROHC only
Transfer of user data
In-sequence delivery of upper layer PDUs at PDCP
    re-establishment procedure for RLC acknowledged
mode (AM)
Sequence reordering (for split bearers in DC (only support
    for RLC AM): PDCP PDU routing for transmission and
    PDCP PDU reordering for reception)
Duplicate detection of lower layer service data units
(SDUs) in a PDCP re-establishment procedure for RLC
    AM Retransmission of PDCP SDUs at handover and, for split
    bearers in DC, of PDCP PDUs at PDCP data-recovery
    procedure, for RLC AM)
Ciphering and deciphering
Timer-based SDU discard in uplink The radio link control (hereinafter referred to as RLC)
1b-10 and 1b-35 performs ARQ operation by reconfiguring
a PDCP protocol data unit (PDU) or RLC service data unit
(SDU) to an appropriate size. The main functions of RLC are
summarized below.

Transfer of upper layer PDUs
ARQ function (Error correction through ARQ (only for
    AM data transfer))
Concatenation, segmentation and reassembly of RLC
    SDUs (only for unacknowledged mode (UM) and AM
    data transfer)
Re-segmentation of RLC data PDUs (only for AM data
    transfer)
Reordering of RLC data PDUs (only for UM and AM data
    transfer)
Duplicate detection (only for UM and AM data transfer)
Protocol error detection (only for AM data transfer)
RLC SDU discard (only for UM and AM data transfer)
RLC re-establishment The MACs 1b-15 and 1b-30 are connected to multiple
RLC layer devices configured in one UE, and may perform
an operation of multiplexing RLC PDUs to MAC PDUs and
demultiplexing RLC PDUs from MAC PDUs. The main
functions of MACs are summarized as follows.

Mapping between logical channels and transport channels
Multiplexing/de-multiplexing of MAC SDUs belonging
    to one or different logical channels into/from transport
    blocks (TB) transferred to/from the physical layer on
    transport channels
Scheduling information reporting
Error correction through hybrid automatic repeat request
    (HARQ)
Priority handling between logical channels of one UE
Priority handling between UEs by means of dynamic
    scheduling
MBMS service identification
Transport format selection
Padding Physical layers 1b-20 and 1b-25 may perform operations
of channel coding and modulating upper layer data, forming
the upper layer data into an OFDM symbol, transmitting the
OFDM symbol through a radio channel, or of demodulating
an OFDM symbol received through a radio channel, chan-
nel-decoding the OFDM symbol, and transmitting the
OFDM symbol to an upper layer.

Figure 3:
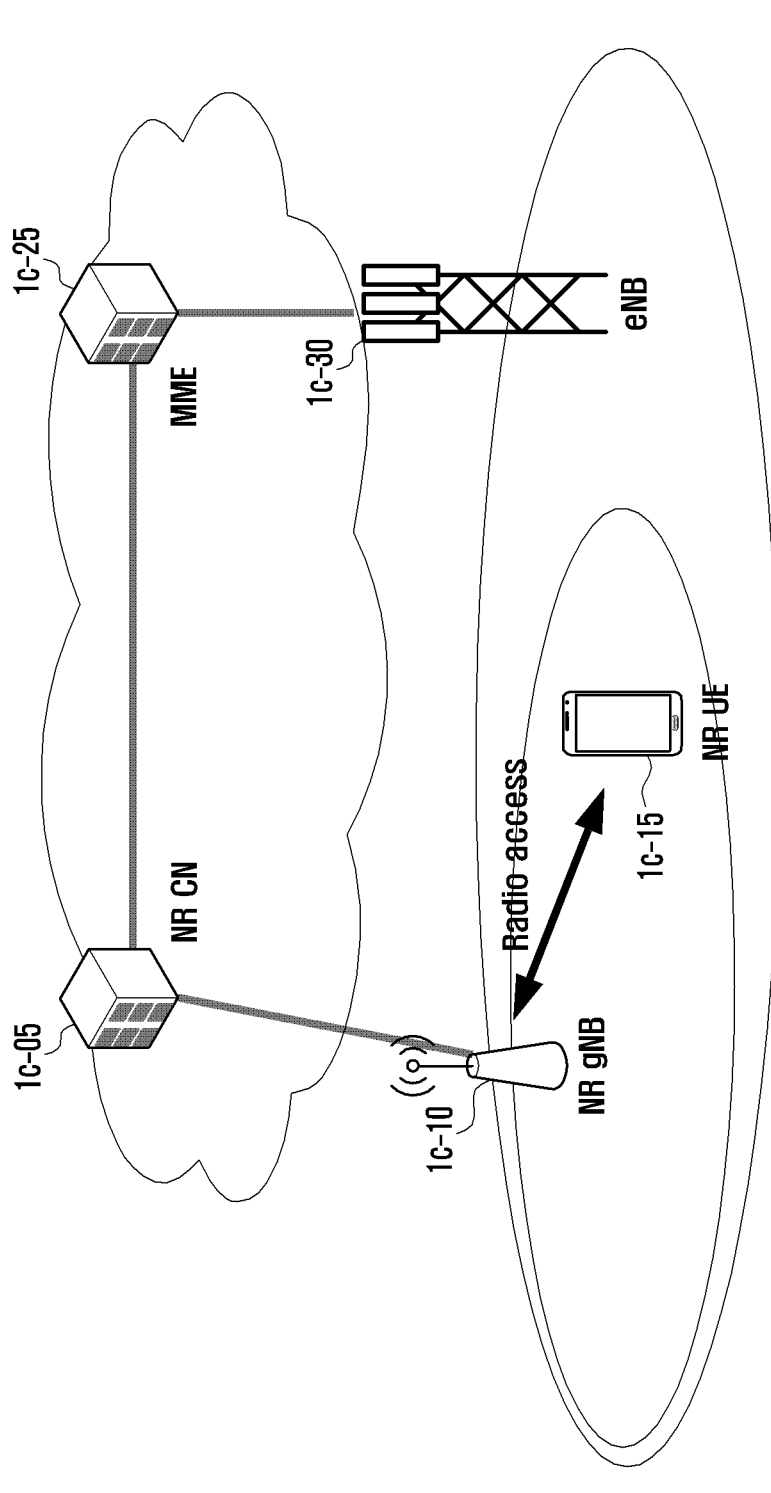
FIG. 3 illustrates the structure of a next-generation mobile communication system according to an embodiment of the disclosure.

FIG. 3 illustrates the structure of a next-generation mobile
communication system according to an embodiment of the
disclosure.

Referring to FIG. 3, a radio access network of a next-
generation mobile communication system (hereinafter
referred to as NR or 5G) includes a new radio node B
(hereinafter referred to as an NR gNB, or NR base station)
1c-10 and a new radio core network (NR CN) 1c-05. A user
terminal (a new radio user equipment, hereinafter referred to
as NR UE or a UE) 1c-15 accesses an external network via
an NR gNB 1c-10 and an NR CN 1c-05.

In FIG. 3, the NR gNB 1c-10 corresponds to an evolved
node B (eNB) of the existing LTE system. The NR gNB is
connected to the NR UE 1c-15 via a radio channel, and may
provide an excellent service as compared to the existing
node B. In the next-generation mobile communication sys-
tem, since all types of user traffics are serviced through a shared channel, there is a need for a device for performing scheduling by collecting state information, such as buffer states, available transmission power states, and channel states of UEs. Further, the NR NB 1c-10 is in charge of this function of the device. In general, one NR gNB typically controls multiple cells. In order to implement ultra-high speed data transmission as compared to the existing LTE, the NR gNB may have the existing maximum bandwidth or more, and may additionally employ beamforming technology using orthogonal frequency division multiplexing (hereinafter referred to as OFDM) as a radio access technology. In addition, the NR gNB adopts an adaptive modulation & coding (AMC) scheme that determines a modulation scheme and a channel coding rate based on the channel state of a UE. The NR CN 1c-05 performs functions, such as mobility support, bearer configuration, QoS configuration, and the like. The NR CN is a device that is in charge of various control functions in addition to a mobility management function for a UE, and is connected to multiple base stations. In addition, the next-generation mobile communication system may also operate in conjunction with the existing LTE system, and the NR CN may be connected to an MME 1c-25 via a network interface. The MME is connected to an eNB 1c-30, that is, to the existing base station.

Figure 4:
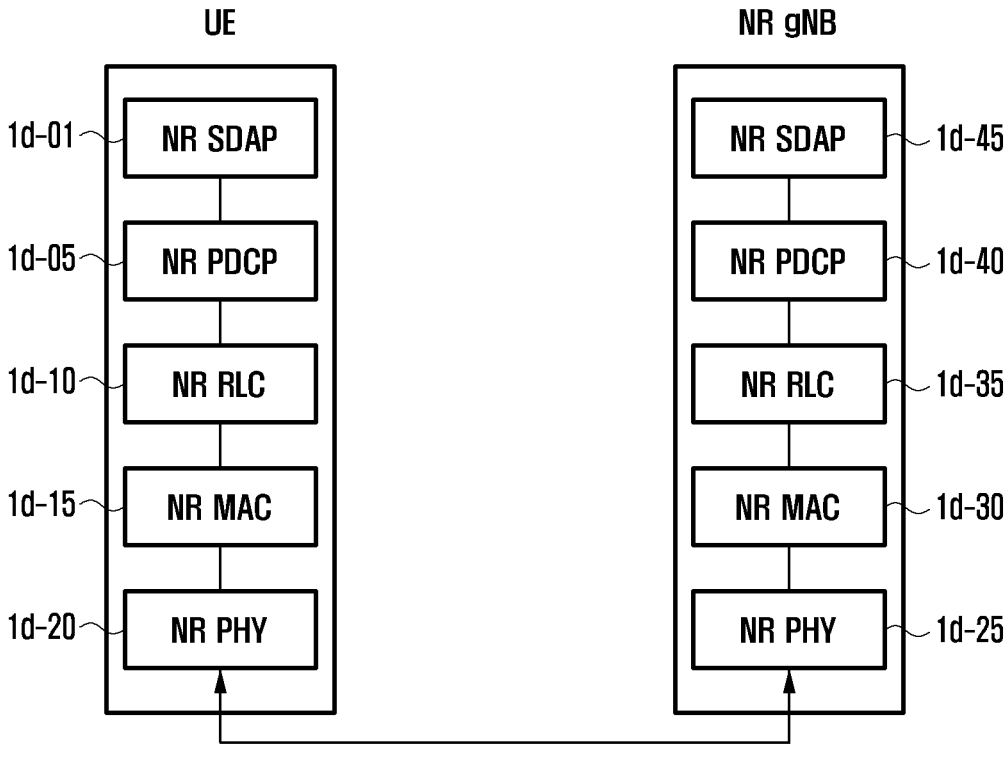
FIG. 4 illustrates a radio protocol structure of a next-generation mobile communication system according to an embodiment of the disclosure.

FIG. 4 illustrates a radio protocol structure of a next-generation mobile communication system according to an embodiment of the disclosure.

Referring to FIG. 4, the radio protocol of the next-generation mobile communication system includes NR SDAPs 1d-01 and 1d-45, NR PDCPs 1d-05 and 1d-40, NR RLCs 1d-10 and 1d-35, and NR MACs 1d-15 and 1d-30, respectively, in a UE and an NR base station.

The main functions of the NR SDAPs 1d-01 and 1d-45 may include some of the following functions.

Transfer of user plane data

Mapping between a QoS flow and a data bearer (DRB) for both downlink (DL) and uplink (UL)

Marking QoS flow ID in both DL and UL packets

Mapping reflective QoS flow to DRB for the UL SDAP PDUs

For the SDAP layer device, the UE may be configured as to whether or not use the header of the SDAP layer device (or new layer device) or the function of the SDAP layer device (or new layer device) for each PDCP layer device, for each bearer, and for each logical channel through an RRC message. When the SDAP header is configured, an NAS reflective QoS reflective configuration 1-bit indicator (NAS reflective QoS) and an AS QoS reflective configuration 1-bit indicator (AS reflective QoS) of the SDAP header are used to instruct the UE to enable updating or reconfiguration of the mapping information relating to the QoS flow of uplink and downlink and data bearer. The SDAP header may include QoS flow ID information indicating QoS. The QoS information may be used as data processing priority, scheduling information, etc., in order to support a smooth service.

The main functions of the NR PDCPs 1d-05 and 1d-40 may include some of the following functions.

Header compression and decompression (ROHC only)

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

The reordering function of the NR PDCP device refers to a function of sequentially reordering PDCP PDUs, received from a lower layer, based on a PDCP sequence number (SN), and may include a function of transmitting data to an upper layer in the reordered sequence, a function of directly transmitting data to an upper layer without taking the sequence into consideration, a function of reordering the sequence and recording missing PDCP PDUs, a function of providing a state report on the missing PDCP PDUs to a transmission side, and a function of requesting retransmission of the missing PDCP PDUs.

The main functions of the NR RLCs 1d-10 and 1d-35 may include some of the following functions.

Transfer of upper layer PDUs

In-sequence delivery of upper layer PDUs

Out-of-sequence delivery of upper layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

The in-sequence delivery function of the NR RLC device refers to a function of transmitting RLC SDUs, received from a lower layer, to an upper layer in a sequence of reception, and may include, if one RLC SDU is originally segmented into multiple RLC SDUs and received, a function of reassembling and transmitting the multiple RLC SDUs. The in-sequence delivery function may include a function of reordering the received RLC PDUs based on an RLC SN or PDCP SN, reordering the sequence and recording missing RLC PDUs, providing a state report on the missing RLC PDUs to a transmission side, and requesting retransmission of the missing RLC PDUs. Alternatively, the in-sequence delivery function of the NR RLC device may include a function of sequentially transmitting only RLC SDUs prior to the missing RLC SDU to an upper layer if an RLC SDU is missing, or sequentially transmitting all the RLC SDUs received before a timer starts to an upper layer if the timer expires even if there is a missing RLC SDU, or sequentially transmitting all RLC SDUs received so far to an upper layer if a predetermined timer expires even if there is a missing RLC SDU. In addition, the RLC PDUs may be processed in the sequence in which the RLC PDUS are received (in a sequence of arrival regardless of the serial number or sequence number), and may be transmitted to a PDCP device in out-of-sequence delivery. The in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer, or may be replaced by a multiplexing function of the NR MAC layer.

The out-of-sequence delivery function of the NR RLC device refers to a function of directly transmitting the RLC SDUs, received from the lower layer, to an upper layer regardless of the order thereof, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 1d-15 and 1d-30 may be connected to multiple NR RLC layer devices configured in one UE, and the main function of the NR MAC may include some of the following functions.

Mapping between logical channels and transport channels

Multiplexing/de-multiplexing of MAC SDUs

Scheduling information reporting

Error correction through HARQ

Priority handling between logical channels of one UE

Priority handling between UEs by means of dynamic scheduling

MBMS service identification

Transport format selection

Padding

Figure 5:
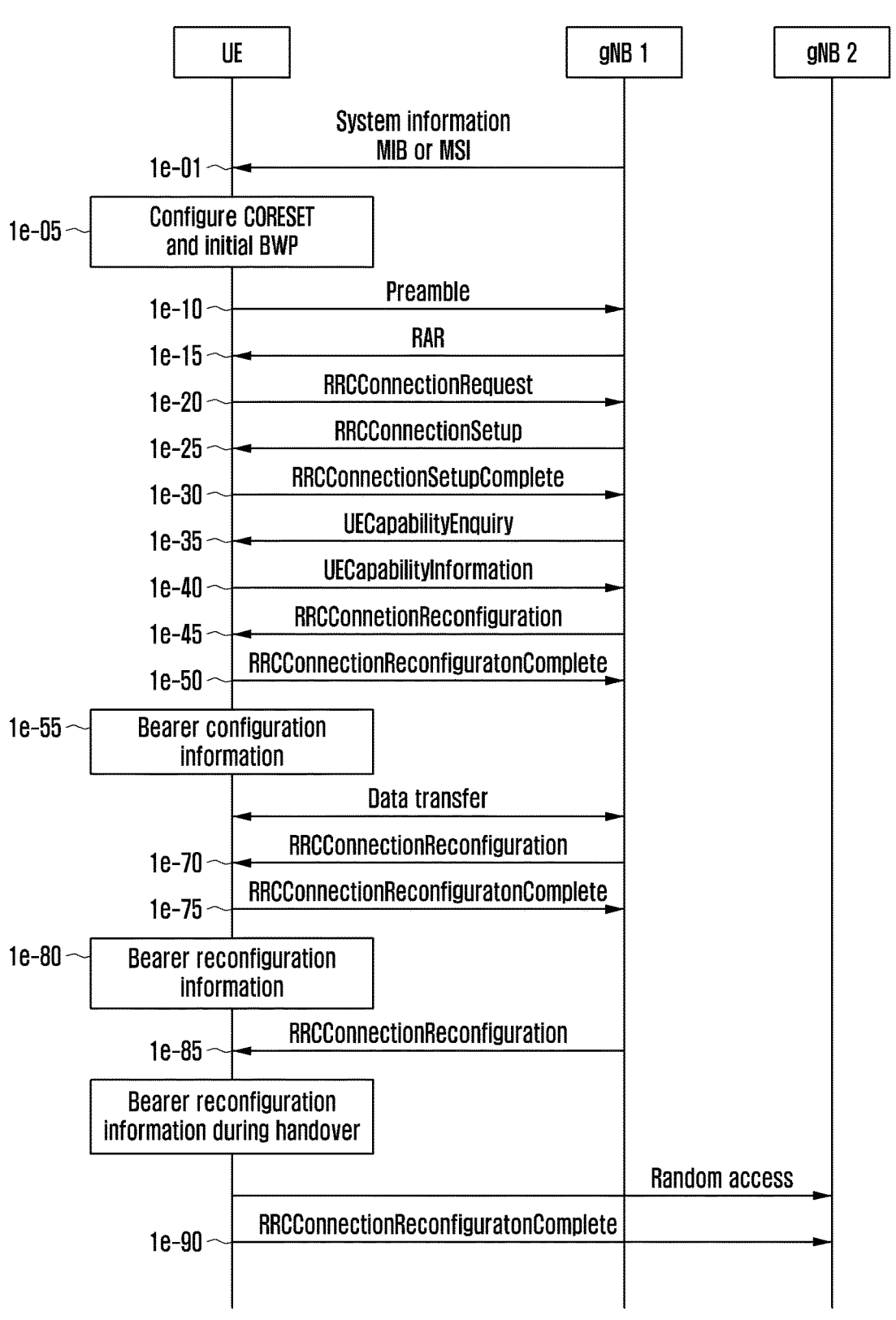
FIG. 5 illustrates a procedure in which a UE switches from a radio resource control (RRC) idle mode to an RRC connected mode in a next-generation mobile communication system of the disclosure, and proposes a method for configuring a protocol layer device or functions of the UE according to an embodiment of the disclosure.

The NR PHY layers 1d-20 and 1d-25 may perform operations of channel-coding and modulating upper layer data, forming the upper layer data into an OFDM symbol, transmitting the OFDM symbols via a radio channel or demodulating and channel decoding of the OFDM symbols received via the radio channel, and transferring the OFDM symbol to an upper layer FIG. 5 illustrates a procedure in which a UE switches from an RRC idle mode to an RRC connected mode in a next-generation mobile communication system of the disclosure, and proposes a method for configuring a protocol layer device or functions of the UE according to an embodiment of the disclosure.

One cell to which a base station provides service may serve a very wide frequency band. First, the UE may search the entire frequency band provided by a service provider (PLMN) in units of predetermined resource blocks (for example, in units of 12 resource blocks (RBs)). That is, the UE may start discovering a primary synchronization sequence (PSS)/secondary synchronization sequence (SSS) in the entire system bandwidth in units of resource blocks. If the UE discovers the PSS/SSS in units of resource blocks and then detects the signals, the UE may read the signals, analyze (decode) the signals, and identify a boundary between a subframe and a radio transmission resource frame (radio frame). If the UE completes synchronization, the UE may read system information of a cell on which the UE currently camps. That is, the UE may identify information on a control resource set (CORESET) by identifying a master system information block (MIB) or minimum system information (MSI) and identify initial access bandwidth part (BWP) information by reading system information in operation 1e-01 and 1e-05. In the above, CORESET information refers to the location of time/frequency transmission resources through which a control signal is transmitted from the base station, and may be, for example, the location of resources through which a PDCCH channel is transmitted.

As described above, if the UE completes synchronization of the downlink signal with the base station and is able to receive a control signal, the UE may perform a random-access procedure in the initial BWP, receive a random-access response, make a request for configuring an RRC connection, receive an RRC message, and configure the RRC connection in operations 1e-10, 1e-15, 1e-20, 1e-25, and 1e-30.

In the above, the basic RRC connection is completed, the base station may transmit an RRC message which asks about a UE capability to the UE (UECapabilityEnquire) in order to identify the UE capability in operation 1e-35. In another method, the base station may ask the MME or the AMF about the UE capability in order to identify the UE capability. This is because the MME or the AMF may have UE capability information if the UE previously accessed the MME or the AMF.

In the above, the UE performs a UE capability report procedure, the RRC message (e.g., non-access stratum (NAS) message or access stratum (AS) message) for reporting UE capability may include some or multiple pieces of information among the following information.

Whether the UE supports a data concatenation function or data de-concatenation function of the upper layer device The maximum size that the UE supports the data concatenation function or data de-concatenation function of the upper layer device (for example, the maximum size of concatenated data or the total maximum size of data obtained by concatenating multiple pieces of data)

The maximum amount of data that can be concatenated when the UE supports the data concatenation function or data de-concatenation function of the upper layer device Whether the integrity protection procedure (or function) is supported for each bearer Whether the integrity protection procedure is supported for DRB If the integrity protection procedure is supported for DRB, whether the integrity protection procedure is supported at any data rate regardless of the maximum data rate (e.g., 64 kbps or full rate) or data rate supported when the integrity protection procedure is applied Information on the functions supported by the UE Release information supported by the UE, for example, Rel-15, Rel-16, or Rel-17. For example, if the UE supports Rel-15 only, the base station or network may consider that the integrity protection procedure for DRB is supportable only at the data rate of 64 kbps. Alternatively, the integrity protection procedure function for the DRB may be identified through the UE capability report message (e.g., non-access stratum (NAS) message or access stratum (AS) message). As another method, the base station or network may consider that, if the UE supports Rel-15 or Rel-16, the integrity protection procedure for DRB is always supportable regardless of data rate, or the integrity protection procedure function for the DRB may be identified through the UE capability report message (e.g., non-access stratum (NAS) message or access stratum (AS) message).

Whether the UE supports deactivation (or disable) or activation (or enable) of the data segmentation function (e.g., data segmentation function in an RLC layer device), or whether the UE supports deactivation (or disable) or activation (or enable) of the data segmentation function in relation to RLC UM mode or RLC AM mode Whether the UE supports a new data segmentation method (e.g., segmentation information (SI) based data segmentation method), or whether the UE supports the new data segmentation method (e.g., segmentation information (SI) for an RLC UM mode or RLC AM mode) in relation to RLC UM mode or RLC AM mode Whether the UE supports the bitmap-based RLC status report, or whether the UE supports the bitmap-based RLC status report in relation to the RLC AM mode Upon receiving the UE capability report message from the UE in the above, the base station or the network may configure, for the UE, the data concatenation function or integrity protection function through an RRC message (for example, RRCReconfiguration message, RRCSetup message, or RRCResume message) for each bearer or each layer device.

If there is no UE capability information desired by the base station, the base station may request the UE capability from the UE.

The base station transmits the RRC message to the UE to identify UE performance, for example, to identify how much of the frequency band the UE can read, or whether the UE supports functions or the area of frequency band that the UE can read. In addition, after identification of the UE performance, an appropriate partial bandwidth (BWP) or appropriate functions may be configured for the UE. When receiving the RRC message inquiring about the UE capability, the UE may transmit to the base station the RRC message including UE capability information relating to functions supported by the UE in response thereto in operation 1e-40.

In the above, the UE may configure bearer setup information, cell group setup information, cell setup information, each layer device information (for example, SDAP layer device (or new layer device), PDCP layer device, RLC layer device, MAC layer device, or PHY layer device) through the RRCSetup message or RRCResume message 1e-25 or RRCReconfiguration messages 1e-45 and 1e-70 of the RRC connection configuration. The RRC message may include configuration information for a PCell, Pscell, or multiple cells, and may configure multiple partial bandwidths for each cell (PCell, Pscell, or Scell). In the above, when receiving the RRCReconfiguration message in which the configuration information of the UE is received, the UE may apply the configuration information to the bearer or layer device of the UE, and may configure the RRCReconfigurationComplete messages 1e-50 and 1e-75 indicating that the reconfiguration is completed is configured and transmit the same to the base station.

In addition, when the base station or network instructs the UE to handover to another cell or frequency, the base station or network may configure a handover message (RRCReconfiguration message 1e-85) including configuration information of a target base station for handover and transmit the handover message to the UE, and the UE may perform a handover procedure (for example, a synchronization procedure or a random access procedure to a target base station, etc.) according to the handover setting, and may configure an RRCReconfigurationComplete message 1e-90 and transmit the same to the target base station when the handover is successfully performed. The configuration information of the target base station may include bearer configuration information, cell group configuration information, cell configuration information, each layer device information (e.g., SDAP layer device (or new layer device) or PDCP layer device, or RLC layer device, MAC layer device, or PHY layer device).

In the above, the RRC message (RRCSetup message, RRCResume message 1e-25, or RRCReconfiguration message 1e-70 or 1e-80) may include cell group configuration information, cell configuration information, and bearer configuration information of the UE, or each layer device information (for example, SDAP layer device (or new layer device), PDCP layer device, RLC layer device, MAC layer device, or PHY layer device) may be configured, and the following information may be included therein.

An indicator indicating whether to configure a data concatenation function or a data de-concatenation function of an upper layer device (e.g., a PDCP layer device or an SDAP layer device (or new layer device)), with regard to the uplink or downlink, for each bearer or for each layer device The maximum size or threshold value to be concatenated when the data concatenation function or data de-concatenation function of the upper layer device is configured for downlink or uplink (for example, the maximum size of concatenated data or total maximum size of data obtained by concatenating multiple pieces of data)

The maximum number that can be concatenated when the data concatenation function or data de-concatenation function of the upper layer device is configured for the downlink or uplink An indicator indicating whether to configure the integrity protection procedure (or function), with regard to the downlink or uplink, for each bearer or each layer device (e.g., PDCP layer device)

An indicator indicating whether to configure the integrity protection procedure for DRB, with regard to the downlink or uplink, for each bearer or for each layer device (e.g., PDCP layer device)

Figure 6:
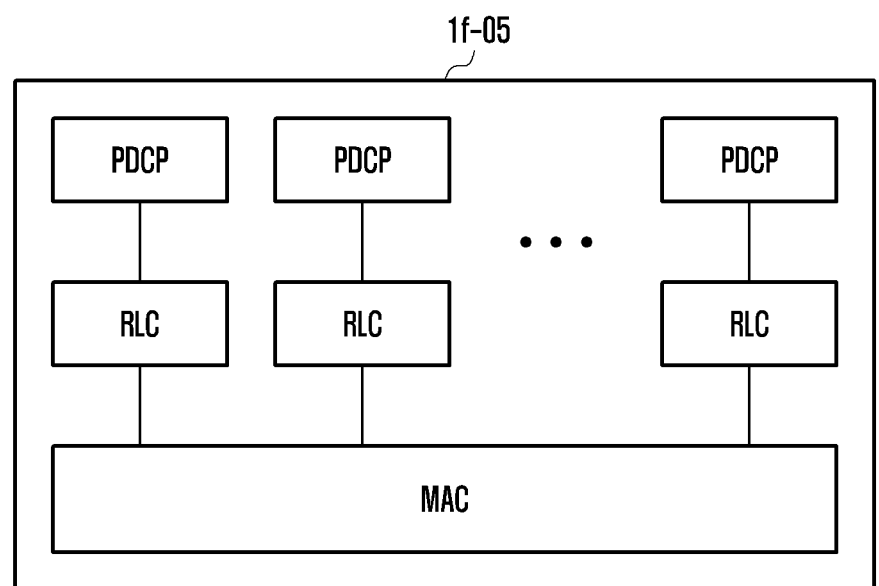
FIG. 6 illustrates the structure of a protocol layer device proposed according to an embodiment of the disclosure.

An indicator or configuration information indicating whether the UE uses a data segmentation function or not, or indicating whether to disable (or deactivate) or enable (or activate) the data segmentation function, with regard to downlink or uplink, or for each bearer, for each layer device (e.g., RLC layer device), for each RLC UM mode or RLC AM mode An indicator or configuration information indicating whether the UE uses a new data segmentation method (e.g., segmentation information (SI)-based data segmentation method) or not, or indicating whether to use an SI-based data segmentation method or an SO-based data segmentation method, with regard to downlink or uplink, or for each bearer, for each layer device (e.g., RLC layer device), for each RLC UM mode or RLC AM mode An indicator or configuration information indicating whether the UE uses a bitmap-based RLC status report or not, with regard to downlink or uplink, or for each bearer, for each layer device (e.g., RLC layer device), for each RLC AM mode Configuration information indicating a specific type of data (e.g., small sized data or data including TCP ACK) or specific data (or QoS flow) (e.g., a QoS flow with small sized data or a QoS flow with a low data transfer rate) to perform data concatenation FIG. 6 illustrates the structure of a protocol layer device proposed according to an embodiment of the disclosure.

Referring to FIG. 6, upon receiving the RRC message from a base station as in FIG. 5, a UE may receive connection establishment information, bearer configuration information, or protocol layer device information of the UE, and may establish and configure protocol layer devices as shown in reference numeral 1f-05. For example, one PHY layer device and a MAC layer device may be established, and multiple bearers may be established and connected to the MAC layer device. The bearers may include an RLC layer device or a PDCP layer device.

Figure 7A:
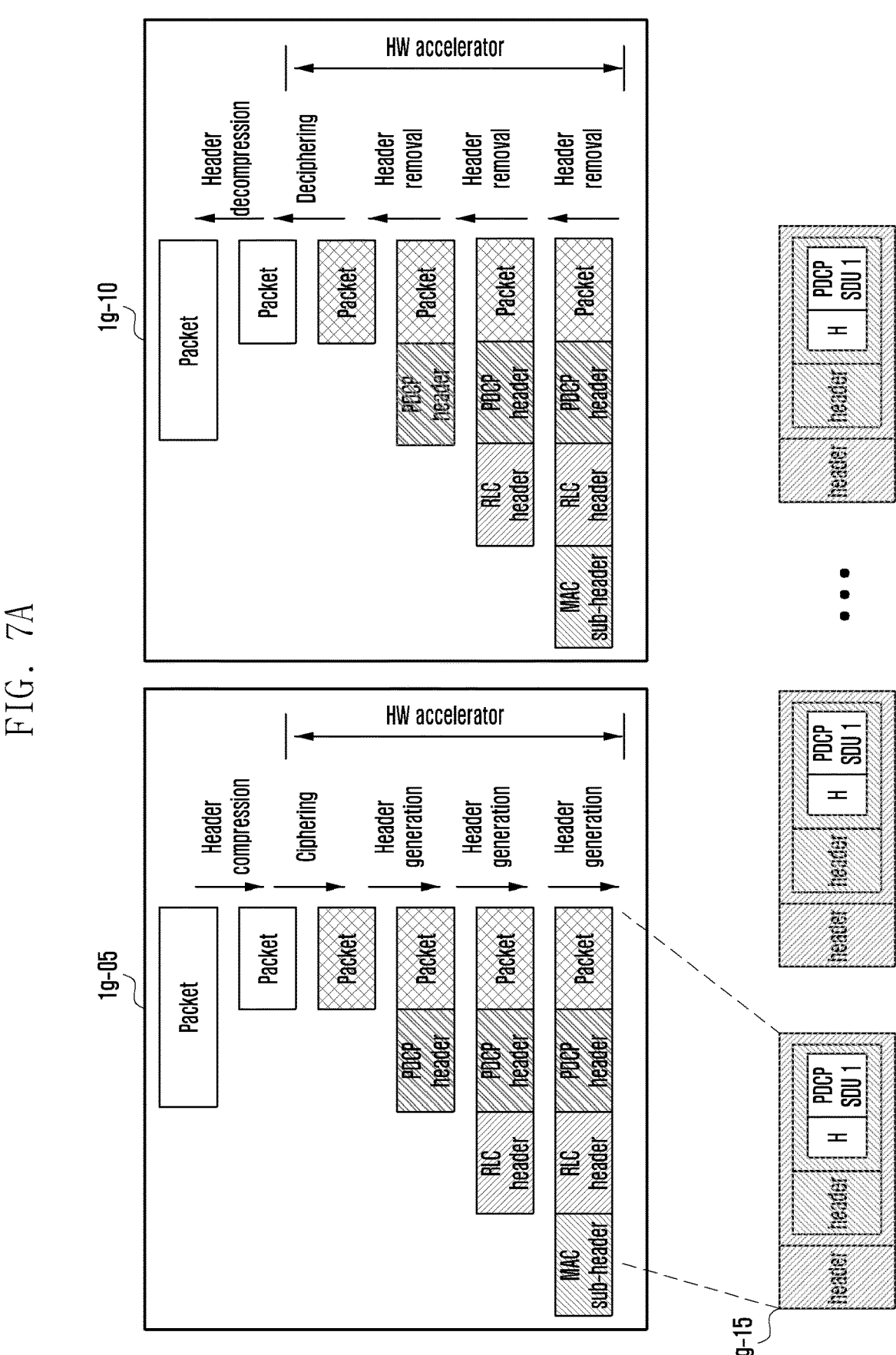
FIG. 7A illustrates a procedure of processing and transmitting data, which is received from an upper layer device, by each protocol layer device of a bearer, and a procedure of processing data, which is received from a lower layer device, by each protocol layer device of a bearer and transferring the processed data to an upper layer device in a next-generation mobile communication system according to an embodiment of the disclosure.

FIG. 7A illustrates a procedure of processing and transmitting data, which is received from an upper layer device, by each protocol layer device of a bearer, and a procedure of processing data, which is received from a lower layer device, by each protocol layer device of a bearer and transferring the processed data to an upper layer device in a next-generation mobile communication system according to an embodiment of the disclosure.

Figure 7B:
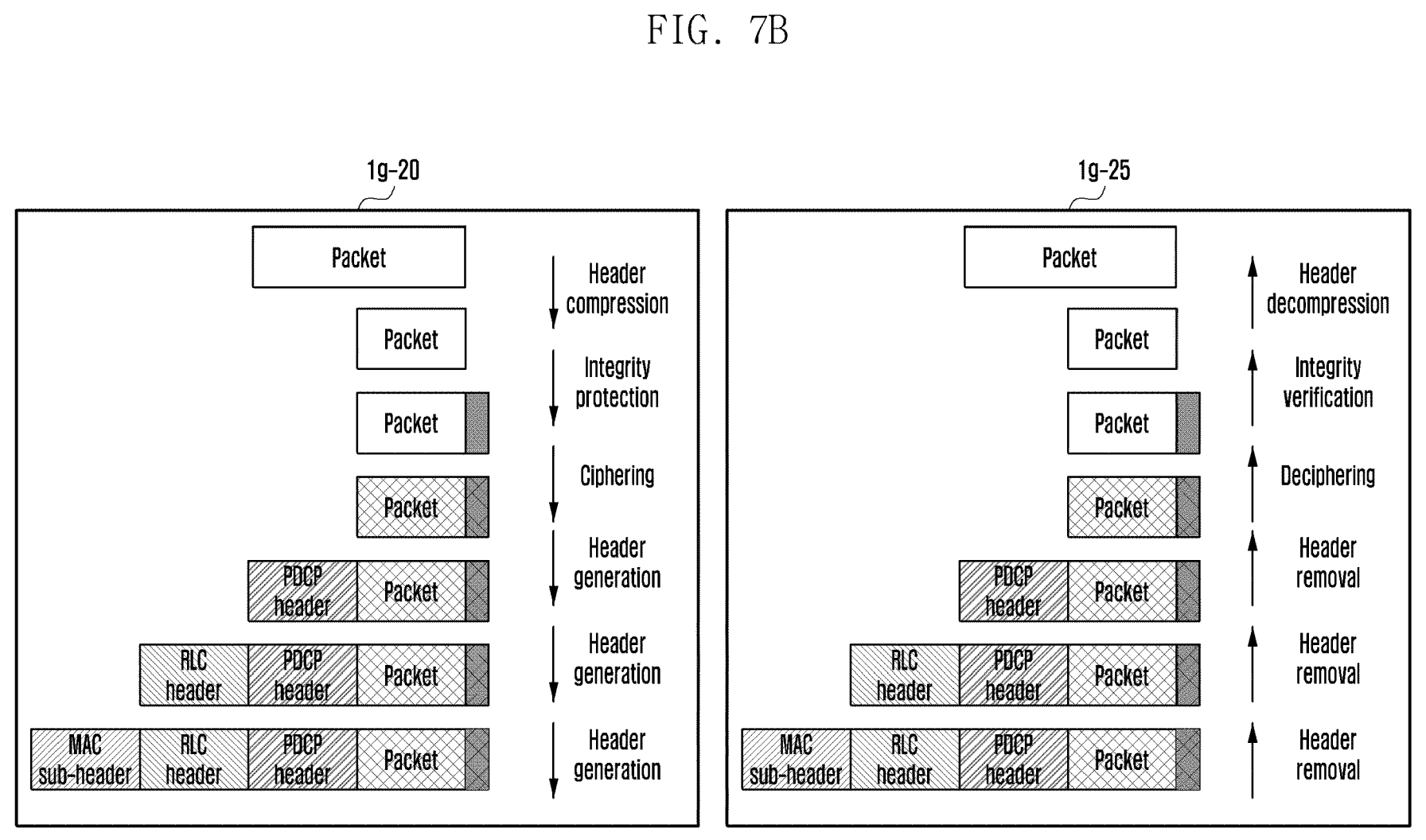

FIG. 7B illustrates a procedure of processing and transmitting data, which is received from an upper layer device, by each protocol layer device of a bearer, and a procedure of processing data, which is received from a lower layer device, by each protocol layer device of a bearer and transferring the processed data to an upper layer device in a next-generation mobile communication system according to an embodiment of the disclosure.

Figure 7C:
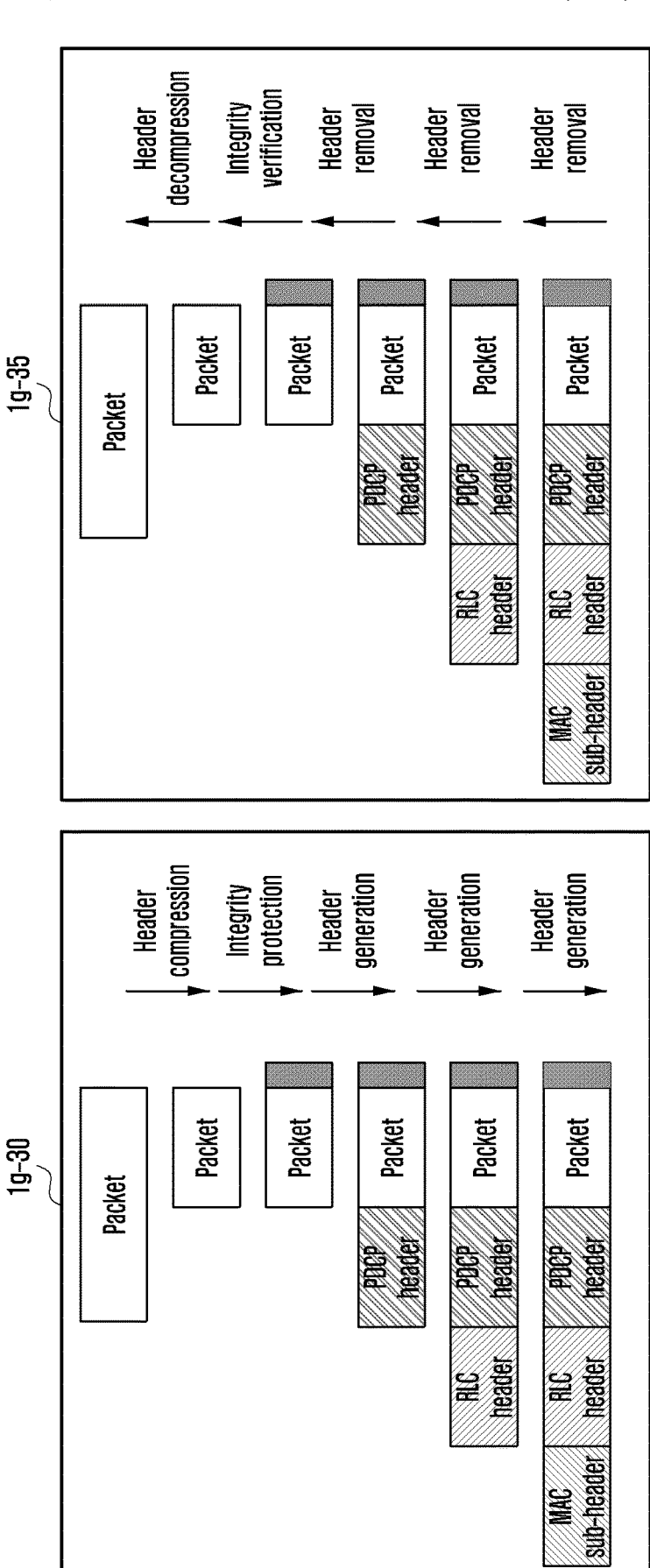
FIG. 7C illustrates a procedure of processing and transmitting data, which is received from an upper layer device, by each protocol layer device of a bearer, and a procedure of processing data, which is received from a lower layer device, by each protocol layer device of a bearer and transferring the processed data to an upper layer device in a next-generation mobile communication system according to an embodiment of the disclosure.

FIG. 7C illustrates a procedure of processing and transmitting data, which is received from an upper layer device, by each protocol layer device of a bearer, and a procedure of processing data, which is received from a lower layer device, by each protocol layer device of a bearer and transferring the processed data to an upper layer device in a next-generation mobile communication system according to an embodiment of the disclosure.

Referring to FIG. 7A, if the ciphering procedure or security key configuring information is configured in the PDCP layer device, the UE may derive the security keys from the RRC layer device, and may apply the security key when establishing or re-establishing the PDCP layer device to perform the ciphering procedure. As shown in 1g-05, when the PDCP layer device receives data (e.g., PDCP SDU) from an upper layer device, if a header compression procedure is configured through an RRC message or a ciphering procedure is configured as shown in FIG. 5, the PDCP layer device may perform a header compression procedure for the data or perform a ciphering procedure for the data, may assign a PDCP serial number and configure a PDCP header to thereby configure the data as a PDCP PDU and transmit the PDCP PDU to a lower layer device. The RLC layer device may configure the RLC serial number and header field values for the data (PDCP PDU) and attach an RLC header thereto, and transmit the data (PDCP PDU) to the MAC layer device, and the MAC layer device may configure the length of the data, a length field, and a MAC header field value such as a logical channel identifier corresponding to the data, may attach a MAC header thereto, and may transmit the data to a lower layer device. The RLC layer device may perform a data segmentation procedure if necessary or when uplink transmission resources are insufficient, and may update field values of the RLC header or configure segmentation information.

In reference numeral 1g-10, when the UE receives data from the lower layer device, the UE may read the MAC header and identifies the length field to separate the data, or may identify the logical channel identifier and demultiplexes the data to the corresponding RLC layer device and transmit the same. In the above, when receiving the data, the RLC layer device may read the RLC header and identify whether or not segmentation occurs, with regard to non-segmented data, the RLC layer device may remove the RLC header therefrom, and transfer the data to the PDCP layer device, and with regard to segmented data, the RLC layer device may store the same in a buffer, when all the pieces of segmented data, with regard to the RLC serial number corresponding to the segmented data, are received, the RLC layer device may reassemble the pieces of segmented data to configure full data and transfer the reassembled data to the PDCP layer device. In the above, when a ciphering procedure is configured, the PDCP layer device performs a deciphering procedure, and if the deciphered data is arranged in a sequence of a PDCP serial number or COUNT value, or if a header compression procedure is configured, the PDCP layer device applies a header decompression procedure to the data, and transfer the data to an upper layer device in ascending order of the COUNT value. If the header compression procedure is not configured in the above, the header compression procedure or the header decompression procedure may be omitted.

Referring to FIG. 7B, when a header compression procedure, integrity protection procedure, or ciphering procedure are configured in the PDCP layer device as shown in reference numeral 1g-20, the transmitting PDCP layer device may apply a header compression procedure to upper layer device data, perform an integrity protection procedure on the header-compressed data or PDCP header, attach 4-byte MAC-I field at the end of data, and perform a ciphering procedure on the MAC-I field and data to which the integrity protection procedure has been applied. Further, as shown in reference numeral 1g-25, the receiving PDCP layer device at the receiving terminal may apply a deciphering procedure for the data received from the lower layer device, may apply the integrity verification procedure based on the 4-byte MAC-I field attached to the deciphered data to identify whether the integrity verification has failed, and may discard data that has failed the integrity verification procedure in the above. If data that has passed the integrity verification procedure are arranged in a sequence of the PDCP serial number or COUNT value, or if the header compression procedure is configured, the receiving PDCP layer device may apply the header decompression procedure to the data, and may transfer the data to an upper layer device in an ascending order of the COUNT value. If the header compression procedure is not configured in the above, the header compression procedure or the header decompression procedure may be omitted.

Referring to FIG. 7C, when a header compression procedure or integrity protection procedure is configured in the PDCP layer device or a ciphering procedure is not configured, the transmitting PDCP layer device may apply a header compression procedure to upper layer device data, perform an integrity protection procedure on the header-compressed data or PDCP header, attach 4-byte MAC-I field at the end of data, and attach the PDCP header in front of the MAC-I field and data, to which the integrity protection procedure has been applied, to transfer the same to a lower layer device, as shown in reference numeral 1g-30. Further, as shown in reference numeral 1g-35, the receiving PDCP layer device at the receiving terminal may apply the integrity verification procedure to data received from a lower layer device based on the 4-byte MAC-I field attached thereto to identify whether the integrity verification has failed, and may discard data that has failed the integrity verification procedure in the above. If data that has passed the integrity verification procedure are arranged in a sequence of the PDCP serial number or COUNT value, or if the header compression procedure is configured, the receiving PDCP layer device may apply the header decompression procedure to the data, and may transfer the data to an upper layer device in an ascending order of the COUNT value. If the header compression procedure is not configured in the above, the header compression procedure or the header decompression procedure may be omitted.

The data transmitted above is generated in a structure in which header and data are repeated as shown in reference numeral 1g-15. For example, the data has a repeated structure, such as header (MAC header, RLC header, PDCP header, or SDAP header) and data and header (MAC header, RLC header, PDCP header or SDAP header) and data. Therefore, when generating data having a repeated structure with headers having a fixed size as described above, in order to perform faster data processing, a hardware accelerator (hardware engine) may be applied to reduce data processing time. In the above, the hardware accelerator is applied or called to be used when adding or removing the header (MAC header, RLC header, PDCP header or SDAP header), or performing a ciphering procedure, a deciphering procedure, an integrity protection procedure, or an integrity verification procedure.

Figure 8:
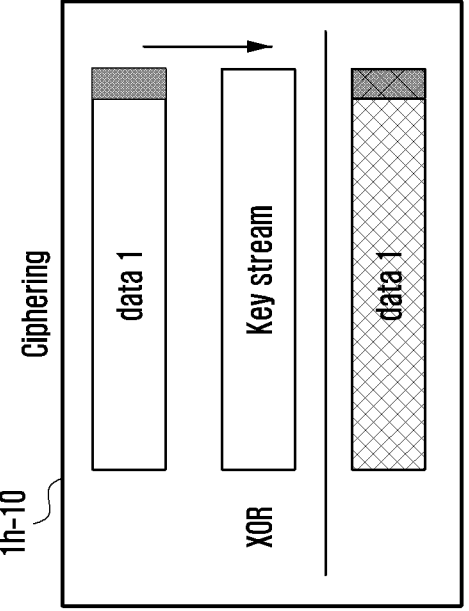
FIG. 8 illustrates an integrity protection and verification procedure, and a ciphering or deciphering procedure in a next-generation mobile communication system according to an embodiment of the disclosure.
Figure 8:
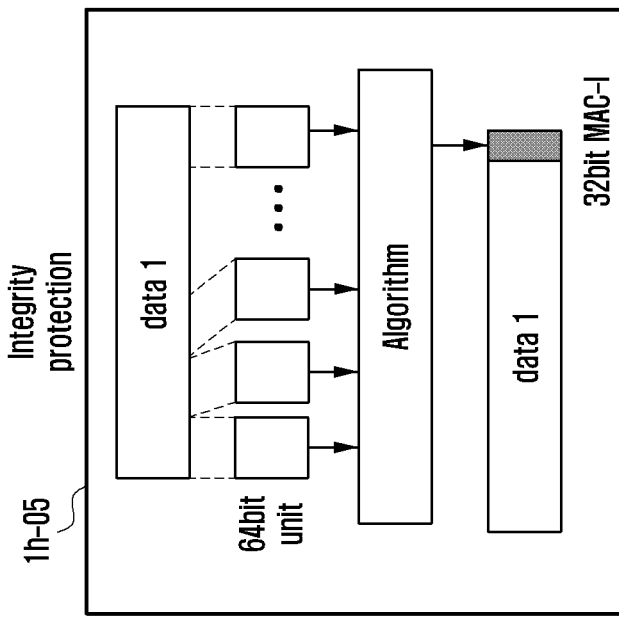

FIG. 8 illustrates an integrity protection and verification procedure, and a ciphering or deciphering procedure in a next-generation mobile communication system according to an embodiment of the disclosure.

As shown in reference numeral **1*h*-05 of FIG. 8**, if the integrity protection procedure is configured, the integrity protection procedure may be performed based on security keys derived or applied from an upper layer device (e.g., an RRC layer device or a NAS layer device), a COUNT value corresponding to data to which the integrity protection procedure is to be applied, or bearer identifiers corresponding to data. For example, data to which the integrity protection procedure is applied is calculated according to the integrity protection algorithm in units of 8 bytes (64 bits), and finally 4-byte (32-bits) MAC-I is calculated, and thus message authentication code for integrity (MAC-I) field can be attached at the end of the data. According to the integrity verification procedure at the receiving terminal, the 4-byte X-MAC field value obtained by inversely applying the integrity verification algorithm to the received data is compared with the MAC-I value attached to the data, and if the two values are the same, it may be determined that the integrity verification of the data is successful. If the two values are different, it may be determined that the integrity verification has failed and the data may be discarded. As described above, the integrity protection procedure or integrity verification procedure is a very complex procedure, the data processing complexity is high, and the data processing time is long.

As shown in reference numeral **1*h*-10**, a ciphering procedure can be performed when the ciphering procedure is configured. For example, the ciphering procedure may generate a key stream having the same length as that of the data through a ciphering algorithm based on security keys derived or applied from an upper layer device (e.g., an RRC layer device or a NAS layer device), a COUNT value corresponding to data to which the ciphering procedure is to be applied, or bearer identifiers corresponding to data. In addition, ciphered data may be generated by performing an XOR procedure for the generated key stream and the data to be ciphered. On the contrary, the receiving terminal may perform the deciphering procedure by performing an XOR procedure on the ciphered data that has received the key stream generated through the deciphering algorithm. As such, the ciphering procedure or the deciphering procedure is a very complex procedure, the data processing complexity is high, and the data processing time is long.

Figure 9:
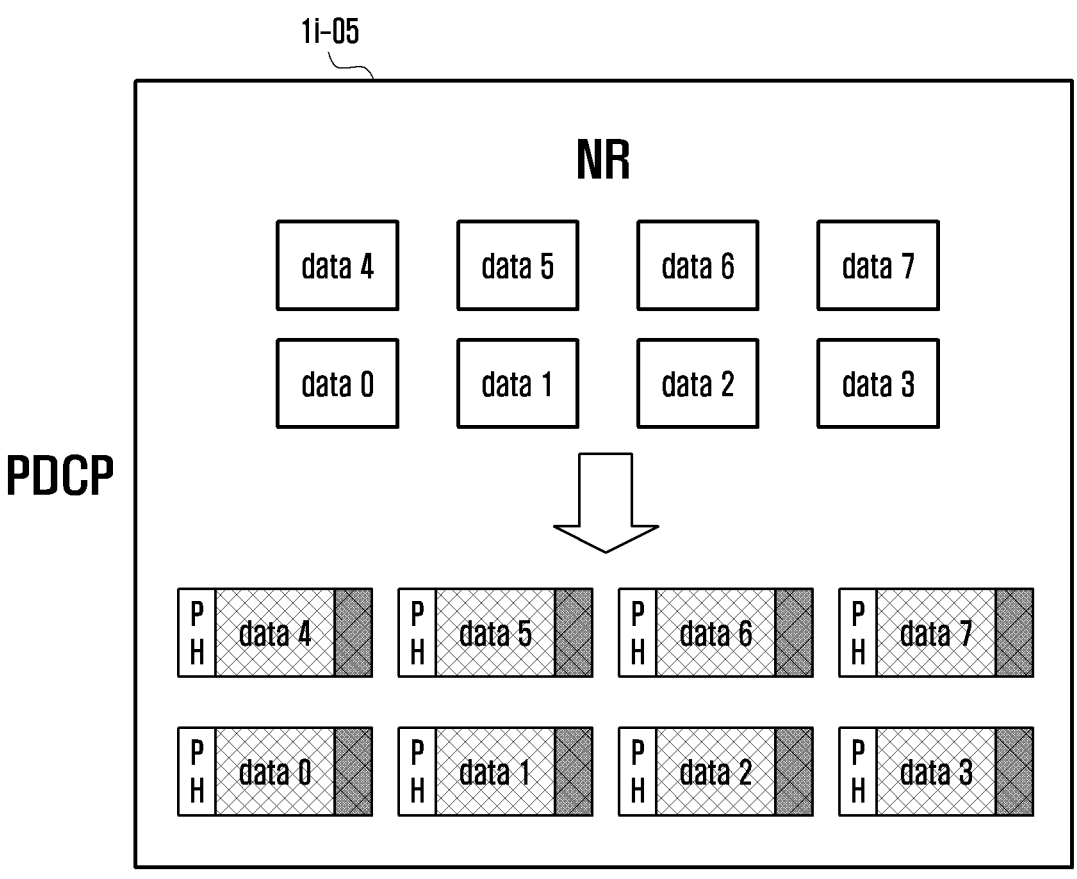
FIG. 9 illustrates a long data processing time with high complexity when an integrity protection procedure or a ciphering procedure is applied to data in a packet data convergence control (PDCP) layer device according to an embodiment of the disclosure.

FIG. 9 illustrates a long data processing time with high complexity when an integrity protection procedure or a ciphering procedure is applied to data in a PDCP layer device according to an embodiment of the disclosure.

Assuming that the transmitting PDCP layer device **1*i*-05 receives 8 pieces of data from an upper layer device as in FIG. 9**, if an integrity protection procedure or a ciphering procedure is configured, the transmitting PDCP layer device should perform 8 integrity protection procedures, generates 8 MACs-I fields and attach the generated fields to the end of each data, or perform 8 ciphering procedures for the data. Therefore, applying the integrity protection procedure or ciphering procedure to each data above is to perform a very complicated procedure 8 times, which consumes a lot of data processing time. In addition, at the receiving terminal, if the receiving PDCP layer device receives 8 pieces of data from a lower layer device, the receiving PDCP layer device should perform 8 deciphering procedures and 8 integrity verification procedures.

Figure 10:
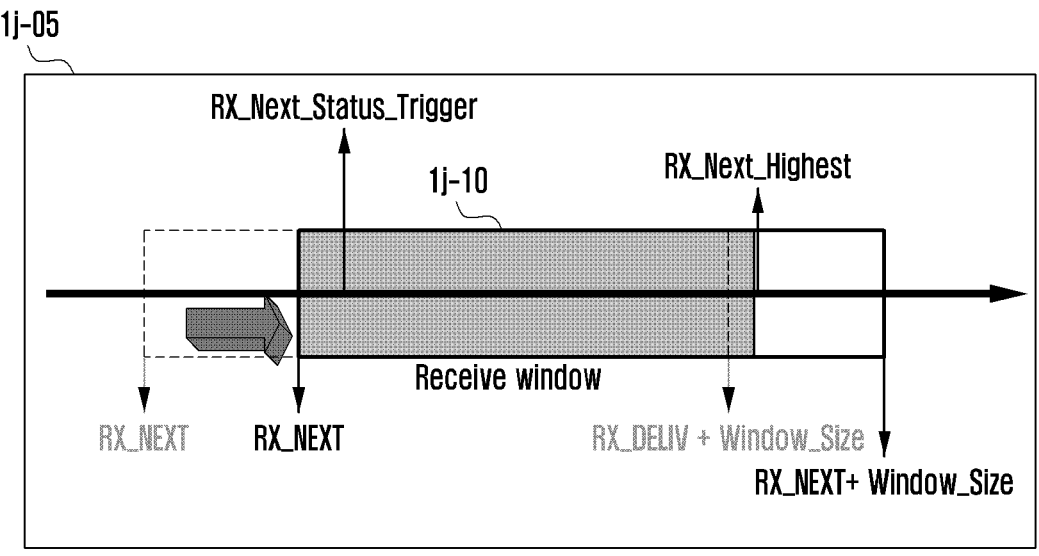
FIG. 10 illustrates an operation of driving radio link control (RLC) reception window in an RLC layer device according to an embodiment of the disclosure.

FIG. 10 illustrates an operation of driving an RLC reception window in an RLC layer device according to an embodiment of the disclosure.

In reference numeral **1*j*-05**, the RLC reception window may be driven by window variables. For example, the first variable (RX_NEXT) indicates the next RLC serial amount of data, having the lowest RLC serial number in sequence successfully received, and the second variable (RX_NEXT Highest) indicates an RLC serial number that is considered to be received next, or the next RLC serial number of the data having the highest RLC serial number among the received pieces of data. In the reception window, with regard to each RLC serial number between the first variable or the second variable, a list is configured to map the RLC serial number, data, or whether successful reception occurs or not, and a linked list is implemented to perform serial number or data search.

The transmission RLC layer device may also drive the transmission window, may configure a list that maps RLC serial number, data, or whether successful reception occurs or not, and may implement a linked list so as to perform serial number or data search. The linked lists configured above may be used when performing the ARQ procedure in the RLC layer device, more specifically when updating the window variables, configuring the RLC status report, or performing the retransmission procedure in the RLC ARQ procedure. In addition, the linked list may be searched to discover pieces of data or update information based on the RLC serial number. Therefore, as the number of RLC serial numbers allocated by the transmitting RLC layer device increases, the length of the linked list becomes longer, and when the length of the linked list becomes longer, the search time performed using the length of the RLC serial number becomes very long. As described in FIGS. 7A, 7B and 7C, since there is no data concatenation procedure in a next-generation mobile communication system, the number of RLC serial numbers configuring the linked list is very large. The RLC serial number space or linked list to be searched for in the linked list as shown in **1*j*-10** becomes very large. Therefore, when the RLC layer device performs the ARQ procedure, as the data search time becomes longer, the data processing time increases.

FIGS. 11A, 11B, 12A, 12B, and 13 illustrate a first embodiment, a second embodiment, or a third embodiment of the data concatenation procedure proposed by the disclosure, in which the number of times of data processing in an integrity protection procedure, an integrity verification procedure, a ciphering procedure, or deciphering procedure is reduced and the number of allocated RLC serial numbers is reduced, so as to reduce the data processing time according to various embodiments of the disclosure.

Various data processing methods are proposed for improving data processing speed when a base station and a UE perform data processing at a high data rate in a next-generation mobile communication system according to the example of the disclosure.

As described above with reference to FIGS. 9 and 10, among the data processing procedures performed when the UE or the base station transmits or receives data, the procedure that consumes the most processing load or time is the ciphering procedure, a deciphering procedure, integrity protection procedure, integrity verification procedure of the PDCP layer device, or autonomous repeat request (ARQ) procedure in the RLC layer device.

Referring to FIG. 5, the procedures are performed in the RLC layer device or the PDCP layer device configured for each bearer, and when the UE establishes a connection with a network, the base station transmits an RRC message (for example, an RRCReconfiguration message, an RRCSetup message, or an RRCResume message) to the UE, and the ciphering procedure (or deciphering procedure), integrity protection procedure (or integrity verification procedure), or whether or not to use the ARQ procedure (e.g., configured in RLC AM mode) may be configured for each bearer (e.g., SRB or DRB) using an indicator.

Therefore, if a ciphering procedure (or deciphering procedure) is established for a bearer and an integrity protection procedure (or integrity verification procedure) is not configured, the UE or the base station may perform the ciphering procedure (or deciphering procedure) for the bearer without performing the integrity protection procedure (or integrity verification procedure).

In addition, if a ciphering procedure (or deciphering procedure) is not established for a bearer and an integrity protection procedure (or integrity verification procedure) is configured, the UE or base station may perform the integrity protection procedure (or integrity verification procedure) for the bearer, and may not perform the ciphering procedure (or deciphering procedure).

In addition, when a ciphering procedure (or deciphering procedure) is configured for a bearer and an integrity protection procedure (or integrity verification procedure) is also configured, the UE or base station may perform an integrity protection procedure (or integrity verification procedure) for the bearer, and then may perform a ciphering procedure (or deciphering procedure).

In the above, since the PDCP layer device performs the ciphering procedure (or deciphering procedure) or the integrity protection procedure (or integrity verification procedure) once for each data received from the upper layer device, the more data the PDCP layer device receives, the more the ciphering procedure (or deciphering procedure) or integrity protection procedure (or integrity verification procedure) need be performed, which increases data processing complexity and increases data processing time. In addition, since an RLC layer device allocates an RLC serial number to each data received from an upper layer device (e.g., a PDCP layer device), the more data the RLC layer device receives, the more RLC serial numbers are allocated and used. Therefore, the ARQ procedure that operates based on RLC serial numbers becomes very complicated and requires a lot of data processing time.

Therefore, the disclosure proposes a method in which the number or frequency of ciphering procedures (or deciphering procedures) or integrity protection procedures (or integrity verification procedures) performed in the PDCP layer device is reduced, and the number of RLC serial numbers allocated and used by the RLC layer device is reduced. Since the ciphering procedure (or deciphering procedure) or the integrity protection procedure (or integrity verification procedure) in the above is a procedure having a large data processing load, it can be processed using a hardware accelerator or hardware engine. In the above, if the number of times of calling and using a hardware accelerator for performing the ciphering procedure (or deciphering procedure) or the integrity protection procedure (or integrity verification procedure) is reduced, more hardware accelerator calls can be used in parallel in order to perform processing of other data (for example, data of another bearer), and thus data processing time can be reduced and data processing speed can be improved. In addition, if the number of RLC serial numbers allocated for each data is reduced, the time for searching for the list with the RLC serial number, data, ACK, or NACK indicator in the ARQ procedure of the RLC layer device can be reduced, and thus the data processing time can be reduced.

The disclosure proposes that an upper layer device (e.g., a PDCP layer device or an SDAP layer device (or new layer device)) performs data concatenation procedure respect to pieces of data (e.g., SDAP SDU or PDCP SDU) received from a further upper layer device. In the above, if the upper layer device data concatenation procedure is configured at the transmitting terminal, data de-concatenation (separation) procedure needs to be performed at the receiving terminal.

Figure 11A:
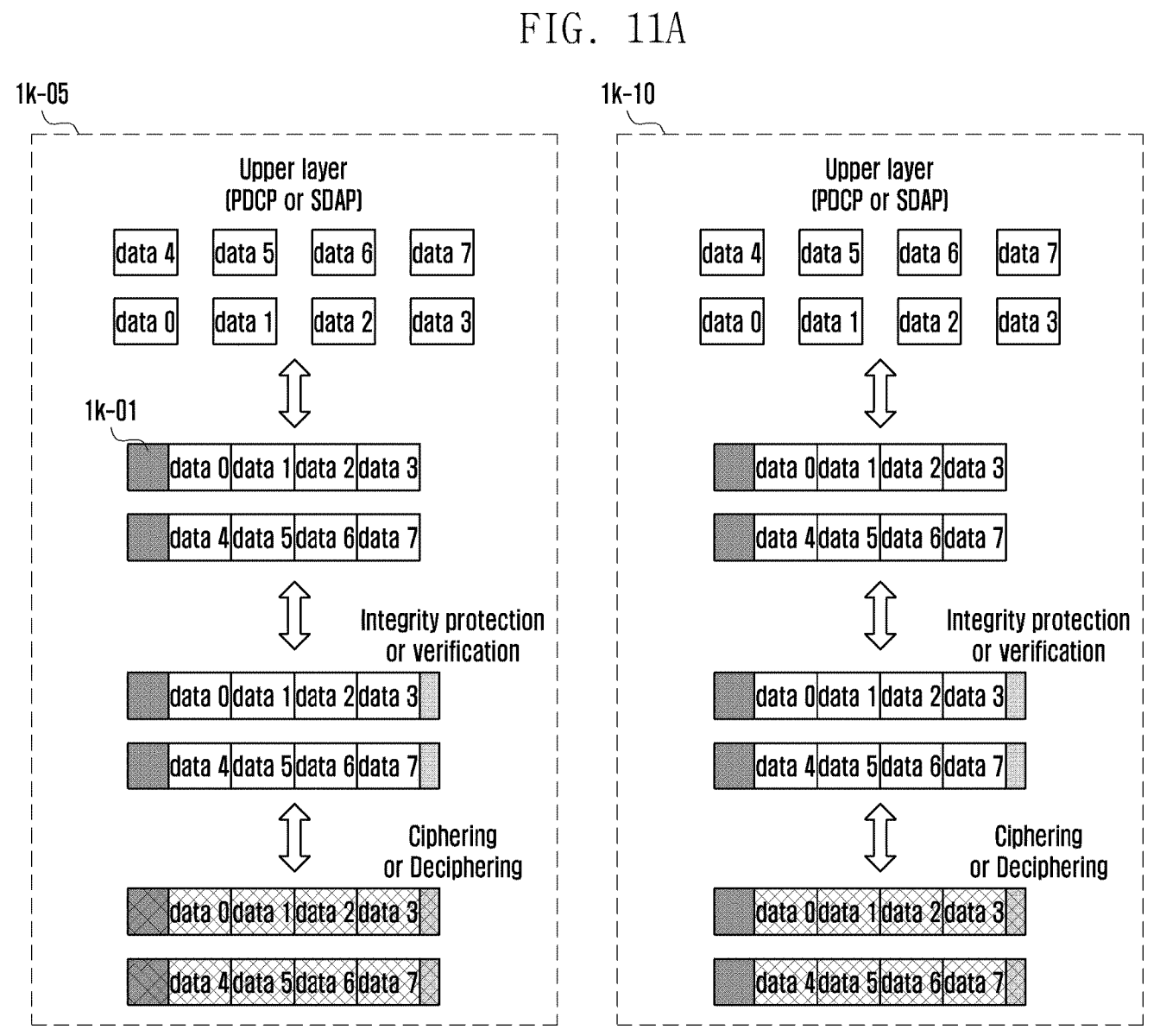
Figure 11B:
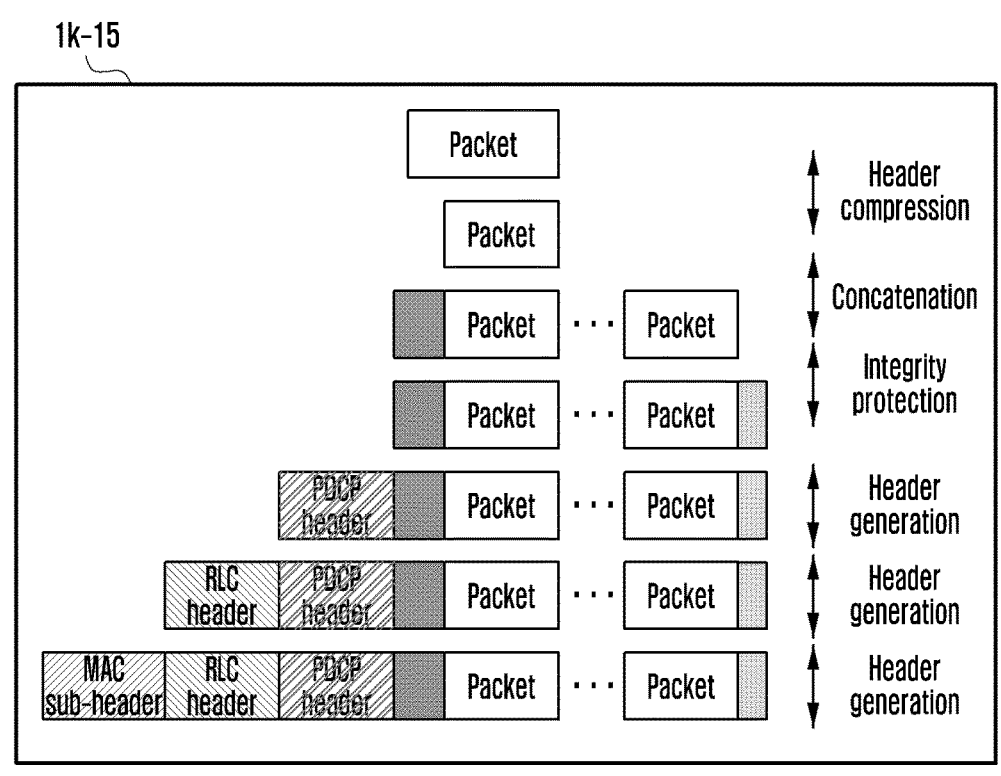
FIG. 11B illustrates a first embodiment of a data concatenation procedure according to an embodiment of the disclosure.
Figure 11B:
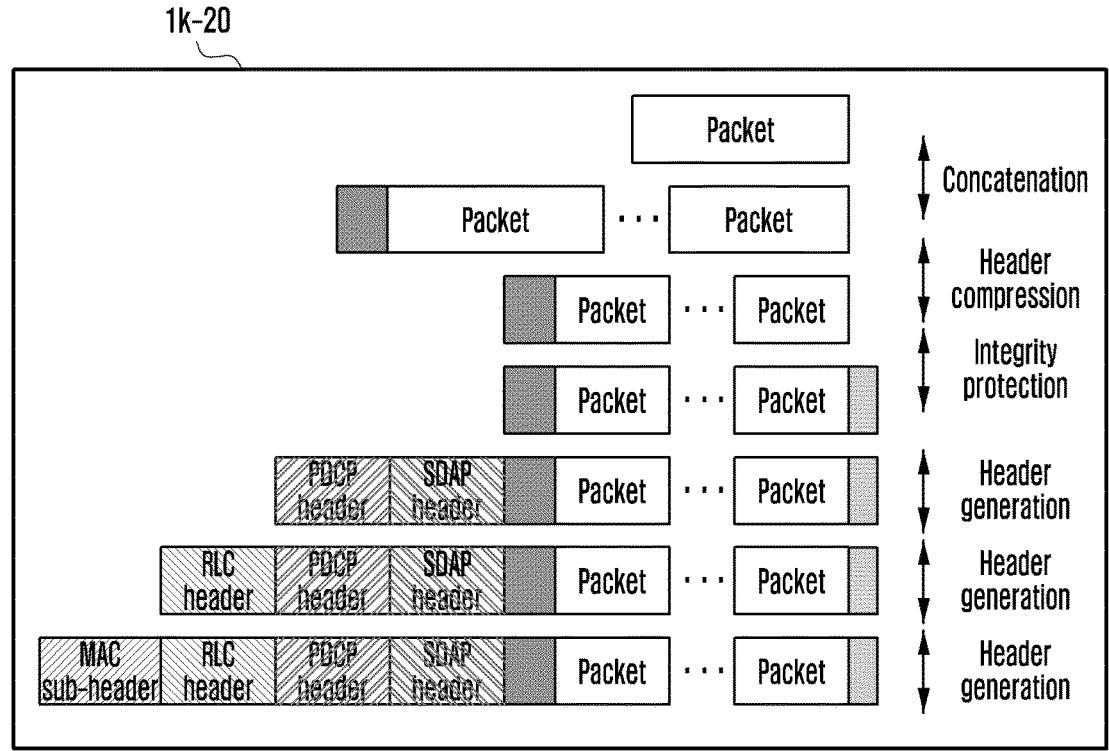
Figure 12A:
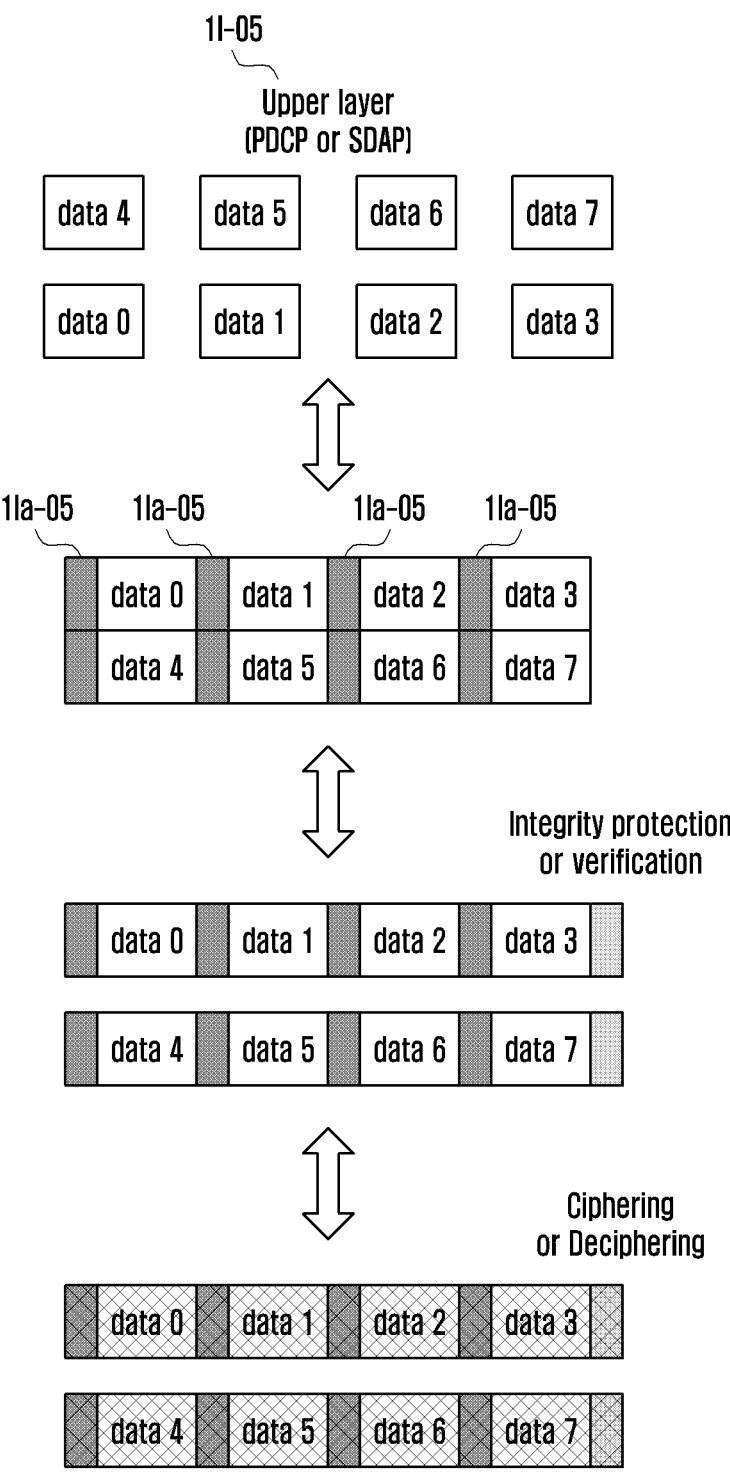
FIG. 12A illustrates a second embodiment of a data concatenation procedure according to an embodiment of the disclosure.
Figure 12B:
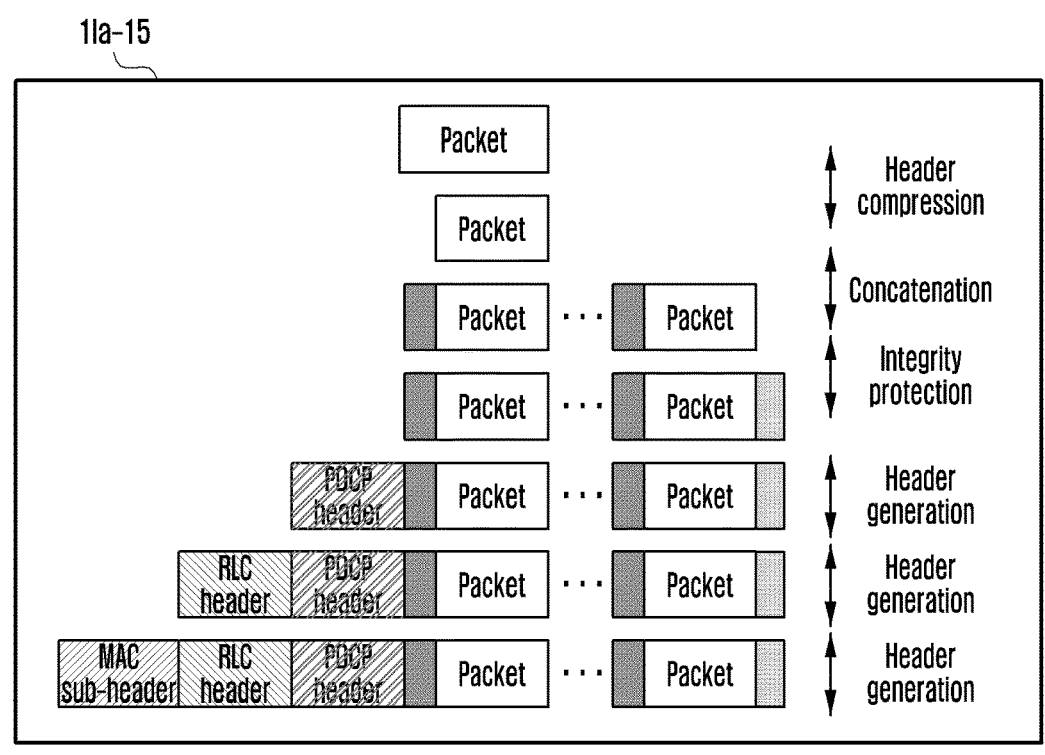
FIG. 12B illustrates a second embodiment of a data concatenation procedure according to an embodiment of the disclosure.
Figure 13:
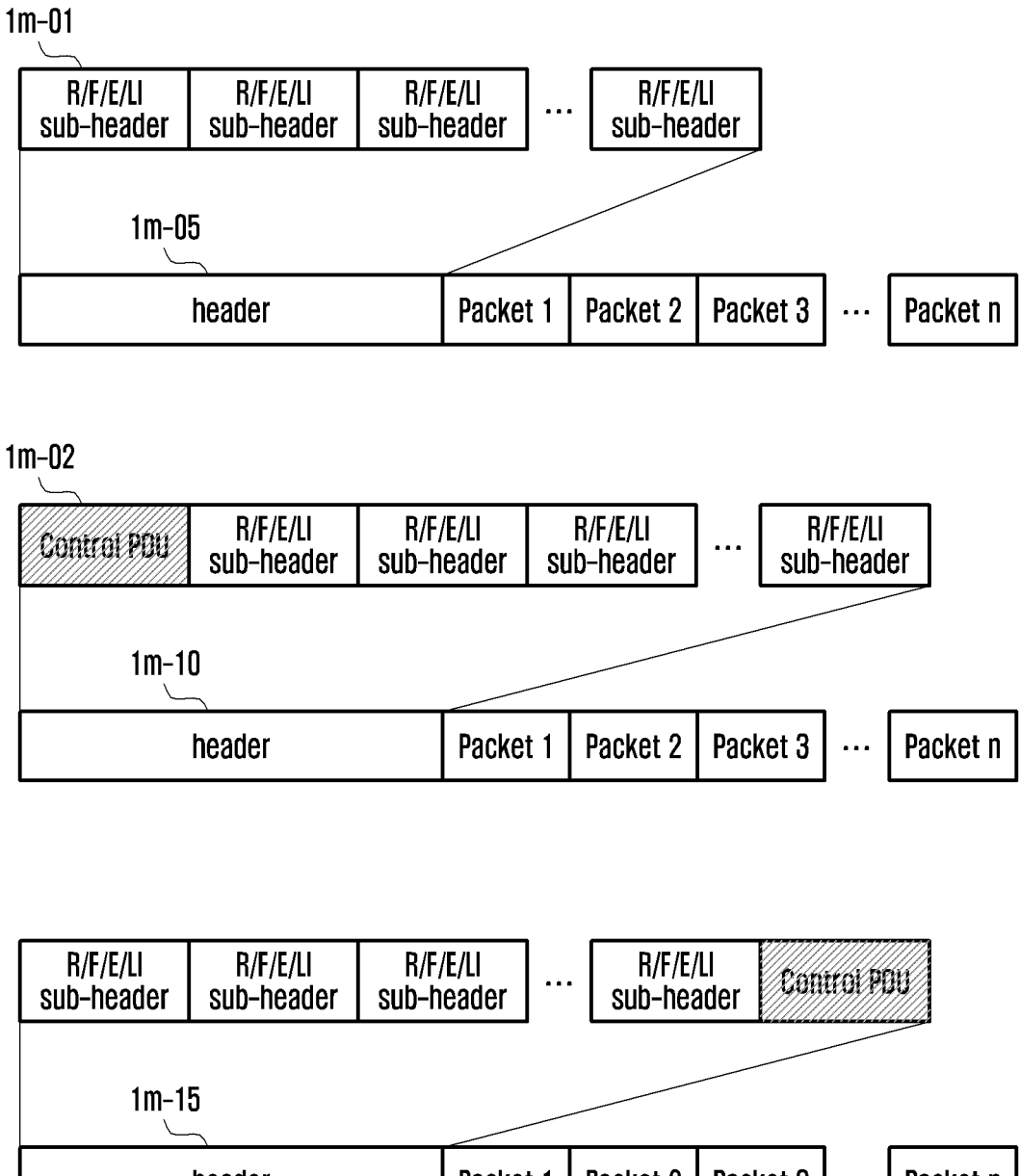
FIG. 13 illustrates a third embodiment of a data concatenation procedure according to an embodiment of the disclosure.

The disclosure proposes a first embodiment of a data concatenation procedure as shown in FIGS. 11A and 11B, a second embodiment of a data concatenation procedure as shown in FIGS. 12A and 12B, or a third embodiment of a data concatenation procedure as shown in FIG. 13.

The first, second, or third embodiments of the upper layer device data concatenation procedure proposed in the disclosure above may have one or multiple functions among the following functions.

The data concatenation procedure proposed in the disclosure may be configured or performed in an SDAP layer device (or new layer device), a PDCP layer device, or a new layer device, and an RRC message (e.g., an RRCReconfiguration message, an RRCSetup message, or an RRCResume message), whether to apply the data concatenation procedure may be configured for each bearer or as an indicator for each downlink or uplink. When the data concatenation procedure is configured in the RRC message, the amount of data to be concatenated or the maximum size of data that can be concatenated may be configured. In another method, the amount of data to be concatenated or the size to be concatenated may be freely determined by the UE implementation or the base station implementation. In another method, a specific type of data (e.g., small size data or data including TCP ACK) to be performed data concatenation in the RRC message, or specific data (or QoS flow) (e.g., QoS flow with a small data size, a QoS flow having a low data rate, or a QoS flow having a high data rate) may be configured.

The UE supporting the data concatenation procedure proposed in the disclosure may report, through a UE capability reporting message, the maximum size that can be concatenated by the data concatenation procedure (e.g., the maximum size of concatenated data or the maximum size to which ciphering procedure (or deciphering procedure) and integrity protection procedure (or integrity verification procedure) can be applied at one time), or whether the data concatenation procedure is supported. In the above, the maximum size that the UE or base station can concatenate by the data concatenation procedure, the maximum size of concatenated data, or the maximum size to which ciphering procedure (or deciphering procedure) and integrity protection procedure (or integrity verification procedure) can be applied at one time may be predetermined or defined and used in the PDCP layer device. For example, the maximum size (e.g., 8192 bytes or 9000 bytes) may be defined in the PDCP layer device-related standard.

New fields (1k-01, 1a-01, 1m-01) are introduced to perform the data concatenation procedure or data de-concatenation procedure proposed in the disclosure. Some of the new fields proposed above may be introduced or defined in the SDAP header or PDCP header, or some of the new fields may be attached or introduced in front of each concatenated data, or some of the new fields may be attached or introduced at the very front of all concatenated data. When performing the data concatenation procedure in the above, a new field may be introduced for each data and used in the data concatenation procedure or data de-concatenation procedure. For example, the new fields are placed in front of each data so that data concatenation, such as the structure of {[new field+data] [new field+data] . . . [new field+ data]}, may occur (reference numerals 1a-05, 1a-15, and 1a-20 in FIGS. 12A and 12B). The above structure facilitates data processing speed because data processing can be performed sequentially and quickly using new fields and the processed data can be directly transferred to the upper layer. In another method, data concatenation, such as [new field] [new field] . . . [new field] [data+data+ . . . +data], may occur. According to the above structure, new fields can be simultaneously processed (reference numerals 1k-05, 1k-10, 1k-15, and 1k-20 in FIGS. 11A and 11B or 1m-05, 1m-10, and 1m-15 in FIG. 13).

In the disclosure, the UE or the base station may apply or perform, based on the new fields, the data concatenation procedure or the data de-concatenation procedure proposed above. The new fields 1k-01, 11a-01, and 1m-01 may include one or multiple fields among the following fields.

C field: may indicate whether a data concatenation function is performed or not, and may indicate that there is data, new fields, or concatenated data immediately thereafter using another method.

E field: may indicate whether there is data, new fields, or concatenated data immediately thereafter.

LI field: may indicate the size of each concatenated data in byte units, or with regard to concatenated data, the size of each data received from or transferred to an upper layer device may be indicated in byte units. For example, the first LI field may indicate the size of the first (or very first) data among concatenated data in byte units, or the second LI field may indicate the size of the second (or the next) data among concatenated data in bytes. For example, an LI field is introduced for each data, and the L1 field may be used in a data concatenation procedure or a data de-concatenation procedure. For example, each of the LI fields is located in front of each data, and thus data may be concatenated in the structure of {[LI field+data] [LI field+data] . . . [LI field+data]}. The above structure facilitates data processing speed because data processing can be performed sequentially and quickly using new fields and the processed data can be directly transferred to an upper layer. As another method, data may be concatenated in the structure of [E field LI field] [E field LI field] . . . [E field LI field] [data+data+ . . . +data]. The above structure has the advantage of enabling simultaneous processing of new fields in the implementation. As another method, the LI field indicating the size of the last data may be omitted. This is because, when n pieces of data are concatenated, if the (n−1)th data is separated by the LI field, the remaining data itself becomes the nth data without even knowing the size of the remaining data. As another method, in the above, the LI field may indicate the size of concatenated data in byte units, and if the header compression procedure is configured, the L1 field may indicate the compressed size of data, the size of data is reduced by application of the header compression procedure, in byte units. As another method, in the above, the LI field may indicate the size of concatenated data in byte units, and if an integrity protection procedure is configured, the L1 field may indicate the size of data before application of the integrity protection procedure and add MAC-I field to the very end of the concatenated data. If the integrity protection procedure is configured at the time of application of the data de-concatenation procedure, a receiving terminal may perform the data de-concatenation procedure by considering that there is a MAC-I field having a predetermined length (e.g., 4 bytes) at the very end thereof. For example, the LI field for the last data may indicate the length of the last data except for the MAC-I field. As another method, in the above, the LI field may indicate the size of concatenated data in byte units, and if a header compression procedure or integrity protection procedure is configured, the L1 field may indicate the size of compressed data to which the header compression procedure is applied before application of the integrity protection procedure, and may add the MAC-I field to the very end of the concatenated data. If the header compression procedure or integrity protection procedure is configured at the time of application of the data de-concatenation procedure, a receiving terminal may perform the data de-concatenation procedure by considering that there is a MAC-I field having a predetermined length (e.g., 4 bytes) at the very end thereof. For example, the LI field for the last data may indicate the length of the last data, to which a header compression procedure is applied, except for the MAC-I field.

F field: is a field indicating the type of length of the LI field introduced or attached for data concatenation or data de-concatenation, and may indicate whether the LI field is a field having a small length (e.g., 6 bytes) or a field having a long length (e.g., 14 bytes). The overhead for the LI field can be reduced by introducing the F field.

SN field: is a field indicating the sequence of pieces of data in concatenated data (e.g., a sequence number).

FIG. 11A illustrates a first embodiment of a data concatenation procedure according to an embodiment of the disclosure.

FIG. 11B illustrates a first embodiment of a data concatenation procedure according to an embodiment of the disclosure.

FIG. 12A illustrates a second embodiment of a data concatenation procedure according to an embodiment of the disclosure.

If integrity protection is configured in the PDCP layer device for convenience of implementation (for example, the same processing can be performed as that for data), the new fields proposed in the disclosure are applied with the integrity protection procedure. Alternatively, when a ciphering procedure is applied to the PDCP layer device, the new fields are applied with the ciphering procedure (indicated by reference numeral 1k-05 of FIG. 11A or reference numeral 1l-05 of FIG. 12A). In another method, in order for a receiving terminal to read new fields before the deciphering procedure, the new fields proposed in the disclosure are applied with an integrity protection procedure when the integrity protection procedure is configured in the PDCP layer device, or when the ciphering procedure is applied to the PDCP layer device, the ciphering procedure may not be applied (indicated by reference numeral 1k-10 of FIG. 11B). That is, if the ciphering procedure is not applied even when the integrity protection procedure is applied, the receiving terminal can read the new fields in advance before the deciphering procedure.

The data concatenation procedure proposed in the disclosure is applied or performed for pieces of data to which the integrity protection procedure or ciphering procedure is not applied or not performed at a transmitting terminal (UE or base station). In another method, the data concatenation procedure proposed in the disclosure is applied or performed for pieces of data before the transmitting terminal (UE or base station) applies or performs the integrity protection procedure or ciphering procedure. For example, if an integrity protection procedure or ciphering procedure is established, the data concatenation procedure may be performed or applied for pieces of data, and then the integrity protection procedure or ciphering procedure may be performed for the concatenated data. This is because the number or frequency of performing the integrity protection procedure or the ciphering procedure can be minimized and the data processing time can be reduced only when the integrity protection procedure or the ciphering procedure is simultaneously applied to the concatenated data. In addition, when applying the integrity protection procedure or ciphering procedure to one concatenated data, obtained by concatenating multiple pieces of data in the above, the integrity protection procedure or ciphering procedure is simultaneously performed on multiple pieces of concatenated data using a single COUNT value, so as to enable single processing using one set of security key values (such as a COUNT value, bearer identifier, or security key) and to shorten the data processing time. For example, if multiple pieces of data are not concatenated in the above, a large amount of data processing time is needed because the integrity protection or ciphering procedure needs to be performed multiple times based on different sets of security key values using a different COUNT value for each data. In addition, when the integrity protection procedure is applied in the above, one MAC-I field can be added after concatenated data, but when the concatenated procedure is not applied, each MAC-I field needs to be added after each data and therefore processing can be complicated and overhead can be increased. Further, when applying or performing the data concatenation procedure to the pieces of data, the data concatenation procedure may be applied in a sequence in which pieces of data are received first from an upper layer device, or the pieces of data can be concatenated, by the concatenation procedure, in a sequence in which the pieces of data are placed in front. This is because, only if data concatenation occurs in order of placement from the front when performing the data concatenation procedure, the receiving terminal may separate the concatenated data and may sequentially transfer the pieces of separated data to the upper layer device. For example, pieces of data concatenated to concatenated data, to which one PDCP serial number is assigned, are arranged in a sequence in which data is received first from an upper layer device. Alternatively, as a method for simply reducing protocol header overhead only (e.g., MAC header, RLC header, or PDCP headers), the data concatenation procedure proposed in the disclosure can be applied or performed for pieces of data for which the integrity protection procedure or ciphering procedure has been applied or performed at the transmitting terminal (UE or base station). For example, the transmitting terminal (transmitting PDCP layer device) may apply the data concatenation procedure proposed in the disclosure to pieces of data appended with a MAC-I field having a predetermined size (e.g., 4 bytes) to which a header compression procedure or ciphering procedure is applied, or an integrity protection procedure is applied. In this case, it may be characterized in that a ciphering procedure or an integrity protection procedure is performed for each data based on a different COUNT value, and pieces of concatenated data can be assigned and applied with different COUNT values (based on the COUNT values configured by PDCP serial numbers included in the PDCP header) in order of placement from the front or in ascending order.

The data de-concatenation procedure proposed in the disclosure is applied or performed for concatenated data for which a deciphering procedure or an integrity verification procedure has been applied or performed at a receiving terminal (UE or base station). In another method, the data de-concatenation procedure proposed in the disclosure is applied or performed for the concatenated data after the receiving terminal (UE or base station) applies or performs the deciphering procedure or integrity verification procedure. For example, if a ciphering procedure or an integrity verification procedure is configured, the deciphering procedure or the integrity verification procedure may be performed on the received concatenated data, and then a data de-concatenation procedure may be performed on the concatenated data. This is because, only when the deciphering procedure or the integrity verification procedure is simultaneously applied to the concatenated data, the number or frequency of performing the deciphering procedure or the integrity verification procedure can be minimized and the data processing time can be reduced. In addition, when the deciphering procedure or integrity protection procedure is applied to one concatenated data, obtained by concatenating multiple pieces of data, the deciphering procedure or integrity protection procedure is performed once for multiple pieces of concatenated data using a single COUNT value, so as to enable single processing using one set of security key values (such as COUNT value, bearer identifier, or security key) and to shorten data processing time. For example, if the data is not concatenated above, a large amount of data processing time is needed because the deciphering procedure or the integrity protection procedure needs to be performed multiple times based on different sets of security key values using a different COUNT value for each data. In addition, when applying or performing the data de-concatenation procedure for the data concatenated above, the data may be sequentially separated from the beginning of the concatenated data, and data processing may be performed in a sequence in which the pieces of data are placed in front and the processed data may be transferred to an upper layer device. For example, pieces of data concatenated to concatenated data to which one PDCP serial number is assigned need to be transferred to an upper layer device in order of placement from the front. As another method, as a method for simply reducing protocol header overhead (e.g., MAC header, RLC header, or PDCP headers), if the data concatenation procedure proposed in the disclosure is applied to pieces of data, to which an integrity protection procedure or a ciphering procedure at the transmitting terminal (UE or base station) is applied or performed, the receiving terminal (receiving PDCP layer device) may separate pieces of data according to the data de-concatenation procedure proposed in the disclosure, and may apply a deciphering procedure, integrity verification procedure, or a header decompression procedure to each data. In this case, it may be characterized in that a deciphering procedure or an integrity verification procedure is performed based on a different COUNT value for each data, and pieces of concatenated data can be assigned and applied with different COUNT values (based on COUNT values configured by PDCP serial numbers included in the PDCP header) in order of placement from the front or in ascending order.

FIG. 12B illustrates a second embodiment of a data concatenation procedure according to an embodiment of the disclosure.

FIG. 13 illustrates a third embodiment of a data concatenation procedure according to an embodiment of the disclosure.

If the data concatenation procedure proposed above is configured or performed in the SDAP layer device (indicated by reference numeral 1*k*-20 of FIG. 11B, reference numeral 1*l*-20 of FIG. 12B, or FIG. 13), the SDAP layer device (or new layer device) does not apply the data concatenation procedure to SDAP control data (SDAP control PDU). This is because the ciphering procedure or deciphering procedure is not applied to the SDAP control data, and when the SDAP control data is concatenated with other data, the implementation complexity can increase when performing the ciphering or deciphering procedure of the concatenated data. In the above, when the SDAP layer device (or new layer device) performs a data concatenation function, a data concatenation procedure may be performed for pieces of data of an upper layer device corresponding to QoS flow IDs (QoS identifiers) mapped to each bearer, and concatenated data may be transferred to the PDCP layer device of the bearer. In another method, when the SDAP layer device (or new layer device) performs the data concatenation function and performs the data concatenation procedure for pieces of data of an upper layer device corresponding to QoS flow IDs (QoS identifiers) mapped to each bearer, specifically, the SDAP layer device may apply the data concatenation procedure to only pieces of data corresponding to the same QoS flow ID (QoS identifier), and may transfer the concatenated data to the PDCP layer device of the bearer. In the above, when an integrity protection procedure is configured, the integrity protection procedure may be applied for SDAP control data, or when a ciphering procedure is configured, the ciphering procedure may not be applied therefor.

If the data concatenation procedure proposed above is configured or performed in the SDAP layer device (or new layer device) (indicated by reference numeral 1*k*-20 of FIG. 11B or 1-20 of FIG. 12B), the data concatenation procedure proposed in the disclosure is applied or performed for pieces of data for which a header compression procedure, an integrity protection procedure, or a ciphering procedure are not applied or not performed at a transmitting terminal (UE or base station). In another method, the data concatenation procedure proposed in the disclosure is applied or performed for pieces of data before a transmitting terminal (UE or base station) applies or performs a header compression procedure, an integrity protection procedure, or a ciphering procedure. Accordingly, the length field (e.g., the LI field) among new fields generated in the data concatenation procedure may configure the length of header uncompressed data as a byte unit value. For example, if a header compression procedure, integrity protection procedure, or ciphering procedure are established, the data concatenation procedure may be performed or applied, and then the header compression procedure, integrity protection procedure, or ciphering procedure may be performed on the concatenated data. This is because the number or frequency of performing the integrity protection procedure or the ciphering procedure can be minimized and the data processing time can be reduced only when the integrity protection procedure or the ciphering procedure is simultaneously applied to the concatenated data. In addition, when the integrity protection procedure or ciphering procedure is applied to one concatenated data, obtained by concatenating multiple pieces of data in the above, the integrity protection procedure or ciphering procedure is performed using a single COUNT value to enable single processing using one set of security key values (such as COUNT value, bearer identifier, or security key) and to shorten data processing time. For example, if pieces of data are not concatenated above, a large amount of data processing time is required because integrity protection or ciphering procedures need to be performed multiple times based on a set of different security key values using a different COUNT value for each data. In addition, when applying or performing the data concatenation procedure to the pieces of data, the data concatenation procedure may be applied in a sequence in which pieces of data are received first from an upper layer device, or can be concatenated, by the concatenation procedure, in a sequence in which the pieces of data are placed in front. This is because, only if data concatenation occurs in order of placement from the front when performing the data concatenation procedure, the receiving terminal may separate the concatenated data and may sequentially transfer the pieces of separated data to the upper layer device. For example, pieces of data concatenated to concatenated data, to which one PDCP serial number is assigned, are arranged in a sequence in which data is received first from an upper layer device.

If the data concatenation procedure proposed above is configured or performed in the SDAP layer device (or new layer device) (indicated by reference numeral 1*k*-20 of FIG. 11B, reference numeral 1-20 of FIG. 12B, or FIG. 13), the data de-concatenation procedure proposed in the disclosure is applied or performed for the concatenated data to which a deciphering procedure, integrity verification procedure, or header decompression procedure have been applied or performed at a receiving terminal (UE or base station). As another method, the data de-concatenation procedure proposed in the disclosure is applied or performed for the concatenated data after the receiving terminal (UE or base station) applies or performs the deciphering procedure, the integrity verification procedure, or the header decompression procedure. For example, if the header compression procedure, ciphering procedure, or integrity verification procedure are configured, the received concatenated data is deciphered, or the integrity verification procedure or header decompression procedure for the received concatenated data is performed, and then the data de-concatenation procedure is performed on the concatenated data. This is because the number or frequency of performing the deciphering procedure or the integrity verification procedure can be minimized and the data processing time can be reduced only when the deciphering procedure or the integrity verification procedure is simultaneously applied to the concatenated data. In addition, when a deciphering procedure or integrity protection procedure is applied to one concatenated data, obtained by concatenating multiple pieces of data in the above, a deciphering procedure or integrity protection procedure is performed using a single COUNT value to enable single processing using one set of security key values (such as COUNT value, bearer identifier, or security key) and to shorten data processing time. For example, if pieces of data are not concatenated above, a large amount of data processing time is required because integrity protection or ciphering procedures need to be performed multiple times based on a set of different security key values using a different COUNT value for each data. In addition, when applying or performing the data de-concatenation procedure to the concatenated data, pieces of data may be sequentially separated from the beginning of the concatenated data, and data processing may be performed in a sequence in which the pieces of data are placed in front and the processed data may be transferred to an upper layer device. For example, pieces of data concatenated to concatenated data, to which one PDCP serial number is assigned, need to be transferred to an upper layer device in order of placement from the front.

If the data concatenation procedure proposed above is configured or performed in the SDAP layer device (or new layer device) (indicated by reference numeral 1$k$-20 of FIG. 11B, reference numeral 1-20 of FIG. 12B, or FIG. 13), the data processing load and implementation complexity can be increased due to a header compression procedure. Therefore, in the above, if the data concatenation procedure or de-concatenation procedure is configured for a random bearer, or if a header compression procedure (e.g., robust header compression (ROHC) and Ethernet header compression (EHC)) or a data compression procedure (uplink data compression (UDC)) are configured to be used or added, with regard to a bearer or upper layer device for which the data concatenation procedure is configured, it may adversely affect the data processing speed. This is because the transmitting terminal needs to perform a header compression procedure for each data or the receiving terminal needs to perform a header decompression procedure for each data. Therefore, with regard to each bearer or upper layer device (PDCP layer device, SDAP layer device, or new layer device), the data concatenation procedure, header compression procedure (e.g., robust header compression (ROHC) and Ethernet header compression (EHC)), or data compression procedure (uplink data compression (UDC)) may be limited not to be established together. For example, if the data concatenation procedure is configured, there may be limitation such that the header compression procedure (e.g., robust header compression (ROHC) and Ethernet header compression (EHC)), or data compression procedure (uplink data compression (UDC)) may not be established. As another method, if the header compression procedure (e.g., robust header compression (ROHC) and Ethernet header compression (EHC)), or data compression procedure (uplink data compression (UDC)) is established, it is possible to limit the data concatenation procedure not to be established. In another method, the ciphering procedure or the integrity protection procedure may not be established in order to further accelerate the data rate in the above.

If the header compression procedure or data compression procedure is not configured in order to accelerate data processing in the above, or if the data concatenation procedure proposed above is configured or performed in the SDAP layer device (or new layer device), the data concatenation procedure proposed in the disclosure applies or perform a data concatenation procedure to pieces of data to which an integrity protection procedure or a ciphering procedure is not applied or not performed at a transmitting terminal (UE or base station). In another method, the data concatenation procedure proposed in the disclosure applies or performs the data concatenation procedure for pieces of data before the transmitting terminal (UE or base station) applies or performs the integrity protection procedure or ciphering procedure. Therefore, among new fields generated in the data concatenation procedure, the length field (e.g., the LI field) may configure the length of data as a byte unit value. For example, if an integrity protection procedure or ciphering procedure is established, the data concatenation procedure may be performed or applied for pieces of data, and then the integrity protection procedure or ciphering procedure may be performed for the concatenated data. This is because the number or frequency of performing the integrity protection procedure or the ciphering procedure can be minimized and the data processing time can be reduced only when the integrity protection procedure or the ciphering procedure is simultaneously applied to the concatenated data. In addition, when the integrity protection procedure or ciphering procedure is applied to one concatenated data, obtained by concatenating multiple pieces of data in the above, the integrity protection procedure or ciphering procedure is performed using a single COUNT value to enable single processing using one set of security key values (COUNT value, bearer identifier, or security key) and to shorten data processing time. For example, if multiple pieces of data are not concatenated in the above, a large amount of data processing time is needed because the integrity protection or ciphering procedure needs to be performed multiple times based on different sets of security key values using a different COUNT value for each data. In addition, when applying or performing the data concatenation procedure to the pieces of data, the data concatenation procedure may be applied in a sequence in which pieces of data are received first from an upper layer device, or the pieces of data can be concatenated, by the concatenation procedure, in a sequence in which the pieces of data are placed in front. This is because, only if data concat-
enation occurs in order of placement from the front
when performing the data concatenation procedure, the
receiving terminal may separate the concatenated data
and may sequentially transfer the pieces of separated
data to the upper layer device. For example, pieces of
data concatenated to concatenated data, to which one
PDCP serial number is assigned, are arranged in a
sequence in which data is received first from an upper
layer device.

If a header compression procedure or data compression
procedure is not configured in order to accelerate data
processing in the above, or if the data concatenation
procedure proposed above is configured or performed
in the SDAP layer device (or new layer device), the
data de-concatenation procedure proposed in the dis-
closure is applied or performed for the concatenated
data for which a deciphering procedure or an integrity
verification procedure has been applied or performed at
the receiving terminal (UE or base station). In another
method, the data de-concatenation procedure proposed
in the disclosure is applied or performed for the con-
catenated data after the receiving terminal (UE or base
station) applies or performs the deciphering procedure
or integrity verification procedure. For example, if a
ciphering procedure or an integrity verification proce-
dure is configured, a deciphering procedure or integrity
verification procedure may be performed on the
received concatenated data, and then a data de-concat-
enation procedure may be performed on the concat-
enated data. This is because the number or frequency of
performing the integrity protection procedure or the
deciphering procedure can be minimized and the data
processing time can be reduced only when the integrity
protection procedure or the deciphering procedure is
simultaneously applied to the concatenated data. In
addition, when the integrity protection procedure or
deciphering procedure is applied to one concatenated
data, obtained by concatenating multiple pieces of data
in the above, the integrity protection procedure or
deciphering procedure is performed using a single
COUNT value to enable single processing using one set
of security key values (COUNT value, bearer identifier,
or security key) and to shorten data processing time.
For example, if multiple pieces of data are not concat-
enated in the above, a large amount of data processing
time is needed because the integrity protection or
deciphering procedure needs to be performed multiple
times based on different sets of security key values
using a different COUNT value for each data. In
addition, when applying or performing the data de-
concatenation procedure to the concatenated data,
pieces of data may be sequentially separated from the
beginning of the concatenated data, and data processing
may be performed in a sequence in which the pieces of
data are placed in front and the processed data may be
transferred to an upper layer device. For example,
pieces of data concatenated to concatenated data, to
which one PDCP serial number is assigned, need to be
transferred to an upper layer device in order of place-
ment from the front.

If the data concatenation procedure proposed above is
configured (indicated by reference numeral 1*k*-15 of
FIG. 11B, reference numeral 1*l*-15, or FIG. 13) or
performed in the PDCP layer device, the PDCP layer
device does not apply the data concatenation procedure
to SDAP control data (SDAP control PDU) or PDCP control data (PDCP control PDU). This is because a
ciphering procedure or a deciphering procedure is not
applied to the SDAP control data, concatenating the
SDAP control data with other data can increase the
implementation complexity when performing cipher-
ing or deciphering of the concatenated data. In addition,
since a ciphering procedure, a deciphering procedure,
an integrity protection procedure, or an integrity veri-
fication procedure are not applied to the PDCP control
data, if the PDCP control data is concatenated with
other data, it may increase the implementation com-
plexity when performing a procedure of ciphering or
deciphering the concatenated data, the integrity protec-
tion procedure, or the integrity verification procedure.
In the above, when an integrity protection procedure is
configured for the SDAP control data, the integrity
protection procedure may be applied, or when a cipher-
ing procedure is configured therefor, the ciphering
procedure may not be applied. However, when the
integrity protection procedure is configured in the
above, the integrity protection procedure may not be
applied to the PDCP control data, or the ciphering
procedure may not be applied thereto when the cipher-
ing procedure is configured. As another method, when
the integrity protection procedure is configured for the
SDAP control data, the integrity protection procedure
may not be applied, or when the ciphering procedure is
configured therefor, the ciphering procedure may not be
applied. In another method, as a method for simply
reducing only protocol header overhead (e.g., MAC
header, RLC header, or PDCP headers), the data con-
catenation procedure proposed in the disclosure may be
applied or performed for pieces of data for which an
integrity protection procedure or a ciphering procedure
is applied or performed at a transmitting terminal (UE
or base station). For example, a transmitting terminal
(transmitting PDCP layer device) may apply the data
concatenation procedure, proposed in the disclosure, to
pieces of data appended with a MAC-I field having a
predetermined size (e.g., 4 bytes) to which a header
compression procedure or ciphering procedure is
applied or an integrity protection procedure is applied.
In this case, it may be characterized in that a ciphering
procedure or an integrity protection procedure is per-
formed based on a different COUNT value for each
data, and pieces of concatenated data can be assigned
and applied with different COUNT values (based on
COUNT values configured by PDCP serial numbers
included in the PDCP header) in order of placement
from the front or in ascending order.

If the data concatenation procedure proposed above is
configured or performed in the PDCP layer device
(indicated by reference numeral 1*k*-15 of FIG. 11B,
reference numeral 1*l*-15 of FIG. 12B, or FIG. 13), the
data processing load and implementation complexity
can be increased due to the header compression pro-
cedure. Therefore, in the above, if a data concatenation
procedure or de-concatenation procedure is configured
for a random bearer, or if a header compression pro-
cedure (e.g., robust header compression (ROHC) and
Ethernet header compression (EHC)) or a data com-
pression procedure (uplink data compression (UDC))
are configured to be used or added, with regard to a
bearer or upper layer device for which the data con-
catenation procedure is configured, it may adversely
affect the data processing speed. This is because the
transmitting terminal needs to perform a header compression procedure for each data or the receiving terminal needs to perform a header decompression procedure for each data. Therefore, with regard to each bearer or upper layer device (PDCP layer device, SDAP layer device, or new layer device), the data concatenation procedure, header compression procedure (e.g., robust header compression (ROHC) and Ethernet header compression (EHC)), or data compression procedure (uplink data compression (UDC)) may be limited not to be established together. For example, if the data concatenation procedure is configured, there may be limitation such that the header compression procedure (e.g., robust header compression (ROHC) and Ethernet header compression (EHC)), or data compression procedure (uplink data compression (UDC)) may not be established. As another method, if the header compression procedure (e.g., robust header compression (ROHC) and Ethernet header compression (EHC)), or data compression procedure (uplink data compression (UDC)) is established, it is possible to limit the data concatenation procedure not to be established. In another method, the ciphering procedure or the integrity protection procedure may not be established in order to further accelerate the data rate in the above.

If the data concatenation procedure proposed above is configured or performed in the PDCP layer device (indicated by reference numeral 1*k*-15 of FIG. 11B, reference numeral 1*l*-15 of FIG. 12B, or FIG. 13), the data concatenation procedure proposed in the disclosure is applied or performed for pieces of data for which the header compression procedure is applied or performed at a transmitting terminal (UE or base station) but the integrity protection procedure or ciphering procedure is not applied or not performed. In another method, the data concatenation procedure proposed in the disclosure is applied or performed for pieces of data, to which the header compression procedure is applied, before the transmitting terminal (UE or base station) applies or performs the integrity protection procedure or ciphering procedure although the header compression procedure is applied or performed. Therefore, the length field (e.g., LI field), among new fields generated in the data concatenation procedure, may configure the length of data to which the header compression procedure is applied as a byte unit value. For example, if a header compression procedure, an integrity protection procedure, or a ciphering procedure are established, the header compression procedure may be applied or performed for each data, the data concatenation procedure may be performed or applied for pieces of data, and then the integrity protection procedure or ciphering procedure may be performed for the concatenated data. This is because the number or frequency of performing the integrity protection procedure or the ciphering procedure can be minimized and the data processing time can be reduced only when the integrity protection procedure or the ciphering procedure is simultaneously applied to the concatenated data. On the other hand, since applying or performing the header compression procedure to each data of concatenated data results in high complexity of implementation, it is convenient to perform data concatenation after performing the header compression procedure in advance, and the length field indicating the length of each concatenated data can be reduced to thereby reduce overhead. In addition, when applying the integrity protection procedure or ciphering procedure to one concatenated data, obtained by concatenating multiple pieces of data in the above, the integrity protection procedure or ciphering procedure is performed on the concatenated data using a single COUNT value, so as to enable single processing using one set of security key values (such as a COUNT value, bearer identifier, or security key) and to shorten the data processing time. For example, if pieces of data are not concatenated in the above, a large amount of data processing time is needed because the integrity protection or ciphering procedure needs to be performed multiple times based on different sets of security key values using a different COUNT value for each data. Further, when applying or performing the data concatenation procedure to the pieces of data, the data concatenation procedure may be applied in a sequence in which pieces of data are received first from an upper layer device, or the pieces of data can be concatenated, by the concatenation procedure, in a sequence in which the pieces of data are placed in front. This is because, only if data concatenation occurs in order of placement from the front when performing the data concatenation procedure, the receiving terminal may separate the concatenated data and may sequentially transfer the pieces of separated data to the upper layer device. For example, pieces of data concatenated to concatenated data, to which one PDCP serial number is assigned, are arranged in a sequence in which data is received first from an upper layer device.

If the data concatenation procedure proposed above is configured or performed in the PDCP layer device (indicated by reference numeral 1*k*-15 of FIG. 11B, reference numeral 1*l*-15 of FIG. 12B, or FIG. 13), the data de-concatenation procedure proposed in the disclosure is applied or performed with regard to concatenated data to which a deciphering procedure or an integrity verification procedure has been applied or performed at a receiving terminal (UE or base station), and a header decompression procedure may be applied to the each of pieces of de-concatenated data. In another method, the data de-concatenation procedure proposed in the disclosure is applied or performed for the concatenated data after the receiving terminal (UE or base station) applies or performs the deciphering procedure or integrity verification procedure, and the header decompression procedure may be applied to the each of pieces of de-concatenated data. For example, if the header compression procedure, ciphering procedure, or integrity verification procedure are configured, the deciphering procedure or the integrity verification procedure may be performed on the received concatenated data, and then a data de-concatenation procedure may be performed on the concatenated data, and the header decompression procedure may be applied to the each of pieces of de-concatenated data. This is because, only when the deciphering procedure or the integrity verification procedure is simultaneously applied to the concatenated data, the number or frequency of performing the deciphering procedure or the integrity verification procedure can be minimized and the data processing time can be reduced. On the other hand, since applying or performing the header compression procedure to each data of concatenated data results in high complexity of implementation, it is easy for implementation to perform each of the header decompression procedures later after performing data de-concatenation, and the length field indicating the length of each concatenated data can be reduced to thereby reduce overhead. In addition, when applying the deciphering procedure or integrity protection procedure to one concatenated data, obtained by concatenating multiple pieces of data in the above, the deciphering procedure or integrity protection procedure is performed on the concatenated data using a single COUNT value, so as to enable single processing using one set of security key values (such as a COUNT value, bearer identifier, or security key) and to shorten the data processing time. For example, if pieces of data are not concatenated in the above, a large amount of data processing time is needed because the deciphering procedure or integrity protection procedure needs to be performed multiple times based on different sets of security key values using a different COUNT value for each data. Further, when applying or performing the data de-concatenation procedure to the concatenated data, pieces of data may be sequentially separated from the beginning of the concatenated data, and data processing may be performed in a sequence in which the pieces of data are placed in front and the processed data may be transferred to an upper layer device. For example, pieces of data concatenated to concatenated data, to which one PDCP serial number is assigned, need to be transferred to an upper layer device in order of placement from the front.

If the header compression procedure or data compression procedure is not configured in order to accelerate data processing in the above, or if the data concatenation procedure proposed above is configured or performed in the PDCP layer device, the data concatenation procedure proposed in the disclosure is applied or performed for pieces of data to which an integrity protection procedure or a ciphering procedure is not applied or not performed at the transmitting terminal (UE or base station). In another method, the data concatenation procedure proposed in the disclosure is applied or performed for pieces of data before the transmitting terminal (UE or base station) applies or performs the integrity protection procedure or ciphering procedure. Therefore, among the new fields generated in the data concatenation procedure, the length field (e.g., LI field) may configure the length of data to which the header compression procedure is applied as a byte unit value. For example, if an integrity protection procedure or ciphering procedure has been established, the data concatenation procedure may be performed or applied to multiple pieces of data, and then the integrity protection procedure or ciphering procedure may be performed on the concatenated data. This is because the number or frequency of performing the integrity protection procedure or the ciphering procedure can be minimized and the data processing time can be reduced only when the integrity protection procedure or the ciphering procedure is simultaneously applied to the concatenated data. In addition, when the integrity protection procedure or ciphering procedure is applied to one concatenated data, obtained by concatenating multiple pieces of data in the above, the integrity protection procedure or ciphering procedure is performed using a single COUNT value to enable single processing using one set of security key values (COUNT value, bearer identifier, or security key) and to shorten data processing time. For example, if multiple pieces of data are not concatenated in the above, a large amount of data processing time is needed because the integrity protection or ciphering procedure needs to be performed multiple times based on different sets of security key values using a different COUNT value for each data. In addition, when applying or performing the data concatenation procedure to the pieces of data, the data concatenation procedure may be applied in a sequence in which pieces of data are received first from an upper layer device, or the pieces of data can be concatenated, by the concatenation procedure, in a sequence in which the pieces of data are placed in front. This is because, only if data concatenation occurs in order of placement from the front when performing the data concatenation procedure, the receiving terminal may separate the concatenated data and may sequentially transfer the pieces of separated data to the upper layer device. For example, pieces of data concatenated to concatenated data, to which one PDCP serial number is assigned, are arranged in a sequence in which data is received first from an upper layer device.

If the header compression procedure or data compression procedure is not configured in order to accelerate data processing in the above, or if the data concatenation procedure proposed above is configured or performed in the PDCP layer device, the data de-concatenation procedure proposed in the disclosure is applied or performed for concatenated data for which a deciphering procedure or integrity protection procedure is applied or performed at a receiving terminal (UE or base station). In another method, the data de-concatenation procedure proposed in the disclosure is applied or performed for concatenated data after the receiving terminal (UE or base station) applies or performs the deciphering procedure or integrity protection procedure. For example, if a ciphering procedure or integrity protection procedure has been established, the deciphering procedure or integrity protection procedure may be performed for the received concatenated data, and then the data de-concatenation procedure may be performed on the concatenated data. This is because the number or frequency of performing the deciphering procedure or integrity protection procedure can be minimized and the data processing time can be reduced only when the deciphering procedure or integrity protection procedure is simultaneously applied to the concatenated data. In addition, when the deciphering procedure or integrity protection procedure is applied to one concatenated data, obtained by concatenating multiple pieces of data in the above, the deciphering procedure or integrity protection procedure is performed using a single COUNT value to enable single processing using one set of security key values (COUNT value, bearer identifier, or security key) and to shorten data processing time. For example, if multiple pieces of data are not concatenated in the above, a large amount of data processing time is needed because the deciphering procedure or integrity protection procedure needs to be performed multiple times based on different sets of security key values using a different COUNT value for each data. In addition, when applying or performing the data de-concatenation procedure to the concatenated data, pieces of data may be sequentially separated from the beginning of the concatenated data, and data processing may be performed in a sequence in which the pieces of data are placed in front and the processed data may be transferred to an upper layer device. For example, pieces of data concatenated to concatenated data, to which one PDCP serial number is assigned, need to be transferred to an upper layer device in order of placement from the front. Alternatively, as a method for simply reducing protocol header overhead only (e.g., MAC header, RLC header, or PDCP headers), if the data concatenation procedure proposed in the disclosure is applied for pieces of data for which the integrity protection procedure or ciphering procedure has been applied or performed at the transmitting terminal (UE or base station), the receiving terminal (receiving PDCP layer device) may separate pieces of data according to a data de-concatenation procedure proposed in the disclosure, and may apply a deciphering procedure, an integrity protection procedure, or a header decompression procedure to each data. In this case, it may be characterized in that a deciphering procedure or an integrity protection procedure is performed for each data based on a different COUNT value, and pieces of concatenated data can be assigned and applied with different COUNT values (based on the COUNT values configured by PDCP serial numbers included in the PDCP header) in order of placement from the front or in ascending order.

In the above, the data concatenation procedure or de-concatenation procedure may be established for a random bearer or upper layer device. If the data concatenation procedure is not configured for a transmitting PDCP layer, the transmitting PDCP layer device may allocate one PDCP serial number to one data (e.g., PDCP SDU or PDCP PDU) received from an upper layer device, may increment a variable for serial number assignment by 1 after allocation of one PDCP serial number (for example, a value obtained by modulating a variable value in which a COUNT value is stored by the total size of the PDCP serial number, or a transmission variable (COUNT value) modulo $2^\wedge$(length of the PDCP serial number for uplink)), and then assign a serial number, which is incremented by 1 using the variable, for the next data. However, if the data concatenation procedure is configured in the above, in a case of applying the data concatenation procedure to pieces of data received from the upper layer device, the transmitting PDCP layer device may assign one PDCP serial number to multiple pieces of concatenated data, may assign one PDCP serial number and increment the variable for serial number assignment by 1, and may assign a serial number, which is incremented by 1 using the variable, for the next data (concatenated data or non-concatenated data). In the above, in a case in which the data concatenation procedure is not applied to data received from an upper layer device, one PDCP serial number may be assigned to one non-concatenated data, the variable for serial number assignment is incremented by 1 after assigning one PDCP serial number, and a serial number, which is incremented by 1 using the variable, may be assigned for the next data (concatenated data or non-concatenated data). In the above, if the data concatenation procedure is performed in the SDAP layer device (or new layer device), PDCP data processing (e.g., header compression procedure, integrity protection procedure, or ciphering procedure) is performed for one PDCP SDU (or SDAP data PDU), obtained by concatenating multiple SDAP SDUs, a PDCP header is generated, and one PDCP serial number with regard to the PDCP data PDU may be generated and assigned. If the data concatenation procedure is performed in the PDCP layer device in the above, PDCP data processing (e.g., integrity protection procedure or ciphering procedure) is performed for one concatenated PDCP SDU obtained by concatenating multiple SDAP SDUs (e.g., compressed PDCP SDU to which a header compression procedure is applied when the header compression procedure is configured), a PDCP header is generated, and one PDCP serial number with regard to the PDCP data PDU may be generated and assigned.

In the above, if the data concatenation procedure or de-concatenation procedure is configured for a random bearer, or if an SDAP header or a header compression procedure (e.g., robust header compression (ROHC) and Ethernet header compression (EHC)) or a data compression procedure (uplink data compression (UDC)) are configured to be used or added, with regard to a bearer or upper layer device for which the data concatenation procedure is configured, it may adversely affect the data processing speed. This is because the transmitting terminal needs to add the SDAP header to each data or perform a header compression procedure for each data or the receiving terminal needs to remove the SDAP header for each data or perform a header decompression procedure for each data. Therefore, with regard to each bearer or upper layer device (PDCP layer device, SDAP layer device, or new layer device), the data concatenation procedure, SDAP header or header compression procedure, or data compression procedure may be limited not to be established together. For example, if the data concatenation procedure is configured, there may be limitation such that the SDAP header or header compression procedure, or data compression procedure may not be established. As another method, if the SDAP header or header compression procedure, or data compression procedure is established, it is possible to limit the data concatenation procedure not to be established.

The data concatenation procedure proposed in the disclosure may be activated or deactivated, or stopped or resumed according to an indication of an RRC message, MAC control information, or PDCCH.

Figure 14A:
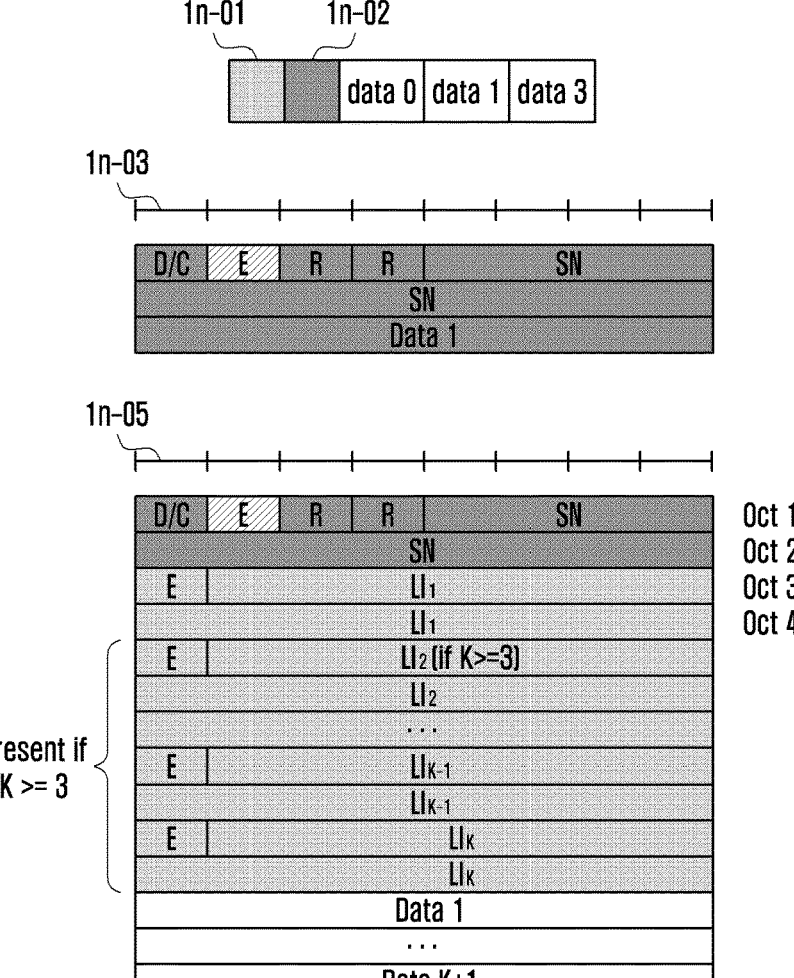
FIG. 14A illustrates a header structure or a new field structure of an upper layer device suitable for the first embodiment or the third embodiment of a data concatenation procedure proposed in according to an embodiment of the disclosure.
Figure 14A:
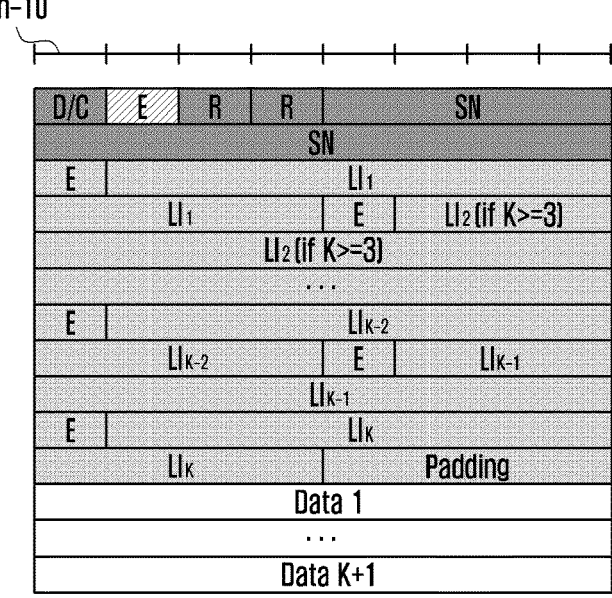

FIG. 14A illustrates the header structure or the new field structure of an upper layer device suitable for the first embodiment (FIG. 11A and FIG. 11B) or the third embodiment (FIG. 13) of the data concatenation procedure proposed in according to an embodiment of the disclosure.

Figure 14B:
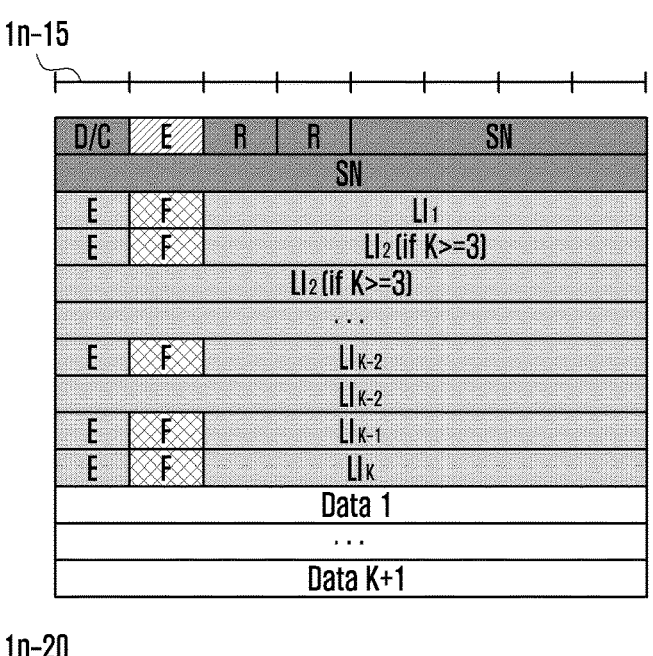
FIG. 14B illustrates a header structure or a new field structure of an upper layer device suitable for the first embodiment or the third embodiment of a data concatenation procedure proposed in according to an embodiment of the disclosure.
Figure 14B:
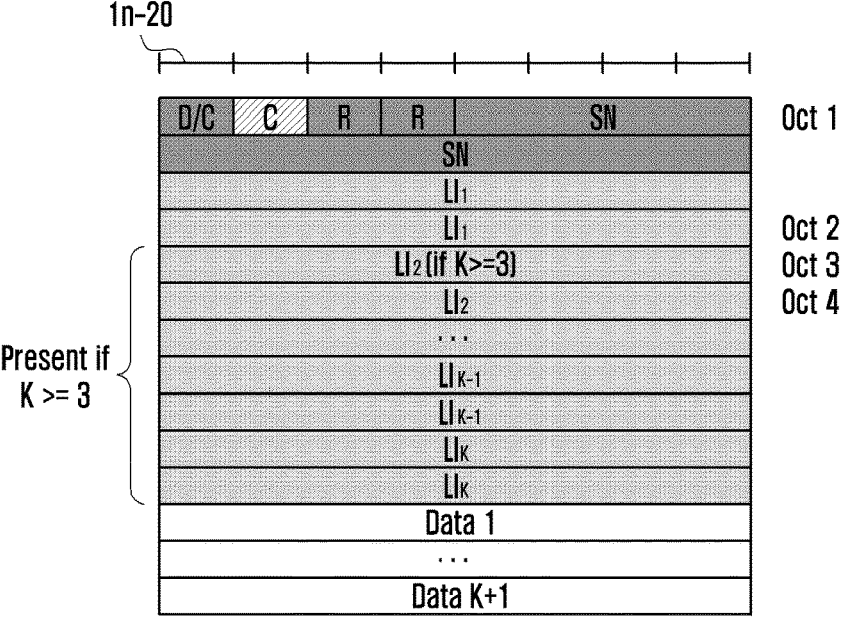
Figure 14B:
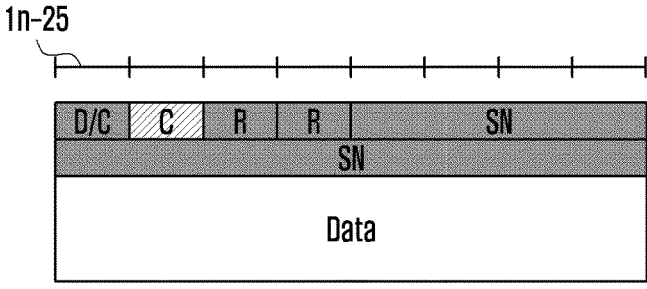

FIG. 14B illustrates the header structure or the new field structure of an upper layer device suitable for the first embodiment (FIG. 11A and FIG. 11B) or the third embodiment (FIG. 13) of the data concatenation procedure proposed in according to an embodiment of the disclosure.

Figure 14C:
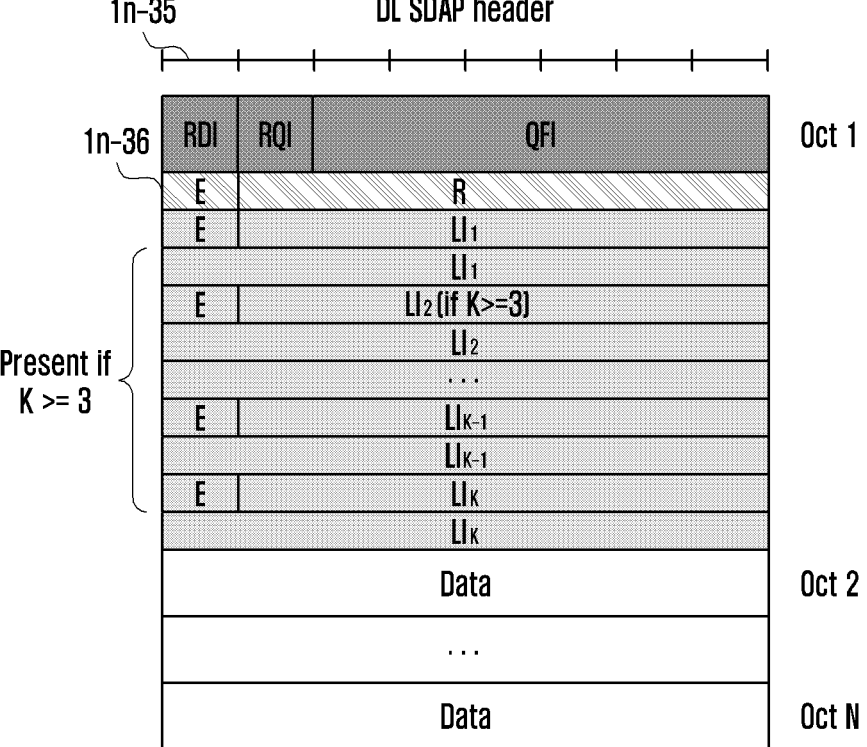
FIG. 14C illustrates a header structure or a new field structure of an upper layer device suitable for the first embodiment or the third embodiment of a data concatenation procedure proposed in according to an embodiment of the disclosure.

FIG. 14C illustrates the header structure or the new field structure of an upper layer device suitable for the first embodiment (FIG. 11A and FIG. 11B) or the third embodiment (FIG. 13) of the data concatenation procedure proposed in according to an embodiment of the disclosure.

Figure 14D:
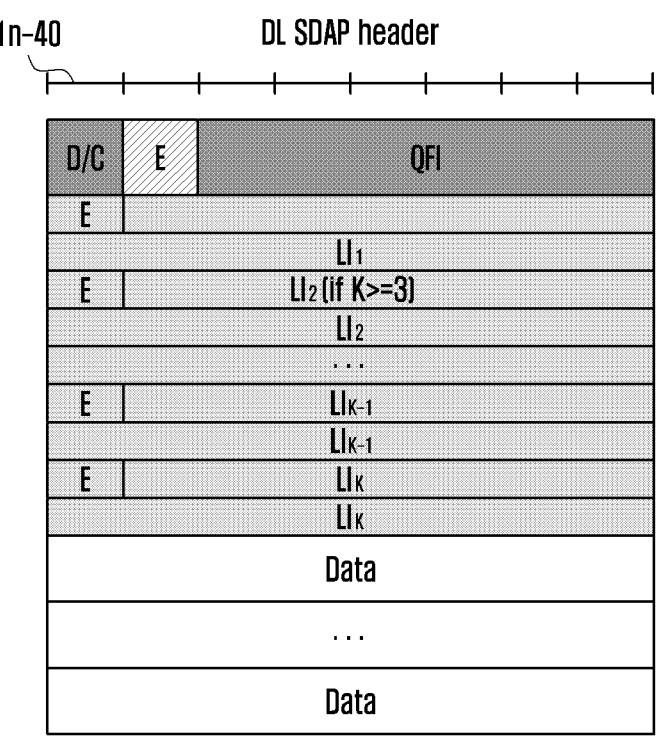
FIG. 14D illustrates a header structure or a new field structure of an upper layer device suitable for the first embodiment or the third embodiment of a data concatenation procedure proposed in according to an embodiment of the disclosure.

FIG. 14D illustrates the header structure or the new field structure of an upper layer device suitable for the first embodiment (FIG. 11A and FIG. 11B) or the third embodiment (FIG. 13) of the data concatenation procedure proposed in according to an embodiment of the disclosure.

Referring to FIG. 14A, a new field (e.g., C field or E field) is defined in the header (e.g., PDCP header or SDAP header) 1n-01 of the upper layer device, and whether a new field (1n-02) exists thereafter, whether the concatenation procedure is applied thereto, or whether a data field exists immediately thereafter, etc. may be indicated.

Therefore, when the data concatenation procedure is not applied to the data transmitted from the upper layer device (for example, the PDCP layer device or the SDAP layer device (or a new layer device)), data may be configured in a structure 1n-03 such that data concatenation to a new field (e.g., for example, field E) does not occur, that no more new fields exist, or that data exists immediately thereafter.

In the above, when the data concatenation procedure is applied to data in the transmitting PDCP layer device, a new field (e.g., C field or E field) may be defined in the header (e.g., PDCP header or SDAP header) of the upper layer device as the structure 1n-05, whether a new field exists thereafter, whether a concatenation procedure is applied thereto, or whether a data field exists immediately thereafter, etc. may be indicated. In addition, new fields (e.g., E field or LI field) are defined and configured as many as the number of concatenated data, the new fields may be attached in front of concatenated data, and data may be concatenated and positioned after the new fields. In the header structure 1n-05, new fields 1n-02 may define the size of each field according to the size of the byte unit, and perform byte alignment therefor. As another method, if byte alignment is not defined in the size of new fields as in the structure 1n-10 and the size of the configured new fields is not in byte units, padding is added at the end thereof and thus new fields 1n-02 may be configured to match the bytes. As another method, referring to FIG. 14B, a new field (e.g., F field) may be introduced as the structure 1n-15, so that the length field may be dynamically indicated in the first size or the second size and overhead can be reduced. Even in the structure 1n-15, byte alignment may be performed by defining the sizes of new fields as in the structure 1n-05. As another method, even in the structure 1n-15, byte alignment may be performed by adding padding as in the structure 1n-10. As another method, the last E field or LI fields in the header structure (1n-05, 1n-10, or 1n-15) may be omitted. For example, if n pieces of data are concatenated, only (n−1) new fields can be added. This is because, if two pieces of data of the n-th data and the (n+1)-th data are separated as the length field for the n-th data, the length of the last data need not be known.

As another method, when the data concatenation procedure is applied to data in the transmitting PDCP layer device, anew field (for example, C field or E field) may be defined in the header (for example, PDCP header or SDAP header), and whether a new field exists thereafter, whether a concatenation procedure is applied thereto, or whether a data field exists immediately thereafter may be indicated. In addition, new fields (e.g., LI fields) may be defined and configured as many as the amount of data to be concatenated, and the new fields may be attached to the front of pieces of data, and the pieces of data may be concatenated and positioned thereafter. In the header structure 1n-20, the new fields 1n-02 may define the size of each field according to the size of the byte unit, so that byte alignment can be performed. The structure such as 1n-20 is a structure useful when it is configured or determined that how many data is to be concatenated. As another method, as in the structure of 1n-25, when the configured number of concatenations cannot be satisfied, data can be transmitted without performing concatenation. If byte alignment is not defined for the size of the new fields and the size of the configured new fields is not in byte units as in the structure 1n-10, the new fields 1n-02 may be configured to match the bytes by adding padding at the end thereof. As another method, the overhead can be reduced by introducing a new field (e.g., F field) like the structure 1n-15 so that the length field can be dynamically indicated as the first size or the second size. As another method, the last E field or LI fields in the header structure 1n-05, 1n-10, or 1n-15 may be omitted. For example, if n pieces of data are concatenated, only n−1 new fields can be added. This is because, if two pieces of data of the n-th data and the (n+1)-th data are separated by the length field for the n-th data, the length of the last data need not be known.

In the above, if the data concatenation procedure is performed in the SDAP layer device (or new layer device), when the SDAP header is configured in the SDAP layer device (or new layer device), since there is no reserved field in the downlink SDAP header, and there is no reserved field in the uplink SDAP header, a field indicating whether a new field exists thereafter, whether a concatenation procedure is applied thereto, or whether a data field exists immediately thereafter may be defined after the header (indicated by reference numeral 1n-36), or may be defined in the uplink SDAP header, like the structures 1n-35 and 1n-40 shown in FIG. 14C. In addition, like the other structures proposed above, new fields may be defined and data concatenation procedures may be performed. As another method, a data concatenation procedure may be applied by defining new fields and attaching the new fields after an uplink SDAP header or a downlink SDAP header, as shown in the structure 1n-40 shown in FIG. 14D. As another method, if the SDAP header is not configured, the data concatenation procedure may be applied by defining new fields such as the structure 1n-45 and positioning the new fields in front of the data.

The header structures or the new field structures of the upper layer device proposed in FIG. 14A, FIG. 14B, FIG. 14C, and FIG. 14D may be combined and applied so as to expand into a new structure.

In addition, in order to facilitate the implementation of hardware processing in FIG. 14A, FIG. 14B, FIG. 14C, and FIG. 14D, the header structure may be designed to have a fixed size with regard to new fields (e.g., length indicator (LI) fields) for data concatenation or data de-concatenation. For example, a header can be made to have a fixed size by always inserting a predetermined number of the new fields (the predetermined number k may be promised in advance or may be configured through an RRC message) regardless of whether data concatenation occurs or not.

As another method, as in the structure 1n-20, if it is indicated that data concatenation has not been applied using a new field (e.g., C field or E field) that indicates whether data concatenation has been applied or not, all new fields (LI field) may not be used, that is, the new fields (LI field) may not be included in the header, and if it is indicated that data concatenation has been applied using the new field (e.g., C field or E field) that indicates whether data concatenation has been applied or not, all the new fields (LI field) of fixed size may be used, that is, the new fields (LI field) of fixed size may be included in the header.

Figure 15A:
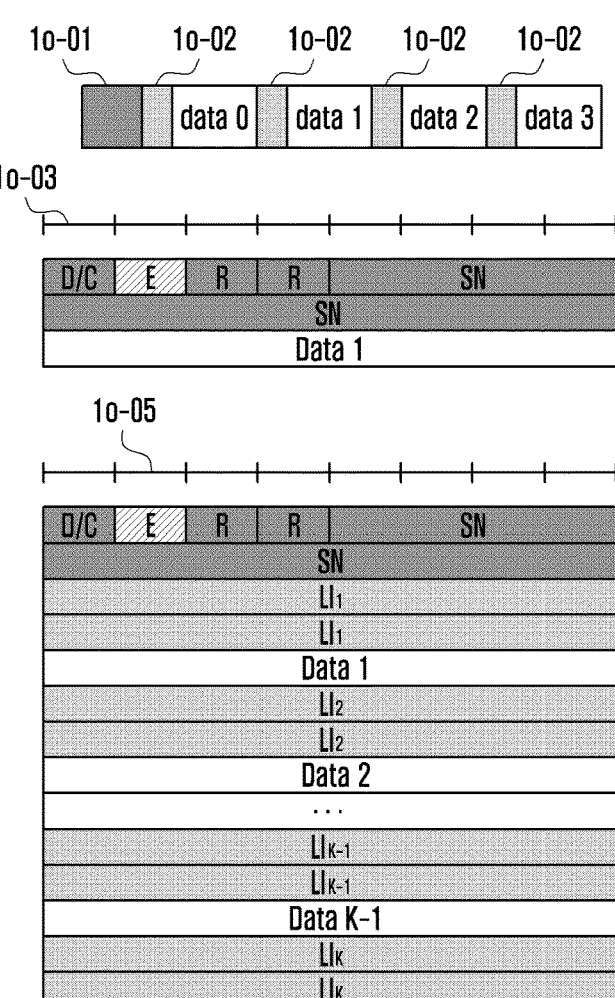
FIG. 15A illustrates a header structure or a new field structure of an upper layer device suitable for the second embodiment of a data concatenation procedure proposed in according to an embodiment of the disclosure.

FIG. 15A illustrates the header structure or the new field structure of an upper layer device suitable for the second embodiment (FIG. 12A and FIG. 12B) of the data concatenation procedure proposed in according to an embodiment of the disclosure.

Figure 15B:
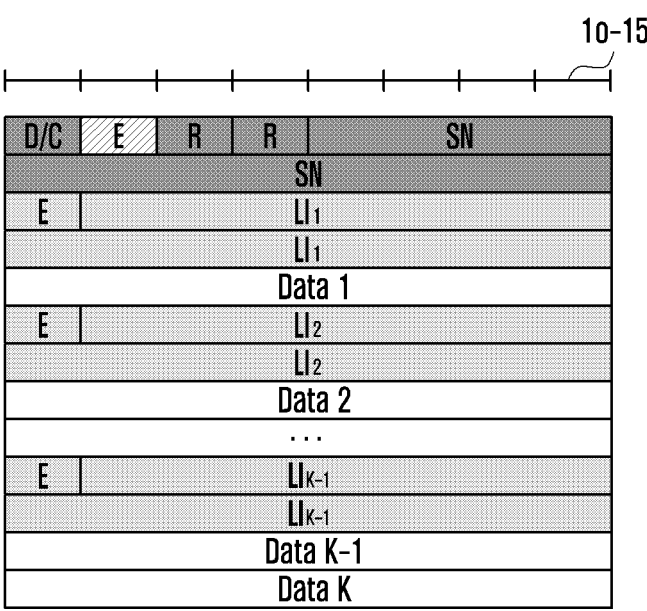
FIG. 15B illustrates a header structure or a new field structure of an upper layer device suitable for the second embodiment of a data concatenation procedure proposed in according to an embodiment of the disclosure.
Figure 15B:
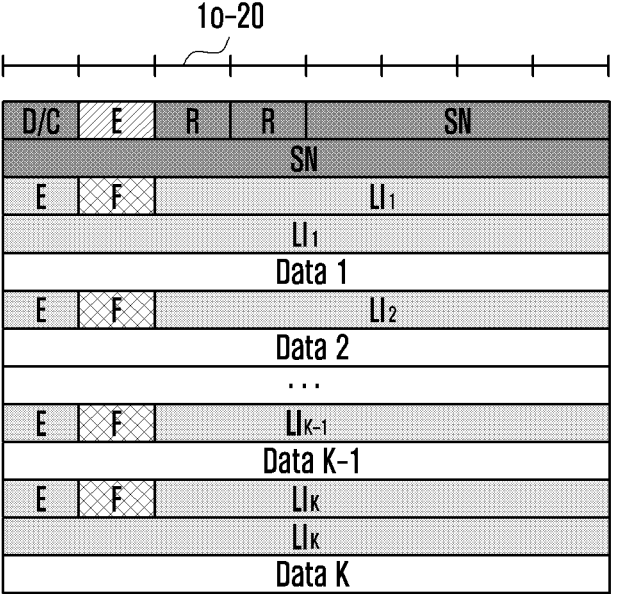
Figure 15C:
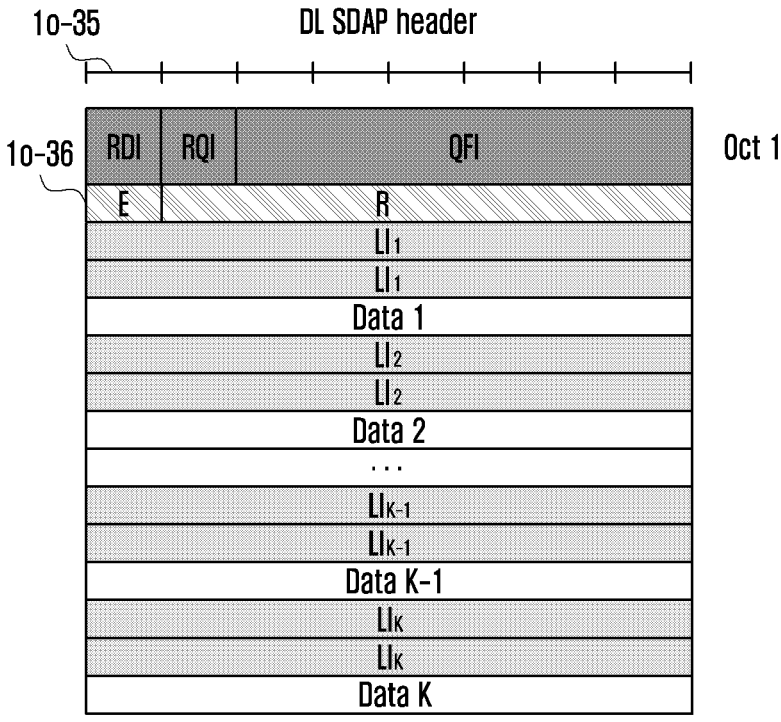
FIG. 15C illustrates a header structure or a new field structure of an upper layer device suitable for the second embodiment of a data concatenation procedure proposed in according to an embodiment of the disclosure.
Figure 15C:
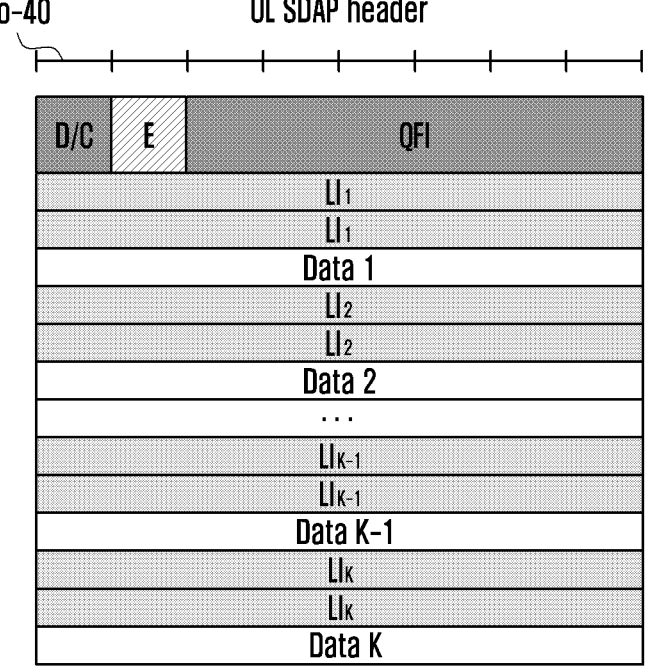

FIG. 15B illustrates the header structure or the new field structure of an upper layer device suitable for the second embodiment (FIG. 12A and FIG. 12B) of the data concatenation procedure proposed in according to an embodiment of the disclosure, FIG. 15C illustrates the header structure or the new field structure of an upper layer device suitable for the second embodiment (FIG. 12A and FIG. 12B) of the data concatenation procedure proposed in according to an embodiment of the disclosure.

FIG. 15D illustrates the header structure or the new field structure of an upper layer device suitable for the second embodiment (FIG. 12A and FIG. 12B) of the data concatenation procedure proposed in according to an embodiment of the disclosure.

Referring to FIG. 15A, a new field (e.g., C field or E field) is defined in the header (e.g., PDCP header or SDAP header) 1o-01) of the upper layer device, and whether a new field (1o-02) exists thereafter, whether the concatenation procedure is applied thereto, or whether a data field exists immediately thereafter, etc. may be indicated.

Therefore, when the data concatenation procedure is not applied to the data transmitted from the upper layer device (for example, the PDCP layer device or the SDAP layer device (or a new layer device)), data may be configured in a structure 1o-03 such that data concatenation to a new field (e.g., for example, field E) does not occur, that no more new fields exist, or that data exists immediately thereafter.

In the above, when the data concatenation procedure is applied to data in the transmitting PDCP layer device, a new field (e.g., C field or E field) may be defined in the header (e.g., PDCP header or SDAP header) of the upper layer device as the structure 1o-05, whether a new field exists thereafter, whether a concatenation procedure is applied thereto, or whether a data field exists immediately thereafter, etc. may be indicated. In addition, new fields (e.g., E field or LI field) are defined and configured as many as the number of concatenated data, and the new fields are attached to the front of each data, and the method of attaching a new field to the front of the concatenated data is repeated in the same way so as to perform the data concatenation procedure. In the header structure of 1o-05 or 1o-10, the new fields 1o-02 may define the size of each field according to the size of the byte unit so as to perform byte alignment. In addition, since the L field is located before each data, if other data exists after the length indicated by the L field, it denotes that another L field exists, the E field can be operated without any problem even if not defined. However, like the structure 1o-10, the E field may be defined and used for convenience of implementation. As another method, as in the structure 1n-05, byte alignment may not be defined for the size of new fields, and if the size of the configured new fields is not in byte units, padding may be added at the end, so that new fields 1o-02 can be configured to match the byte.

Referring to FIG. 15B, a new field (e.g., F field) may be introduced as the structure 1o-20, so that the length field may be dynamically indicated in the first size or the second size and overhead can be reduced. Even in the structure 1o-20, byte alignment may be performed by defining the sizes of new fields as in the structure 1o-05. As another method, even in the structure 1o-20, byte alignment may be performed by adding padding as in the structure 1n-10. As another method, the last E field or LI fields in the header structure (1o-05, 1o-10, or 1o-15) may be omitted. For example, if n pieces of data are concatenated, only (n−1) new fields can be added. This is because, if two pieces of data of the n-th data and the (n+1)-th data are separated as the length field for the n-th data, the length of the last data need not be known.

In the above, if the data concatenation procedure is performed in the SDAP layer device (or new layer device), when the SDAP header is configured in the SDAP layer device (or new layer device), since there is no reserved field in the downlink SDAP header, and there is no reserved field in the uplink SDAP header, a field indicating whether a new field exists thereafter, whether a concatenation procedure is applied thereto, or whether a data field exists immediately thereafter may be defined after the header (indicated by reference numeral 1o-36), or may be defined in the uplink SDAP header, like the structures 1o-35 and 1o-40 shown in FIG. 15C. In addition, like the other structures proposed above, new fields may be defined and data concatenation procedures may be performed.

As another method, a data concatenation procedure may be applied by defining new fields and attaching the new fields after an uplink SDAP header or a downlink SDAP header, as shown in the structure 1o-45 shown in FIG. 15D. As another method, if the SDAP header is not configured, the data concatenation procedure may be applied by defining new fields such as the structure 1o-45 and positioning the new fields in front of the data, if the data concatenation procedure is not applied, the structure such as 1o-50 may be defined.

The header structures or the new field structures of the upper layer device proposed in FIG. 15A, FIG. 15B, FIG. 15C, and FIG. 15D may be combined and applied so as to expand into a new structure.

Figure 16:
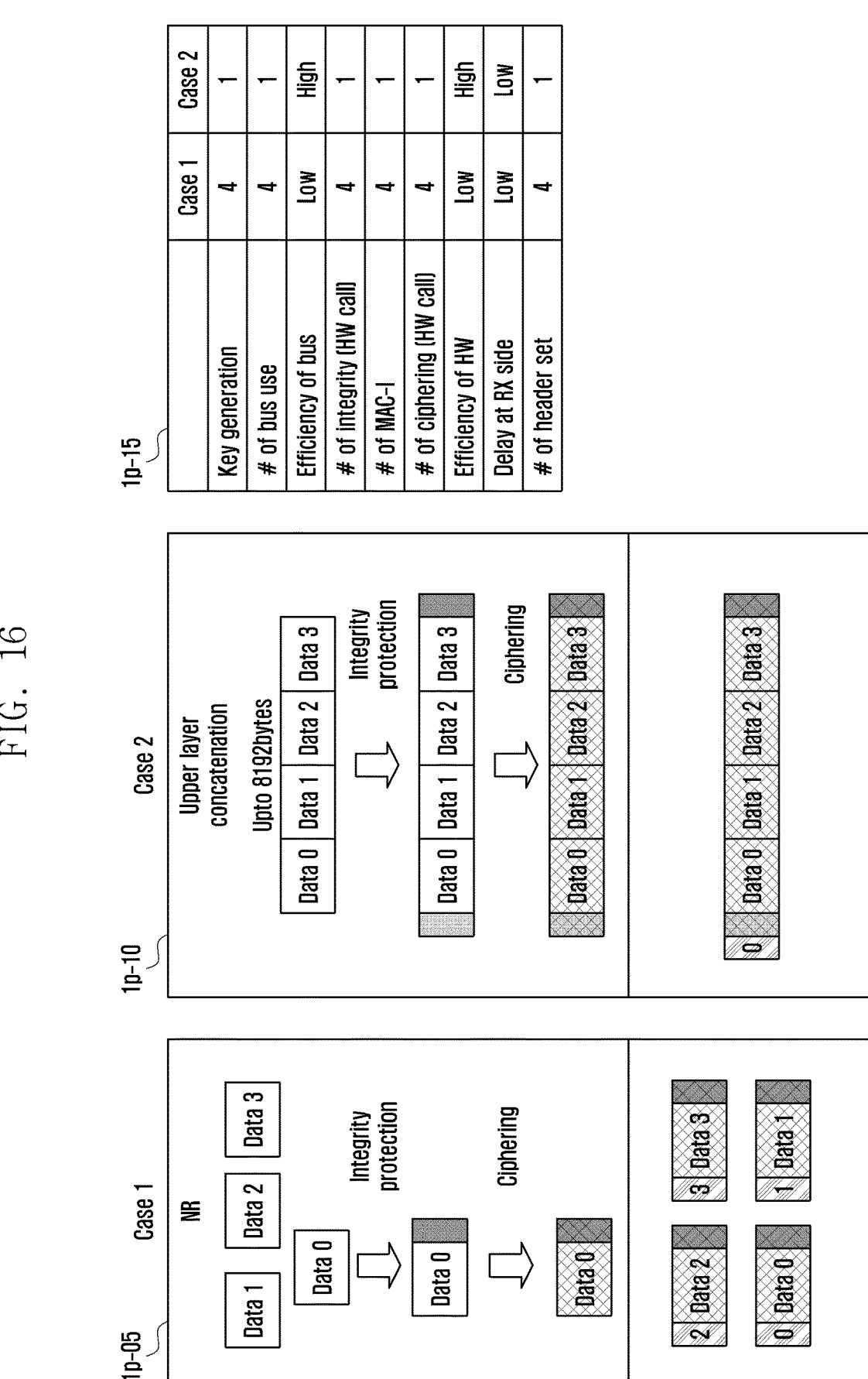
FIG. 16 is a diagram comparing a data processing procedure in a next-generation mobile communication system according to the disclosure with a data processing procedure proposed in according to an embodiment of the disclosure.

FIG. 16 is a diagram comparing a data processing procedure in a next-generation mobile communication system according to the disclosure with a data processing procedure proposed in according to an embodiment of the disclosure.

For example, assuming that the transmitting PDCP layer device receives 4 pieces of first data, second data, third data, and fourth data from an upper layer device, if the integrity protection procedure is configured, the integrity protection procedure may be performed for each data based on security key values, bearer identifiers, or COUNT values for the data, and a total of four integrity protection procedures may be performed based on a total of four COUNT values. If the ciphering procedure is configured in the above, the transmitting PDCP layer device may perform the ciphering procedure for each databased on security key values or bearer identifiers or COUNT values for the data, and a total of four ciphering procedures can be performed based on a total of four COUNT values. In addition, if the receiving PDCP layer device receives four pieces of first data, second data, third data, and fourth data to which the integrity protection procedure or ciphering procedure is applied in the above, a deciphering procedure or integrity verification procedure may be performed for each databased on security key values, bearer identifiers, or COUNT values for the data, and consequently, the deciphering procedure is performed four times or the integrity verification procedure is performed four times (indicated by reference numeral 1p-05).

If the data concatenation procedure of the upper layer device proposed in the disclosure is configured or applied, the transmitting PDCP layer device may, when the integrity protection procedure is configured for one data, be obtained by concatenating the first data, the second data, the third data, and the fourth data, perform the integrity protection procedure for the data once based on the security key values, bearer identifiers, or COUNT values for the data, and may perform the integrity protection procedure for one data, obtained by concatenating the four pieces of data. If the ciphering procedure is configured in the above, the transmitting PDCP layer device may perform the ciphering procedure once for the concatenated data based on the security key values, the bearer identifier, or the COUNT value for the data, and may perform a total of one ciphering procedure based on one COUNT value. In addition, if receiving the concatenated data (first data, second data, third data, fourth data) to which the integrity protection procedure or ciphering procedure has been applied, the receiving PDCP layer device may perform a deciphering procedure or integrity verification procedure for the concatenated data based on security key values, bearer identifiers, or COUNT values for the data, and consequently, perform the deciphering procedure once or the integrity verification procedure once (indicated by reference numeral 1p-10).

In the above, the amount of data that can be concatenated is equal to the size of data that can be simultaneously processed when the modem of a UE performs an integrity protection procedure, integrity verification procedure, ciphering procedure, or deciphering procedure. Alternatively, in the above, the amount of data that can be concatenated is equal to a predetermined, defined, or configured size.

In the above, when the data concatenation procedure is performed in the upper layer device as in reference numeral 1p-10, as more data is concatenated, the number of times of processing the integrity protection procedure, integrity verification procedure, ciphering procedure, or deciphering procedure can be reduced. Therefore, a large amount of data can be processed in parallel with other pieces of data such that, consequently, the data processing speed can be increased, and the data processing time can be shorten.

As shown in reference numeral 1p-15 of FIG. 16, if the data concatenation procedure of the upper layer device proposed in the disclosure is applied (indicated by reference numeral 1p-10), the number of times of generating a security key or key stream is reduced, the number of times of using a bus for data transport is also reduced, and the efficiency of the bus increases because the bus is used in large data units at once. In addition, the number of processing of the integrity protection procedure, integrity verification procedure, ciphering procedure, or deciphering procedure can be reduced, and if the number of integrity protection procedures is reduced, the MAC-I field is also less generated. In addition, when performing data concatenation in the above, if a modem of the UE performs data concatenation equal to the size of data that can be simultaneously processed when performing the integrity protection procedure, integrity verification procedure, ciphering procedure, or deciphering procedure, the efficiency of the hardware accelerator that performs the above procedures can be increased. In addition, since a PDCP header, RLC header, or MAC header are not generated for each data, but one PDCP header, RLC header, or MAC header are generated for concatenated data, overhead in transmission resources can also be reduced.

Figure 17A:
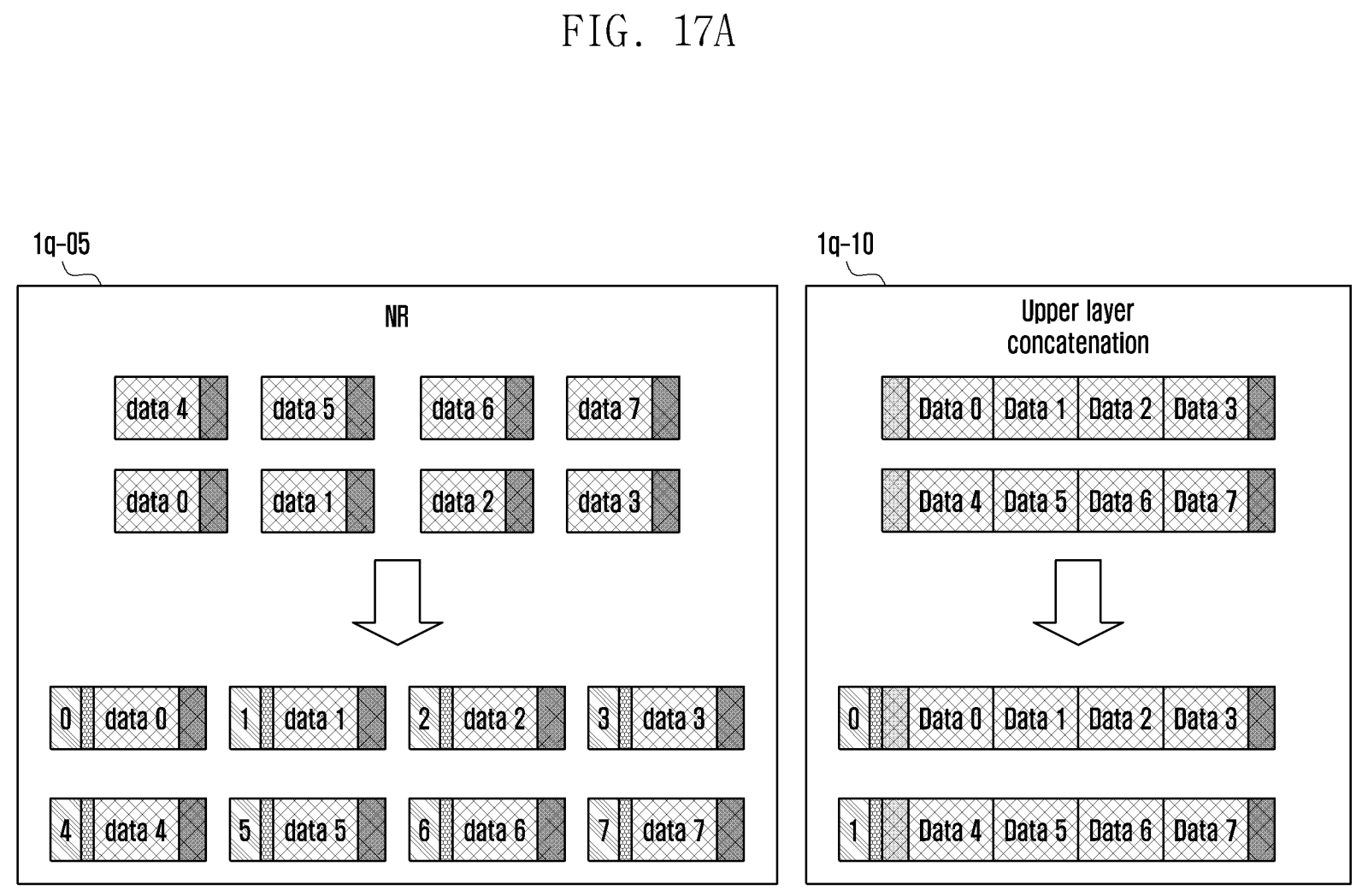

FIG. 17A illustrates the benefit of the data concatenation procedure proposed in the disclosure from the viewpoint of an RLC layer device according to an embodiment of the disclosure.

Figure 17B:
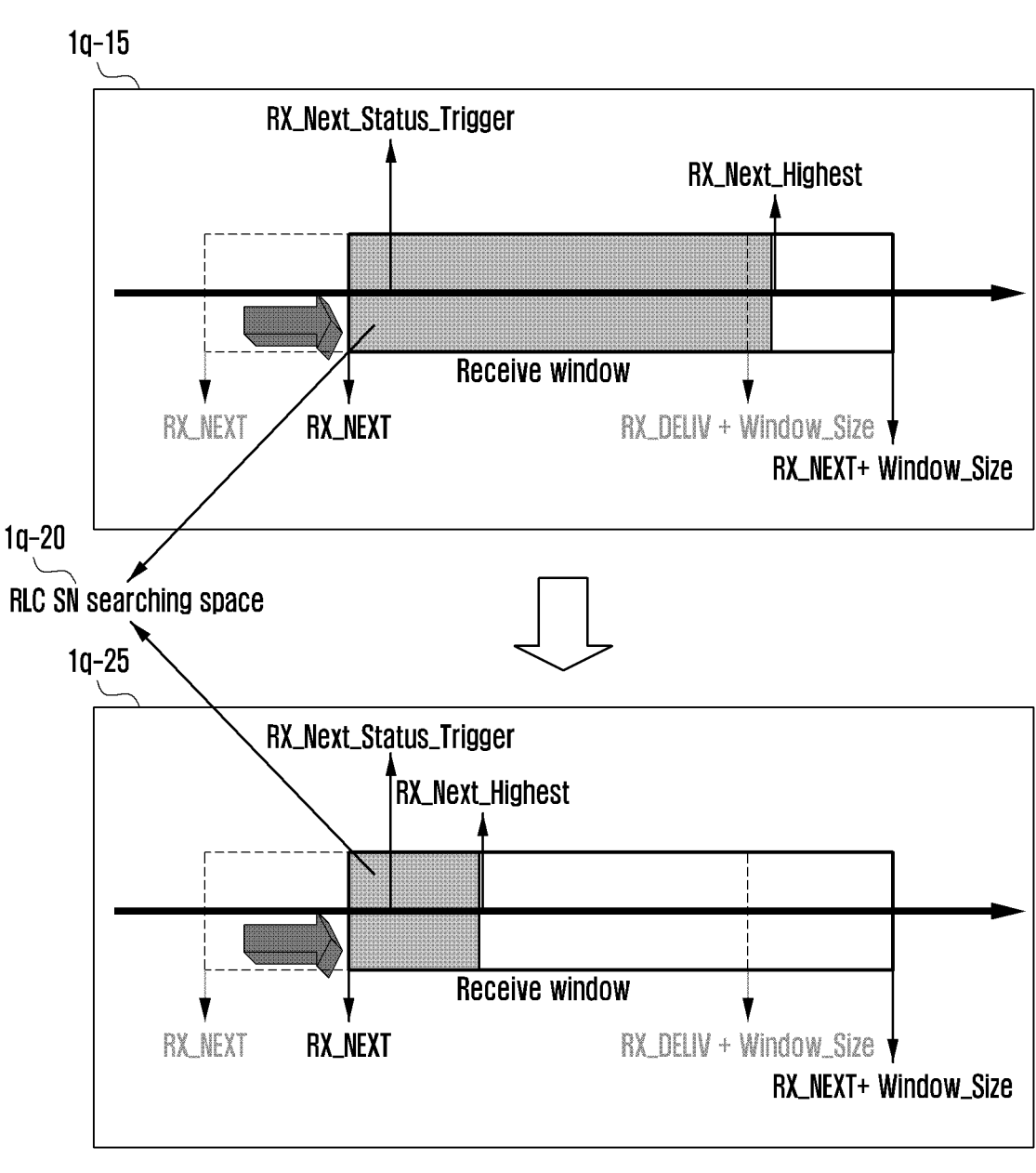
FIG. 17B illustrates the benefit of a data concatenation procedure proposed in the disclosure from the viewpoint of an RLC layer device according to an embodiment of the disclosure.

FIG. 17B illustrates the benefit of the data concatenation procedure proposed in the disclosure from the viewpoint of an RLC layer device according to an embodiment of the disclosure.

In addition, if the data concatenation procedure is not applied (indicated by reference numeral 1q-05) as shown in FIG. 17A, one RLC serial number needs to be allocated to each data. However, if the data concatenation procedure proposed in the disclosure is applied (indicated by reference numeral 1q-10), since one RLC serial number is allocated to the concatenated data, it is possible to efficiently operate the ARQ procedure with a small RLC serial number when operating the ARQ procedure in the RLC layer device.

Therefore, if the data concatenation procedure is not applied (indicated by reference numeral 1q-05) as shown in FIG. 17A, RLC serial number, data, a linked list as to whether successful transport occurs or not, or the RLC serial number space to be searched for becomes longer, in order for the ARQ procedure, as shown in FIG. 17B (indicated by reference numerals 1q-15 and 1q-20). However, if the data concatenation procedure proposed in the disclosure is applied (indicated by reference numeral 1q-10), since one RLC serial number is allocated to the concatenated data, a linked list or RLC serial number space to be searched for when operating the ARQ procedure in the RLC layer device is greatly reduced as shown in FIG. 17B (indicated by reference numerals 1q-25 and 1q-20), it is possible to shorten the RLC serial number search time, improve data processing speed, and reduce data processing time.

Figure 18:
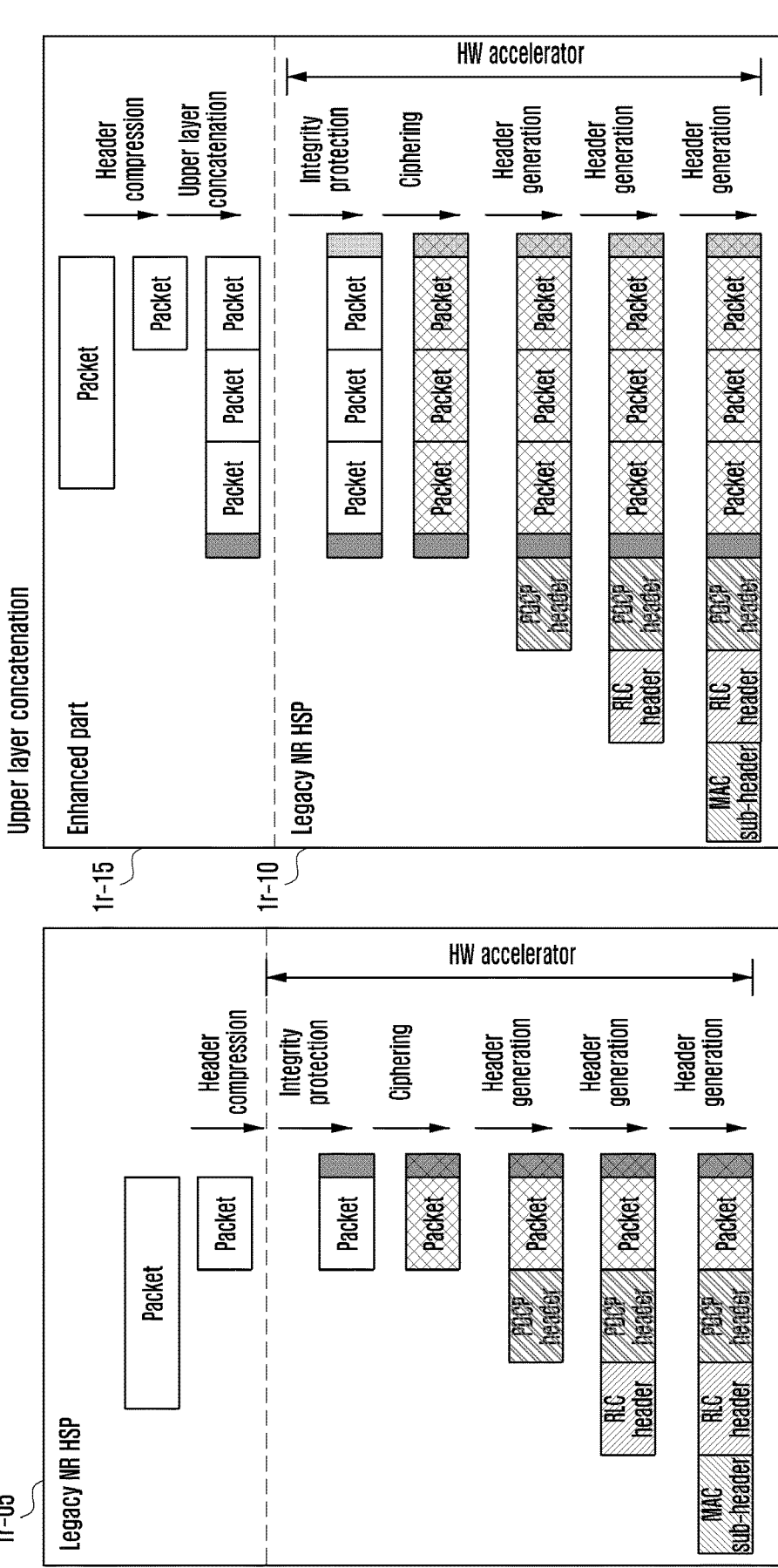
FIG. 18 is a diagram for explaining that a data concatenation procedure of an upper layer device proposed in the disclosure does not influence a basic data processing procedure of a next-generation mobile communication system according to an embodiment of the disclosure.

FIG. 18 is a diagram for explaining that a data concatenation procedure of an upper layer device proposed in the disclosure does not influence a basic data processing procedure of a next-generation mobile communication system according to an embodiment of the disclosure.

Referring to FIG. 18, as shown in reference numeral 1r-05, the length of data received from an upper layer device or the length data for which a header compression procedure is configured is variable. In addition, when the integrity protection procedure or ciphering procedure is configured for data having a variable length, the integrity protection procedure or ciphering procedure may be applied to the data, and a PDCP header, RLC header, or MAC header may be generated and attached to the data, and data may be transmitted.

In FIG. 18, as shown in reference numeral in 1r-15, the data concatenation procedure proposed in the disclosure may be applied to data received from an upper layer device, and the length of the concatenated data has a variable length. In addition, when the integrity protection procedure or ciphering procedure is configured for concatenated data having a variable length, the integrity protection procedure or ciphering procedure may be applied to the data, and a PDCP header, RLC header, or MAC header may be generated and attached to the data and data transmission may occur. Therefore, if the data received from an upper layer device in the basic data processing procedure 1r-10 is regarded as concatenated data, since the basic data processing procedure can be reused as it is, it is possible to minimize the impact on the existing implementation. It is also possible to significantly improve data processing speed while minimizing impact to a hardware accelerator, a hardware engine, or a modem design.

Figure 19:
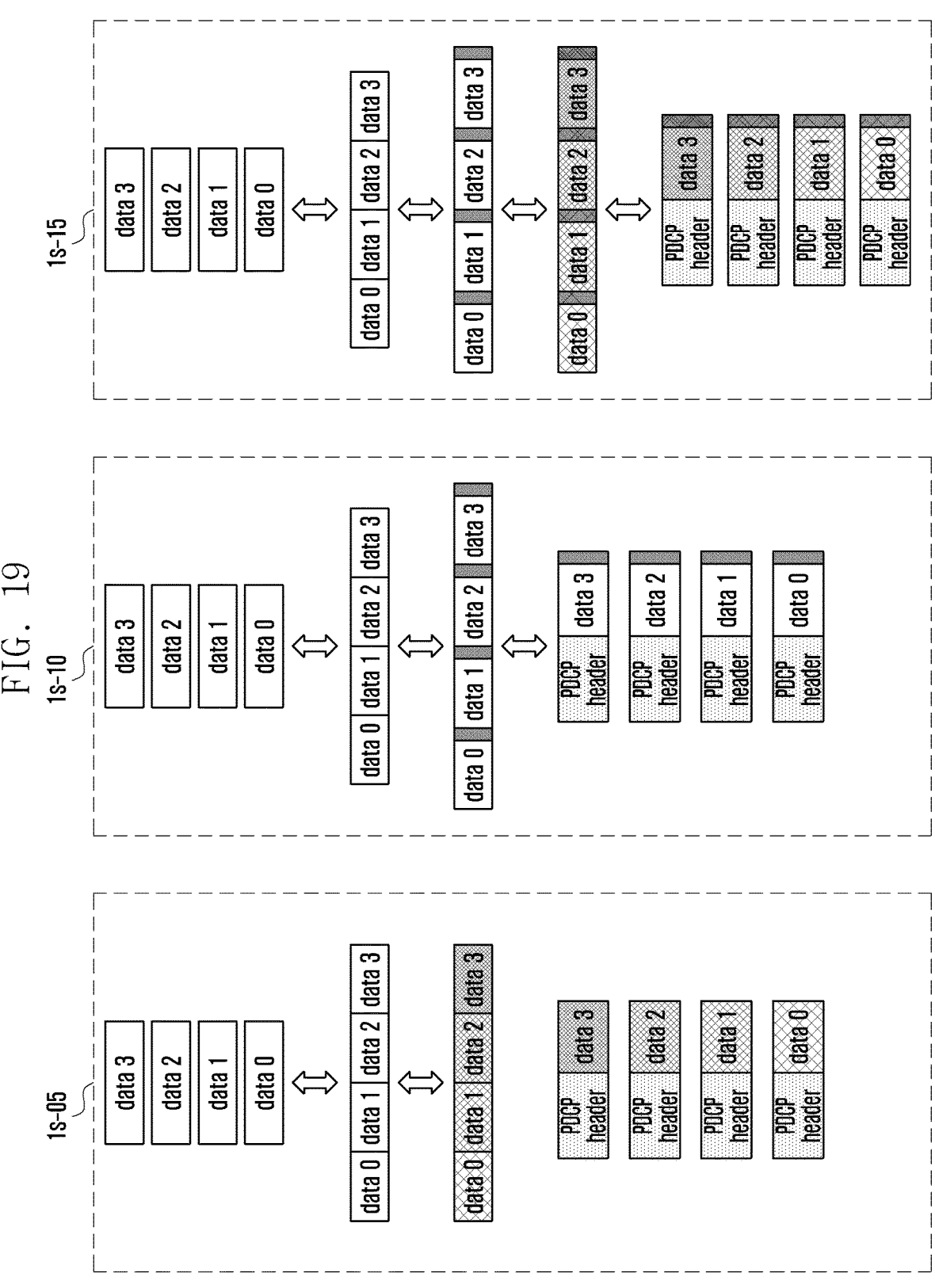
FIG. 19 illustrates a method for implementing while inheriting the features of a data concatenation function of an upper layer device, or an implementation method that can have advantages similar to a data concatenation function of an upper layer device proposed in according to an embodiment of the disclosure.

FIG. 19 proposes a method of inheriting and implementing the characteristics of the data concatenation function of an upper layer device proposed in the disclosure without introducing new fields by extending the data concatenation function of the upper layer device proposed in the above, or proposes an implementation method that can have advantages similar to the data concatenation function of the upper layer device without new fields according to an embodiment of the disclosure. That is, proposed below is an implementation method of reducing the number of ciphering procedure (or deciphering procedure) or integrity protection procedure (or integrity verification procedure) as in the first embodiment, the second embodiment, or the third embodiment proposed above in the disclosure, or allowing the procedures to be simultaneously processed, thereby capable of increasing the data processing speed of a UE or a base station and lowering processing complexity.

Since the fourth embodiment of the data concatenation procedure proposed in the FIG. 19 has no new fields, which is different from the first embodiment, second embodiment, or third embodiment of the data concatenation procedure proposed in the disclosure, if the transmitting PDCP layer device performs a data concatenation procedure and transmits the concatenated data, the receiving PDCP layer device cannot separate the concatenated data. Therefore, the fourth embodiment of the data concatenation procedure proposed in the disclosure proposes a method of: allocating a PDCP serial number or a COUNT value to each data received from an upper layer device in the transmitting PDCP layer device (if a header compression procedure (or data compression procedure) is configured in the PDCP layer device, the header compression procedure (or data compression procedure) may be applied to each data before performing the data concatenation procedure, and the data concatenation procedures may be applied to the pieces of compressed data); performing the data concatenation procedure for the plurality of different data, and then applying, in a multi-array implementation method, security key values, bearer identifiers, or plurality of different COUNT values to concatenated data obtained by concatenating multiple pieces of data; and simultaneously performing an integrity protection procedure or ciphering procedure for each data of concatenated data, and performing a data de-concatenation procedure again on the concatenated data so as to generate a PDCP header for each data and transmit data to a lower layer device.

That is, in reference numeral 1p-05 in FIG. 16, a method for applying different COUNT values, ciphering key values, or bearer identifier values to respective pieces of data to perform integrity protection (or integrity verification) or ciphering (or deciphering) procedures, respectively, is shown, and a multi-array implementation method (e.g., matrix operation) which is an implementation method that simultaneously performs the method, shown in reference numeral 1p-05, for multiple pieces of data can be applied. In addition, the receiving PDCP layer device may apply a deciphering procedure or an integrity verification procedure to each received data based on security key values, a bearer identifier, or a COUNT value for the data. As another method, the receiving PDCP layer device may collect data for which a data concatenation procedure is applied and received and perform the data concatenation procedure, and may simultaneously apply a deciphering procedure or an integrity verification procedure to each data of concatenated data by applying security key values, a bearer identifier or multiple different COUNT values to concatenated data, obtained by concatenating multiple pieces of data, in a multi-array implementation method. In addition, each data may be separated from the concatenated data, and the pieces of data may be transferred to an upper layer device in the ascending order of the COUNT value (if a header compression procedure (or data compression procedure) is configured in the PDCP layer device, a header decompression procedure (or data decompression procedure) may be applied to each data, and the decompressed data may be transferred to an upper layer device).

When performing the data concatenation procedure in the fourth embodiment of the data concatenation procedure of the disclosure, it may be characterized in that the PDCP layer device does not apply the data concatenation procedure to the SDAP header, SDAP control data (SDAP control PDU), or PDCP control data (PDCP control PDU) when performing the integrity protection procedure, integrity verification procedure, ciphering procedure, or deciphering procedure. Because the ciphering procedure or deciphering procedure is not applied to the SDAP header or SDAP control data, if the SDAP header or SDAP control data is concatenated with other pieces of data, implementation complexity increases when the concatenated data is ciphered or deciphered. In addition, since the ciphering procedure, deciphering procedure, integrity protection procedure, or integrity verification procedure are not applied to the PDCP control data, if the PDCP control data is concatenated with other pieces of data, the implementation complexity may be increased when performing ciphering procedure, deciphering procedure, integrity protection procedure, or the integrity verification procedure for the concatenated data.

As another method, if the SDAP header is configured in the SDAP layer device (or the new layer device), the SDAP header of each data may be excluded when performing the data concatenation procedure. This is because the ciphering procedure or the deciphering procedure is not applied to the SDAP header. For example, the transmitting PDCP layer device may apply the data concatenation procedure of the fourth embodiment proposed above to pieces of data except for the SDAP header with regard to each data received from an upper layer device. For example, the receiving PDCP layer device may apply the data concatenation procedure of the fourth embodiment proposed above to data except for the SDAP header with regard to each data received from a lower layer device. In the above, when an integrity protection procedure is configured for SDAP control data, the integrity protection procedure may be applied, or when a ciphering procedure is configured therefor, the ciphering procedure may not be applied. However, when the integrity protection procedure is configured for PDCP control data in the above, the integrity protection procedure may not be applied or when the ciphering procedure is configured therefor, the ciphering procedure may not also be applied. As another method, when the integrity protection procedure is configured for the SDAP control data, the integrity protection procedure may not be applied, or when the ciphering procedure is configured therefor, the ciphering procedure may not be applied.

As another method, when performing the data concatenation procedure in the fourth embodiment of the data concatenation procedure of the disclosure, it may be characterized in that the PDCP layer device does not apply the data concatenation procedure to the PDCP control data (PDCP control PDU) when performing the integrity protection procedure or integrity verification procedure, and may apply the data concatenation procedure to the SDAP header or SDAP control data (SDAP control PDU). This is because the integrity protection or verification procedure is applied to the SDAP header or SDAP control data, but the integrity protection or verification procedure is not applied to the PDCP control data (e.g., ROHC feedback, EHC feedback, or PDCP status report). For example, if the PDCP control data is concatenated with other pieces of data, implementation complexity can be increased when the integrity protection or verification procedure is performed on the concatenated data. In addition, the PDCP layer device may not apply the data concatenation procedure to the SDAP header, SDAP control data, or PDCP control data (PDCP control PDU) when performing the ciphering or deciphering procedure. This is because the ciphering or deciphering procedure is not applied to the SDAP header, SDAP control data, or PDCP control data (e.g., ROHC feedback, EHC feedback, or PDCP status report). For example, if the SDAP header, SDAP control data, or PDCP control data are concatenated with other pieces of data, implementation complexity may increase when the integrity protection or verification procedure is performed on the concatenated data.

For example, the transmitting PDCP layer device may apply the data concatenation procedure of the fourth embodiment proposed above to pieces of data including an SDAP header or SDAP control data, with regard to each data received from an upper layer device when performing the integrity protection procedure. For example, the receiving PDCP layer device may apply the data concatenation procedure of the fourth embodiment proposed above to pieces of data including the SDAP header or SDAP control data, with regard to each data received from a lower layer device when performing the integrity verification procedure.

For example, the transmitting PDCP layer device may apply the data concatenation procedure of the fourth embodiment proposed above to pieces of data except for SDAP control data or SDAP header, with regard to each data received from an upper layer device when performing the ciphering procedure. For example, the receiving PDCP layer device may apply the data concatenation procedure of the fourth embodiment proposed above to pieces of data except for the SDAP control data or the SDAP header, with regard to each data received from a lower layer device when the deciphering procedure is performed.

As shown in reference numeral 1s-05 of FIG. 19, if only the ciphering procedure is configured in the PDCP layer device, the fourth embodiment of the disclosure may be applied so as to apply the data concatenation procedure to pieces of data received from an upper layer device and simultaneously perform ciphering of respective pieces of data for the concatenated data using different security key values (e.g., COUNT values) in a multiple array implementation. In addition, the pieces of concatenated data may be separated, a PDCP header may be individually configured for each data, the PDCP header may be concatenated in front of each data, and thus each data may be transferred to a lower layer device.

As shown in reference numeral 1s-10 of FIG. 19, if only the integrity protection procedure is configured in the PDCP layer device, the fourth embodiment of the disclosure may be applied so as to apply the data concatenation procedure to pieces of data received from the upper layer device, and simultaneously perform the integrity protection procedure on each data for the concatenated data using different security key values (e.g., COUNT values) in a multiple array implementation. In addition, the pieces of concatenated data may be separated, 4-byte length MAC-I field, which is generated by the integrity protection procedure, may be concatenated at the very end of each data, the PDCP header may be individually configured and concatenated in front of each data, and thus each data may be transferred to a lower layer device.

As shown in reference numeral 1s-15 of FIG. 19, if the integrity protection procedure and ciphering procedure are configured in the PDCP layer device, the fourth embodiment of the disclosure may be applied so as to apply the data concatenation procedure to the data received from an upper layer device, and simultaneously perform the integrity protection procedure on each data for the concatenated data using different security key values (e.g., COUNT values) in a multiple array implementation. In addition, with regard to each data of the concatenated data, 4-byte long MAC-I field generated by the integrity protection procedure may be concatenated at the very end of each data, and concatenated data may be configured again. With regard to the reconfigured concatenated data above, a ciphering procedure may be simultaneously applied to respective pieces of data using different security key values (e.g., COUNT values) in a multiple array implementation. In addition, the pieces of concatenated data may be separated, a PDCP header may be individually configured for each data, the PDCP header may be concatenated in front of each data, and thus each data may be transferred to a lower layer device.

In the fourth embodiment proposed in the disclosure, since the integrity protection procedure, integrity verification procedure, ciphering procedure, or deciphering procedure are performed after performing the data concatenation procedure in the transmitting or receiving PDCP layer device, it is possible to reduce the number of times of performing the above procedures so as to shorten the processing time. However, since the concatenated data is separated again and each data is transmitted to the lower layer device, the space of the RLC serial number or the size of the linked list cannot be reduced when searching for the linked list implemented in the RLC layer device.

Figure 20:
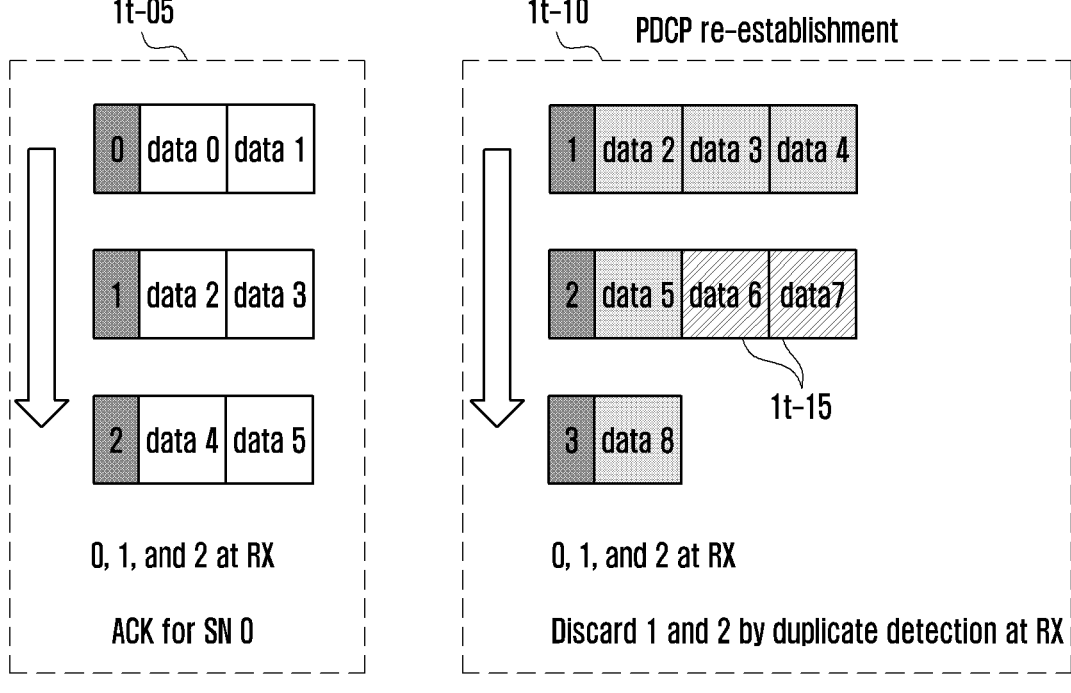
FIG. 20 illustrates a data loss problem that may occur when a UE configured with a data concatenation function performs a handover procedure proposed in according to an embodiment of the disclosure.

FIG. 20 illustrates a data loss problem that may occur when a UE configured with a data concatenation function proposed in the disclosure performs a handover procedure according to an embodiment of the disclosure.

As shown in reference numeral 1t-05 of FIG. 20, it may be assumed that a transmitting PDCP layer device of AM DRB has transmitted data corresponding to PDCP serial number (or COUNT value) number 0, number 1, and number 2. Further, it may be assumed that an RLC layer device (RLC layer device operating in an AM mode) connected to the PDCP layer device has received an ACK (confirmation indicator indicating successful transfer) for the data corresponding to the number 0, and has not received an ACK corresponding to the number 1 and number 2 yet. However, actually, it may be assumed that the receiving PDCP layer device has received data corresponding to the PDCP serial number (or COUNT value) number 0, number 1, and number 2. In this situation, upon receiving a handover command message (e.g., RRCReconfiguration message), the transmitting PDCP layer device in the above performs a PDCP re-establishment procedure and starts retransmission of the first data for which successful transfer from a lower layer device (RLC layer device) is not received. When the data concatenation procedure proposed in the disclosure is performed in the PDCP re-establishment procedure, if the concatenation procedure is newly performed such as reference numeral 1t-10, differently from pieces of data concatenated based on the existing (or first) PDCP serial number (or COUNT value), data loss may occur. This is because, when the data concatenation procedure is newly performed as in reference numeral 1t-10 and transmitted, the receiving PDCP layer device has already received the data corresponding to PDCP serial number (or COUNT value) number 1 and number 2, and thus the data corresponding to the PDCP serial number (or COUNT value) may be assumed to be a duplicate reception in the duplicate detection procedure and the data may be discarded. Therefore, even though data 6 and data 7 (indicated by reference numeral 1t-15) are the first received data, since the duplicate detection procedure is performed based on the PDCP serial number (or COUNT value), the data may be discarded, and thus data loss may occur.

Therefore, when the data concatenation procedure proposed in the disclosure is performed in the PDCP layer device or when the data concatenation procedure is performed in the PDCP layer device, if the PDCP re-establishment procedure is triggered or retransmission is to be performed, a procedure of concatenating again the pieces of data, which are concatenated at the time of the first transmission, as it is, with regard to pieces of data corresponding to PDCP serial numbers (or COUNT values) for which retransmission is required, and retransmitting the same is proposed. A more specific procedure is proposed below.

As shown in reference numeral 1e-85 in FIG. 5 of the disclosure, when a UE receives a handover command message (e.g., RRCReconfiguration message) from a base station, when a data concatenation procedure is configured in the PDCP layer device, when a data concatenation procedure is performed in the PDCP layer device, or when a PDCP re-establishment procedure is indicated through the RRC message, a PDCP re-establishment procedure that prevents data loss is proposed as follows.

If the data concatenation procedure or data de-concatenation procedure is configured for the PDCP layer device in the above, the UE may perform the data concatenation function in the upper layer device. If the UE receives a RRC message (RRCReconfiguration) indicating a handover from the base station, if ReconfigurationWithSync (handover indicator) is included in the RRC message, if an indicator (reestablishPDCP) for reestablishment of the PDCP layer device (PDCP re-establishment) is included in the RRC message, or if security configuration information (security config) for changing the security key is included in the RRC message, the UE may derive a new security key from the RRC layer device based on the security configuration information and apply the security key to each PDCP layer device. In addition, the UE may perform a PDCP re-establishment procedure in the PDCP layer device. When the PDCP re-establishment procedure is performed in the above, the UE may newly apply and transmit the data processing procedure of the PDCP layer device based on the new security key, with regard to data to be retransmitted or data to be transmitted to AM DRB. For example, specifically, in the PDCP re-establishment procedure, the UE may apply the data processing procedure of the PDCP layer device, with regard to data to be retransmitted and data to be newly transmitted, as follows.

When re-applying the data processing procedure (header compression procedure, integrity protection procedure, or ciphering procedure) of the PDCP layer device to the data to be retransmitted in the PDCP re-establishment procedure based on the new security key, if the data concatenation procedure is configured, or if the data concatenation procedure has been performed on previously transmitted data, or if the header compression procedure is configured when newly configuring data to be retransmitted, the UE may newly perform the header compression procedure again or perform the data concatenation procedure again in the same manner as that for the data concatenated at the time of previous transmission, if the integrity protection procedure is configured for the data concatenated in the same manner, the UE may newly perform the integrity protection procedure for the concatenated data based on the new security key, or if a ciphering procedure is configured, the UE may perform the ciphering procedure on the concatenated data based on the new security key. For example, in the transmitting PDCP layer device, the first data and the second data have been configured as PDCP serial number No. 1 and transmitted, and the third data has been configured as PDCP serial number No. 2 and transmitted, but if successful transfer of for PDCP serial number No. 1 and No. 2 has not been confirmed from a lower layer device, a retransmission procedure (transfer to the lower layer device) is performed in the PDCP re-establishment procedure. In the above, it may be assumed that the receiving terminal has actually received data corresponding to PDCP serial number No. 1 and has not received data corresponding to PDCP serial number No. 2. However, in the retransmission procedure of the PDCP re-establishment procedure, if the first data, the second data, and the third data are concatenated and configured as PDCP serial number No. 1, and transmitted, since having already received the data for the PDCP serial number No. 1 before, the receiving terminal may detect that the data has received in duplicate and discard the data. That is, data loss may occur because the third data is concatenated with PDCP serial number No. 1 by, differently from before, newly performing the concatenation function for the data retransmitted in the PDCP re-establishment procedure in the above. Therefore, when the procedure of the PDCP layer device is newly applied using the new security key to the data retransmitted by the PDCP re-establishment procedure above, the data concatenation function must be performed in the same manner as the previously transmitted data, and the procedure of the PDCP layer device must be re-applied based on the new security key.

When applying the data processing procedure (header compression procedure, integrity protection procedure, or ciphering procedure) of the PDCP layer device to data to be newly transmitted in the PDCP re-establishment procedure based on the new security key, if the data concatenation procedure is configured, and the header compression procedure is configured when configuring data to be transmitted, the UE may perform the header compression procedure, or perform the data concatenation procedure (data concatenation may occur or not), if the integrity protection procedure is configured for concatenated data or data that is not concatenated, the UE may newly perform the integrity protection procedure for the concatenated data or the data that is not concatenated based on the new security key, or if a ciphering procedure is configured, the UE may perform the ciphering procedure on the concatenated data or the data that is not concatenated based on the new security key, and may perform a transmission procedure (transfer to a lower layer device).

Following the above procedure, for example, with regard to UM DRB, window state variables may be initialized, and with regard to data that has not yet been transmitted to a lower layer device or pieces of data for which the PDCP discard timer has not expired, transmission or retransmission may be performed by compressing, ciphering, or performing integrity protection based on the header (or data) compression context or security key of a target base station in ascending order of COUNT value. If the reordering timer is running, the timer may be stopped and initialized, and the pieces of received data (PDCP SDU or PDCP PDU) may be sequentially processed and transferred to an upper layer device, and with regard to AM DRB, window state variables may not be initialized, and transmission or retransmission may be performed by compressing, ciphering, or performing integrity protection based on the header (or data) compression context or security key of a target base station in ascending order of the PDCP serial number or COUNT value starting with the first data (PDCP SDU or PDCP PDU) for which successful transfer is not confirmed from the lower layer device.

The problem described in FIG. 20 of the disclosure and the corresponding PDCP re-establishment procedure may be applied when a target base station to which the UE should perform handover supports the data concatenation function proposed in the disclosure. For example, the PDCP re-establishment procedure may be performed when the source base station supports the data concatenation function or the target base station supports the data concatenation function.

Hereinafter, in the disclosure, proposed is an efficient PDCP re-establishment procedure when the handover procedure is performed by a source base station supporting the data concatenation function to a target base station supporting the data concatenation function by extending the handover procedure proposed above, when the handover procedure is performed by a source base station that does not support the data concatenation function to a target base station supporting the data concatenation function, when the handover procedure is performed by a source base station supporting the data concatenation function to a target base station that does not support the data concatenation function, or when the handover procedure is performed by a source base station that does not support the data concatenation function to a target base station that does not support the data concatenation function.

When the UE receives a handover command message (e.g., RRCReconfiguration message) from the base station as shown in 1e-85 in FIG. 5 of the disclosure, when the data concatenation procedure is configured or not configured in the PDCP layer device, when the data connection procedure is performed or not performed in the PDCP layer device, or when the PDCP re-establishment procedure is indicated in the RRC message, the PDCP re-establishment procedure for preventing data loss is proposed as follows.

> If the data concatenation procedure or data de-concatenation procedure is configured for the PDCP layer device in the above, the UE may perform the data concatenation function in the upper layer device. Further, in the above, if the UE receives RRC message (RRCReconfiguration) indicating a handover from the base station, if the RRC message includes ReconfigurationWithSync (handover indicator), if the RRC message includes an indicator (reestablishPDCP) for reestablishment of a PDCP layer device (PDCP re-establishment), or if the RRC message includes security configuration information (security config) for changing the security key, the UE may derive a new security key from the RRC layer device based on the security configuration information, and may apply the security key to each PDCP layer device. In addition, the UE may perform a PDCP re-establishment procedure in the PDCP layer device. When the UE performs the PDCP re-establishment procedure in the above, with regard to data to be retransmitted or data to be transmitted to AM DRB (or data to be retransmitted or data to be transmitted to UM DRB), the UE may newly apply the data processing procedure of a PDCP layer based on the new security key and transmit. For example, specifically, in the PDCP re-establishment procedure, the UE may apply the data processing procedure of the PDCP layer device to retransmitted data and newly transmitted data as follows. (For example, when performing a handover procedure by a source base station supporting the data concatenation function to a target base station supporting the data concatenation function, or when performing a handover procedure by a source base station that does not support the data concatenation function to a target base station supporting the data concatenation function)
> When re-applying the data processing procedure (header compression procedure, integrity protection procedure, or ciphering procedure) of the PDCP layer device to data to be retransmitted in the PDCP re-establishment procedure based on the new security key, if the data concatenation procedure is configured, if the data concatenation procedure has been performed on previously transmitted data, or if the header compression procedure is configured when newly configuring data to be retransmitted, the UE may newly perform the header compression procedure again or perform the data concatenation procedure again in the same manner as that for the data concatenated at the time of previous transmission. If the integrity protection procedure is configured for the data concatenated in the same manner, the UE may newly perform the integrity protection procedure for the concatenated data based on the new security key, or if a ciphering procedure is configured, the UE may perform the ciphering procedure on the concatenated data based on the new security key. For example, in the transmitting PDCP layer device, the first data and the second data have been configured as PDCP serial number No. 1 and transmitted, and the third data has been configured as PDCP serial number No. 2 and transmitted, but if successful transfer of PDCP serial number No. 1 and No. 2 has not been confirmed from a lower layer device, a retransmission procedure (transfer to the lower layer device) is performed in the PDCP re-establishment procedure. In the above, it may be assumed that the receiving terminal has actually received data corresponding to PDCP serial number No. 1 and has not received data corresponding to PDCP serial number No. 2. However, if, in the retransmission procedure of the PDCP re-establishment procedure, the first data, the second data, and the third data are concatenated, configured as PDCP serial number No. 1, and transmitted, since having already received the data for the PDCP serial number No. 1 before, the receiving terminal may detect that the data has received in duplicate and discard the data. That is, data loss may occur because the third data is concatenated with PDCP serial number No. 1 by, different from before, newly concatenating the concatenation function for the data retransmitted in the PDCP re-establishment procedure in the above. Therefore, when the procedure of the PDCP layer device is newly applied using the new security key to the data retransmitted by the PDCP re-establishment procedure above, the data concatenation function should be concatenated in the same manner as the previously transmitted data, and the procedure of the PDCP layer device should be re-applied based on the new security key.

> When applying the data processing procedure (header compression procedure, integrity protection procedure, or ciphering procedure) of the PDCP layer device to data to be newly transmitted in the PDCP re-establishment procedure based on the new security key, if the data concatenation procedure is configured or if the header compression procedure is configured when configuring data to be transmitted, the UE may perform the header compression procedure, or may perform the data concatenation procedure (which may concatenate data, or may not concatenate data), if a integrity protection procedure is configured for concatenated data or data that is not concatenated, the UE may newly perform the integrity protection procedure for the concatenated data or the data that is not concatenated based on the new security key, or if a ciphering procedure is configured, the UE may perform the ciphering procedure on the concatenated data or the data that is not concatenated based on the new security key, and may perform a transmission procedure (transfer to the lower layer device).

Following the above procedure, with regard to UM DRB, window state variables may be initialized, and with regard to data that has not yet been transmitted to a lower layer device or pieces of data for which the PDCP discard timer has not expired, transmission or retransmission may be performed by compressing, ciphering, or performing integrity protection based on the header (or data) compression context or security key of a target base station in ascending order of COUNT value. If the reordering timer is running, the timer may be stopped and initialized, and the pieces of received data (PDCP SDU or PDCP PDU) may be sequentially processed and transferred to an upper layer device, and with regard to AM DRB, window state variables may not be initialized, and transmission or retransmission may be performed by compressing, ciphering, or performing integrity protection based on the header (or data) compression context or security key of a target base station in ascending order of the PDCP serial number or COUNT value starting with the first data (PDCP SDU or PDCP PDU) for which successful transfer is not confirmed from the lower layer device.

If the data concatenation procedure or data de-concatenation procedure is not configured for the PDCP layer device in the above (or if a data concatenation procedure or data de-concatenation procedure has been previously configured, but the data concatenation procedure or data de-concatenation procedure is not configured through the RRC message (RRCReconfiguration message)), the UE may not perform the data concatenation function in the upper layer device. Further, in the above, if the UE receives RRC message (RRCReconfiguration) indicating a handover from the base station, if the RRC message includes ReconfigurationWithSync (handover indicator), if the RRC message includes an indicator (reestablishPDCP) for reestablishment of a PDCP layer device (PDCP re-establishment), or if the RRC message includes security configuration information (security config) for changing the security key, the UE may derive a new security key from the RRC layer device based on the security configuration information and apply the security key to each PDCP layer device. In addition, the UE may perform a PDCP re-establishment procedure in the PDCP layer device. When the PDCP re-establishment procedure is performed in the above, the UE may newly apply the data processing procedure of a PDCP layer device, with regard to data to be retransmitted or data to be transmitted to AM DRB (or data to be retransmitted or data to be transmitted to UM DRB), based on the new security key and transmit. For example, specifically, in the PDCP re-establishment procedure, the UE may apply the data processing procedure of the PDCP layer device to retransmitted data and newly transmitted data as follows. (For example, when performing a handover procedure by a source base station supporting the data concatenation function to a target base station that does not support the data concatenation function, or when performing a handover procedure by a source base station that does not support the data concatenation function to a target base station that does not support the data concatenation function)

When re-applying the data processing procedure (header compression procedure, integrity protection procedure, or ciphering procedure) of the PDCP layer device to data to be retransmitted in the PDCP re-establishment procedure based on the new security key, if the data concatenation procedure has been performed on previously transmitted data, or if the header compression procedure has been configured when newly configuring data to be retransmitted, the UE may newly perform the header compression procedure again, or if pieces of data concatenated during previous transmission has been de-concatenated (or data separation) (or data concatenation function has not been applied), and the integrity protection procedure has been configured for non-concatenated data (different PDCP serial numbers or COUNT values have been allocated), the UE may newly perform the integrity protection procedure for the non-concatenated data based on the new security key, or if a ciphering procedure has been configured, the UE may perform the ciphering procedure on the non-concatenated data based on the new security key. For example, in the transmitting PDCP layer device, the first data and the second data have been configured as PDCP serial number No. 1 and transmitted, and the third data has been configured as PDCP serial number No. 2 and transmitted, but if successful transfer of PDCP serial number No. 1 and No. 2 has not been confirmed from the lower layer device, a retransmission procedure (transfer to the lower layer device) is performed in the PDCP re-establishment procedure. In the above, when the procedure of the PDCP layer device is newly applied using the new security key to the data retransmitted by the PDCP re-establishment procedure, the concatenation is released (or data is separated) for the previously transmitted concatenated data or the data concatenation function is not applied, the first data is configured as PDCP serial number (or COUNT value) No. 1, the second data is configured as PDCP serial number (or COUNT value) No. 2, the third data is configured as PDCP serial number (or COUNT value) as No. 3, and thus the data processing procedure of the PDCP layer device may be applied based on the new security key and transmitted to the lower layer device. In the above, since the transmitting PDCP layer device or the receiving PDCP layer device has been reconfigured such that the data concatenation function is not used, the concatenated data may be regarded as data that has not been successfully transmitted or received, or the PDCP serial number or the COUNT value corresponding to the concatenated data may be considered unused, or may be prevented from being reflected in the window variable update. For example, the UE may not apply the data concatenation function as described above to starting with the first data (or the first concatenated data) for which an indication indicating successful transfer is not received from the lower layer device when performing the PDCP re-establishment procedure, and re-allocate the PDCP serial number (or COUNT value) to each data in ascending order and process data so as to perform retransmission or transmission. In the handover procedure, the source base station (or target base station) may consider the pieces of concatenated data as data, the reception of which is unsuccessful (or considered as pieces of data (including the first concatenated data), the reception of which is unsuccessful in the ascending order of the PDCP serial number or COUNT value, starting with the first concatenated data among the pieces of received data), may consider that the PDCP serial number or COUNT value corresponding to the pieces of data is unused (or not received), may prevent the data from being reflected in the window variable update, or may prevent the data from being transferred. Further, in the above, the source base station (or the target base station) may transmit, to the UE, a PDCP status report regarding the successfully received data or the unsuccessfully received data as described above. Even when a handover procedure is performed to a target base station that does not support the data concatenation function proposed in the disclosure using the above described method, a handover procedure without data loss can be performed.

When applying the data processing procedure (header compression procedure, integrity protection procedure, or ciphering procedure) of the PDCP layer device to data to be newly transmitted in the PDCP re-establishment procedure based on the new security key, if the data concatenation procedure is configured, or if the header compression procedure is configured when configuring data to be transmitted, the UE may perform the header compression procedure, or perform the data concatenation procedure (data concatenation may occur or not), if the integrity protection procedure is configured for concatenated data or data that is not concatenated, the UE may newly perform the integrity protection procedure for the concatenated data or the data that is not concatenated based on the new security key, or if a ciphering procedure is configured, the UE may perform the ciphering procedure on the concatenated data or the data that is not concatenated based on the new security key, and may perform a transmission procedure (transfer to a lower layer device).

Following the above procedure, for example, with regard to UM DRB, window state variables may be initialized, and with regard to data that has not yet been transmitted to a lower layer device or pieces of data for which the PDCP discard timer has not expired, transmission or retransmission may be performed by compressing, ciphering, or performing integrity protection based on the header (or data) compression context or security key of a target base station in ascending order of COUNT value. If the reordering timer is running, the timer may be stopped and initialized, and the pieces of received data (PDCP SDU or PDCP PDU) may be sequentially processed and transferred to an upper layer device, and with regard to AM DRB, window state variables may not be initialized, and transmission or retransmission may be performed by compressing, ciphering, or performing integrity protection based on the header (or data) compression context or security key of a target base station in ascending order of the PDCP serial number or COUNT value starting with the first data (PDCP SDU or PDCP PDU) for which successful transfer is not confirmed from the lower layer device.

In the following of the disclosure, another embodiment of allocating a PDCP serial number (or COUNT value) to concatenated data when the data concatenation function is applied in the PDCP layer device is proposed.

In the above embodiment, the transmitting PDCP layer device may allocate a PDCP serial number (or COUNT value) by considering the number of concatenated data when allocating the PDCP serial number (or COUNT value). Even if the data concatenation function is performed for a plurality of PDCP SDUs as proposed in the disclosure, the actually transmitted PDCP serial number of the PDCP PDU may be allocated using a new method by considering the number of concatenated data such that one PDCP serial number (or COUNT value) may be allocated to each PDCP SDU, mapped thereto, or used. For example, when transmitting the first data (e.g., PDCP SDU) to one PDCP PDU, PDCP serial number (or COUNT value) is assigned 0 and transmitted, and then if the second data (PDCP SDU) and the third data (PDCP SDU) are concatenated, the PDCP serial number (or COUNT value) may be assigned 1 when transmitting the concatenated data to one PDCP PDU. Thereafter, when the fourth data (PDCP SDU) is transmitted to one PDCP PDU, since two pieces of data are concatenated in the previous data (PDCP PDU) and transmitted, the PDCP serial number (or COUNT value) is assigned 3. Thereafter, if the fifth data (PDCP SDU) and the sixth data (PDCP SDU) are concatenated, the PDCP serial number (or COUNT value) is assigned 4 when the concatenated data is transmitted to one PDCP PDU. Thereafter, when the seventh data (PDCP SDU) and the eighth data (PDCP SDU) are concatenated and transmitted to one PDCP PDU, since two pieces of data are concatenated in the previous data (PDCP PDU) and transmitted, the PDCP serial number (or COUNT value) may be assigned 6.

Accordingly, the receiving terminal configured to receive the PDCP PDUs may receive the first data and consider the PDCP serial number (or COUNT value) as 0, may consider the second data as the PDCP serial number (or COUNT value) 1, may consider the third data as the PDCP serial number (or COUNT value) 2, may consider the fourth data as the PDCP serial number (or COUNT value) 3, may consider the fifth data as the PDCP serial number (or COUNT value) 4, may consider the sixth data as the PDCP serial number (or COUNT value) 5, may consider the seventh data as the PDCP serial number (or COUNT value) 6, and may consider the eighth data as the PDCP serial number (or COUNT value) 7.

That is, in the above embodiment, when the transmitting terminal updates the transmission window variable for allocation of the PDCP serial number (or COUNT value), the transmission window variable is increased by the number of PDCP SDUs received from the upper layer device (or increased each time the PDCP SDU is received), or increased by the number of PDCP SDUs transmitted to the lower layer (or increased each time each PDCP SDU is transmitted). Alternatively, when transmitting concatenated PDCP SDUs to one PDCP PDU, a PDCP serial number (or COUNT value) of the PDCP SDU having the smallest PDCP serial number (or COUNT value) among the concatenated PDCP SDUs included in the PDCP PDU may be included as the PDCP serial number in the header of the PDCP PDU and transmitted.

Therefore, upon receiving the PDCP PDU, the receiving terminal may first identify whether the data concatenation function has been applied, and when the data concatenation function has been applied, the receiving terminal may separate PDCP SDUs from the PDCP PDU, may increase the PDCP serial number by 1 in ascending order for each of the separated PDCP SDUs starting with the PDCP serial number included in the PDCP header, may map or configure each PDCP serial number (or COUNT value), may manage reception window variables, and may perform reception data processing.

In the following of the disclosure, methods for reducing data processing complexity of an ARQ operation performed by an RLC layer device of AM DRB configured in the UE are proposed.

The following fifth embodiment is proposed as an embodiment for reducing the data processing complexity of the ARQ operation performed by the RLC layer device of the AM DRB proposed in the disclosure. In the fifth embodiment, when configuring bearer configuration information for a UE through the RRC message as shown in FIG. 5, the base station allows a data segmentation function to be released in the RLC layer device configuration information or suggests the data segmentation function not to be used. For example, the data segmentation function may be configured to be used or not to be used by introducing an indicator through the RRC message or the RLC layer device configuration information. Therefore, since the UE cannot transmit the data due to lack of uplink transmission resource when the data segmentation method is configured not to be used, the data segmentation method is not performed when the data has to be segmented, and instead of transmitting the data, transmission including padding can be performed.

If the data segmentation function is configured not to be used, only one type of RLC header is used in the RLC layer device having various RLC header types according to the data segmentation procedure. Therefore, since the header of each layer device has a fixed size in the PDCP layer device, the RLC layer device, or the MAC layer device, the UE can increase the data processing speed. For example, when applying a hardware accelerator with high efficiency to data processing when repeating the same size or operation as the repeated procedure, if a header with fixed size is used in SDAP, PDCP, RLC, or MAC layer devices in the above, the data processing efficiency is increased and the data processing speed can be reduced. In addition, if the data segmentation function is configured not to be used in the RLC layer device, the RLC status report configuration method can be simplified based on the bitmap, thereby reducing the complexity of the ARQ operation. For example, the ARQ operation can be simplified since there is no need to consider the pieces of segmented data when configuring the RLC status report (that is, there is no need to consider the segment offset (SO) field or the segmentation information (SI) field), and only the RLC serial number field based on the bitmap has to be considered. The bitmap-based RLC status report proposed above may be configured as follows.

In the disclosure, the RX_Next variable is a variable indicating the value obtained by increasing the RLC serial number by one, corresponding to the completely received last RLC SDU in order, or the value of the next RLC serial number of the RLC serial number, and RX_Highest_Status may indicate the highest RLC serial number value, which can be indicated as ACK_SN value in the RLC status report The first configuration method is as follows.

The value of ACK_SN in the RLC status report may be configured as the RLC serial number of the next RLC SDU that is not indicated to be lost in the RLC status report or has not yet been received. In another method, the value of ACK_SN may be configured as the value of the RLC serial number of RX_Highest_Status. In another method, the value of ACK_SN may be configured as the serial number of the first lost RLC SDU, the RLC serial number of the first data that is not transmitted to the upper layer device, the value obtained increasing, by one, the RLC serial number of the last data transmitted to the upper layer device or the RLC serial number value of RX_Highest_Status.

For RLC SDUs having a size of RLC serial number greater than or equal to RX_NEXT or less than RX_Highest_Status The length of the bitmap field may be configured as the length from the RLC serial number, which does not include the first lost RLC SDU, to a multiple of 8, which includes the RLC serial number of the last data out of order. Alternatively, the length of the bitmap field may be considered as the length from the RLC serial number, which does not include the first lost RLC SDU, to the RLC serial number of the RLC SDU, in which the size of RLC control data (RLC status report) matches the size of the transmission resource (transmission resource indicated by the lower layer device). The length may be configured according to a case, which first satisfies the conditions, among the above two cases.

If RLC SDUs corresponding to the bitmap field are not successfully received, the bitmap field corresponding to the RLC SDU may be configured as 0.

If RLC SDUs corresponding to the bitmap field are successfully received, the bitmap field corresponding to the RLC SDU may be configured as 1.

When transmitting the RLC status report, configured as described above, to the lower layer device, the RLC status report may be transmitted to the lower layer device as the first RLC PDU of the transmitting RLC layer device. That is, the highest priority is given to the RLC status report, and if the RLC status report is generated, the RLC status report is transmitted to a lower layer device first so as to enable fast transmission.

The second configuration method is as follows.

For RLC SDUs having a size of the RLC serial number greater than or equal to RX_NEXT or less than RX_Highest_Status, the RLC status report can be configured in an ascending order of the RLC serial number, starting from the RLC serial number value such as RX_Next, and the RLC status report can be configured according to the transmission resource indicated by the lower layer device as follows.

Starting from the RLC serial number value such as RX_Next, one-to-one mapping, from least significant bit ((LSB) or right) or most significant bit (MSB) or left), may be performed on each RLC serial number, in ascending order of the bit value of the bitmap and the RLC serial number.

If RLC SDUs corresponding to the bitmap field are not successfully received, the bitmap field corresponding to the RLC SDU may be configured as 0 (or 1).

If RLC SDUs corresponding to the bitmap field are successfully received, the bitmap field corresponding to the RLC SDU may be configured as 1 (or 0).

The value of ACK_SN in the RLC status report may be configured as the RLC serial number of the next RLC SDU that is not indicated to be lost in the RLC status report or has not yet been received. In another method, the value of ACK_SN may be configured as the value of the RLC serial number of RX_Highest_Status. In another method, the value of ACK_SN may be configured as the serial number of the first lost RLC SDU, the RLC serial number of the first data that is not transmitted to the upper layer device, the value obtained by increasing, by one, the RLC serial number of the last data transmitted to the upper layer device, or the RLC serial number value of RX_Highest_Status.

The length of the bitmap field may be configured as the length from the RLC serial number, which does not include the first lost RLC SDU, to a multiple of 8, which includes the RLC serial number of the last data out of order. Alternatively, the length of the bitmap field may be configured as the length from the RLC serial number, which does not include the first lost RLC SDU, to the RLC serial number of the RLC SDU, in which the size of RLC control data (RLC status report) matches the size of the transmission resource, and the length may be configured according to the case, which first satisfies the conditions, among the above two cases.

When transmitting the RLC status report, configured as above, to the lower layer device, the RLC status report may be transmitted to the lower layer device as the first RLC PDU of the transmitting RLC layer device. That is, the highest priority is given to the RLC status report, and if the RLC status report is generated, the generated RLC status report is transmitted to a lower layer device first so as to enable fast transmission.

As described above, the bitmap-based RLC status report proposed in the disclosure may be defined as the new RLC control data (RLC control PDU). For example, by defining each PDU type field value in the RLC header, an indication can be made to distinguish RLC status report using ACK_SN, NACK_SN, NACK_RANGE, or SO fields and the bitmap-based RLC status report proposed in the disclosure. In another method, by introducing a new indicator in the RLC header, an indication can be made to distinguish the RLC status report using the ACK_SN, NACK_SN, NACK_RANGE, or SO fields and the bitmap-based RLC status report proposed in the disclosure.

The following sixth embodiment is proposed as an embodiment for reducing the data processing complexity performed by the RLC layer device of the UM DRB or AM DRB proposed in the disclosure. In the sixth embodiment, when configuring the bearer configuration information through the RRC message in the UE as shown in FIG. 5, the base station configures to use one RLC header format in the RLC layer device configuration information, to use a new RLC header format, or proposes a data segmentation method (or type of the data segmentation method, an SO field-based method (to be described later in FIG. 22), or an SI field-based method (to be described later in FIG. 24)), or a new function (the UE may use the method proposed in the sixth embodiment without the configuration information according to another method). For example, by introducing an indicator in the RRC message or in the RLC layer device configuration information, the sixth embodiment may be configured to be used or not to be used.

The sixth embodiment proposes a method in which only one type of RLC header can be used even if the data segmentation procedure is used in the RLC layer device having various RLC header types according to the data segmentation procedure. Accordingly, the UE can increase the data processing speed since the header of each layer device has a fixed size in the PDCP layer device, the RLC layer device, or the MAC layer device. For example, when applying a hardware accelerator with high efficiency to data processing when repeating the same size or operation as the repeated procedure, if a header with fixed size is used in SDAP, PDCP, RLC, or MAC layer devices in the above, the data processing efficiency is increased and the data processing speed can be reduced.

A detailed method of the sixth embodiment of the disclosure will be described with reference to FIGS. 23 and 24.

Figure 21:
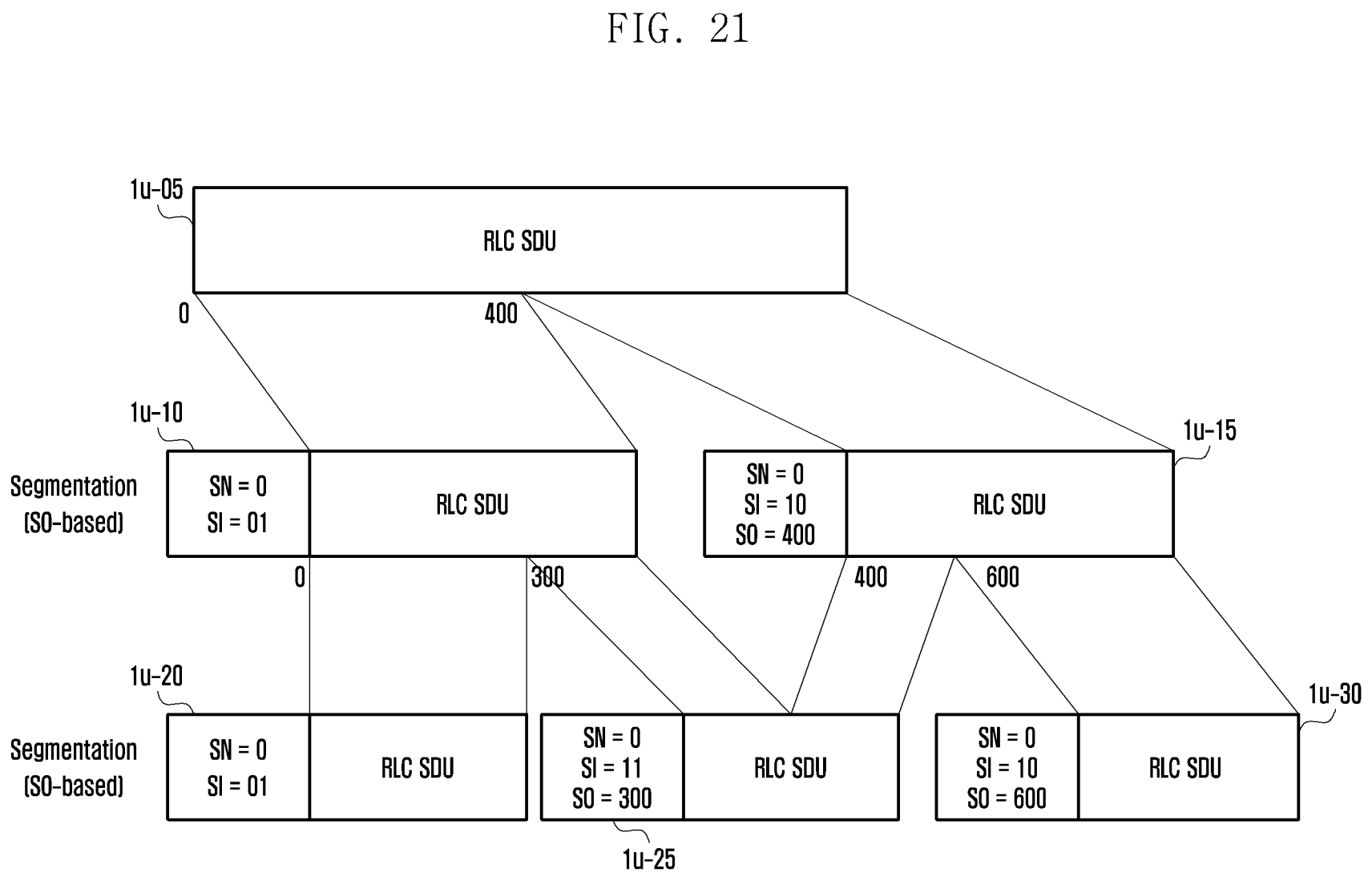

FIG. 21 illustrates an SO-based segmentation operation which can be used in an RLC layer RLC AM mode or RLC UM mode in according to an embodiment of the disclosure.

In the disclosure, a procedure and a method for performing a segment offset (SO)-based segmentation operation on a packet received from an upper layer in the RLC layer may be applied. The proposed method may be characterized in that an integrated segmentation operation is performed for a case of first transmission and a case of retransmission without distinguishing the segmentation operations therefor. Further, the method may be characterized in that concatenation is not performed in the RLC layer. In addition, the method may be characterized in that whether the RLC SDU, which is a data part in the end of the RLC header, is a complete RLC SDU without segmentation, or is the first, the middle, or the last segment of RLC SDU can be distinguished by introducing the SI field in the RLC header. In addition, the method may be characterized in that there is no length field indicating the length in the RLC header.

Referring to FIG. 21, the RLC layer receives a PDCP PDU (RLC SDU) $1u$-05 from the PDCP layer, which is an upper layer. The RLC SDU may be processed to a size indicated by the MAC layer, and if the RLC SDU is segmented, the RLC PDU may be configured by including the segmentation information of the header. The RLC PDU includes an RLC header and an RLC payload (RLC SDU). The RLC header may include the characteristics (data or control information) and segmentation information of the RLC PDU, and may include a D/C field, a P field, an SI field, an SN field, and an SO field. In the above RLC UM mode which does not support ARQ, there is no P field and may be replaced by a reserved field.

The D/C (Data/Control) field is 1 bit and is used to indicate whether the configured RLC PDU is a control PDU or a data PDU.

| Value | Description |
|---|---|
| 0 | Control PDU |
| 1 | Data PDU |

The sequence number (SN) field indicates the serial number of the RLC PDU and may have a predetermined length. For example, the serial number may have a length of 12 bits or 18 bits.

The segment offset (SO) field may have a size of 2 bytes, and indicates a position of the RLC SDU in which the RLC SDU segmentation originally occurs and is used to indicate the first byte of the segmented segment.

With regard to P field, when a condition of triggering a polling at the transmitting terminal occurs, the P field may be configured to be 1 to enable the receiving terminal to perform an RLC status report. That is, ACK/NACK information for RLC PDUs received so far can be transmitted to the transmitting terminal.

When the RLC layer receives the RLC SDU 1u-05, the RLC layer may immediately insert the RLC SN into the RLC SDU, may generate an RLC header, and may configure the RLC PDU. If a segmentation operation is required for a predetermined reason, the RLC PDU may be generated by updating the SI field and adding the SO field to the RLC header, as shown in reference numerals 1u-10 or 1u-15. That is, after the segmentation operation, the SO field may be added or not to the segmented segment according to a predetermined condition. The predetermined condition is determined according to the SI field, which will be described below. The predetermined reason of requiring the segmentation operation may correspond to a case of requesting segmentation operation for a specific MAC SDU (RLC PDU) from the RLC layer since the size of the currently generated MAC subheader and MAC SDU is larger than the size of the transmission resource allocated by the MAC layer. In the above, the sequence number (SN) field is the serial number of the RLC PDU, or if necessary or configured, the PDCP SN may be reused. The segment offset (SO) field is a field having a predetermined length and may indicate that the first byte of the segmented RLC PDU data field (RLC SDU) corresponds to which sequential position of the byte of the original RLC PDU data field (RLC SDU) at the time of initial transmission, and may indicate that the first byte of the re-segmented RLC PDU data field corresponds to which sequential position of the byte of the original RLC PDU data field (RLC SDU) at the time of retransmission. In the above, the SO field may have a fixed length (e.g., 2 bytes) or may be configured by an RRC message (e.g., RRCConnectionSetup or RRCConnectionReconfiguration message) 1e-25, 1e-30, and 1e-45. In the above, the segmentation information (SI) field may be defined as follows or may be called a different name.

| Value | Description |
| --- | --- |
| 00 | A complete RLC SDU |
| 01 | First segment of a RLC SDU |
| 10 | Last segment of a RLC SDU |
| 11 | Middle segment of a RLC SDU |

When the SI field is 00, it indicates a complete RLC SDU that is not segmented, and here, the SO field is not required in the RLC header. When the SI field is 01, it indicates the first of the segmented RLC SDU, and here, the SO field is not required in the RLC header. This is because, in the first segment, the SO field always indicates 0. When the SI field is 10, it indicates the last of the segmented RLC SDU, and here, the SO field is required in the RLC header. When the SI field is 11, it indicates the middle of the segmented RLC SDU, and here, the SO field is required in the RLC header. The mapping relation between the 2 bits and the 4 pieces of information (complete RLC SDU, the first segment, the last segment, and the middle segment) may have a total of 4×3×2×1=24 mappings, and one example is shown in the above. The disclosure includes all of the above 24 mapping cases. If the RLC PDUs 1u-10 and 1u-15 have failed in transmission, retransmission can be performed, and here, if transmission resources are insufficient, re-segmentation may be performed as in reference numerals 1u-20, 1u-25, and 1u-30. During the re-segmentation, the SI field and the SO field of the newly generated RLC PDUs 1u-20, 1u-25, and 1u-30 may be updated. In a case of reference numeral 1u-20, since it is the first segment, the SI is updated to 01, and the SO field is not required.

In a case of reference numeral 1u-25, since it is the middle segment, the SI is updated to 11, and the SO field is updated to 300 so as to indicate that the first byte of the RLC PDU data field (RLC SDU) corresponds to which sequential position of the original RLC PDU data field (RLC SDU). In a case of 1u-30, since it is the last segment, the SI is updated to 10, and the SO field is updated to 600 so as to indicate that the first byte of the RLC PDU data field (RLC SDU) corresponds to which sequential position of the original RLC PDU data field (RLC SDU).

Figure 22:
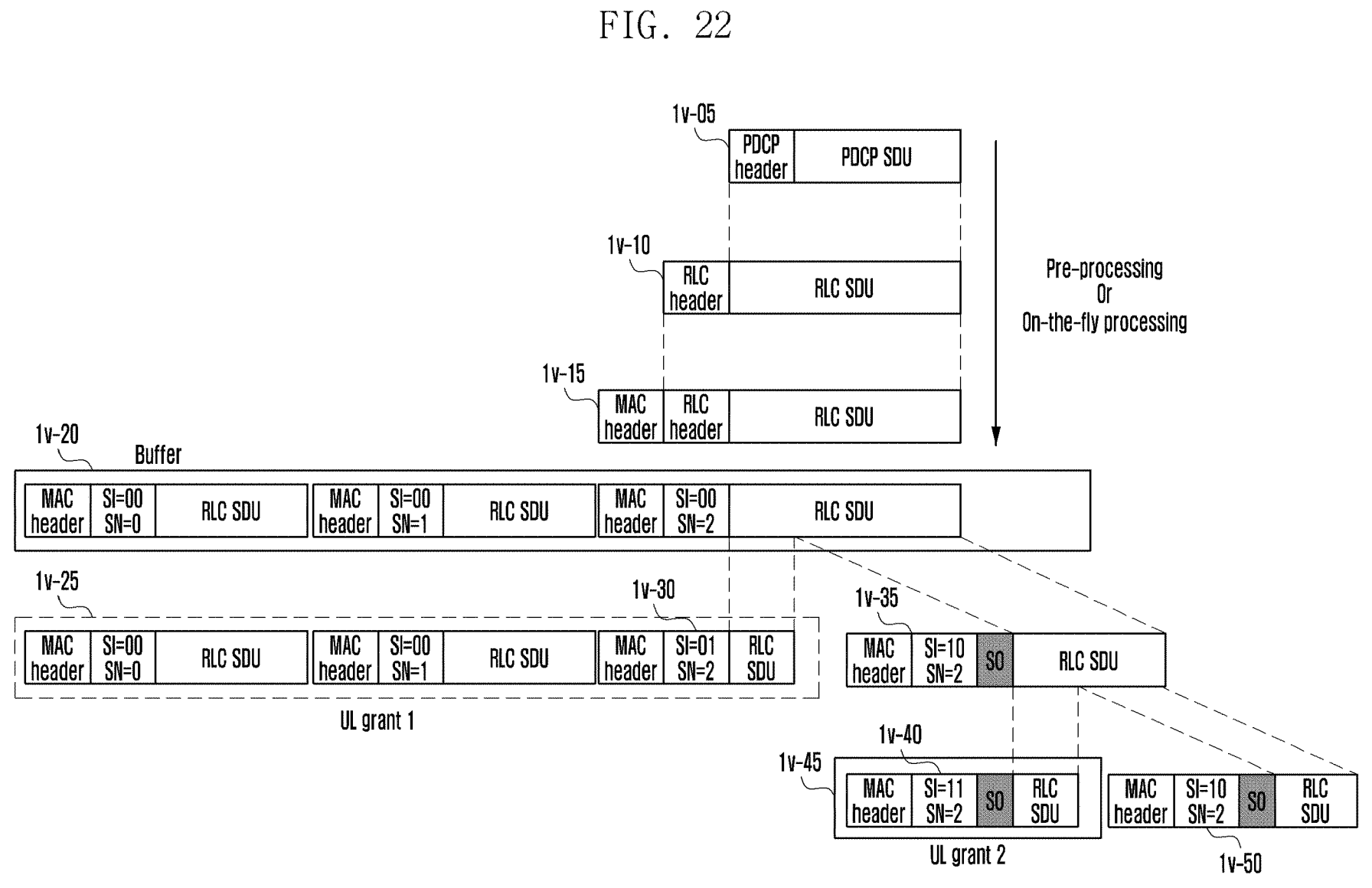

FIG. 22 illustrates a data processing operation to which the SO-based segmentation method of the RLC AM mode or the RLC UM mode proposed in according to an embodiment of the disclosure.

Referring to FIG. 22, when an IP packet arrives at the PDCP layer, a PDCP header is attached thereto, and a PDCP PDU (or RLC SDU) 1v-05 may be transmitted to the RLC layer. The RLC layer may first generate an RLC header, allocate an RLC serial number, and configure the RLC header to complete the RLC PDU 1v-10, and then transfer the RLC PDU to the MAC layer. The MAC layer calculates the size of the MAC SDU (or RLC PDU) to configure the L field, configures a corresponding logical channel identifier and the like, configures the MAC subheader 1v-15, and stores the same in the buffer 1v-20. Therefore, data packets received in the PDCP layer may be stored in a buffer by performing data pre-processing before receiving the transmission resource (UL grant) from the base station, or on-the-fly processing of data can be performed immediately after receiving the transmission resource.

If an uplink transmission resource (UL grant 1) 1v-25 is received from the base station, but the segmentation operation needs to be performed due to insufficient uplink transmission resources, the RLC header of each segment can be newly configured (indicated by reference numerals 1v-30 and 1v-35) after performing the segmentation operation as shown in reference numeral 1v-30 and configuring the SI field to the RLC header of each segment. In addition, as described with reference to FIG. 21, since the SO field needs be added to the middle segment or the last segment other than the first segment, and the offset thereof needs to be indicated, the SO field may be added to the RLC header as shown in reference numeral 1v-35. In addition, the MAC PDU configured according to the uplink transmission resource may be transmitted. If the second uplink transmission resource (UL grant 2) 1v-45 is received, and a segmentation operation needs to performed again due to insufficient uplink transmission resources, the SI field is updated according to the newly segmented segments, the SO field is updated or added, and the RLC header is configured as shown in reference numerals 1v-40 and 1v-50, respectively. Then, the MAC PDU is configured and transmitted according to the uplink transmission resource (UL grant 2).

The SO-based segmentation method is characterized in that the segmented segments have the same RLC serial number of the original RLC PDU even after segmentation operation is performed. Accordingly, the segments segmented in one RLC PDU are identical to the RLC serial numbers of the original RLC PDU (indicated by reference numerals 1v-30, 1v-35, 1v-40, 1v-45, and 1v-50).

The RLC layer may operate in RLC acknowledged mode (AM), RLC unacknowledged mode (UM), and RLC transparent mode (TM). In the RLC AM mode, the RLC layer supports the ARQ function, the transmitting terminal may receive an RLC status report from the receiving terminal and perform retransmission of lost (NACK-received) RLC PDUs through the status report. In a case of performing the retransmission, if the uplink transmission resource is insufficient, a re-segmentation operation may be performed. Therefore, the SO-based segmentation method ensures reliable data transmission without errors and is suitable for services requiring high reliability. In order to efficiently support the ARQ function, accurate information for the lost RLC PDUs is required. Therefore, the SO field can be used valuably. That is, which RLC PDU is lost and which part of the RLC PDU is lost can be more specifically indicated in the RLC status report based on the SO field. When the transmitting terminal receives the specific information of the lost RLC PDU in the SO field, retransmission may be performed by performing the SO-based segmentation operation according thereto.

On the other hand, the ARQ function is not supported in the RLC UM mode. Therefore, the RLC status report is not performed, and there is no retransmission function. In the RLC UM mode, upon receiving an uplink transmission resource or before the reception, the RLC layer of the transmitting terminal configures RLC headers for PDCP PDUs (RLC SDUs) received from an upper layer, and transmits the RLC header to a lower layer. Therefore, continuous data transmission is possible without transmission delay, and it may be useful for services sensitive to transmission delay. Therefore, in the RLC UM mode, the ARQ function is not performed as described above, and since the RLC status report is not performed, specific information such as the SO field is not required in the SO-based segmentation method that may be applied in the RLC AM mode.

Figure 23:
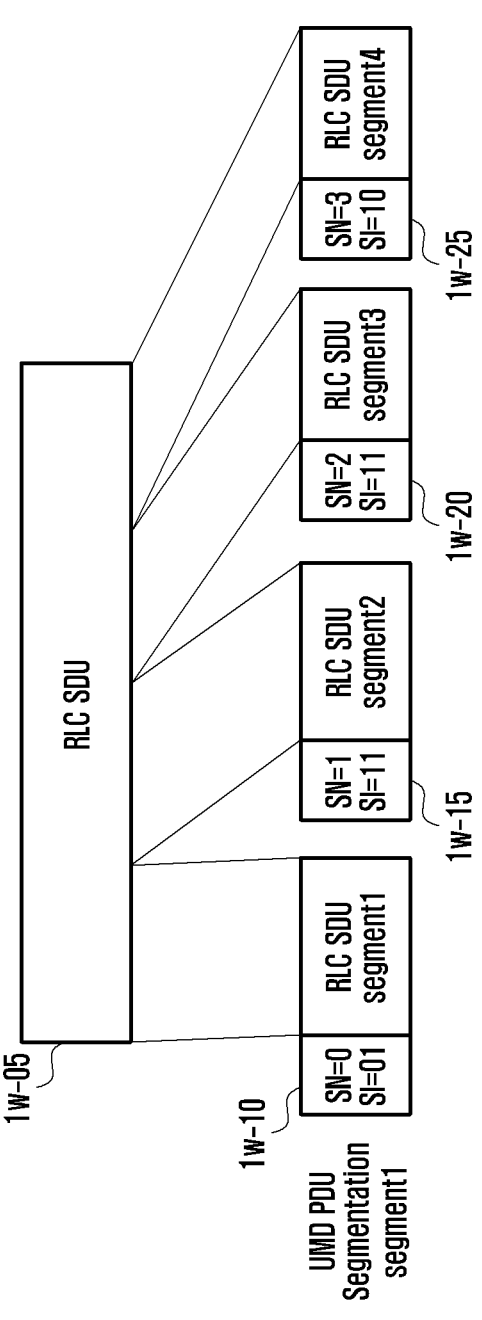
FIG. 23 illustrates an SI field-based segmentation method proposed for an RLC UM mode or RLC AM mode in according to an embodiment of the disclosure.

FIG. 23 illustrates an SI field-based segmentation method proposed for an RLC UM mode or RLC AM mode in according to an embodiment of the disclosure.

The SI field-based segmentation method proposed in FIG. 23 does not require an SO field, unlike the SO field and SI field-based segmentation method proposed in FIG. 21. That is, there is an advantage of having much less overhead. That is, since the SO field corresponding to the 2 bytes is not required, overhead is reduced and waste of transmission resources can be reduced.

There are two major differences between the segmentation method proposed in FIG. 21 and the SI field-based segmentation method proposed in FIG. 23.

1. RLC serial number allocation: In FIG. 21, even if, with regard to one RLC SDU, multiple segments are generated by a segmentation operation, the multiple segments have the same RLC serial number. That is, even if the segmentation operation is performed on one RLC SDU and the four segments are segment 1, segment 2, segment 3, and segment 4, the four segments have the same RLC serial number, and the four segments can be distinguished by indicating offset as the SO field of each segment. On the other hand, in the SI field-based segmentation method proposed in FIG. 23, when four segments are generated (indicated by reference numerals 1*w*-10, 1*w*-15, 1*w*-20, and 1*w*-25) with regard to one RLC SDU 1*w*-05 as described above, different RLC serial numbers are allocated to each segment. That is, RLC serial numbers 0, 1, 2, and 3 are allocated to respective segments, and the SI field is configured according to whether it is the first segment, the middle segment, or the last segment. Therefore, the sequence of respective segments can be distinguished using the SI field, and if three or more segments are generated, several segments in the middle (segments having the same SI field) can be distinguished in the order of the RLC serial number. Accordingly, at the receiving terminal, reassembling is possible only with the combination of the RLC serial number and the SI field (without the SO field).

2. SO field is not used: In FIG. 21, since the same RLC serial number is allocated to each segment, SO field is required for distinguishing the segments, but in FIG. 23, SO field is not required since different RLC serial numbers are allocated to each segment and the SI field is also configured.

In the above, the segmentation information (SI) field may be defined as follows or may be called a different name.

| Value | Description |
|-------|-------------|
| 00 | A complete RLC SDU |
| 01 | First segment of a RLC SDU |
| 10 | Last segment of a RLC SDU |
| 11 | Middle segment of a RLC SDU |

When the SI field is 00, it indicates a complete RLC SDU, and when the SI field is 01, it indicates the first of the segmented RLC SDU, when the SI field is 10, it indicates the last of the segmented RLC SDU, when the SI field is 11, it indicates the middle of the segmented RLC SDU. The mapping relationship between the 2 bits and the 4 pieces of information (complete RLC PDU, the first segment, the last segment, and the middle segment) may have a total of $4 \times 3 \times 2 \times 1 = 24$ mappings, and one example in shown in the above. The disclosure includes all of the above 24 mapping cases.

Figure 24:
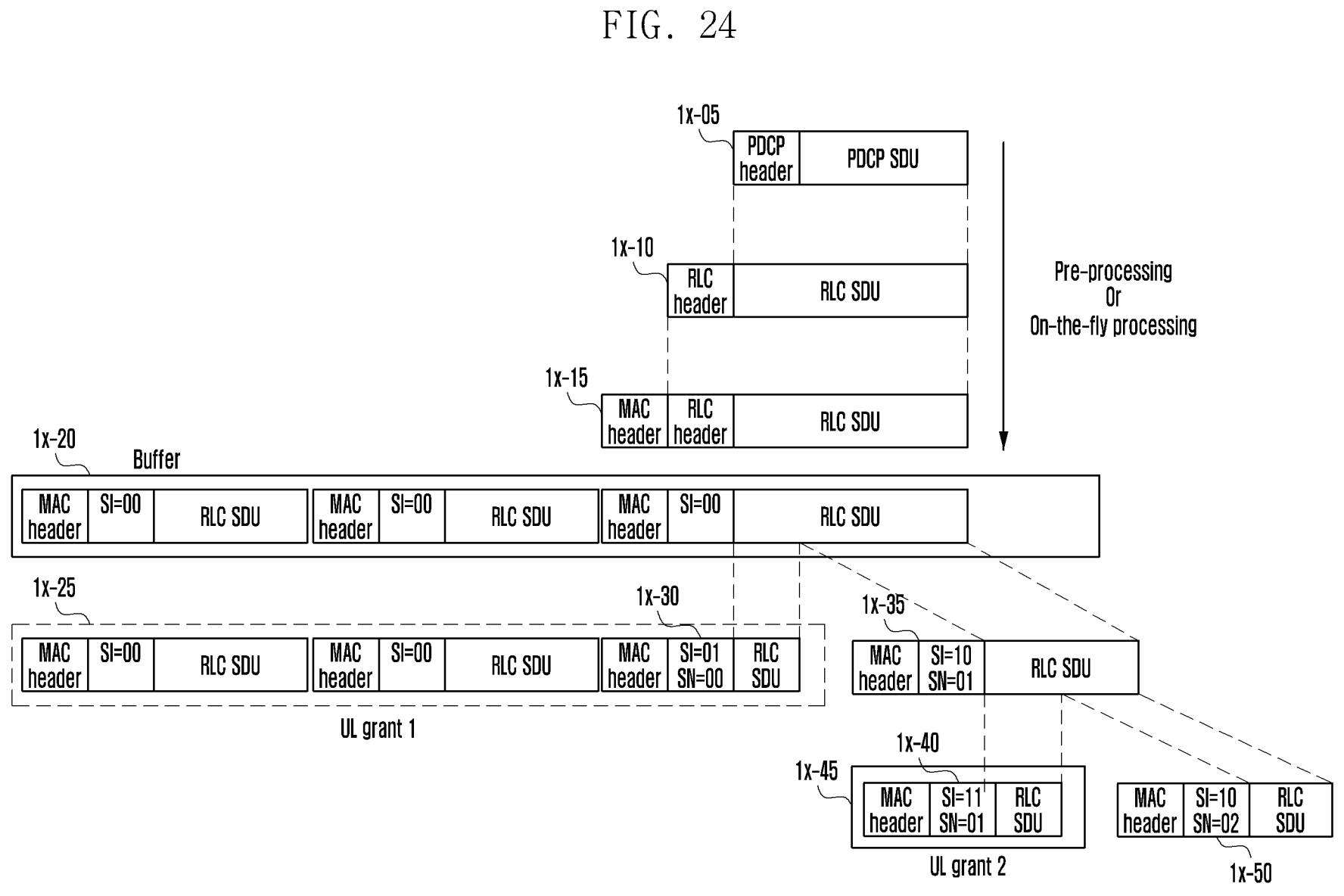

FIG. 24 illustrates a data processing operation to which the SI-based segmentation method of the RLC UM mode or the RLC AM mode proposed in according to an embodiment of the disclosure.

Referring to FIG. 24, when an IP packet arrives at the PDCP layer, a PDCP header may be attached thereto, and a PDCP PDU (or RLC SDU) 1*x*-05 may be transferred to the RLC layer. A characteristic of the RLC UM mode proposed in the disclosure is that an RLC serial number is not assigned to an RLC PDU in which a segmentation operation is not performed. Therefore, in the RLC layer, the RLC PDU 1*x*-10 can be completed by configuring the RLC header without assigning the RLC serial number, and then transferred to the MAC layer. The MAC layer calculates the size of the MAC SDU (or RLC PDU) to configure the L field, configures the corresponding logical channel identifier and the like, configures the MAC subheader 1*x*-15, and stores the same in a buffer 1*x*-20. Therefore, data packets received in the PDCP layer may be stored in a buffer by performing data pre-processing before receiving the transmission resource (UL grant) from the base station, or on-the-fly processing of data can be performed immediately after receiving the transmission resource.

If an uplink transmission resource (UL grant 1) 1*x*-25 is received from the base station, but the segmentation operation needs to be performed due to insufficient uplink transmission resources, the RLC header of each segment can be newly configured (indicated by reference numerals 1*x*-30 and 1*x*-35) after assigning different RLC serial numbers to the RLC header of respective segment, and configuring the SI field according to whether the original RLC PDU is the first segment, the middle segment, or the last segment, as shown in reference numeral 1*x*-30. In addition, the MAC PDU may be configured according to the uplink transmission resource and be transmitted. If the second uplink transmission resource (UL grant 2) 1*x*-45 is received but the segmentation operation needs to be performed again due to the insufficient size of the transmission resource, the same RLC serial number is applied to the first segment, which is re-segmented again from the segment, and update is performed to the SI field according to whether the original RLC PDU is the first segment, the middle segment, or the last segment, as shown in reference numeral 1x-40. In addition, as shown in reference numeral 1x-50, a new RLC serial number is allocated to the newly segmented segment, and the RLC header may be newly configured after configuring the SI field of the segment, which is generated by performing the segmentation operation, to correspond to whether the first segment, the middle segment, or the last segment of the original RLC PDU.

Therefore, it can be seen that the transmission/reception operation in the RLC UM mode proposed in FIG. 23 proposed in the disclosure operates well even in the data pre-processing procedure as described above.

In the RLC layer device in the AM mode in the disclosure, when the data segmentation method is configured not to be used or is not used, the UE may improve the data processing speed of the receiving terminal by using the bitmap-based RLC status report, which is proposed in the disclosure, or by configuring and transmitting the bitmap-based RLC status report. In another method, when the data segmentation method is configured not to be used or is not used in the RLC layer device in the AM mode in the disclosure, the UE may use the RLC status report using ACK_SN, NACK_SN, NACK_RANGE, or SO fields, or may configure and transmit the RLC status report.

When the SI field-based data segmentation method proposed in the disclosure is configured or used in the RLC layer device in the AM mode, the UE may improve the data processing speed of the receiving terminal by using the bitmap-based RLC status report, which is proposed in the disclosure, or by configuring and transmitting the bitmap-based RLC status report. In another method, when the SI field-based data segmentation method proposed in the disclosure is configured or used in the RLC layer device in the AM mode, the UE may use the RLC status report using ACK_SN, NACK_SN, NACK_RANGE, or SO fields, or may configure and transmit the RLC status report.

When the SI field-based data segmentation method proposed in the disclosure is configured or used in the RLC layer device in the AM mode, the UE may apply the following methods when the data re-segmentation is required. In the above, the data re-segmentation may be performed in a case in which the uplink transmission resource is insufficient when retransmission is performed on data that has already been transmitted (e.g., segmented data or complete (non-segmented) data) (e.g., a case in which some data has already been transmitted but the RLC status report indicates that the receiving is unsuccessful and thus retransmission is required) and thus requires application of the data segmentation method again on the above data (e.g., segmented data).

First method: In the first method, when the SI field-based data segmentation method proposed in the disclosure is configured or used in the RLC layer device in the AM mode, the data segmentation may be configured not to be allowed. For example, due to insufficient uplink transmission resources when retransmission is performed on data that has already been transmitted (e.g., segmented data or complete (non-segmented) data) (e.g., a case where some data has already been transmitted but the RLC status report indicates that the receiving is unsuccessful and thus retransmission is required), if a case of applying the data segmentation method again on the above data (e.g., segmented data or complete (non-segmented) data) occurs, the data segmentation method is not applied again or the data re-segmentation is not performed on the above data, and the above data may not be transmitted since the transmission resource is insufficient for transmission without the re-segmentation of the above data. Alternatively, with regard to the above transmission resource, padding may be transmitted instead of the data. Thereafter, when the uplink transmission resource large enough to transmit the data is received, the data may be transmitted.

Second method: In the second method, when the SI field-based data segmentation method proposed in the disclosure is configured or used in the RLC layer device in the AM mode, if the data segmentation method is required to be performed for the first transmitted data due to insufficient transmission resource, the SI field-based data segmentation method proposed in the disclosure may be applied. However, due to insufficient uplink transmission resources when retransmission is performed on data that has already been transmitted (e.g., segmented data or complete (non-segmented) data) (e.g., a case where some data has already been transmitted but the RLC status report indicates that the receiving is unsuccessful and thus retransmission is required), if a case in which the data segmentation method is required to be performed again on the above data (e.g., segmented data) (that is, a case in which data re-segmentation is required to be performed) occurs, the data re-segmentation procedure may be performed by applying the SO-field based data segmentation method, proposed in the disclosure, on the above data (e.g., RLC SDU). In the above, a new indicator may be introduced in the RLC header to indicate whether the SO field-based data segmentation method is applied, the SI field-based data segmentation method is applied, or data re-segmentation is performed. In addition, when the receiving RLC layer device receives the data for which the data re-segmentation procedure is performed as described above, the RLC status report using ACK_SN, NACK_SN, NACK_RANGE, or SO fields or a bitmap-based RLC status report are configured and transmitted to the transmitting RLC layer device.

Figure 25:
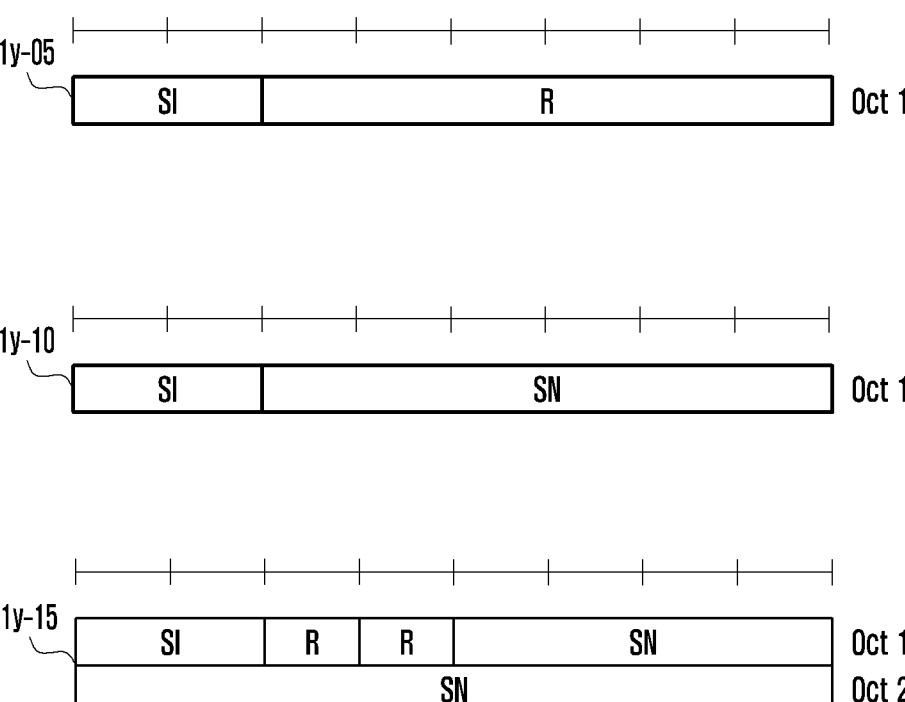
FIG. 25 illustrates an RLC header structure applicable in an RLC UM mode or an RLC AM mode proposed in according to an embodiment of the disclosure.

FIG. 25 illustrates an RLC header structure applicable in the RLC UM mode or the RLC AM mode proposed in according to an embodiment of the disclosure.

The RLC header structure may include some or other new fields among the fields described in FIG. 23, and may have a different structure according to the length of each field, such as a different RLC serial number length, and according to the position of each field. "R" refers to a reserved bit, and the RLC header structure may include no RF field and E field. In the above, the SI field indicates a complete RLC SDU for which the segmentation operation is not performed, and the first segment, the middle segment, and the last segment for which the segmentation operation is performed.

In a case of the RLC UM mode proposed in the disclosure, the RLC serial number is not used and is not required for the complete RLC SDU (RLC SDU for which the segmentation operation is not performed). In fact, there are many reasons for requiring the RLC serial number. That is, the RLC serial number is required for reordering, duplicate checking, lost packet detection or ARQ function support, and reassembling of segmented segments. However, in a next-generation mobile communication system, there is no need to perform reordering in the RLC layer, and the duplicate checking can be performed by the PDCP layer, and the lost packet detection or ARQ functions are not supported in the RLC UM mode. Therefore, the RLC serial number is only required for the segmented RLC PDU segment. Therefore, the RLC serial number is not required in the complete RLC PDU.

In the disclosure, in a case of the RLC UM mode, the RLC serial number is not used in the complete RLC PDU, and a header format such as reference numeral 1y-05 is proposed (if whether an RLC SN or an RLC header exists is indicated by a 1-bit indicator in the MAC subheader of the MAC layer, the RLC header itself can be omitted without using a header format such as 1y-05 for the complete RLC PDU. Here, the receiving terminal may identify the indicator of the MAC subheader, and may identify that there is no RLC header and whether it is a complete RLC PDU). That is, with regard to the RLC PDU that has not been performed segmentation operation, the transmitting terminal may indicate that there is no RLC serial number by indicating the SI field of the header of reference numeral 1y-05 as 00 to indicate that it is a complete RLC PDU, and the receiving terminal may identify that there is no RLC serial number if the SI field of the header is identified as 00. Therefore, the header structure is independent of the length of the RLC serial number. The 1-byte header such as reference numeral 1y-05 may be used for the complete RLC PDU.

In addition, with regard to the first RLC PDU segment for which the segmentation operation has been performed, an RLC serial number is assigned as described above, and the RLC header may be used in the format of 1y-10 (when using a 6-bit length of RLC serial number) or 1y-15 (when using a 12-bit length of RLC serial number). However, a new continuous RLC serial number is allocated, to the middle segment and the last segment generated by performing the segmentation operation, respectively, and the RLC header format, such as 1y-10 (when using a 6-bit length of RLC serial number) or 1y-15 (when using a 12-bit length of RLC serial number), may be used by configuring the SI field according to each segment. As described above, RLC serial numbers are required for segments for which the segmentation operation has been performed. This is because, only when there is an RLC serial number, it is possible to distinguish which segments have which RLC serial number sequence, and based on this, the receiving terminal may perform reassembling to generate a complete RLC PDU, may perform data processing, and may transmit the RLC SDU to the upper layer. Therefore, the receiving terminal may reassemble the segmented segments into a complete RLC PDU using the RLC serial number and the SI field.

In addition, in the RLC AM mode, the RLC serial number is always included for each data (or regardless of whether data segmentation occurs), and a format of 1y-10 or 1y-15 may be used.

In the disclosure, the operation of the transmitting terminal applying the SI-based segmentation method without using a serial number in the RLC UM mode is as follows.

If the RLC serial number is configured not to be used in the transmitting terminal RLC layer device, the transmitting terminal may perform transmission by attaching a 1-byte RLC header, such as 1y-05 without the RLC serial number, to the RLC SDU for which the segmentation operation is not performed (when configuring the RLC header, the SI field is configured to be 00 and the operation of configuring the RLC header is performed) and transmitting the same to the lower layer. However, if the RLC SDU segmentation operation is performed even when the RLC serial number is configured not to be used to reduce overhead, the RLC serial number should be added and the SI field should be configured as described in FIG. 23. The reason for configuring the RLC header by allocating a new continuous RLC serial number to each segment and configuring the SI field with regard to the segmented RLC SDU is to receive the segmented RLC SDU segments by the receiving terminal and reassemble RLC SDU segments to restore a complete the RLC SDU. Therefore, even when the RLC serial number is configured not to be used in the RLC UM mode, if a segmentation operation is performed, RLC headers such as 1y-10 and 1y-15 should be applied.

In summary, the transmitting terminal performs transmission according to whether the segmentation operation of the RLC SDU has been performed, that is, with regard to the RLC SDU for which the segmentation operation is not performed, a 1-byte RLC header such as 1y-05 without the RLC serial number is attached thereto and transmitted to a lower layer, and with regard to the RLC SDU for which the segmentation operation has been performed, the corresponding SI field is updated according to the type of segments (first, middle, last segments), and different consecutive RLC serial numbers are added in order to configure the RLC header and transmitted to the lower layer as described above.

In the disclosure, the operation of the receiving terminal with respect to the operation of the transmitting terminal applying the SI-based segmentation method without using a serial number in the RLC UM mode is as follows.

The receiving terminal RLC layer device receives the RLC PDU, identifies the SI field in the RLC header, and distinguishes whether the received RLC PDU is an RLC PDU for which no segmentation operation is performed (complete RLC PDU) or an RLC PDU for which the segmentation operation is received (segmented RLC PDU). If it is an RLC SDU for which the segmentation operation is not performed, the RLC header may be deleted and transmitted to an upper layer. If it is an RLC SDU for which the segmentation operation is performed, the receiving terminal RLC layer device identifies the SI field, identifies whether it is the first, the middle, or the last segment, stores and organizes the segments according to the RLC serial number, if the reassembly function is triggered by a window or a timer, reassembles the segments to generate a complete RLC SDU and transmit the same to the upper layer, and if reassembly is impossible, discards the segments (or the packets remaining in the buffer can be immediately discarded when the timer expires).

The procedure described in FIG. 24 can be easily extended to the procedure of the RLC AM mode, the only difference is that the RLC serial number is included for the complete data (complete RLC SDU) as well as the segmented data regardless of whether the data is segmented or not. Therefore, in consideration of this difference, the contents of the disclosure can be easily extended to the RLC AM mode.

In the disclosure, an embodiment of the operation of the RLC layer device of the transmitting terminal and the receiving terminal in the RLC UM mode is as follows.

In the transmitting terminal RLC UM mode device, a variable called VT(S) can be managed (it can be reused as another variable or called a different name). The variable VT(S) is an RLC serial number value allocated to segments for which the segmentation operation has been performed in the transmitting terminal, and the segmented segments for one RLC SDU have different RLC serial numbers, that is, different VT(S). The receiving terminal may configure the timer, which is configured by the base station, and the timer value. The VT(S) value may be initially configured as zero.

If data is generated in the RLC UM mode at the transmitting terminal (or data is received from an upper layer device), the RLC UM PDU may be configured, and the MAC SDU and MAC subheader may also be configured.

Thereafter, when the transmitting terminal identifies or receives the transmission resource, the transmitting terminal determines whether to perform segmented transmission of the RLC UM PDUs according to the size of the transmission resource. In a case of a complete RLC PDU that does not perform segmented transmission, a 1-byte RLC header not including the RLC serial number is configured (indicated by reference numeral 1g-05), and the VT(S) value is maintained. That is, the RLC serial number is not allocated. If it is determined to perform a segmented transmission for a predetermined RLC PDU, a header including the RLC serial number is configured (a header such as 1y-05 is configured).

When performing segmented transmission in the above, a new RLC serial number (a new VT(S) value) is allocated to each segment and the VT(S) value is increased by 1. That is, whenever a new RLC serial number (a new VT(S) value) is allocated to each segment, the VT(S) value is increased by 1. Further, when the segmentation operation is also performed on the next RLC PDU, the RLC serial number is continuously incremented and allocated. In addition, when the value of VT(S) reaches the maximum value ($2^{\wedge}$(length of RLC serial number)$-1$), the VT(S) value resets to 0 again and the above process is repeated again. If the above procedure is applied to the RLC AM mode, a new RLC serial number (a new VT(S) value) may be allocated for each segment or complete data (RLC SDU) in the AM mode, and the VT(S) value may be increased by 1.

When the receiving terminal RLC layer device operates on a window basis, the receiving terminal operates the RLC reception window, and the window may be operated with the size of half of the RLC serial number. Further, in a case of the lower edge of the window, a serial number obtained by subtracting the size of the RLC window at the upper edge may be configured, and the upper edge may be configured as the highest RLC serial number received from the receiving terminal RLC. Therefore, if the received RLC serial number has a higher value than the RLC serial numbers in the window, the window moves accordingly. If the serial number of the received RLC PDU has a value greater than the received upper edge of the window, the window moves forward.

On the other hand, if the serial number of the received RLC PDU has a value smaller than the received lower edge of the window, the receiving terminal RLC layer may discard the serial number, and may check whether a duplicate RLC PDU is received with regard to the RLC serial number within the window and discard the duplicated serial number. Further, when the RLC PDU segment having the RLC serial number in the window is arrived, it is stored and when the lower edge of the window passes the RLC serial number corresponding to the RLC PDU segment, a reassembly procedure is performed to generate a complete RLC PDU and transmit to the upper layer. Further, when a complete RLC PDU is not generated, an operation of discarding RLC PDU segments may be performed. In addition, the receiving terminal RLC layer identifies the SI field, and in a case of an RLC PDU for which the segmentation operation is not performed, immediately transmits the RLC PDU to an upper layer. Further, when the SI field indicates the RLC PDU for which the segmentation operation is performed, stores the RLC PDU, and when the reassembly procedure is triggered by the window as described above (the lower edge moves to a value larger than the RLC serial number of the segments), an operation of transmitting the RLC PDU to the upper layer or discarding the same is performed.

In the following of the disclosure, the operation of the transmitting RLC layer device and the operation of the receiving RLC layer device are proposed when the SI field-based data segmentation method or the SO field-based data segmentation method proposed in the disclosure is configured (or used) with regard to RLC UM mode (UM data transfer).

The transmitting UM RLC layer device performs the following operation when transmitting data (UMD PDU) to a lower layer device.

1> If the SI field-based data segmentation method is configured not to be used, or if the SO field-based data segmentation method is configured to be used, 2> If the data (UMD PDU) includes RLC SDU segment, 3> The RLC serial number of the data (UMD PDU) is configured as the value of the UM_TX_Next variable.

2> If the data includes a segment that maps (or matches) the last byte of the RLC SDU, 3> The UM_TX_Next value is increased by 1.

1> Otherwise (or if the SI field-based data segmentation method is configured to be used, or if the SO field-based data segmentation method is configured not to be used), 2> If data (UMD PDU) includes segments of the RLC SDU, the RLC serial number of the data (UMD PDU) is configured as the value of the UM_TX_Next variable. Then, the UM_TX_Next value is increased by 1.

The receiving UM RLC layer device performs the following operation when storing data (UMD PDU), corresponding to the RLC serial number x, in a buffer.

1> If all byte segments corresponding to the RLC serial number x have been received, and/or the SI field-based data segmentation method is not configured, 2> The RLC SDU is reassembled into all byte segments corresponding to the RLC serial number x, the RLC header is removed, and the reassembled RLC SDU is transmitted to the upper layer device.

1> Otherwise, if all byte segments corresponding to the data (RLC SDU or UMD PDU) have been received, and/or the SI field-based data segmentation method is configured, 2> The RLC SDU is reassembled into all byte segments corresponding to the data (RLC SDU or UMD PDU), the RLC header is removed, and the reassembled RLC SDU is transmitted to the upper layer device.

In the above, the UM_TX_Next variable is a variable storing an RLC serial number value to be allocated for data to be newly generated next (data including a segment). The initial value of the variable is 0.

In the following of the disclosure, the operation of the transmitting RLC layer device and the operation of the receiving RLC layer device are proposed when the SI field-based data segmentation method or when the SO field-based data segmentation method proposed in the disclosure is configured (or used) with regard to the RLC AM mode (AM data transfer).

The transmitting AM RLC layer device performs the following operation for each RLC SDU received from an upper layer device.

1> If the SI field-based data segmentation method is configured not to be used, or if the SO field-based data segmentation method is configured to be used, 2> The RLC serial number of the RLC SDU is configured as the same value as AM_TX_Next, and the RLC serial number of the AMD PDU is configured as the same value as AM_TX_Next to generate the AMD PDU.

2> The AM_TX_Next value is increased by 1.

The transmitting AM RLC layer device performs the following operation when transmitting data (AMD PDU) including the segment of the RLC SDU to the lower layer device.

1> If the SI field-based data segmentation method is configured not to be used, or if the SO field-based data segmentation method is configured to be used, 2> The RLC serial number of the data (AMD PDU) is configured as the RLC serial number corresponding to the RLC SDU.

The transmitting AM RLC layer device performs the following operation when transmitting data (AMD PDU) to a lower layer device.

1> If the SI field-based data segmentation method is configured to be used,

2> The RLC serial number of the data (AMD PDU) is configured as the AM_TX_Next value, and the AM_TX_Next value is increased by 1.

The receiving AM RLC layer device performs the following operation when storing data (AMD PDU) corresponding to the RLC serial number x in a buffer.

1> If all byte segments of the RLC SDU corresponding to the RLC serial number x have been received, and/or the SI field-based data segmentation method is not configured, 2> The RLC SDU is reassembled into AMD PDUs or all byte segments corresponding to the RLC serial number x, the RLC header is removed, and the reassembled RLC SDU is transmitted to the upper layer device.

1> Otherwise, if all byte segments corresponding to the data (RLC SDU or AMD PDU) have been received, and/or if the SI field-based data segmentation method is configured, 2> The RLC SDU is reassembled into all byte segments corresponding to the data (RLC SDU or AMD PDU), the RLC header is removed, and the reassembled RLC SDU is transmitted to the upper layer device.

In the above, the AM_TX_Next variable is a variable which stores the RLC serial number value to be allocated for data to be newly generated next. The initial value of the variable is 0.

Figure 26:
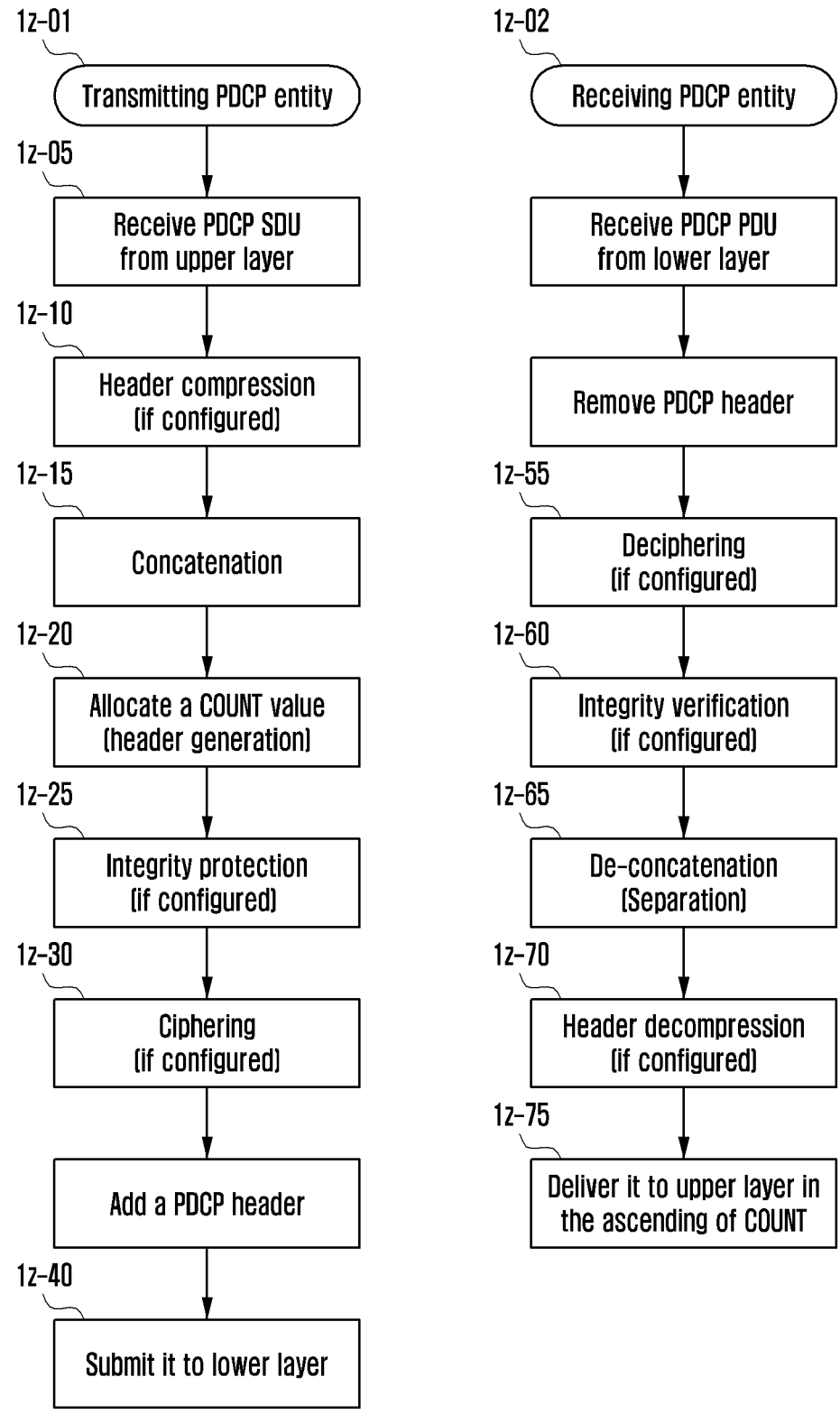
FIG. 26 illustrates an operation of a PDCP layer device of a UE proposed above in according to an embodiment of the disclosure.

FIG. 26 illustrates an operation of a PDCP layer device of a UE proposed above in according to an embodiment of the disclosure.

If the data concatenation procedure proposed in FIG. 26 is configured or performed in the PDCP layer device, the data concatenation procedure proposed in the disclosure is characterized in that, if data is received from an upper layer device (operation 1z-05), the data concatenation procedure 1z-15 is applied or performed for pieces of data for which the header compression procedure is applied or performed (if the header compression procedure is configured) (operation 1z-10) at a transmitting PDCP device (operation 1z-01) but the integrity protection procedure 1z-25 or ciphering procedure 1z-30 is not applied or not performed therefor. In another method, the data concatenation procedure proposed in the disclosure is applied or performed for pieces of data, to which the header compression procedure is applied, before the transmitting PDCP layer device applies or performs the integrity protection procedure or ciphering procedure although the header compression procedure is applied or performed. Therefore, the length field (e.g., LI field), among new fields generated in the data concatenation procedure 1z-15, may configure the length of data to which the header compression procedure is applied as a byte unit value. For example, if a header compression procedure, an integrity protection procedure, or a ciphering procedure are established, the header compression procedure may be applied or performed for each data, the data concatenation procedure may be performed or applied for pieces of data, and then the integrity protection procedure 1z-25 or ciphering procedure 1z-30 may be performed for the concatenated data. This is because the number or frequency of performing the integrity protection procedure or the ciphering procedure can be minimized and the data processing time can be reduced only when the integrity protection procedure or the ciphering procedure is simultaneously applied to the concatenated data.

On the other hand, since applying or performing the header compression procedure to each data of concatenated data results in high complexity of implementation, it is convenient to perform data concatenation after performing the header compression procedure in advance, and the length field indicating the length of each concatenated data can be reduced to thereby reduce overhead. In addition, when applying the integrity protection procedure or ciphering procedure to one concatenated data, obtained by concatenating multiple pieces of data in the above, the integrity protection procedure or ciphering procedure is performed on the concatenated data using a single COUNT value (operation 1z-20), so as to enable single processing using one set of security key values (such as a COUNT value, bearer identifier, or security key) and to shorten the data processing time. For example, if pieces of data are not concatenated in the above, a large amount of data processing time is needed because the integrity protection or ciphering procedure needs to be performed multiple times based on different sets of security key values using a different COUNT value for each data. Further, when applying or performing the data concatenation procedure to the pieces of data, the data concatenation procedure may be applied in a sequence in which pieces of data are received first from an upper layer device, or the pieces of data can be concatenated, by the concatenation procedure, in a sequence in which the pieces of data are placed in front. This is because, only if data concatenation occurs in order of placement from the front when performing the data concatenation procedure, the receiving terminal may separate the concatenated data and may sequentially transfer the pieces of separated data to the upper layer device. For example, pieces of data concatenated to concatenated data, to which one PDCP serial number is assigned, are arranged in a sequence in which data is received first from an upper layer device (operations 1z-15 and 1z-40).

If the data concatenation procedure proposed in FIG. 26 above is configured or performed in the PDCP layer device, the data de-concatenation procedure 1z-65 proposed in the disclosure is applied or performed with regard to concatenated data to which a deciphering procedure 1z-55 or an integrity verification procedure 1z-60 has been applied or performed at a receiving PDCP layer device 1z-02, and a header decompression procedure 1z-70 may be applied to each of pieces of de-concatenated data.

In another method, the data de-concatenation procedure proposed in the disclosure is applied or performed for the concatenated data after the receiving terminal (UE or base station) applies or performs the deciphering procedure or integrity verification procedure, and a header decompression procedure may be applied to respective pieces of de-concatenated data. For example, if the header compression procedure, ciphering procedure, or integrity verification procedure are configured, the deciphering procedure or the integrity verification procedure may be performed on the received concatenated data, and then a data de-concatenation procedure may be performed on the concatenated data and a header decompression procedure may be applied to respective pieces of de-concatenated data. This is because, only when the deciphering procedure or the integrity verification procedure is simultaneously applied to the concatenated data, the number or frequency of performing the deciphering procedure or the integrity verification procedure can be minimized and the data processing time can be reduced.

On the other hand, since applying or performing the header compression procedure to each data of concatenated data results in high complexity of implementation, it is easy for implementation to perform each of the header decompression procedures later after performing data de-concatenation, and the length field indicating the length of each concatenated data can be reduced to thereby reduce overhead. In addition, when applying the deciphering procedure or integrity protection procedure to one concatenated data, obtained by concatenating multiple pieces of data in the above, the deciphering procedure or integrity protection procedure is performed on the concatenated data using a single COUNT value, so as to enable single processing using one set of security key values (such as a COUNT value, bearer identifier, or security key) and to shorten the data processing time. For example, if pieces of data are not concatenated in the above, a large amount of data processing time is needed because the deciphering procedure or integrity protection procedure needs to be performed multiple times based on different sets of security key values using a different COUNT value for each data. Further, when applying or performing the data de-concatenation procedure to the concatenated data, pieces of data may be sequentially separated from the beginning of the concatenated data, and data processing may be performed in a sequence in which the pieces of data are placed in front and the processed data may be transferred to an upper layer device. For example, pieces of data concatenated to concatenated data, to which one PDCP serial number is assigned, need to be transferred to an upper layer device in order of placement from the front (operation 1z-75).

Figure 27:
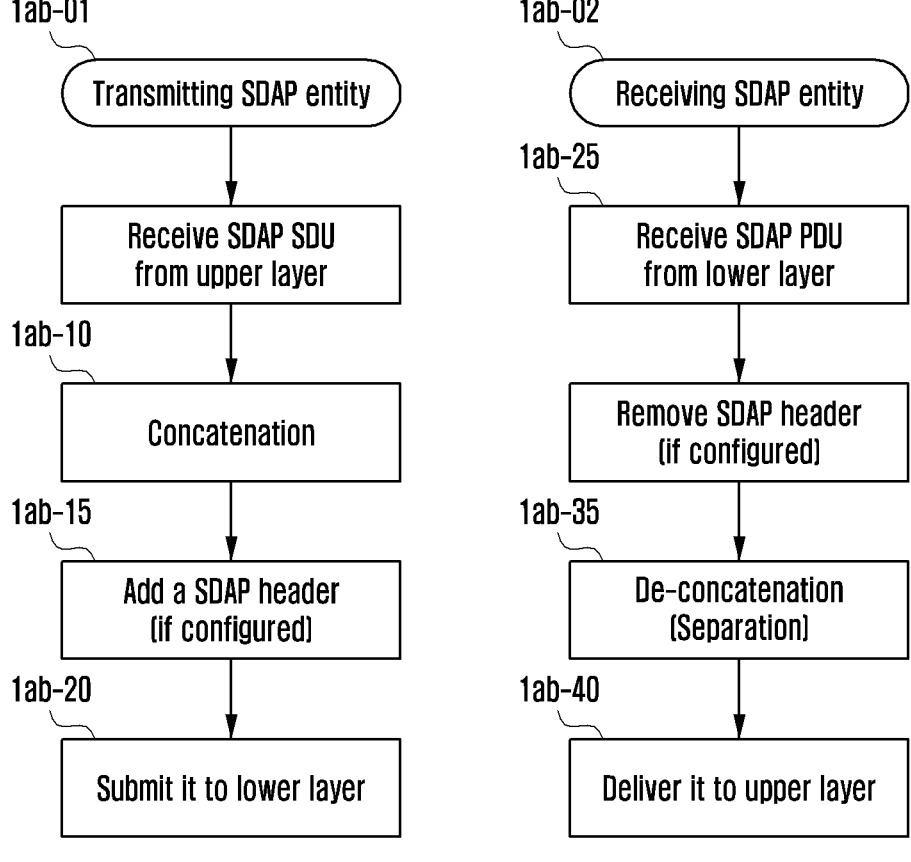
FIG. 27 illustrates an operation of a service data adaptation protocol (SDAP) layer device (or new layer device) of the UE proposed above in according to an embodiment of the disclosure.

FIG. 27 illustrates an operation of an SDAP layer device (or new layer device) of a UE, proposed above in according to an embodiment of the disclosure.

If the data concatenation procedure proposed in FIG. 27 is configured or performed in the SDAP layer device (or new layer device), the data concatenation procedure proposed in the disclosure is applied or performed for pieces of data for which a header compression procedure, an integrity protection procedure, or a ciphering procedure are not applied or not performed at a transmitting SDAP layer device (or new layer device) 1ab-01. In another method, the data concatenation procedure proposed in the disclosure is characterized in that the data concatenation procedure is applied or performed for pieces of data before the transmitting terminal (UE or base station) applies or performs the header compression procedure, integrity protection procedure, or ciphering procedure. Therefore, the length field (e.g., LI field), among new fields generated in the data concatenation procedure, may configure the length of data for which header compression does not occur as a byte unit value. In the above, when the SDAP layer device (or new layer device) performs the data concatenation function, the data concatenation procedure is performed only on the data of the upper layer device corresponding to QoS flow IDs (QoS identifiers) mapped to each bearer, and the concatenation data may be transferred to the PDCP layer device of the bearer.

In another method, the SDAP layer device (or new layer device) performs the data concatenation function and performs the data concatenation procedure for pieces of data of the upper layer device corresponding to QoS flow IDs (QoS identifiers) mapped to each bearer. Specifically, the data concatenation procedure may be applied only to pieces of data corresponding to the same QoS flow ID (QoS identifier), and the concatenated data may be transferred to the PDCP layer device of the bearer. For example, if a header compression procedure, integrity protection procedure, or ciphering procedure are established, the data concatenation procedure 1ab-10 is performed or applied, and then the concatenated data is transferred to the PDCP layer device (1ab-20) to perform the header compression procedure, integrity protection procedures, or ciphering procedures. If the SDAP header is configured in the above, the SDAP header may be configured and attached in front of the concatenated data before transferring the concatenated data to a lower layer device (operation 1ab-15). This is because the number or frequency of performing the integrity protection procedure or the deciphering procedure can be minimized and the data processing time can be reduced only when the integrity protection procedure or ciphering procedure is simultaneously applied to the concatenated data.

In addition, when the integrity protection procedure or ciphering procedure is applied to one concatenated data, obtained by concatenating multiple pieces of data in the above, the integrity protection procedure or ciphering procedure is performed using a single COUNT value to enable single processing using one set of security key values (COUNT value, bearer identifier, or security key) and to shorten data processing time. For example, if multiple pieces of data are not concatenated in the above, a large amount of data processing time is needed because the integrity protection or ciphering procedure needs to be performed multiple times based on different sets of security key values using a different COUNT value for each data.

In addition, when applying or performing the data concatenation procedure to the pieces of data, the data concatenation procedure may be applied in a sequence in which pieces of data are received first from an upper layer device, or the pieces of data can be concatenated, by the concatenation procedure, in a sequence in which the pieces of data are placed in front. This is because, only if data concatenation occurs in order of placement from the front when performing the data concatenation procedure, the receiving terminal may separate the concatenated data and may sequentially transfer the pieces of separated data to the upper layer device. For example, pieces of data concatenated to concatenated data, to which one PDCP serial number is assigned, are arranged in a sequence in which data is received first from an upper layer device (operation 1ab-20).

If the data concatenation procedure proposed in FIG. 27 is configured or performed in the SDAP layer device (or new layer device), the data de-concatenation procedure proposed in the disclosure is applied or performed for concatenated data to which a deciphering procedure, an integrity verification procedure, or a header compression procedure have been applied or performed at a receiving terminal (or new layer device) 1ab-02.

In another method, the data de-concatenation procedure proposed in the disclosure is characterized in that concatenated data is received from a lower layer device (operation 1*ab*-25) and the data de-concatenation procedure 1*ab*-35 is applied or performed therefor, after the receiving terminal (or new layer device) applies or performs the deciphering procedure, integrity verification procedure, or header compression procedure. If the SDAP header is configured above, when data is received from the lower layer device, the SDAP header may be removed and processed (operation 1*ab*-30). For example, if a header compression procedure, ciphering procedure, or integrity verification procedure are configured, a deciphering procedure is performed on the received concatenated data, or an integrity verification procedure or header decompression procedure therefor is performed, and then the data de-concatenation procedure 1*ab*-35 can be performed for concatenated data. This is because the number or frequency of performing the deciphering procedure or the integrity verification procedure can be minimized and the data processing time can be reduced only when the deciphering procedure or the integrity verification procedure is simultaneously applied to the concatenated data.

In addition, when a deciphering procedure or integrity protection procedure is applied to one concatenated data, obtained by concatenating multiple pieces of data in the above, a deciphering procedure or integrity protection procedure is performed using a single COUNT value to enable single processing using one set of security key values (such as COUNT value, bearer identifier, or security key) and to shorten data processing time. For example, if pieces of data are not concatenated above, a large amount of data processing time is required because integrity protection or ciphering procedures need to be performed multiple times based on a set of different security key values using a different COUNT value for each data. In addition, when applying or performing the data de-concatenation procedure to the concatenated data, pieces of data may be sequentially separated from the beginning of the concatenated data, and data processing may be performed in a sequence in which the pieces of data are placed in front and the processed data may be transferred to an upper layer device. For example, pieces of data concatenated to concatenated data, to which one PDCP serial number is assigned, need to be transferred to an upper layer device in order of placement from the front (operation 1*ab*-40).

Figure 28:
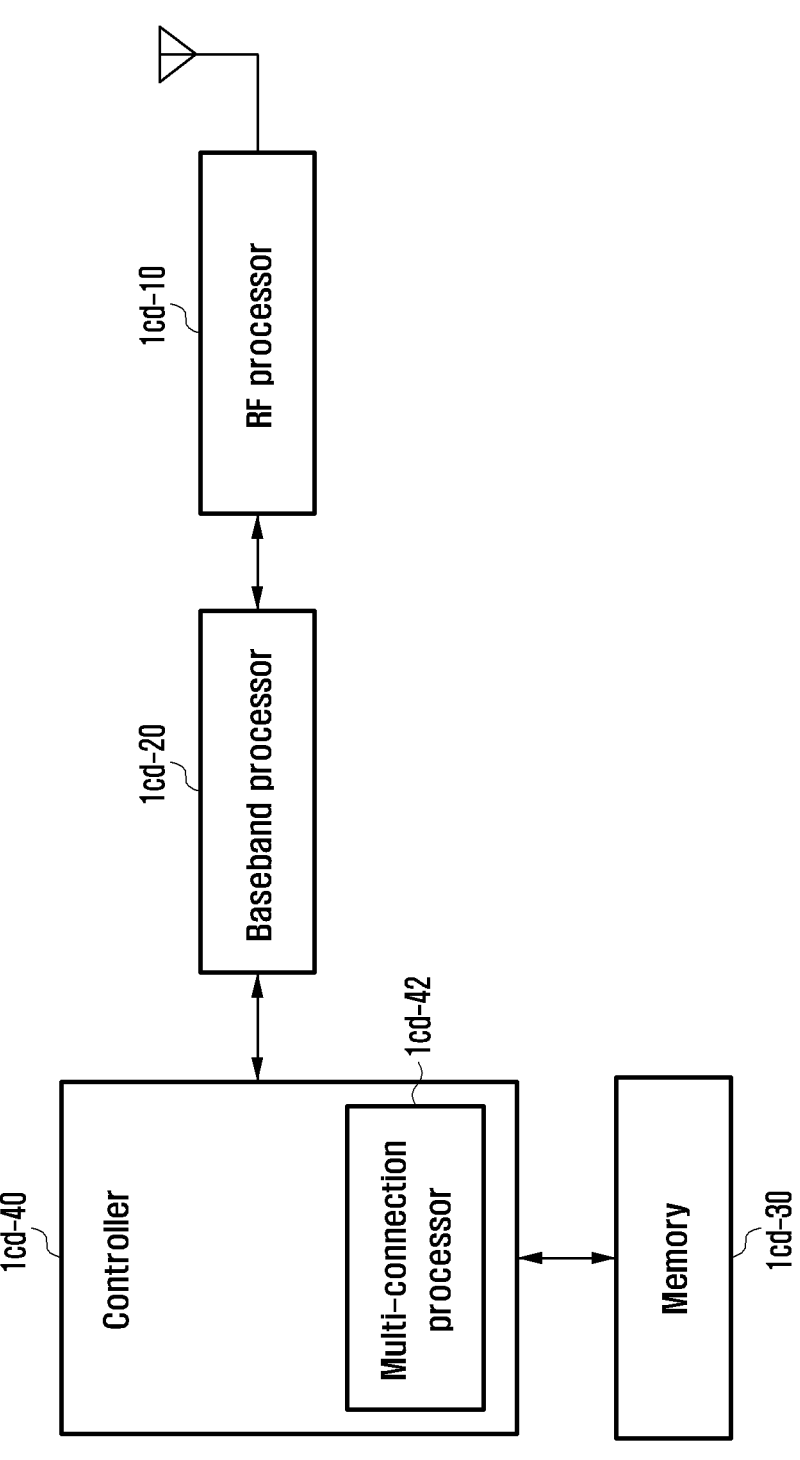
FIG. 28 illustrates the structure of a UE to which according to an embodiment of the disclosure.

FIG. 28 illustrates the structure of a UE to which according to an embodiment of the disclosure.

Referring to FIG. 28, the UE may include a radio frequency (RF) processor 1*cd*-10, a baseband processor 1*cd*-20, a memory 1*cd*-30, and a controller 1*cd*-40.

The RF processor 1*cd*-10 may perform a function for transmitting and receiving a signal through a wireless channel such as band conversion, amplification, and the like of a signal. Specifically, the RF processor 1*cd*-10 may up-convert a baseband signal provided from the baseband processor 1*cd*-20 into an RF band signal and may transmit the RF band signal through an antenna, and may down-convert the RF band signal received through the antenna into a baseband signal. For example, the RF processor 1*cd*-10 may include a transmission filter, a reception filter, an amplifier, a mixer, an oscillator, a digital to analog convertor (DAC), an analog to digital convertor (ADC), and the like. In FIG. 28, only one antenna is shown, but the UE may include a plurality of antennas. In addition, the RF processor 1*cd*-10 may include a plurality of RF chains. In addition, the RF processor 1*cd*-10 may perform beamforming. For the beamforming, the RF processor 1*cd*-10 may adjust the phase and magnitude of each of signals transmitted and received through a plurality of antennas or antenna elements. In addition, the RF processor may perform MIMO and may receive multiple layers when performing the MIMO operation. The RF processor 1*cd*-10 may perform reception beam sweeping by appropriately configuring a plurality of antennas or antenna elements under the control of the controller, or may adjust the direction and beam width of the reception beam so that the reception beam is coordinated with transmission beam.

The baseband processor 1*cd*-20 may perform a conversion function between a baseband signal and a bit string according to a physical layer standard of the system. For example, during data transmission, the baseband processor 1*cd*-20 generates complex symbols by encoding and modulating a transmission bit string. In addition, during data reception, the baseband processor 1*cd*-20 may restore the received bit string by demodulating and decoding a baseband signal provided from the RF processor 1*cd*-10. For example, according to an orthogonal frequency division multiplexing (OFDM) scheme, during data transmission, the baseband processor 1*cd*-20 may generate complex symbols by encoding and modulating a transmission bit string, may map the complex symbols to subcarriers, and may then configure OFDM symbols through an inverse fast Fourier transform (IFFT) operation and cyclic prefix (CP) insertion. In addition, during data reception, the baseband processor 1*cd*-20 may divide the baseband signal provided from the RF processor 1*cd*-10 into units of OFDM symbols, may restore the signals mapped to the subcarriers through a fast Fourier transform (FFT) operation, and may then restore the received bit string through demodulation and decoding.

The baseband processor 1*cd*-20 and the RF processor 1*cd*-10 may transmit and receive signals as described above. Accordingly, the baseband processor 1*cd*-20 and the RF processor 1*cd*-10 may be referred to as a transmitter, a receiver, a transceiver, or a communicator. Further, at least one of the baseband processor 1*cd*-20 and the RF processor 1*cd*-10 may include a plurality of communication modules to support a plurality of different radio access technologies. In addition, at least one of the baseband processor 1*cd*-20 and the RF processor 1*cd*-10 may include different communication modules to process signals of different frequency bands. For example, the different radio access technologies may include an LTE network, an NR network, and the like. In addition, the different frequency bands may include a super high frequency (SHF) (e.g., 2.5 GHz or 5 GHz) band and a millimeter wave (e.g., 60 GHz) band.

The memory 1*cd*-30 may store data such as a basic program, an application program, and configuration information for the operation of the UE. The memory 1*cd*-30 may provide stored data in response to a request from the controller 1*cd*-40.

The controller 1*cd*-40 may control overall operations of the UE. For example, the controller 1*cd*-40 may transmit and receive signals through the baseband processor 1*cd*-20 and the RF processor 1*cd*-10. In addition, the controller 1*cd*-40 may record and read data in the memory 1*cd*-30. To this end, the controller 1*cd*-40 may include at least one processor. For example, the controller 1*cd*-40 may include a communication processor (CP) for performing control for communication and an application processor (AP) for controlling an upper layer such as an application program. The controller 1*cd*-40 may also include a multi-connection processor 1*cd*-42.

Figure 29:
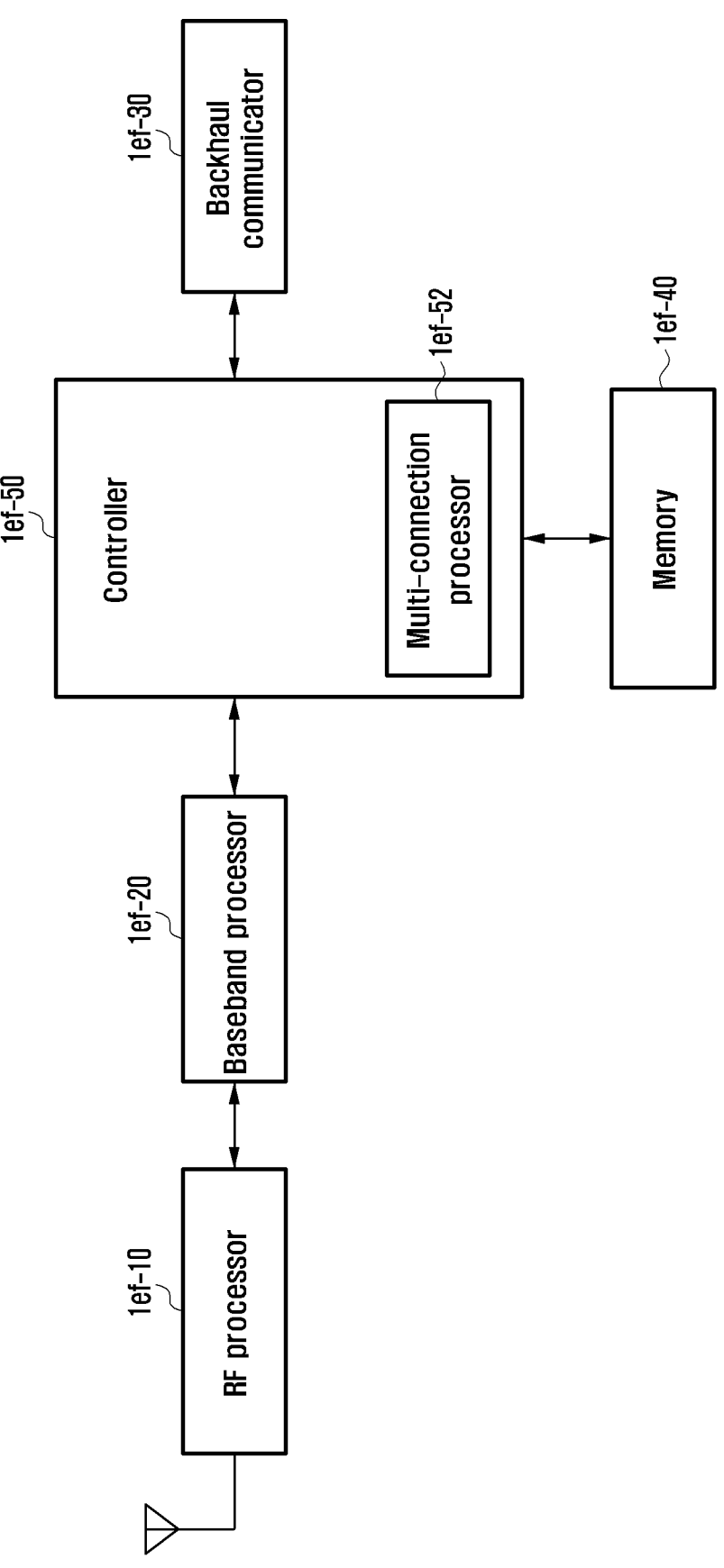
FIG. 29 illustrates a block configuration of a TRP in a wireless communication system according to an embodiment of the disclosure.

FIG. 29 is a block diagram illustrating a TRP in a wireless communication system to which according to an embodiment of the disclosure.

Referring to FIG. 29, the base station may be configured to include an RF processor 1ef-10, a baseband processor 1ef-20, a backhaul communicator 1ef-30, a memory 1ef-40, and a controller 1ef-50.

The RF processor 1ef-10 may perform a function for transmitting and receiving a signal through a wireless channel such as band conversion, amplification, and the like of a signal. Specifically, the RF processor 1ef-10 may up-convert a baseband signal provided from the baseband processor 1ef-20 into an RF band signal to transmit the RF band signal through an antenna, and may down-convert the RF band signal received through the antenna into a baseband signal. For example, the RF processor 1ef-10 may include a transmission filter, a reception filter, an amplifier, a mixer, an oscillator, a DAC, an ADC, and the like. In FIG. 29, only one antenna is shown, but the first access node may have a plurality of antennas. In addition, the RF processor 1ef-10 may include a plurality of RF chains. In addition, the RF processor 1ef-10 may perform beamforming. For the beamforming, the RF processor 1ef-10 may adjust the phase and magnitude of each of signals transmitted and received through a plurality of antennas or antenna elements. The RF processor may perform a downlink MIMO operation by transmitting one or more layers.

The baseband processor 1ef-20 may perform a conversion function between a baseband signal and a bit string according to a physical layer standard of a first radio access technology. For example, during data transmission, the baseband processor 1ef-20 may generate complex symbols by encoding and modulating a transmission bit string. In addition, during data reception, the baseband processor 1ef-20 may restore a received bit string by demodulating and decoding the baseband signal provided from the RF processor 1ef-10. For example, according to an OFDM scheme, during data transmission, the baseband processor 1ef-20 may generate complex symbols by encoding and modulating a transmission bit string, may map the complex symbols to subcarriers, and may then configure OFDM symbols through IFFT operation and CP insertion. In addition, during data reception, the baseband processor 1ef-20 may divide the baseband signal provided from the RF processor 1ef-10 in units of OFDM symbols, may restore signals mapped to the subcarriers through the FFT operation, and may then restore the received bit string through demodulation and decoding. The baseband processor 1ef-20 and the RF processor 1ef-10 may transmit and receive signals as described above. Accordingly, the baseband processor 1ef-20 and the RF processor 1ef-10 may be referred to as a transmitter, a receiver, a transceiver, a communicator, or a wireless communicator.

The communicator 1ef-30 may provide an interface for communicating with other nodes in a network.

The memory 1ef-40 may store data such as a basic program, an application program, and configuration information for the operation of a main base station. In particular, the memory 1ef-40 may store information on a bearer assigned to a connected UE, a measurement result reported from the connected UE, and the like. In addition, the memory 1ef-40 may store information that is a criterion for determining whether to provide or terminate multiple connections to the UE. The memory 1ef-40 may provide stored data in response to a request from the controller 1ef-50.

The controller 1ef-50 may control overall operations of the main base station. For example, the controller 1ef-50 may transmit and receive signals through the baseband processor 1ef-20 and the RF processor 1ef-10 or through the backhaul communicator 1ef-30. In addition, the controller 1ef-50 may record and read data in the memory 1ef-40. To this end, the controller 1ef-50 may include at least one processor. The controller may also include a multi-connection processor 1ef-52.

Hereinafter, high-speed packetization for NR-advanced will be described.

The first (Release 15) 5G communication standard called NR was completed by the 3rd Generation Partnership Project (3GPP). One of the key changes deviated from 4G communication standard called LTE is to design a new data structure enabling pre-processing and application of hardware accelerator, which has been expected to be able to support the NR target for peak data rate (i.e. 20 Gbps for downlink and 10 Gbps for uplink). However, user plane integrity protection (UPIP) has been adopted in the late stage of Release 16, which incurs significant performance degradation on data processing. Moreover, tremendous number of layer 2 (L2) headers resulted from the NR data structure is another bottleneck of data processing in reality (or the data processing burden of a UE or a factor that degrades performance). In this specification, maximum service data unit (MSDU) processing approach is proposed to provide a breakthrough to overcome these difficulties and achieve high data rates, which still enables pre-processing (or data processing) or application of hardware accelerator. Theoretical analysis proves that MSDU processing outperforms the legacy (or existing) NR data processing performance with respect to header overhead, processing time, and data throughput. In numerical results, it is showed that MSDU processing provides significant performance gain compared with the legacy NR data processing.

1. Introduction

In LTE, one of the main design principles is to maximize the efficiency of expensive resources, which was a cornerstone to design the LTE data structure for layer 2 (L2) including medium access control (MAC), radio link control (RLC), and packet data convergence control (PDCP) [1]-[3].

Specifically, for uplink (UL), a UE generates the LTE data after reception of UL grant, which makes a number of data fit in the size of UL grant with minimum size of L2 headers. In this way, the header overhead can be reduced at the cost of processing time because the UE should wait for UL grant before starting to configure the LTE data. In this LTE data structure, the size of headers is variable according to the size of UL grant. The same data structure is applied to downlink (DL) in LTE.

The first (Release 15) 5G communication standard called NR was completed by the 3rd generation partnership project (3GPP). In NR having much wider bandwidth in high frequency bands, the main concern is not the resource efficiency but the reduction of processing time to support the NR target for peak data rate (i.e. 20 Gbps for downlink and 10 Gbps for uplink) [4]. In order to achieve this, the NR data structure [5]-[7] has been designed to allow pre-processing before the reception of UL grant and enable the application of hardware (HW) accelerator, which has the fixed-sized L2 headers per PDCP service data unit (SDU). The generation of L2 headers (MAC/RLC/PDCP headers, optionally service data adaptation protocol (SDAP) header) per PDCP SDU is not impacted by the time point of UL grant. In addition to this, the fixed-sized L2 headers forms the implementation-friendly structure to use HW accelerators.

In the late stage of Release 16 of NR, support of User plane integrity protection (UPIP) at any data rate became a mandatory function to support secure communication. The UPIP is simply to apply the cryptographic algorithms to the user plane data. Such symmetric cryptographic algorithms (ciphering and integrity protection) requires extremely compute-intensive operations, which incur significant performance degradation on data processing. In this reason, Release 15 NR restricts the usage of UPIP up to 64 Kbps [8]. However, the UPIP shall be supported at any data rate from Release 16 onwards, which is expected to be one of the critical bottlenecks (or the data processing burden of a UE or a factor that degrades performance) for the scenarios supporting very high data rates.

In reality, another bottleneck is the processing of tremendous number of L2 headers with the NR data structure. For example, 1.6 million of L2 headers should be processed per second to support the NR target for DL peak data rate.

In the disclosure, we propose a breakthrough called maximum service data unit (MSDU) processing approach to overcome these difficulties and achieve high data rate. By concatenating multiple PDCP SDUs into one pseudo SDU up to the maximum size equal or smaller than the size supported by HW engines (or hardware engine or modem) (i.e. maximum SDU processing approach), we theoretically prove and numerically analyze that the proposed MSDU processing approach outperforms the legacy NR data processing with significant performance gain.

The remainder of this specification is organized as follows: Section 2 describes the NR data processing and its data structure. Section 3 investigates the earlier literatures for cryptographic algorithms (or integrity protection, integrity verification algorithm, ciphering algorithm, or deciphering algorithm). We propose MSDU processing and its data structure in section 4. Section 5 proves several theorems on MSDU processing. In section 6, some guidelines with representative algorithms are provided to implement MSDU processing. Section 7 shows the numerical results. In section 8 and 9, we conclude this discussion and present future works.

2. NR Data Structure and Processing

2.1. NR Data Structure

Figure 30:
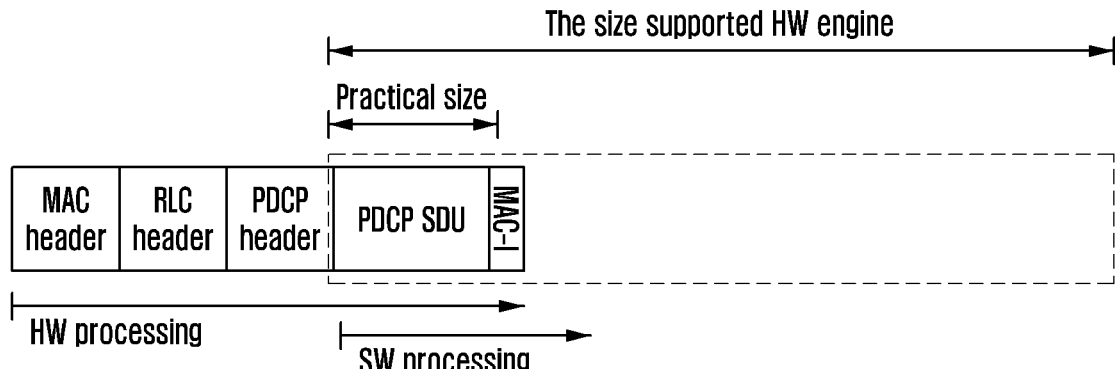
FIG. 30 illustrates a new radio (NR) data structure according to an embodiment of the disclosure.

FIG. 30 illustrates an NR data structure according to an embodiment of the disclosure.

In this section, the NR data structure adopted from Release 15 onwards and the data processing thereof are investigated. Referring to FIG. 30, the NR systems use a very simple data structure at the cost of header overhead, which eases implementation and enables fast processing by HW accelerators operated in HW engines.

To be more specific, the fixed-sized L2 headers and 4-byte message authentication code-integrity (MAC-I) derived from UPIP are added for each PDCP SDU, which can be pre-processed regardless of the reception of UL grant. Due to the maximum size (i.e. 1500 byte) supported by Ethernet protocol widely used in local area networks (LAN), the practical size of most PDCP SDUs is equal or smaller than 1500 byte while the NR modem including HW engines shall support 9000 bytes according to standard specification [7].

2.2. NR Data Processing

To support high data rates, the HW processing can be applied to the most computationally intensive tasks for DL data processing, e.g., in the order of parsing (or reading or interpreting) L2 headers and running cryptographic algorithms (deciphering and integrity verification). After the HW processing (or hardware data processing), the major remaining SW processing is header decompression, which is difficult to be implemented by HW engines due to the variety of supported header types. The similar processing is applicable to UL data in reverse order.

Since the cryptographic operations performing ciphering and integrity protection consume the processing time the most and contribute the main processing burden, the cryptographic procedure including UPIP would be considered as the main bottleneck to support high data rates. In addition, 1.6 million of L2 headers should be processed per second to support the NR target for DL peak rate, i.e. 20 Gbps assuming PDCP SDUs with the size of 1500 byte, which would be another processing bottleneck because the number of L2 headers is directly related to the number of RLC/PDCP sequence numbers (SN) impinging the complexity of window management as well as their header parsing complexity. In the next section, the characteristics of cryptographic algorithms are analyzed before putting forward the main work of this specification.

3. Cryptographic Algorithm for NR

The advanced encryption standard (AES) adopted by national institute of standards and technology (NIST) [9] is the most popular and world-widely used symmetric key cryptographic algorithm because of its easy implementation and various possibility of optimized implementations (e.g. parallel processing based on HW engines) with robust security, which is also supported as a baseline algorithm for ciphering and integrity protection in NR [10]. In this regard, we consider the AES algorithm as the cryptographic algorithm for ciphering and integrity protection in this specification. In the literature, there are lots of works about the analysis of AES algorithms. Based on earlier studies, we review several clues to overcome the difficulties described in the previous sections.

It is well known that the AES algorithm theoretically has a linear time complexity with the input size [11] and the dominant contributor about the processing time is the initialization and security key setup time for the range of small data (e.g., about 16 bytes 8192 bytes) [12], [13]. In [14]-[16], it was also showed that the AES throughput goes higher as the input size becomes larger. The AES throughput is calculated as the total amount of AES-processed data in bytes divided by the processing time.

The previous literatures hint at an efficient design to overcome two bottlenecks mentioned in the earlier sections. Based on this, we propose a MSDU processing approach to reduce the data processing time and header overhead, and achieve much better performance than NR data processing in the next section.

4. Maximum SDU Processing Approach

4.1. Proposed Data Structure for Maximum SDU Processing

Figure 31:
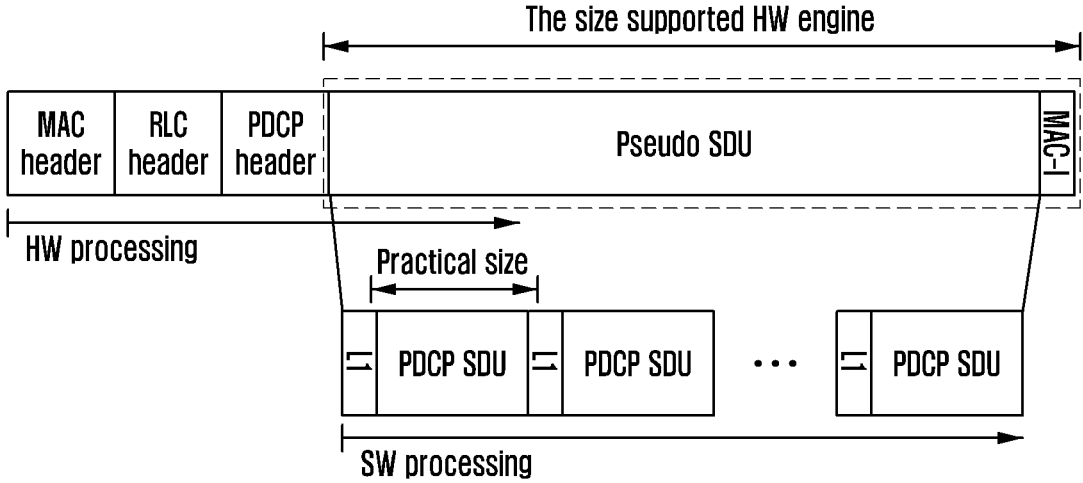
FIG. 31 illustrates a data structure proposed for NR-Advanced according to an embodiment of the disclosure.

FIG. 31 illustrates a data structure proposed for NR-Advanced according to an embodiment of the disclosure.

In section 3, the earlier research shows a possibility to enhance the performance of cryptographic algorithms with the same processing time by increasing the input size due to its linearity. Given that the NR systems handle the size of data up to 9000 byte, the dominant factor of the time for the cryptographic processing (ciphering, deciphering, integrity protection, or integrity verification) is the initialization and key setup time, which can be significantly reduced by one-shot execution per multiple PDCP SDUs consuming one initialization and security key setup time because the NR data structure explained in section 2.1 requires one initialization and security key setup time per PDCP SDU. With these principles, the present application proposes a new data structure highly suitable for maximum SDU processing (MSU) as shown in FIG. 31.

The proposed data structure introduces a pseudo SDU which consists of multiple PDCP SDUs with fixed-sized length indicator (LI) fields indicating the length of each PDCP SDU in bytes. When the transmitter concatenates multiple PDCP SDUs into one pseudo SDU, each LI field is placed right before each PDCP SDU, which make the receiver be able to de-concatenate each PDCP SDU based on each LI field. The length of LI field can be larger than 11 bits, which is enough large to indicate the practical size of data. In PDCP header, one bit may indicate whether the payload is a pseudo SDU or a PDCP SDU. In this way, the fixed-sized L2 headers and 4-byte MAC-I derived from UPIP are added per pseudo SDU including multiple PDCP SDUs, which can be pre-processed regardless of the reception of UL grant and can be processed by HW accelerators, which has the same benefits as those of NR data structure described in section 2. Moreover, the structure of pseudo SDU the same as NR data structure eases implementation.

4.2. Maximum SDU Processing (or MSDU Processing Method)

The maximum SDU processing still have the benefits of NR data structure enabling pre-processing and application of hardware accelerator, that is, it is an add-on feature on top of NR data structure or legacy (or existing or current) implementation because the pseudo SDU can be regarded as a large-sized PDCP SDU in NR data structure.

Specifically, in order to maximize the efficiency of HW engines, multiple PDCP SDUs may be concatenated into one pseudo SDU with maximum size smaller than the size supported by HW engines. For DL data, the HW processing can be applied to L2 header parsing or de-cryptographic algorithms for each pseudo SDU in the same manner as section 2.2. After the HW processing, a simple procedure de-concatenating multiple PDCP SDUs from one pseudo SDU is additionally performed as a part of SW processing followed by header decompression per PDCP SDU. The similar processing is applicable to UL data in reverse order.

When using maximum SDU processing (or MSDU processing method), it is straightforward that the number of L2 headers is reduced by 1/N times (where N denotes the number of concatenated PDCP SDUs), which implies the reduction of the number of RLC/PDCP sequence numbers (SN) impinging the complexity of window management as well as their header parsing complexity. Based on the earlier studies on cryptographic algorithm, we prove several useful theorems in the next section.

5. Theoretical Analysis 5.1. Header Overhead

To analyze the header overhead between NR data processing and maximum SDU (MSDU) processing, the equations for header overhead per second are theoretically given by the following equation.

$$NR_{overhead}=(H_{MAC}+H_{RLC}+H_{PDCP})\times n_{SDU} \qquad \text{Equation 1}$$

where $H_{Layer}$ is the header size of each Layer and $n_{SDU}$ is the number of PDCP SDUs processed per second, and by $$MSDU_{overhead} = (H_{MAC} + H_{RLC} + H_{PDCP})\times \qquad \text{Equation 2}$$

$$\left(N_{pseudo} + n_{SDU} - \sum_{k=1}^{N_{pseudo}} n_{SDU}(k)\right) +$$

$$\sum_{k=1}^{N_{pseudo}} L_{LI} \times n_{SDU}(K)$$

which is subject to $N_{pseudo}\geq 1$ and $MSDU_{overhead}$ is equal to $NR_{overhead}$ when $N_{pseudo}=0$. $N_{pseudo}$ is the number of pseudo SDUs processed per second, $L_{LI}$ is the length of LI field, and $n_{SDU}(k)$ is the number of concatenated PDCP SDUs for the $k^{th}$ pseudo SDU.

By using mathematical techniques with (1) and (2), the upper bound of header overhead for MSDU processing is given in the following theorem.

Theorem 1: The header overhead for MSDU processing is upper-bounded as $MSDU_{overhead}\leq NR_{overhead}$ Proof: The Equation 2 can be reformulated as $$MSDU_{overhead}=H_{L2}(N_{pseudo}+n_{SDU}\Phi)+L_{LI}\Phi$$

where $$H_{L2} = H_{MAC} + H_{RLC} + H_{PDCP} \text{ and } \Phi = \sum_{k=1}^{N_{pseudo}} n_{SDU}(k).$$

By concatenation property, we have inequality as $$2N_{pseudo}\leq\Phi \qquad \text{Equation 3}$$

Using Equation 3 and the positive value of $(H_{L2}-2L_{LI})$ according to section 4 or [5]-[7], the Equation 2 can be upper-bounded as $$= H_{L2}n_{SDU} + H_{L2}(N_{pseudo} - \Phi) + L_{LI}\Phi$$

$$= H_{L2}n_{SDU} + H_{L2}N_{pseudo} - (H_{L2} - L_{LI})\Phi \leq$$

$$H_{L2}n_{SDU} + H_{L2}N_{pseudo} - (H_{L2} - L_{LI})2N_{pseudo} \leq$$

$$H_{L2}n_{SDU} + H_{L2}N_{pseudo} - (H_{L2} - L_{LI})2N_{pseudo}$$

$$= H_{L2}n_{SDU} - (H_{L2} - 2L_{LI})N_{pseudo} \leq$$

$$H_{L2}n_{SDU}$$

$$= NR_{overhead}$$

This concludes the proof.

Theorem 1 says that MSDU processing approach reduces the header overhead compared with NR data processing in theory. The significant reduction is also showed with numerical results in the Section 7.

5.2. Cryptographic Processing Time

Theoretically, the processing time of AES algorithm is a linear function with the input size as described in section 3. In addition to this, the dominant contributor about the processing time is the initialization or security key setup time for the range of small data considered in this specification, which also includes initialization of HW engines, data loading and unloading, and cryptographic algorithm registration. Based on these, the cryptographic processing time can be modelled as $$y(k)=\delta x(k)+\mu \qquad \text{Equation 4}$$

which is subject to $\mu >> \delta x(k)$ where $\mu$ is the initialization and security key setup time, $\delta$ is the AES processing coefficient, $x(k)$ is the size of kth data, and $y(k)$ is the cryptographic processing time for kth data.

For $n_{SDU}$ PDCP SDUs, the cryptographic processing time for NR data processing is given by $$T_{NR} = \sum_{k=1}^{n_{SDU}} [\delta x_{NR}(k) + \mu] \qquad \text{Equation 5}$$

where $x_{NR}(k)$ is the size of the $k^{th}$ PDCP SDU, and the cryptographic processing time for MSDU data processing is given by $$T_{MSDU} = \qquad \text{Equation 6}$$
$$\sum_{k=1}^{N_{pseudo}} [\delta x_{MSDU}(k) + \mu] + \sum_{k=1}^{M} [\delta x_{NR}(k) + \mu] \text{ where } M =$$
$$n_{SDU} - \sum_{k=1}^{N_{pseudo}} n_{SDU}(k),$$
$$x_{MSDU}(k) = \sum_{i=1}^{n_{SDU}(k)} x_{NR}(i, k) + L_{LI} n_{SDU}(k),$$
$$\text{and } x_{NR}(i, k)$$

is the size of the $i^{th}$ PDCP SDU for the $k^{th}$ pseudo SDU.

By using Lemma 1 together with (5) and (6), the upper bound of cryptographic processing time for MSDU processing is given in the following theorem.

Theorem 2: The cryptographic processing time for MSDU processing is upper-bounded as $$T_{MSDU} \le T_{NR}$$

We first prove Lemma 1 necessary for proof of Theorem 2.

Lemma 1: For MSDU processing, we have the following inequality $$\mu > \frac{\delta L_{LI} n_{SDU}(k)}{n_{SDU}(k) - 1} k = 1, 2, \ldots, n_{SDU}$$

Proof of Lemma 1: For the range of data size considered in MSDU processing, the dominant contributor about the processing time is the initialization or security key setup time, i.e. $\mu >> \delta x_{NR}(k)$. According to section 3, it is straight-forward that $$x_{NR}(k) \gg \frac{L_{LI} n_{SDU}(k)}{n_{SDU}(k) - 1}$$

Note that the right-hand side converges to $L_{LI}$ as $n_{SDU}(k)$ goes to infinity, which has the length of about 11 bits while $x_{NR}(k)$ has the practical size smaller or equal than 1500 bytes. This concludes the proof of Lemma 1.

Proof of Theorem 2: Considering the linear property, we can simplify the Equation 6 with $$x_{NR}(k)=x_{NR} \text{ or } n_{SDU}(k)=n_m \text{ as}$$

$$T_{MSDU}=N_{pseudo}(\delta x_{MSDU}+\mu)M(\delta x_{NR}+\mu)$$

where $M=n_{SDU}-N_{pseudo}n_M$ and $x_{MSDU}=n_M x_{NR}+L_{LI} n_M$. With further calculations, we get $$= N_{pseudo}\delta x_{MSDU} + N_{pseudo}\mu + M\delta x_{NR} + M\mu$$
$$= n_{SDU}x_{NR}\delta + n_{SDU}\mu + N_{pseudo}L_{LI}n_M\delta -$$
$$(n_M - 1)N_{pseudo}\mu$$
$$= n_{SDU}x_{NR}\delta + n_{SDU}\mu + N_{pseudo}[L_{LI}n_M\delta - (n_M - 1)\mu]$$
$$= n_{SDU}x_{NR}\delta + n_{SDU}\mu - N_{pseudo}(n_M - 1)\left(\mu - \frac{\delta L_{LI}n_M}{(n_M - 1)}\right)$$

Note that the last term of the right-hand side has a positive value because of positive $(n_M - 1)$ from the concatenation property $(n_M \ge 2)$ and Lemma 1 and thus the Equation 6 is upper-bounded by $T_{NR}=n_{SDU}x_{NR}\delta+n_{SDU}\mu$. This concludes the proof of Theorem 2.

Theorem 2 says that MSDU processing approach reduces the cryptographic processing time compared with NR data processing in theory, which is also shown with numerical results in the section 7.

5.3. Efficiency of HW Engine

As shown in FIG. 30 or FIG. 31, it is expected that the proposed MSDU processing approach maximizes the utilization of HW engine per invocation. In this section, the utilization rates of HW engine for NR data processing and MSDU processing are defined as the sum of the utilization rate of HW engine per invocation $$U_{NR} = \sum_{n=1}^{N_{SDU}} \frac{x_{NR}(n)}{\sigma} \qquad \text{Equation 7}$$

$$U_{MSDU} = \sum_{n=1}^{N_{pseudo}} \frac{x_{MSDU}(n)}{\sigma} + \sum_{i=1}^{M} \frac{x_{NR}(i)}{\sigma} \qquad \text{Equation 8}$$

where $\sigma$ is the maximum size supported by HW engine.

By similar techniques, the lower bound of utilization rate for MSDU processing is given by the following theorem.

Theorem 3: The utilization rate of HW engine for MSDU processing is lower-bounded as $$U_{NR} \le U_{MSDU}$$

Proof: By the linear property, the Equation 8 is simplified with $x_{NR}(k)=x_{NR}$ and $$n_{SDU}(k) = n_M \text{ as}$$

$$= \frac{1}{\sigma}(N_{pseudo}x_{MSDU} + Mx_{NR})$$
$$= \frac{1}{\sigma}(N_{pseudo}n_M x_{NR} + N_{pseudo}L_{LI}n_M + n_{SDU}x_{NR} - N_{pseudo}n_M x_{NR})$$
$$= \frac{1}{\sigma}(N_{pseudo}L_{LI}n_M + n_{SDU}x_{NR}) \ge$$
$$\frac{1}{\sigma}(n_{SDU}x_{NR}) = U_{NR}$$

This concludes the proof of Theorem 4.

As the number of HW engine invocations is one of the critical factors on data processing, we derive the upper bound of the number of HW engine invocations for MSDU processing in the following theorem.

Theorem 4: The number of HW engine invocations for MSDU processing is upper-bounded as $$Call_{MSDU} \leq Call_{NR}$$

Proof: Note that the NR data processing is subject to call a HW engine for each PDCP SDU as described in section 2, i.e. $Call_{NR} = n_{SDU}$. The number of HW engine invocations for MSDU processing is given by $$Call_{MSDU} = N_{pseudo} + M$$
$$= N_{pseudo} + n_{SDU} - \Phi \leq$$
$$N_{pseudo} + n_{SDU} - 2N_{pseudo} \leq$$
$$n_{SDU} = Call_{NR}$$

This concludes the proof of Theorem 4.

Based on Theorem 3 and 4, it is easily seen that MSDU processing approach improves the efficiency of HW engines.

5.4. Data Throughput

We finally analyze the data throughput based on Theorem 1, 2, 3, and 4. The data throughputs for NR data processing and MSDU processing are given by $$R_{NR} = \frac{\sum_{k=1}^{n_{SDU}} x_{NR}(k)}{T_H^{NR} + T_D^{NR} + T_{etc}^{NR}} \qquad \text{Equation 9}$$

where $$T_H^{NR}, T_D^{NR}, \text{and } T_{etc}^{NR}$$

are the processing time of header, data, and other operations for NR data processing, respectively, and $$R_{MSDU} = \frac{\sum_{k=1}^{n_{SDU}} x_{NR}(k)}{T_H^{MSDU} + T_D^{MSDU} + T_{etc}^{MSDU} + \epsilon} \qquad \text{Equation 10}$$

where $$T_H^{MSDU}, T_D^{MSDU}, \text{and } T_{etc}^{MSDU}$$

are the processing time of header, data, and other operations for MSDU data processing, respectively and $\epsilon$ is additional processing time from concatenation/de-concatenation for MSDU processing.

By previous theorems and several corollaries, the lower bound of data throughput for MSDU processing is given by the following theorem.

Theorem 5: The data throughput for MSDU processing is lower-bounded as $$R_{NR} \leq R_{MSDU}$$

Proof: Before proving this, several corollaries are given as

Corollary 1: The NR data processing is a subset (or part) of MSDU data processing.

As explained in Section 4, the proposed data structure turns into NR data structure when concatenation with LI fields is not performed, i.e., the MSDU processing is exactly the same as the NR data processing unless the pseudo SDU is constructed. Between them, the only difference is that additional concatenation and de-concatenation procedures are performed for the pseudo SDU.

Corollary 2: The smaller the number of L2 header, the lower the complexity of L2 operations.

The L2 operations include RLC/PDCP SN based window operations including automatic repeat request (ARQ) mechanism as well as header parsing. Given that the small number of L2 header implies the small number of RLC/PDCP SN allocations and header parsing, corollary 2 is very straightforward.

Coming back to proof of Theorem 5, the denominator of the Equation 10 can be reformulated according to theorems and several corollaries as $$T_H^{MSDU} = T_H^{NR} - T_1 \qquad \text{Equation 11}$$
$$T_D^{MSDU} = T_D^{NR} - T_2 \qquad \text{Equation 12}$$
$$T_{etc}^{MSDU} = T_{etc}^{NR} - T_{3,4} \qquad \text{Equation 13}$$

where $T_1 \geq 0$ is the reduced processing time from Theorem 1, $T_2 \geq 0$ is the reduced processing time from Theorem 2, $T_{3,4} \geq 0$ is the reduced processing time from Theorem 3, 4 and Corollary 2. Note that $\epsilon$ is a marginal value because concatenation and de-concatenation based on LI fields are very simple procedures consuming negligible processing time and also note that $\epsilon$ is zero if $T_1 = T_2 = T_{3,4} = 0$.

With these (11), (12), and (13), Theorem 5 is satisfied.

This concludes the proof of Theorem 5.

By Theorem 5, we conclude that MSDU processing is a breakthrough to overcome the difficulties of NR data processing and support higher data rates. To apply MSDU processing in reality, some guidelines and representative algorithms are proposed to avoid bad implementations in the next sections.

6. Application

In the previous sections, we theoretically analyzed that MSDU processing outperforms NR data processing. However, its application should consider initial delay aspect from the transmitter's point of view. For example, always-on (or always) MSDU processing may wait for possible PDCP SDUs to be concatenated into one pseudo SDU, which can cause unexpected processing delay in case of initial transmission stage. In this regard, using only MSDU processing is not an optimal strategy.

To take full advantages of both NR data processing and MSDU processing, we propose several representative algorithms designed with the combination of NR data processing and MSDU processing, which is expected to be referred to practical implementations.

TABLE 1

Parameters for representative algorithms

| Parameters | Description |
|---|---|
| $\beta_b$ | The amount of pending data in buffer. |
| $N_b$ | The number of pending PDCP SDUs in buffer. |
| $\beta_p$ | The amount of pre-processed data |
| $\varphi_p$ | The maximum amount of data to be pre-processed for the next UL grants. |
| $\alpha$ | The maximum size of a pseudo SDU |
| $\tau$ | The actual size of constructed pseudo SDU |
| $T_{MSDU}$ | The timer to wait for possible PDCP SDUs |

The parameters $\beta_b$, $N_b$, and $\beta_p$ may be calculated on the fly, considering the current buffer status and reflecting the data processing results while the parameters, $\varphi_p$ or $\alpha$ are the configured values by implementation. The value of $\varphi_p$ may be determined as the maximum size of UL grant. However, the determination of $\alpha$ should consider the performance of device operating this algorithm in order to select an optimal value. The details are described in the next section. Based on these parameters, a very simple algorithm minimizing the processing delay is given as Algorithm 1: Minimization of processing delay

```
1:  do
2:     if N_b > 1:
3:        MSDU processing satisfying τ ≤ α;
4:     else
5:        NR data processing for the PDCP SDU;
6:  while (β_p < φ_p and β_b > 0)
```

The algorithm 1 starts and continues data processing while $\beta_p<\varphi_p$ and $\beta_b>0$, which does not cause any processing delay resulted from waiting for possible PDCP SDUs. If $\beta_p\geq\varphi_p$, the PDCP SDUs start to be buffered as pending data in buffer. When $\beta_p<\varphi_p$ is met, MSDU processing is performed to configure one pseudo SDU satisfying $\tau<\alpha$ if $N_b>1$. Otherwise, NR data processing is applied to each PDCP SDU.

For algorithm 1, MSDU processing may generate a pseudo SDU too early without waiting for the next PDCP SDUs, the size of which may be much smaller than the maximum size of a pseudo SDU a. Given that the performance gain goes higher as the size of pseudo SDU becomes larger as shown in section 7, we can consider a smart algorithm with a timer controlling the performance gain of MSDU processing as well as the processing delay as follows:

Algorithm 2: Control of efficiency or processing delay

```
1:  Start T_MSDU.
2:  do
3:     if N_b > 1 and T_MSDU expires:
4:        MSDU processing satisfying τ ≤ α;
5:        Restart T_MSDU.
6:     else if T_MSDU expires:
7:        NR data processing for the PDCP SDU;
```

-continued

Algorithm 2: Control of efficiency or processing delay

```
8:        Restart T_MSDU.
9:  while (β_p < φ_p and β_b > 0)
```

The difference is that MSDU processing or NR data processing is performed when $T_{MSDU}$ expires, i.e., it waits for possible PDCP SDUs until the expiry of $T_{MSDU}$ to maximize the efficiency of MSDU processing. Based on the value of $T_{MSDU}$, we can control the performance gain of MSDU processing as well as the processing delay. Note that Algorithm 2 is the exactly same as Algorithm 1 if the value of $T_{MSDU}$ is set to zero.

7. Numerical Results

In this section, we provide some numerical results to evaluate the performance of the MSDU processing approach proposed in the previous sections. Throughout the simulation, the experiment is performed based on the results from the laptop equipped with Intel core 15 2.5 GHz operating in Windows 7 [17]. In this simulation, the processing time refers to the AES encryption time considered the time that the AES algorithm takes to produce AES-processed data from input data. The size of L2 headers is referred to the standardization specifications [5]-[7] and the size of packet is considered as 1500 byte unless stated otherwise.

Figure 32:
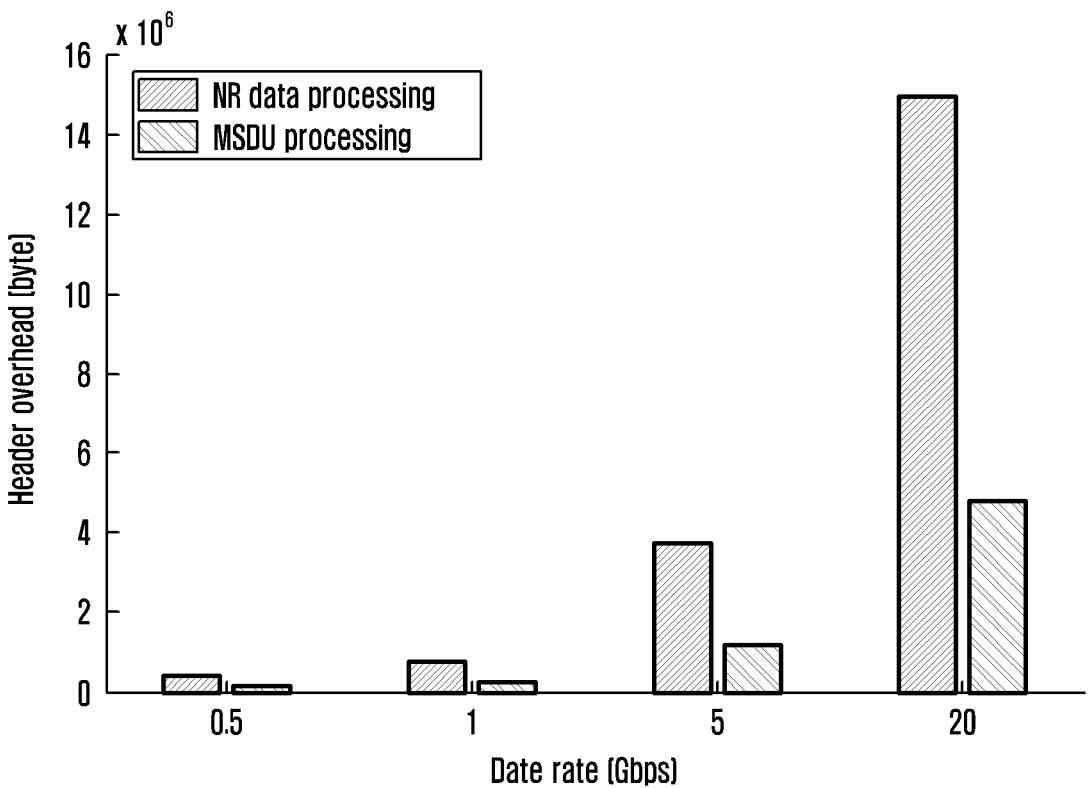
FIG. 32 illustrates a header overhead with respect to a data rate according to an embodiment of the disclosure.

FIG. 32 represents the different data rate and corresponding header overhead loaded by NR data processing or MSDU processing in seconds according to an embodiment of the disclosure.

It is seen that MSDU processing significantly reduces the header overhead as data rate goes higher, which is aligned with Theorem 1. Note that the overhead of MSDU processing is much more reduced than that of NR data processing if we additionally consider 4-byte MAC-I as explained in section 4 because MAC-I is added to each pseudo SDU for MSDU processing while it is added to each PDCP SDU for NR data processing.

Figure 33:
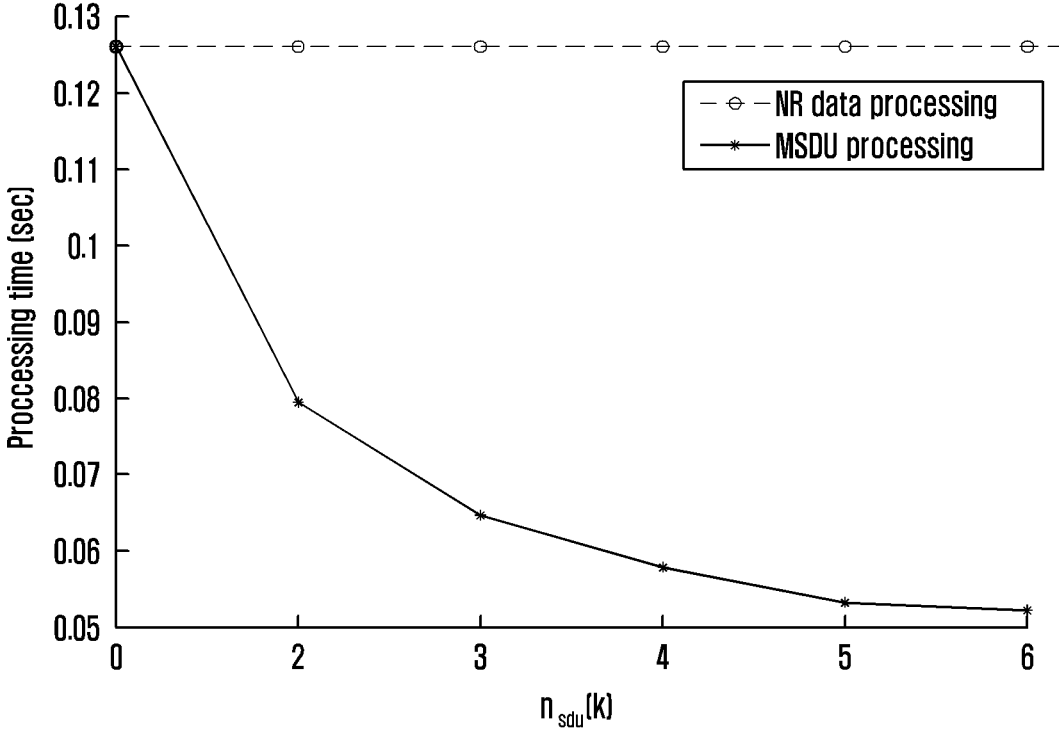
FIG. 33 illustrates a processing time with respect to the number of concatenated PDCP protocol data units (PDUs) per pseudo SDU according to an embodiment of the disclosure.

FIG. 33 illustrates a processing time with respect to the number of concatenated PDCP PDUs per pseudo SDU according to an embodiment of the disclosure.

Referring to FIG. 33, the total amount of data to be processed is considered as 1 Mbyte and the number of concatenated PDCP SDUs per pseudo SDU $n_{SCU}$ (k) varies from 1 to 6 since each packet has the size of 1500 byte and the maximum size supported by HW engine is 9000 byte. According to Theorem 2, the upper bound is considered as the processing time of NR data processing.

Referring to FIG. 33, the processing time of MSDU processing is reduced as $n_{SDU}$(k) increases, which implies that MSDU processing with maximum size of pseudo reduces the processing time the most and the utilization of HW engines should be maximized to cut down the processing time. Note that this processing time can be enhanced further by implementations (e.g., parallel optimization and pipelined processing with more HW engines [14], [15]). It is also expected that different implementations have different saturation levels of $n_{SDU}$(k) or $\alpha$ for Algorithm 1 for the same processing time, e.g., $n_{SDU}$(k)=5 or $n_{SDU}$(k)=6 have similar processing time in FIG. 33 so that there is marginal gain if $n_{SDU}$(k) is further increased. In the similar way as FIG. 33, the optimal a may be determined considering the convergence of processing time by implementation.

Figure 34:
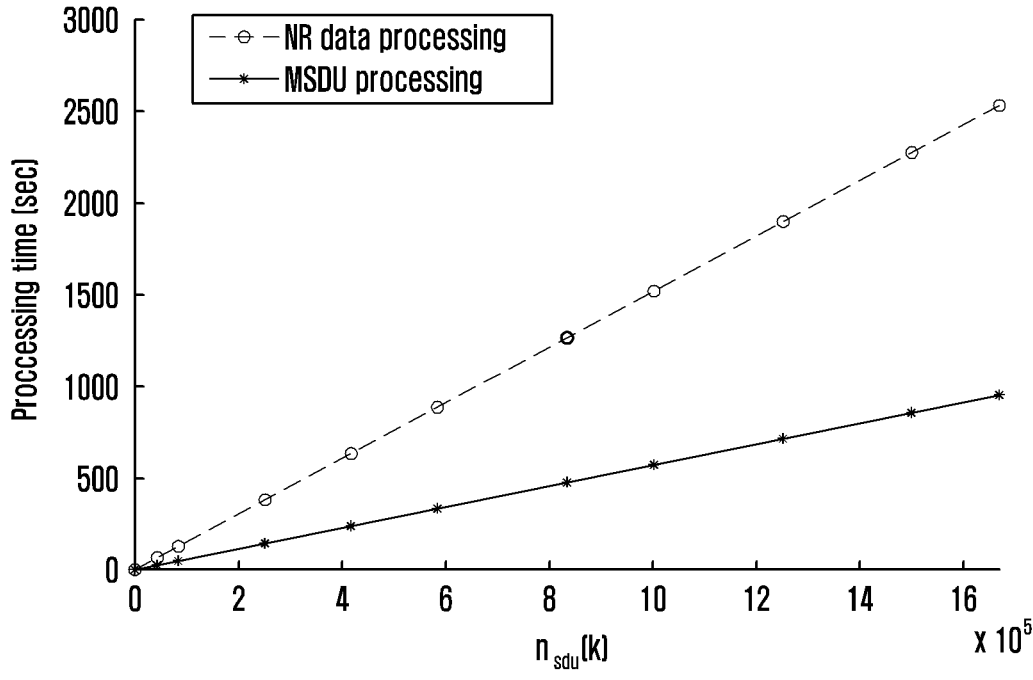
FIG. 34 illustrates a processing time with respect to the number of PDCP SDUs according to an embodiment of the disclosure.

FIG. 34 shows the processing time for different number of PDCP SDUs to be processed according to an embodiment of the disclosure.

As the number of PDCP SDUs to be processed $n_{SDU}$ goes larger, MSDU processing outperforms NR data processing with significant processing gain. This shows that MSDU processing is an appropriate approach to process tremendous number of packets at high data rates.

Figure 35:
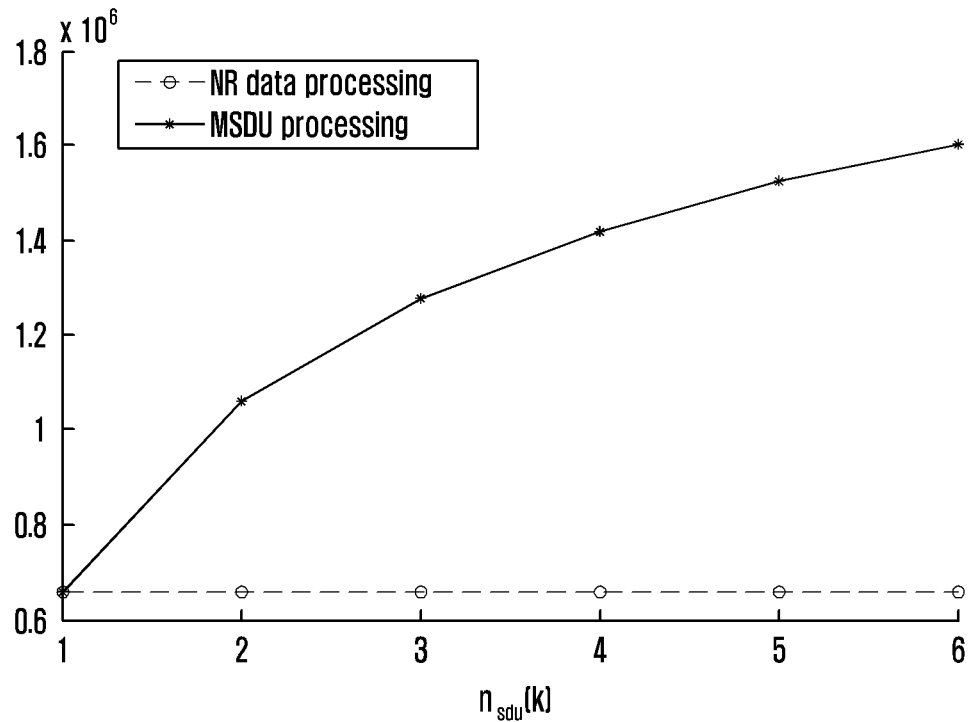
FIG. 35 illustrates data throughput with respect to the number of concatenated PDCP PDUs per pseudo SDU according to an embodiment of the disclosure.

FIG. 35 illustrates data throughput with respect to the number of concatenated PDCP PDUs per pseudo SDU according to an embodiment of the disclosure.

Referring to FIG. 35, the data throughput is defined as in Theorem 5 and the total amount of data to be processed corresponds to that of 20 Gbps. According to Theorem 5, the lower bound is considered as data throughput of NR data processing. Given that the data processing time $$T_D^{MSDU}$$

is the main contributor, other denominators of (9) and (10) are assumed as 20% of $$T_D^{MSDU},$$

which does not affect the tendency of data throughput in this simulation. FIG. 35 represents the data throughput versus the number of concatenated PDCP SDUs per pseudo SDU $n_{SDU}(k)$. It also shows that MSDU processing outperforms NR data processing with significant performance gain as the number of PDCP SDUs to be processed goes larger.

8. Conclusion

In the disclosure, we first investigated the bottlenecks of NR data processing and its data structure. To overcome these difficulties and support higher data rates, MSDU processing and its data structure were proposed based on the intuition from the earlier literature. By theoretical analysis, we proved that the NR data processing is the lower bound of MSDU processing with respect to header overhead, the upper bound of MSDU processing with respect to cryptographic processing time, and finally the lower bound of MSDU processing with respect to data throughput. Moreover, the efficiency and the invocation number of HW engines were also analyzed in theory. We also provided several guidelines with algorithms, which need to be considered in practical implementations. In numerical results, we showed that the proposed MSDU processing outperforms NR data processing with significant gain.

9. Future Works

Based on the theoretical analysis and the results in the disclosure, the MSDU processing can be tested and implemented in a commercial modem with HW engines and the algorithm operating MSDU processing can be optimized to maximize the data throughput.

The references referred to in the above details are as follows.

[1] 3GPP TS 36.321, "Medium Access Control (MAC) protocol specification", V16.4.0, 2021.
[2] 3GPP TS 36.322, "Radio Link Control (RLC) protocol specification", V16.0.0, 2021.
[3] 3GPP TS 36.323, "Packet Data Convergence Protocol (PDCP) specification", V16.3.0, 2021.
[4] 3GPP TR 38.913, Study on Scenario and Requirements for Next Generation Access Technologies, v14.1.0, 2016.
[5] 3GPP TS 38.321, "Medium Access Control (MAC) protocol specification", V16.4.0, 2021.
[6] 3GPP TS 38.322, "Radio Link Control (RLC) protocol specification", V16.2.0, 2021.
[7] 3GPP TS 38.323, "Packet Data Convergence Protocol (PDCP) specification", V16.3.0, 2021.
[8] 3GPP TS 24.501, "Non-Access-Stratum (NAS) protocol for 5G System (5GS) specification", V15.6.0, 2019.
[9] National Institute of Standards and Technology, "Advanced Encryption Standard (AES)," 2001.
[10] 3GPP TS 33.401, "3GPP System Architecture Evolution (SAE) and Security architecture specification", V16.3.0, 2020.
[11] G. Orhanou, S. El Hajji and Y. Bentaleb, EPS AES-based confidentiality and integrity algorithms—Complexity study, Proceeding of the 2nd International Conference on Multimedia Computing and Systems, Ouarzazate, Morocco, (2011).
[12] Bruce Schneier, Doug Whiting "A Performance Comparison of the Five AES Finalists", third AES Candidate Conference, 2000.
[13] Schneier B, et al. Performance Comparison of the AES submissions; The Second AES Candidate Conference; National Institute of Standards and Technology, Gaithersburg, MD Mar. 22-23, 1999; pp. 15-34.
[14] D. Biagio, A. Barenghi, G. Agosta, and G. Pelosi, "Design of a parallel AES for graphics hardware using the CUDA framework," Proc. of 2009 IEEE International Parallel and Distributed Processing Symposium, IEEE press, 2009, pp. 1-8.
[15] R. Sever, A. N. Ismailglu, Y. C. Tekmen, M. Askar and B. Okcan, "A high speed FPGA implementation of the Rijndael algorithm", Euromicro Symposium on Digital System Design, pp. 358-362, Aug. 31-Sep. 3, 2004.
[16] Q. Li, C. Zhong, K. Zhao, X. Mei, and X. Chu, "Implementation and analysis of AES encryption on GPU," in Proc. IEEE 14th Int. Conf. High Perform. Comput. Commun., IEEE 9th Int. Conf. Embedded Softw. Syst. (HPCC-ICESS), June 2012, pp. 843-848.
[17] Shaza D. Rihan, Ahmed Khalid, Saife Eldin F. Osman, "A performance comparison of encryption algorithms AES and DES", International Journal of Engineering Research & Technology (IJERT), Volume 4, Issue 12 (December 2015).

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a packet data convergence protocol (PDCP) layer of a transmission device in a wireless communication system, the method comprising:

receiving, from an upper layer, PDCP service data units (SDUs);

generating a PDCP control protocol data unit (PDU);

performing concatenation of the PDCP SDUs to generate a concatenated data, wherein the concatenation is not applied to the PDCP control PDU;

applying at least one operation of integrity protection or ciphering for the concatenated data, based on security key information; and submitting, to a lower layer, at least one PDCP PDU including the concatenated data for which the at least one operation is applied.

2. The method of claim 1, further comprising:

generating a field related to the concatenation, wherein the at least one PDCP PDU further includes the field.

3. The method of claim 2, wherein the field is included in the concatenated data of the at least one PDCP PDU.

4. The method of claim 2, wherein the at least one PDCP PDU further includes a PDCP header, and wherein the field is included in the PDCP header.

5. The method of claim 1, wherein the PDCP SDUs are concatenated based on an order of reception from the upper layer.

6. A method performed by a packet data convergence protocol (PDCP) layer of a reception device in a wireless communication system, the method comprising:

receiving, from a transmission device through a lower layer, at least one PDCP protocol data unit (PDU);

identifying a PDCP control PDU and concatenated data from the at least one PDCP PDU;

applying at least one operation of integrity verification or a deciphering for the concatenated data, based on security key information;

obtaining PDCP service data units (SDUs) separated from the concatenated data, and PDCP control SDU from the PDCP control PDU; and delivering, to an upper layer, the PDCP control SDU and the PDCP SDU.

7. The method of claim 6, further comprising:

identifying a field related to concatenation included in the at least one PDCP PDU, wherein the PDCP SDUs are separated from the concatenated data based on the field.

8. The method of claim 7, wherein the field is included in the concatenated data of the at least one PDCP PDU.

9. The method of claim 7, wherein the at least one PDCP PDU further includes a PDCP header, and wherein the field is included in the PDCP header.

10. The method of claim 6, wherein the separated PDCP SDUs are transferred to the upper layer based on an order of placement from a front.

11. A transmission device in a wireless communication system, the transmission device comprising:

a transceiver; and a controller configured to control a packet data convergence protocol (PDCP) layer to:

receive, from an upper layer, PDCP service data units (SDUs), generate a PDCP control protocol data unit (PDU), perform concatenation of the PDCP SDUs to generate a concatenated data, wherein the concatenation is not applied to the PDCP control PDU, apply at least one operation of integrity protection or ciphering for the concatenated data, based on security key information, and submit, to a lower layer, at least one PDCP PDU including the concatenated data for which the at least one operation is applied.

12. The transmission device of claim 11, wherein the controller is further configured to generate a field related to the concatenation, and wherein the at least one PDCP PDU further includes the field.

13. The transmission device of claim 12, wherein the field is included in the concatenated data of the at least one PDCP PDU.

14. The transmission device of claim 12, wherein the at least one PDCP PDU further includes a PDCP header, and wherein the field is included in the PDCP header.

15. The transmission device of claim 11, wherein the controller is further configured to concatenate the PDCP SDUs based on an order of reception from the upper layer.

16. A reception device in a wireless communication system, the reception device comprising:

a transceiver; and a controller configured to control a packet data convergence protocol (PDCP) layer to:

receive, from a lower layer, at least one PDCP protocol data unit (PDU), identify a PDCP control PDU and concatenated data from the at least one PDCP PDU, apply at least one operation of integrity verification or a deciphering for the concatenated data, based on security key information, obtain PDCP service data units (SDUs) separated from the concatenated data, and PDCP control SDU from the PDCP control PDU, and deliver, to an upper layer, the PDCP control SDU and the PDCP SDUs.

17. The reception device of claim 16, wherein the controller is further configured to identify a field related to concatenation included in the at least one PDCP PDU, and wherein the PDCP SDUs are separated from the concatenated data based on the field.

18. The reception device of claim 17, wherein the field is included in the concatenated data of the at least one PDCP PDU.

19. The reception device of claim 17, wherein the at least one PDCP PDU further includes a PDCP header, and wherein the field is included in the PDCP header.

20. The reception device of claim 16, wherein the controller is further configured to transfer the separated PDCP SDUs to the upper layer in an order of placement from a front.

* * * * *